(12) United States Patent
Xu et al.

(10) Patent No.: US 8,321,893 B2
(45) Date of Patent: Nov. 27, 2012

(54) APPARATUS AND METHOD FOR DISCOVERING ESG BOOTSTRAP ENTRY POINT IN CBMS SYSTEM

(75) Inventors: Yiling Xu, Suwon-si (KR); Jae-Yeon Song, Seoul (KR); Kook-Heui Lee, Suwon-si (KR); Ji-Eun Keum, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 430 days.

(21) Appl. No.: 12/399,329

(22) Filed: Mar. 6, 2009

(65) Prior Publication Data

US 2009/0228927 A1 Sep. 10, 2009

(30) Foreign Application Priority Data

| Mar. 6, 2008 | (KR) | 10-2008-0021107 |
| Apr. 8, 2008 | (KR) | 10-2008-0032879 |
| Apr. 17, 2008 | (KR) | 10-2008-0035839 |
| Apr. 21, 2008 | (KR) | 10-2008-0036781 |
| May 9, 2008 | (KR) | 10-2008-0043670 |

(51) Int. Cl.
*G06F 3/00* (2006.01)
(52) U.S. Cl. ........................... 725/51; 725/109
(58) Field of Classification Search .................. None
See application file for complete search history.

(56) References Cited

U.S. PATENT DOCUMENTS

| 7,924,338 B2 | 4/2011 | Parks |
| 7,983,226 B2 | 7/2011 | Oommen et al. |
| 2002/0166128 A1* | 11/2002 | Ikeda et al. ............. 725/112 |
| 2007/0053291 A1* | 3/2007 | Hiltunen et al. ......... 370/233 |
| 2007/0294727 A1 | 12/2007 | Jeon et al. |
| 2008/0070557 A1* | 3/2008 | Paila et al. ............. 455/414.1 |
| 2008/0182616 A1* | 7/2008 | Connors et al. ......... 455/552.1 |
| 2009/0328099 A1 | 12/2009 | Praden et al. |
| 2010/0058387 A1 | 3/2010 | De Cuetos et al. |

FOREIGN PATENT DOCUMENTS

| EP | 1 791 362 A2 | 5/2007 |
| EP | 1 883 228 A1 | 1/2008 |
| JP | 2005-512403 A | 4/2005 |
| JP | 2007-535870 A | 12/2007 |
| JP | 2009-545218 A | 12/2008 |
| WO | 2007/029090 A1 | 3/2007 |

(Continued)

OTHER PUBLICATIONS

Service Guide for Mobile Broadcast Services, Draft Version 1.0, Jan. 23, 2007, Open Mobile Alliance, OMA-TS-BCAST_ServiceGuide-V1_0_0-20070123-D, Open Mobile Alliance Ltd.

Technical Paper (1) XP 040397617, IP Datacast over DVB-H: Content Delivery Protocols, ETSI TS IXX XXX, Oct. 1, 2005, vol. 0.0.10, Geneva, Switzerland.

(Continued)

*Primary Examiner* — Brian Pendleton
*Assistant Examiner* — Olugbenga Idowu
(74) *Attorney, Agent, or Firm* — Jefferson IP Law, LLP

(57) ABSTRACT

A method of providing discovery information of an Electronic Service Guide (ESG) bootstrap entry point is provided. The method includes listing at least one piece of ESG bootstrap characteristic information for an ESG bootstrap proper for a status of a terminal, creating a Management Object (MO), which connects the ESG bootstrap entry point with said at least one piece of ESG bootstrap characteristic information and transmitting the created MO to the terminal through an interactive channel.

20 Claims, 61 Drawing Sheets

FOREIGN PATENT DOCUMENTS

| | | |
|---|---|---|
| WO | 2007/064150 A1 | 6/2007 |
| WO | 2007/136199 A1 | 11/2007 |
| WO | 2008/012262 A1 | 1/2008 |
| WO | 2008/053322 A2 | 5/2008 |
| WO | 2008/088177 A1 | 7/2008 |
| WO | 2008/104868 A2 | 9/2008 |

OTHER PUBLICATIONS

Technical Paper (2) XP 040397615, IP Datacast over DVB-H: Architecture, ETSI TS IXX XXX, Oct. 1, 2005, vol. 0.0.14, Geneva, Switzerland.

DVB-H, IP Datacast over DVB-H, Service Purchase and Protection (SPP), DVB Document A100, Dec. 2005.

* cited by examiner

APPARATUS AND METHOD FOR DISCOVERING ESG BOOTSTRAP ENTRY POINT IN CBMS SYSTEM

PRIORITY

This application claims the benefit under 35 U.S.C. §119 (a) of Korean patent applications filed in the Korean Industrial Property Office on Mar. 6, Apr. 8, Apr. 17, Apr. 21, and May 9, 2008 and respectively assigned Serial Nos. 10-2008-0021107, 10-2008-0032879, 10-2008-0035839, 10-2008-0036781, and 10-2008-0043670, the entire disclosures of all of which are hereby incorporated by reference.

BACKGROUND OF THE INVENTION

1. Field of the Invention

The present invention relates to a Convergence of Broadcasting and Mobile Service (CBMS) system. More particularly, the present invention relates to a method and an apparatus for Electronic Service Guide (ESG) selection in a CBMS system.

2. Description of the Related Art

With the development of communication and broadcast technologies, broadcast systems and mobile communication systems are able to provide a mobile Broadcast, which includes transmission of packet data through a broadcast channel. The capability of the mobile Broadcast is beyond that of the typical broadcast service which is limited to voice and image services. Establishing such a mobile Broadcast may include the discovery of a service by a mobile terminal capable of receiving the mobile broadcast, such as a mobile phone, a notebook, or a Personal Digital Assistant (PDA), subscription of the mobile terminal to the service, provision of various pieces of control information for reception of the service, transmission of the service and reception of the service by the mobile terminal.

The Open Mobile Alliance (OMA), which is an organization studying standards for interaction between individual mobile solutions, has determined standards for various applications mainly relating to mobile games, Internet services, etc. Among the working groups of the OMA, the sub working group of the Browser and Content (OMA BAC) Mobile Broadcast (BCAST) is studying technologies for convergence of a broadcast service and a mobile communication service by using a mobile terminal capable of communicating with an interactive network. Further, the Digital Video Broadcasting-Convergence of Broadcasting and Mobile Service (DVB-CBMS), which is an organization for mobile broadcast terminal standards, also defines system structures, interfaces, etc. for convergence of a broadcast service and a mobile communication service.

FIG. 1 is a block diagram illustrating a structure of a conventional CBMS system.

FIG. 1 illustrates logical entities interacting with each other in order to achieve capabilities required for Internet Protocol (IP) Data Cast (IPDC) based on DVB-H (Digital Video Broadcasting-Handheld). The entities illustrated in FIG. 1 are discriminated based on their main functions and may be located within either physically discriminated servers or the same server.

Referring to FIG. 1, the content creation block 101 creates content sources for a broadcast service and supplies the created content sources to the service application block 103. The service application block 103 creates service data for a particular service by aggregating the content sources, which are supplied from the content creation block 101, with metadata that is used for service configuration. For creation of the service data, the service application block 103 includes multiple sub-entities managing different applications for individual services. The service management block 105 includes sub-entities performing functions including service configuration, resource allocation, electronic service guide provisioning, security, and Mobility Management (MM) between the service application block 103 and a terminal 111.

The broadcast network 107 is a network that transmits broadcast service data, an example of which is the DVB-H system. In general, the interactive network 109 refers to a cellular mobile communication network, such as the Universal Mobile Telecommunications system (UMTS) according to the 3rd Generation Partnership Project (3GPP), the International Mobile Telecommunications (IMT)-2000 according to the 3GPP2, and the Wireless Local Area Network (WLAN) or Wireless Broadband internet (WiBro). Also, the interactive network 109 may include all types of mobile communication networks capable of receiving information or a request from the terminal 111 and transmitting a response to the information or the request. The broadcast network 107 and the interactive network 109 operate as transmission bearers in a Convergence of Broadcasting and Mobile Service (CBMS) system.

The terminal 111 refers to a user terminal or receiver capable of accessing the interactive network 109 and receiving a broadcast service supplied from the broadcast network 107. In a CBMS system, the terminal 111 receives service data and signaling information from the broadcast network 107 and bi-directionally exchanges service data and signaling information with the interactive network 109.

Hereinafter, interfaces between individual entities including the logical entities will be described. In FIG. 1, CBMS-x and X-x refer to reference points between different functional entities, wherein CBMS-x refers to a reference point within the range of an IP datacast relating to the DVB-H specification and X-x refers to a reference point out of the range of an IP datacast relating to the DVB-H specification.

The interfaces of X-1, X-2 and X-3 refer to reference points between the broadcast network 107 and other entities, and they are typically not used in interactive standards based on the DVB-H. The X-1 interface interconnects the content creation block 101 and the service application block 103, the X-2 interface interconnects the interactive network 109 and the terminal 111, and the X-3 interface interconnects the service management block 105 and the interactive network 109.

The CBMS-1 interface carries broadcast-related signaling, i.e. Program Specific Information/Service Information (PSI/SI), from the broadcast network 107 to the terminal 111, and the CBMS-2 interface transfers content including audio, video, and files, from the service application block 103 to the terminal 111. The CBMS-3 interface transfers an Electronic Service Guide (ESG) from the service management block 105 to the terminal 111 through the broadcast network 107 in the form of Point-To-Multipoint (PTM) transmission. The CBMS-4 interface is used for Point-To-Point (PTP) transmission of ESG metadata and access control for service applications of the service application block 103 between the service management block 105 and the terminal 111. The CBMS-5 interface, which is an interface for PTP transmission service between the service application block 103 and the terminal 111, transfers a Short Message Service (SMS), a Multimedia Message Service (MMS), etc. through the interactive network 109. The CBMS-6 interface carries configuration parameters, which include allocated bandwidths and the number of services for DVB-H transmission, between the service management block 105 and the broadcast network 107. The CBMS-7 interface is used for description of a service application including metadata and content description or declaration of a service application between the service application block 103 and the service management block 105.

In order to receive a broadcast service in a mobile broadcast system such as the CBMS system, the terminal receives a Service Guide (SG), which includes description information of the service itself, charging information for the service, and information on a method of receiving the service. Then, by using the SG, the terminal can receive a service that it desires.

According to the conventional art as described above, in order to receive the ESG bootstrap information and receive a desired service through selection of an ESG, the terminal has to select an ESG bootstrap entry point from the PSI/SI in the broadcast network. Therefore, there is a need for the ability to select an ESG in an interactive network using an OMA Device Management (DM) without using the broadcast network.

SUMMARY OF THE INVENTION

An aspect of the present invention is to address at least the above-mentioned problems and/or disadvantages and to provide at least the advantages described below. Accordingly, an aspect of the present invention is to provide a method and an apparatus for discovering an Electronic Service Guide (ESG) bootstrap entry point for selection of an ESG in an interactive network.

Another aspect of the present invention is to provide a method and an apparatus for discovering roaming partner information within a roaming coverage area of a mobile station and an ESG bootstrap entry point corresponding to the roaming partner information.

In accordance with an aspect of the present invention, a method of providing discovery information of an ESG bootstrap entry point, which is a point for requiring ESG bootstrap information for selection of an ESG, by a server in a Convergence of Broadcasting and Mobile Service (CBMS) system, is provided. The method includes listing at least one piece of ESG bootstrap characteristic information for an ESG bootstrap appropriate for a status of a terminal, creating a Management Object (MO), which connects the ESG bootstrap entry point with said at least one piece of ESG bootstrap characteristic information and transmitting the created MO to the terminal through an interactive channel.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features and advantages of certain exemplary embodiments of the present invention will be more apparent from the following description taken in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces By the term "substantially" it is meant that the recited characteristic, parameter, or value need not be achieved exactly, but that deviations or variations, including for example, tolerances, measurement error, measurement accuracy limitations and other factors known to skill in the art, may occur in amounts that do not preclude the effect the characteristic was intended to provide.

Exemplary embodiments of the present invention propose mechanisms, which enable a terminal to either select a new Electronic Service Guide (ESG) bootstrap entry point based on the Open Mobile Alliance (OMA) Device Management (DM) or select an ESG based on provisioning. As used herein, the term "ESG bootstrap entry point" denotes a point at which a terminal can access an ESG bootstrap in order to search for ESG bootstrap information.

First, Management Object (MO), which is ESG bootstrap entry point information used in searching for an ESG bootstrap entry point by using the OMA DM, is defined. According to exemplary embodiments of the present invention, the MO may have various configurations, and may provide useful information, which enables a terminal to select an appropriate ESG bootstrap entry point information. Therefore, the MO can be properly modified according to its use.

Figure 2:
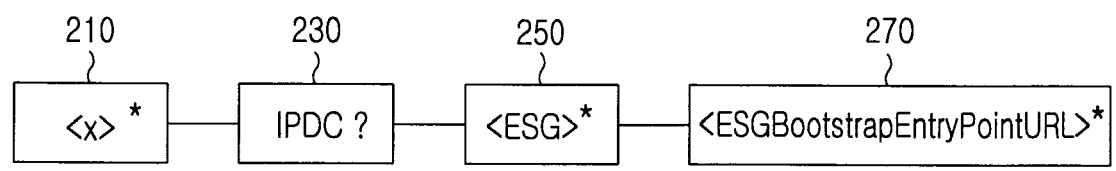
FIG. 2 illustrates a representative Management Object (MO) according to an exemplary embodiment of the present invention.

FIG. 2 illustrates a representative MO according to an exemplary embodiment of the present invention.

Referring to FIG. 2, reference numerals 210 to 270 denote nodes used in searching for an ESG bootstrap entry point. Among the nodes, the X field 210 is a node functioning as a placeholder, the Internet Protocol Data Cast (IPDC) field 230 is a node for an IPDC terminal, the ESG field 250 is a node carrying ESG-related information, and the ESGBootstrapEntryPointURL field 270 is a node indicating an entry point Uniform Resource Locator (URL) for requiring ESG bootstrap information through an interactive network.

The tables below provide a description of each node, which is provided through a description of the OMA DM. Therefore, a more detailed description of the tables below can be obtained by referring to detailed descriptions of OMA DMs.

Table 1 below shows the above-mentioned node <x> in more detail.

TABLE 1

| | |
|---|---|
| Status | Required |
| Occurrence | ZeroOrMore |
| Format | Node |
| Min.Access Types | Get |
| Value | N/A |

Table 2 shows the above-mentioned node <x>/IPDC/ in more detail.

TABLE 2

| | |
|---|---|
| Status | Required |
| Occurrence | ZeroOrOne |
| Format | Node |
| Min.Access Types | Get |
| Value | N/A |

Table 3 below shows the above-mentioned node <x>/IPDC/ESG/ in more detail.

TABLE 3

| | |
|---|---|
| Status | Required |
| Occurrence | OneOrMore |
| Format | Node |
| Min.Access Types | Get |
| Value | N/A |

Table 4 shows the above-mentioned node <x>/IPDC/ESG/ESGBootstrapEntryPointURL/ in more detail.

TABLE 4

| | |
|---|---|
| Status | Required |
| Occurrence | OneOrMore |
| Format | Chr |
| Min.Access Types | Get |
| Value | URL to the Entry Point to request ESG Bootstrap information over interactive Network |

Based on the representative MO described above, a terminal can search for an ESG bootstrap entry point URL by using the following OMA DM mechanisms.

Table 5 shows ideas of exemplary embodiments of the present invention.

TABLE 5

All the solutions for the entry point in this document are described as a URL, but the entry point could be one or more of a URL, IP address and port number. If both the URL and IP address are used at the same time, each case could be treated as a sub node.

| | |
|---|---|
| Note 1 | Different mechanisms and examples of the MO are provided in this document, and all or part of these mechanisms and MOs could be combined and modified based on the application. |
| Note 2 | IPPlatformID may not globally and uniquely identify the IP platform, so the IP platform should be identified by IPPlatformID and NetworkID. In this case, all of the recitations of IPPlatformID in this document may be replaced by IPPlatformID plus NetworkID. |
| Note 3 | All the identifiers and structures identified in this disclosure are based on a current existing specification, IG. However, they could be modified when a new version is available. |
| Note 4 | The concept of roaming is still in discussion. All the related issues in this document may be modified after a final decision on roaming has been made. |
| Note 5 | Based on a current specification, there is one ESG bootstrap entry point for one IP platform. But in this document, the node of an IP platform for each entry point may occur more than once. Future extension is contemplated. Other nodes are in a similar condition. For the convenience of explanation, the occurrence of a node in this document is zero or more. But the actual occurrence of each node could be modified based on the current application and specification. |
| Note 6 | Mechanism 1-9 use OMA DM for ESG bootstrap entry point discovery. Mechanism 10 is related to ESG entry point discovery. Mechanism 10 is related to provision information. All the structure and MO examples provided in mechanism 1-9 may be modified for mechanism 10 and 11. |
| Note 7 | 1) The parameters for bootstrap entry point, ESG entry point, and provisioning information are described when defining the MO. The terminal may acquire them through the OMA DM mechanism. But this information may also be delivered to the terminal over an interactive network or a broadcast network through signaling, e.g. query and request, notification, etc. This will be useful especially when a terminal does not support OMA DM. 2) If it is assumed that each DM server only provides the information for its IPDC operator, the local IPDC operator identifier could be omitted. But for further extension, the local IPDC operator identifier information is given in this document. 3) In mechanism 12-14, the ESGBoostrapEntryPointURL(or ESGEntryPointURL) for local and roaming cases are separated. For a different roaming partner, the URL is also separated. But it could be the same or a different URL. If the URL is different, that means a different URL is prepared to differentiate the local, and various roaming partner case. If the same URL is prepared, the terminal should tell the server which bootstrap (or ESG), local or which roaming partner, that it wants to use for a query at this entry point. |

OMA DM Mechanism According to 1$^{st}$ Exemplary Embodiment of the Present Invention A terminal can register in a particular Internet Protocol Data Cast Key Management System (IPDC KMS) and IPDC operator, and has a right to access a service possessed by the IPDC KMS and IPDC operator. A service described in the ESG may belong to a particular single IPDC KMS and IPDC operator, and the IPDC KMS and IPDC operator information is given within an acquisition fragment.

When a service is given within an acquisition fragment as described above, a terminal may not be aware of which IPDC operator each service belongs to, before selecting and searching for an ESG.

Meanwhile, a current IPDC operator can be identified by the IPDCKMSID and IPDCOperatorID. In exemplary embodiments of the present invention, the IPDCKMSID and IPDCOperatorID are used as an IPDC operator identifier. If the IPDC operator identifier is changed later, related identifiers also should be replaced by new identifiers.

When the IPDCKMSID and IPDCOperatorID are used as an IPDC operator identifier as described above, indication information reading "which ESG is proper for a terminal registered in a particular IPDC KMS and IPDC operator" in an OMA DM mechanism according to the first exemplary embodiment of the present invention can achieve optimization of the OMA DM mechanism, and helps the terminal to more easily and rapidly find a proper ESG bootstrap entry point for selection of an ESG belonging to the IPDC KMS and IPDC operator.

1. 1$^{st}$ OMA DM Mechanism

Figure 3:
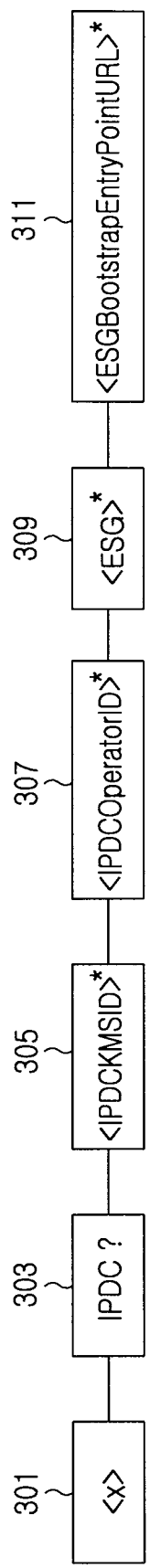
FIG. 3 illustrates an MO of a first Open Mobile Alliance Device Management (OMA DM) mechanism according to a first exemplary embodiment of the present invention.

FIG. 3 illustrates an MO of a first OMA DM mechanism according to the first exemplary embodiment of the present invention.

Referring to FIG. 3, the X field 301 is a node functioning as a placeholder, the IPDC field 303 is a node for an IPDC terminal, the IPDCKMSID field 305 is a node indicating a home IPDC KMS for the terminal, the IPDCOperatorID field 307 is a node indicating a home IPDC operator for the terminal, the ESG field 309 is a node carrying ESG-related information, and the ESGBootstrapEntryPointURL field 311 is a node indicating an ESG entry point URL for requesting ESG bootstrap information through an interactive network.

Through nodes 301 to 311 as described above, the terminal can search for an ESG bootstrap entry point URL, and can find an ESG having corresponding IPDCKMSID and IPDCOperatorID from the ESG bootstrap entry point URL obtained through the search.

2. 2$^{nd}$ OMA DM Mechanism

A second OMA DM mechanism according to the first exemplary embodiment of the present invention provides a bootstrap entry point for a particular ESG KMS system. All bootstrap information for an IPDC operator belonging to a particular IPDC KMS system using a bootstrap entry point is described below.

Figure 4:
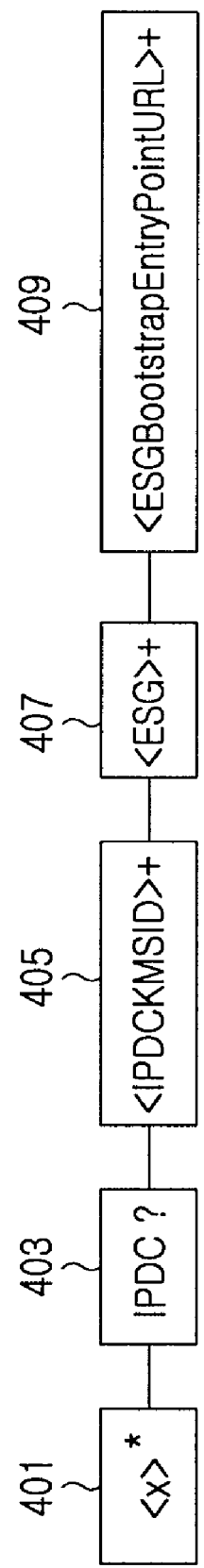
FIG. 4 illustrates an MO of a second OMA DM mechanism according to the first exemplary embodiment of the present invention.

FIG. 4 illustrates an MO of the second OMA DM mechanism according to the first exemplary embodiment of the present invention.

Referring to FIG. 4, the X field 401 is a node functioning as a placeholder, the IPDC field 403 is a node for an IPDC terminal, the IPDCKMSID field 405 is a node indicating a home IPDC KMS for the terminal, the ESG field 407 is a node carrying ESG-related information, and the ESGBootstrapEntryPointURL field 409 is a node indicating an ESG entry point URL for requiring ESG bootstrap information through an interactive network.

Based on the second OMA DM mechanism according to the first exemplary embodiment of the present invention as described above, the terminal can search for an ESG bootstrap entry point URL. From the ESG bootstrap entry point URL obtained through the search, the terminal can find an ESG having an IPDCKMSID which the terminal itself has registered.

The following description of mechanisms based on the OMA DM mechanism according to the first exemplary embodiment of the present invention will use the first OMA DM mechanism according to the first exemplary embodiment of the present invention as an example. Of course, the mechanisms described below can be applied to similar examples using the second OMA DM mechanism according to the first exemplary embodiment of the present invention. However, for convenience of description, the present specification discusses only the examples using the first OMA DM mechanism according to the first exemplary embodiment of the present invention.

OMA DM Mechanism According to 2$^{nd}$ Exemplary Embodiment of the Present Invention In some circumstances, there may be multiple ESG providers within each ESG bootstrap, and each ESG provider can provide multiple ESGs. Therefore, a single ESG bootstrap entry point may include multiple pieces of ESG information. When a single ESG bootstrap entry point may include multiple pieces of ESG information as described above, an OMA DM mechanism according to the second exemplary embodiment of the present invention indicates an ESG Universal Resource Identifier (ESGURI), so as to provide a solution enabling a terminal to find a proper ESG bootstrap entry point.

1. 1$^{st}$ OMA DM Mechanism

Figure 5:
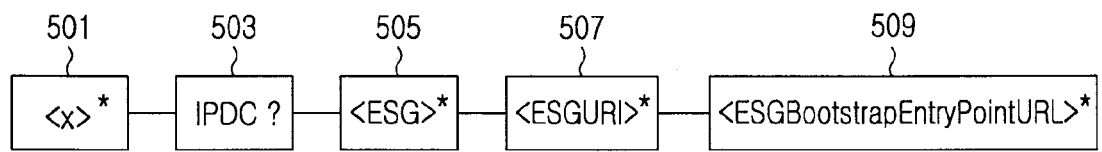
FIG. 5 illustrates an MO of a first OMA DM mechanism according to a second exemplary embodiment of the present invention.

FIG. 5 illustrates an MO of a first OMA DM mechanism according to a second exemplary embodiment of the present invention.

Referring to FIG. 5, the X field 501 is a node functioning as a placeholder, the IPDC field 503 is a node for an IPDC terminal, the ESG field 505 is a node carrying ESG-related information, the ESGURI field 507 is a node indicating an ESGURI that can be found within the ESG bootstrap, and the ESGBootstrapEntryPointURL field 509 is a node indicating an ESG entry point URL for requiring ESG bootstrap information through an interactive network.

2. 2$^{nd}$ OMA DM Mechanism

A second OMA DM mechanism according to the second exemplary embodiment of the present invention is a mechanism based on the OMA DM mechanism according to the first exemplary embodiment of the present invention as described above.

Figure 6:
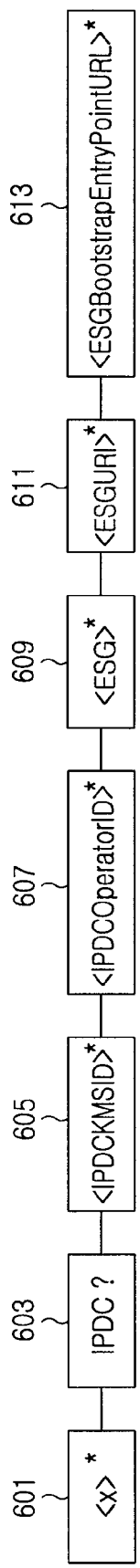
FIG. 6 illustrates an MO of a second OMA DM mechanism according to the second exemplary embodiment of the present invention.

FIG. 6 illustrates an MO of a second OMA DM mechanism according to the second exemplary embodiment of the present invention.

Referring to FIG. 6, the X field 601 is a node functioning as a placeholder, the IPDC field 603 is a node for an IPDC terminal, the IPDCKMSID field 605 is a node indicating a home IPDC KMS for the terminal, and the IPDCOperatorID field 607 is a node indicating a home IPDC operator for the terminal. Further, the ESG field 609 is a node carrying ESG-related information, the ESGURI field 611 is a node indicating an ESGURI that can be found within the ESG bootstrap, and the ESGBootstrapEntryPointURL field 613 is a node indicating an ESG entry point URL for requiring ESG bootstrap information through an interactive network.

Through the OMA DM mechanism according to the second exemplary embodiment of the present invention as described above, the terminal can find the ESG bootstrap entry point related to only the desired ESG. For example, the terminal accesses an ESG1 in one network and then moves to another network. However, the change of the network causes a change of bootstrap information for the ESG1. At this time, without using the OMA DM mechanism according to the second exemplary embodiment of the present invention, the terminal must search all bootstrap information for the bootstrap information relating to ESG1. However, by using the OMA DM mechanism according to the second exemplary embodiment of the present invention, the terminal can find the bootstrap information relating to ESG1.

OMA DM Mechanism According to 3$^{rd}$ Exemplary Embodiment of the Present Invention Multiple available ESGs may exist within multiple areas. When there are multiple available ESGs within multiple areas as described above, the OMA DM mechanism according to a third exemplary embodiment of the present invention enables a terminal located within a particular area to acquire bootstrap information for an ESG usable within the particular area through an ESG bootstrap entry point.

1. 1st OMA DM Mechanism

Figure 7:
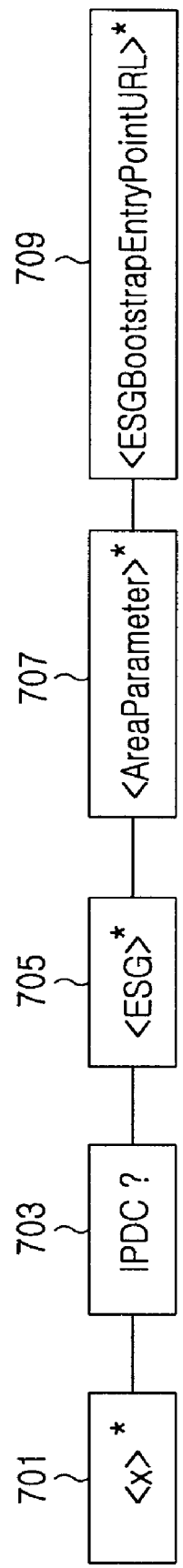
FIG. 7 illustrates an MO of a first OMA DM mechanism according to a third exemplary embodiment of the present invention.

FIG. 7 illustrates an MO of a first OMA DM mechanism according to the third exemplary embodiment of the present invention.

Referring to FIG. 7, the X field 701 is a node functioning as a placeholder, the IPDC field 703 is a node for an IPDC terminal, the ESG field 705 is a node carrying ESG-related information, the AreaParameter field 707 is a node carrying area-related parameters, such as network identifier (ID), cell ID, Mobile Country Code (MCC), Mobile Network Code (MNC), GPS, nation code, and the like, and the ESGBootstrapEntryPointURL field 709 is a node indicating an ESG entry point URL for requiring ESG bootstrap information through an interactive network.

2. 2nd OMA DM Mechanism

In the OMA DM mechanism according to the first exemplary embodiment of the present invention described above, the ESG bootstrap entry point is a point for a particular terminal from particular IPDCKMSID and IPDCOperatorID in a particular area.

Figure 8:
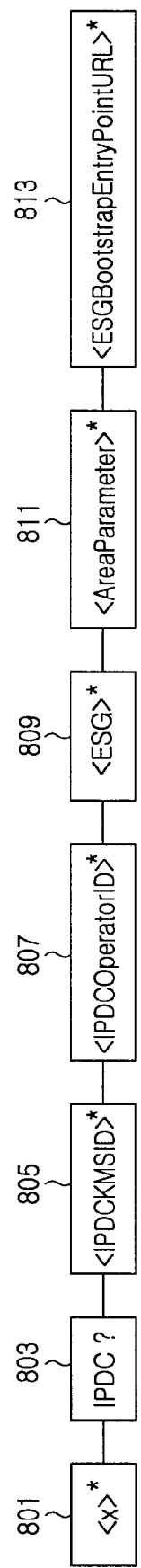
FIG. 8 illustrates an MO of a second OMA DM mechanism according to the third exemplary embodiment of the present invention.

FIG. 8 illustrates an MO of a second OMA DM mechanism according to the third exemplary embodiment of the present invention.

Referring to FIG. 8, the X field 801 is a node functioning as a placeholder, the IPDC field 803 is a node for an IPDC terminal, the IPDCKMSID field 805 is a node indicating a home IPDC KMS for the terminal, and the IPDCOperatorID field 807 is a node indicating a home IPDC operator for the terminal. Further, the ESG field 809 is a node carrying ESG-related information, the AreaParameter field 811 is a node carrying area-related parameters, such as network ID, cell ID, MCC, MNC, GPS, and nation code, and the ESGBootstrapEntryPointURL field 813 is a node indicating an ESG entry point URL for requiring ESG bootstrap information through an interactive network.

Using the OMA DM mechanism according to the third exemplary embodiment of the present invention as described above, the terminal can obtain an ESG bootstrap entry point for only a particular area. For example, when there exist two cells each having an ESG, it is possible to prepare two different ESG bootstrap entry points for the two cells, so as to use the two different ESG bootstrap entry points according to the position of the terminal.

OMA DM Mechanism According to 4th Exemplary Embodiment of the Present Invention

Each network may have available a plurality of ESGs, each of which is different according to the network. For example, each network may have its own ESG for satellite, ESG for DVB-H, ESG for an interactive network and the like. In the case where available ESGs are different according to the network as described above, an OMA DM mechanism according to a fourth exemplary embodiment of the present invention enables a terminal having accessed a particular network to acquire bootstrap information for an ESG usable in the network through an ESG bootstrap entry point.

1. 1st OMA DM Mechanism

Figure 9:
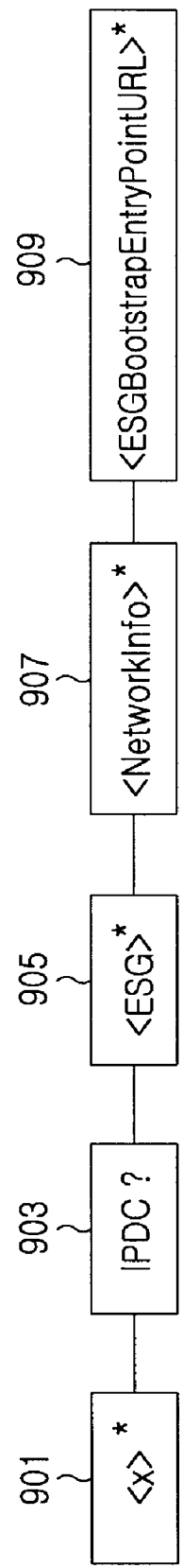
FIG. 9 illustrates an MO of a first OMA DM mechanism according to a fourth exemplary embodiment of the present invention.

FIG. 9 illustrates an MO of a first OMA DM mechanism according to the fourth exemplary embodiment of the present invention.

Referring to FIG. 9, the X field 901 is a node functioning as a placeholder, the IPDC field 903 is a node for an IPDC terminal, the ESG field 905 is a node carrying ESG-related information, the NetworkInfo field 907 is a node carrying network-related parameters, such as network type (satellite, terrestrial, interactive network, etc.) and network ID, and the ESGBootstrapEntryPointURL field 909 is a node indicating an ESG entry point URL for requiring ESG bootstrap information through an interactive network.

2. 2nd OMA DM Mechanism

In the OMA DM mechanism according to the first exemplary embodiment of the present invention described above, the ESG bootstrap entry point is a point for a particular terminal from particular IPDCKMSID and IPDCOperatorID in a particular area.

Figure 10:
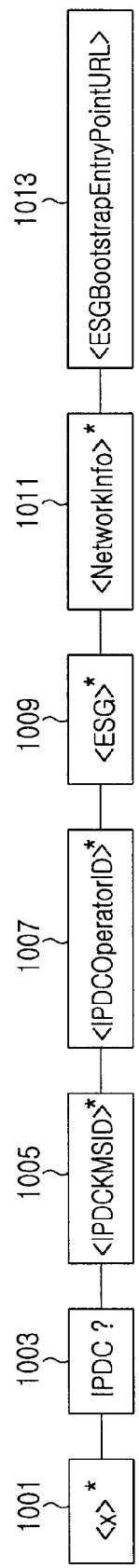
FIG. 10 illustrates an MO of a second OMA DM mechanism according to the fourth exemplary embodiment of the present invention.

FIG. 10 illustrates an MO of a second OMA DM mechanism according to the fourth exemplary embodiment of the present invention.

Referring to FIG. 10, the X field 1001 is a node functioning as a placeholder, the IPDC field 1003 is a node for an IPDC terminal, the IPDCKMSID field 1005 is a node indicating a home IPDC KMS for the terminal, and the IPDCOperatorID field 1007 is a node indicating a home IPDC operator for the terminal. Further, the ESG field 1009 is a node carrying ESG-related information, the NetworkInfo field 1011 is a node carrying network-related parameters, such as network type (satellite, terrestrial, interactive network, etc.) and network ID, and the ESGBootstrapEntryPointURL field 1013 is a node indicating an ESG entry point URL for requiring ESG bootstrap information through an interactive network.

In an OMA DM mechanism according to the fourth exemplary embodiment of the present invention, a terminal can obtain an ESG bootstrap entry point for a particular network. For example, a Digital Video Broadcasting-Satellite service to Handheld (DVB-SH) terminal can use a satellite ESG bootstrap entry point when it receives a satellite signal, and use a terrestrial ESG bootstrap entry point when it receives a terrestrial signal.

OMA DM Mechanism According to 5th Exemplary Embodiment of the Present Invention

There exists a large amount of detailed information about each ESG bootstrap and ESG. The above description relating to the first to fourth exemplary embodiments of the present invention discusses characteristic information, which includes a mechanism for an ESG bootstrap entry point relating to particular IPDCKMSID and IPDCOperatorID, an ESG bootstrap relating to a particular area, and an ESG bootstrap relating to a particular network. An OMA DM mechanism according to a fifth exemplary embodiment of the present invention provides a scheme for indicating the above-described characteristic information together with detailed information on the characteristic information. That is to say, according to the fifth exemplary embodiment of the present invention, detailed information relating to the ESG is included in the MO in order to help proper ESG bootstrap entry point selection by a terminal. By combining all or a part of the detailed information relating to the ESG, it is possible to indicate attributes of the ESG bootstrap entry point. Further, the related detailed information is not limited to the IPDCKMSID, IPDCOperatorID, area parameter, and network information, and may include more information for describing attributes of the ESG bootstrap entry point as application requirements.

1. 1st OMA DM Mechanism

Figure 11A:
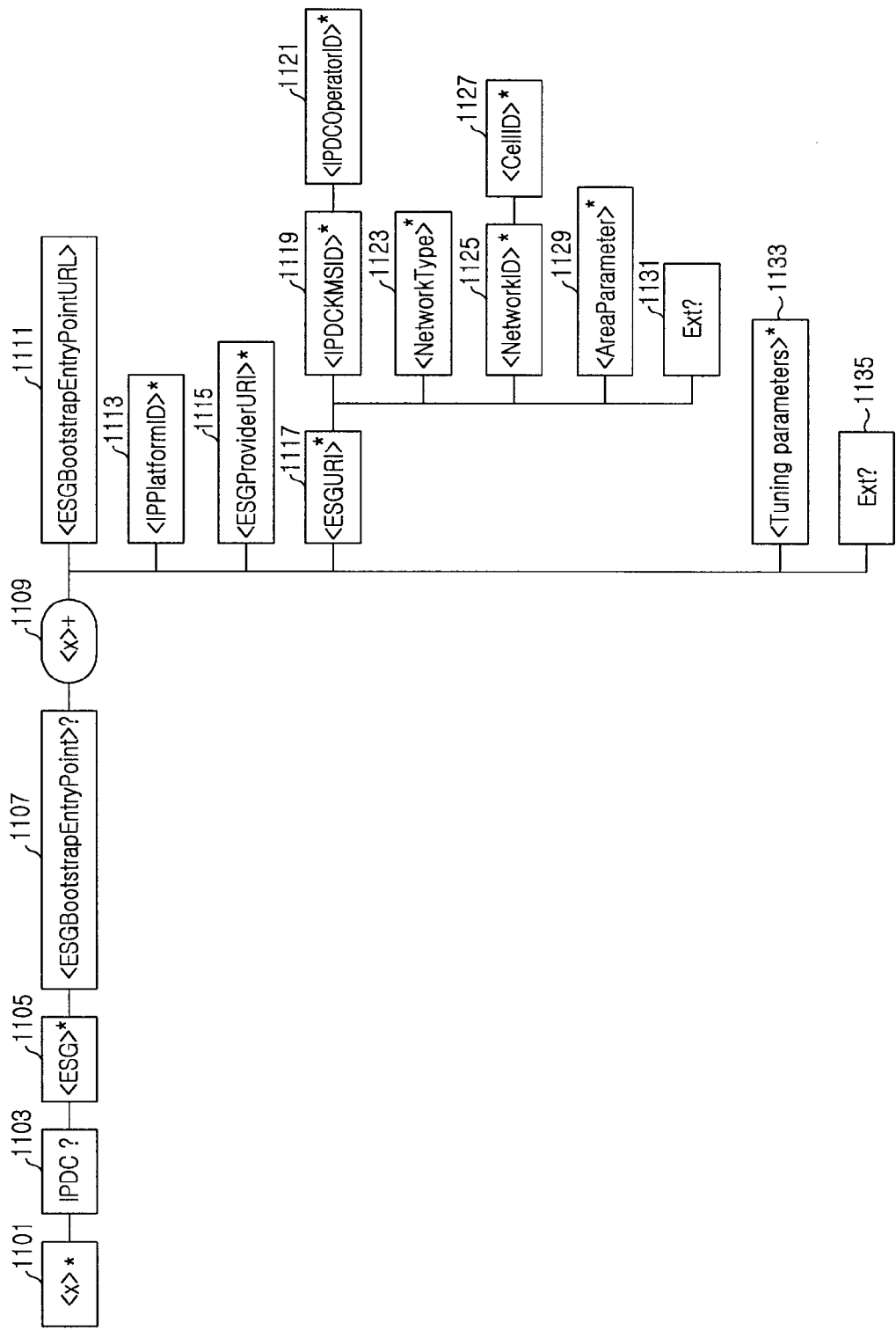
FIGS. 11A and 11B illustrate an MO of a first OMA DM mechanism according to a fifth exemplary embodiment of the present invention.
Figure 11B:
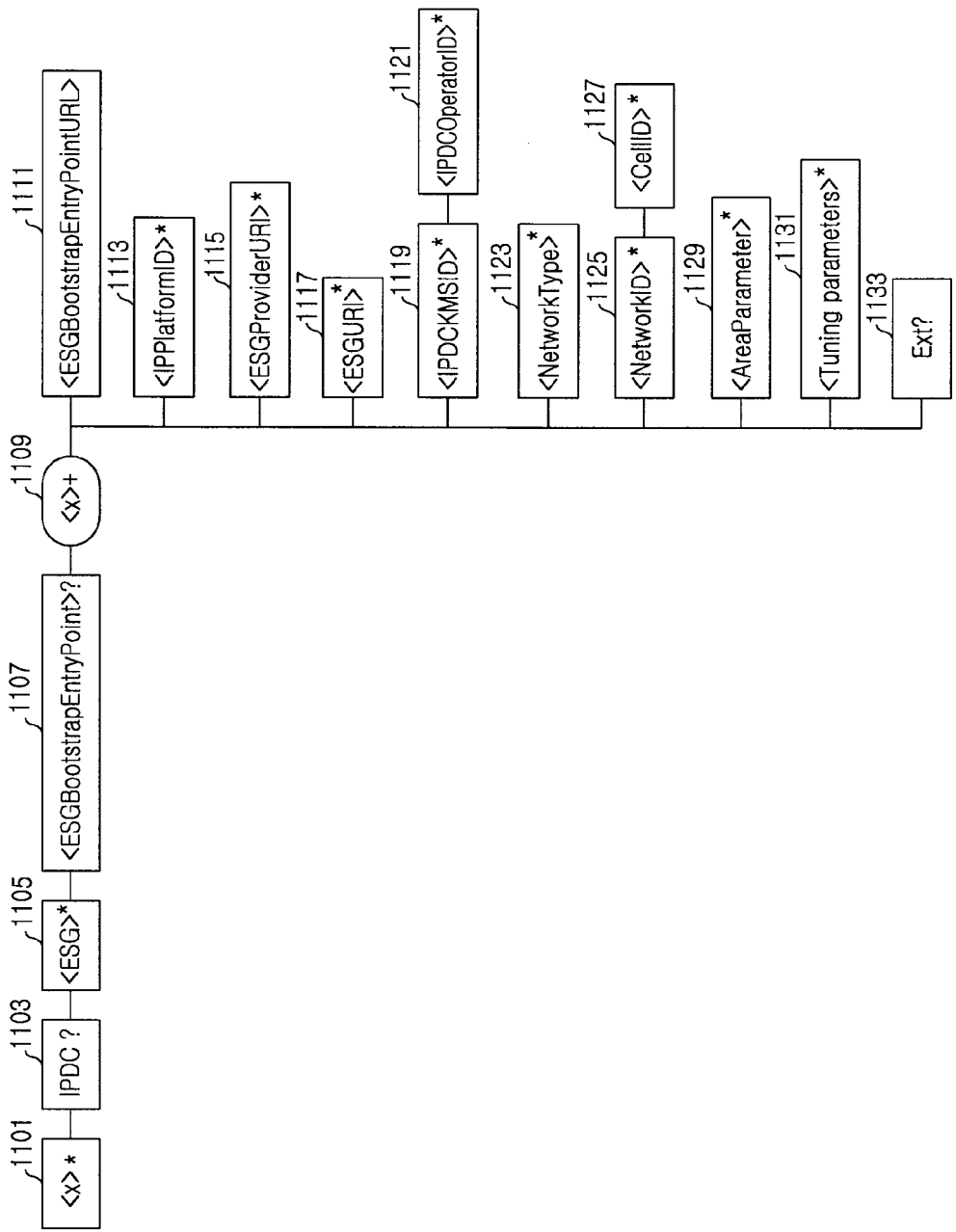

FIGS. 11A and 11B illustrate an MO of a first OMA DM mechanism according to a fifth exemplary embodiment of the present invention.

Referring to FIGS. 11A and 11B, the X field 1101 or 1109 is a node functioning as a placeholder, the IPDC field 1103 is a node for an IPDC terminal, the ESG field 1105 is a node carrying ESG-related information, the ESGBootstrapEntryPoint field 1107 is a node carrying ESG bootstrap-related information. Further, the ESGBootstrapEntryPointURL field 1111 is a node indicating an ESG bootstrap entry point URL for requiring ESG bootstrap information through an interactive network, the IPPlatformID field 1113 is a node carrying an IP platform indicator ID, the ESGProviderURI field 1115 is a node carrying a URI identifying an ESG provider. Further, the ESGURI field 1117 is a node indicating an ESGURI that can be found within the ESG bootstrap, the IPDCKMSID field 1119 is a node indicating an IPDCKMSID that can be found within the ESG, and the IPDCOperatorID field 1121 is a node indicating an IPDCOperatorID that can be found within the ESG.

Further, the NetworkType field 1123 is a node indicating network type-related information, such as satellite, terrestrial network, Digital Video Broadcasting-Satellite (DVB-S), Digital Video Broadcasting-Handheld (DVB-H), DVB-SH, 3rd Generation Partnership Project (3GPP), Wimax, and the like, the NetworkID field 1125 is a node carrying a network ID capable of accessing the ESG, the CellID field 1127 is a node carrying a cell ID capable of accessing the ESG, the AreaParameter field 1129 is a node carrying area-related parameters, such as network ID, cell ID, MCC, MNC, GPS, and nation code, the Ext field 1131 is a node carrying other access range parameters relating to application requirements, the Tuning parameters field 1133 is a node carrying related tuning parameters, and the Ext field 1135 is a node for addition or extension.

2. 2$^{nd}$ OMA DM Mechanism

Figure 12:
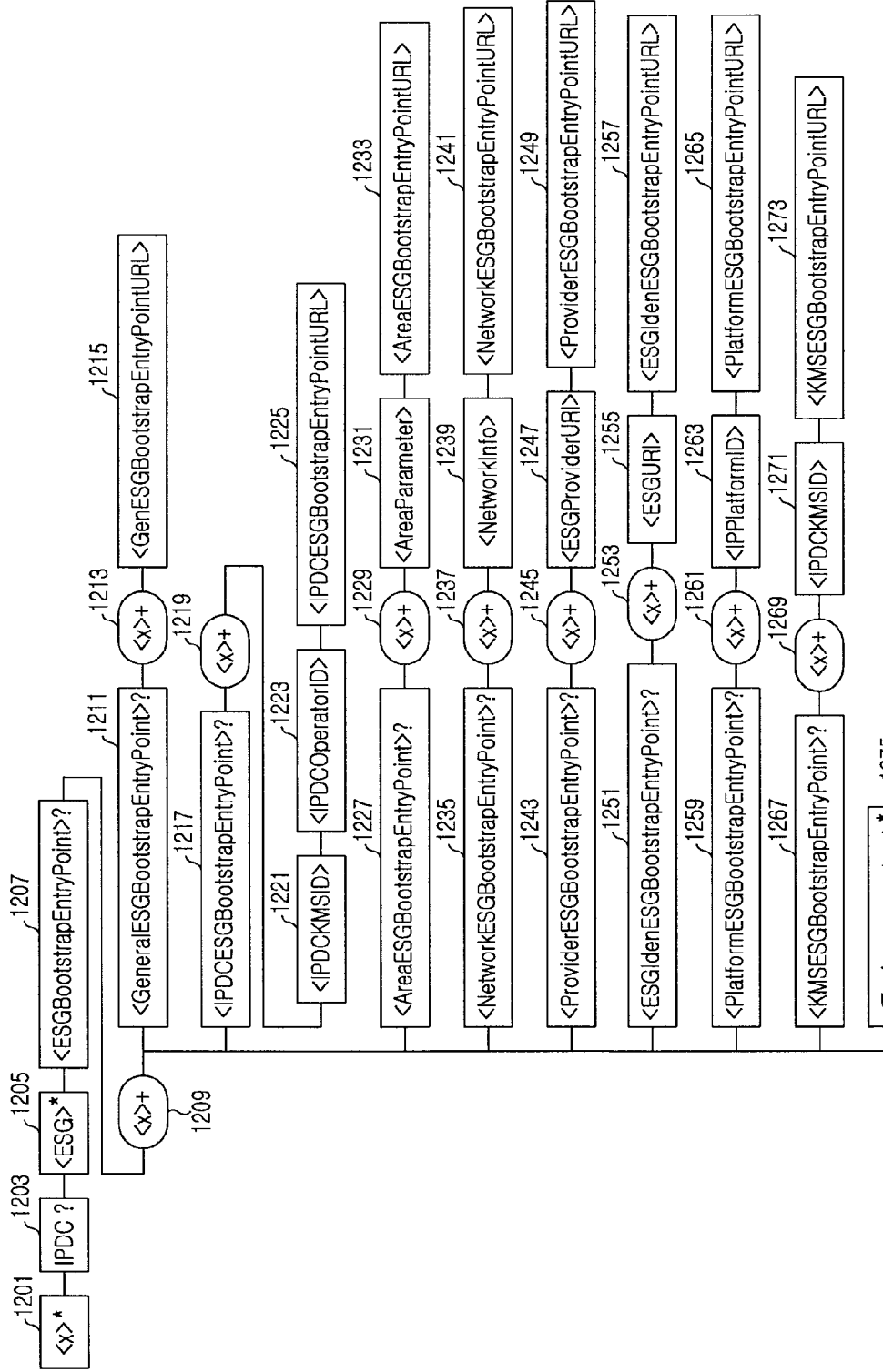
FIG. 12 illustrates an MO of a second OMA DM mechanism according to the fifth exemplary embodiment of the present invention.

As illustrated in FIG. 12 and described below, it is possible to enumerate different types of ESG bootstrap entry points according to the characteristics. Here, the type of the ESG bootstrap entry point is not limited, and a new type of ESG bootstrap entry point can be added in a similar way.

FIG. 12 illustrates an MO of a second OMA DM mechanism according to the fifth exemplary embodiment of the present invention.

Referring to FIG. 12, the X field 1201, 1209, 1213, 1219, 1229, 1237, 1245, 1253, 1261, or 1269 is a node functioning as a placeholder, the IPDC field 1203 is a node for an IPDC terminal, the ESG field 1205 is a node carrying ESG-related information, the ESGBootstrapEntryPoint field 1207 is a node carrying ESG bootstrap-related information, the GeneralESGBootstrapEntryPoint field 1211 is a node carrying typical ESG bootstrap-related information. Further, the GenESGBootstrapEntryPointURL field 1215 is a node indicating a URL, which is a typical ESG bootstrap entry point for requiring ESG bootstrap information through an interactive network, the IPDCESGBootstrapEntryPoint field 1217 is a node carrying information of an ESG bootstrap relating to an IPDC KMS system and IPDC operator, the IPDCKMSID field 1221 is a node indicating an IPDCKMSID that can be found in the ESG, the IPDCOperatorID field 1223 is a node indicating an IPDCOperatorID that can be found in the ESG, the IPDCESGBootstrapEntryPointURL field 1225 is a field indicating a URL, which is an ESG bootstrap entry point for requiring ESG bootstrap information relating to an IPDC KMS system and IPDC operator through an interactive network, the AreaESGBoostrapEntryPoint field 1227 is a node carrying information of an ESG bootstrap relating to an area, and the AreaParameter field 1231 is a node carrying area-related parameters, such as network ID, cell ID, GPS, nation code and the like. The AreaESGBootstrapEntryPointURL field 1233 is a field indicating a URL, which is an ESG bootstrap entry point for requiring ESG bootstrap information relating to an area through an interactive network, the NetworkESGBootstrapEntryPoint field 1235 is a node carrying information of an ESG bootstrap relating to a network, and the NetworkInfo field 1239 is a node carrying network-related information, such as network type and network ID. The NetworkESGBootstrapEntryPointURL field 1241 is a node indicating a URL, which is an ESG bootstrap entry point for requiring ESG bootstrap information relating to a network through an interactive network, the ProviderESGBootstrapEntryPoint field 1243 is a node carrying information of an ESG bootstrap relating to a provider, and the ESGProviderURI field 1247 is a node carrying ESG provider-related information. The ProviderESGBootstrapEntryPointURL field 1249 is a node indicating a URL, which is an ESG bootstrap entry point for requiring ESG bootstrap information relating to a provider through an interactive network, the ESGIdenESGBootstrapEntryPoint field 1251 is a node carrying information of an ESG bootstrap relating to an ESGURI, the ESGURI field 1255 is a node indicating an ESGURI that can be found in the ESG bootstrap, the ESGIdenESGBootstrapEntryPointURL field 1257 is a node indicating a URL, which is an ESG bootstrap entry point for requiring ESG bootstrap information relating to an ESGURI through an interactive network, and the PlatformESGBootstrapEntryPoint field 1259 is a node carrying information of an ESG bootstrap relating to an IP platform. The IPPlatformID field 1263 is a node carrying IP platform-related information, the PlatformESGBootstrapEntryPointURL field 1265 is a node indicating a URL, which is an ESG bootstrap entry point for requiring ESG bootstrap information relating to an IP platform through an interactive network, the KMSEGBootstrapEntryPoint field 1267 is a node carrying information of an ESG bootstrap relating to an IPDC KMS system, the IPDCKMSID field 1271 is a node indicating an IPDCKMSID that can be found in the ESG, the KMSESGBootstrapEntryPointURL field 1273 is a node indicating an entry point URL for requiring ESG bootstrap information relating to an IPDC KMS system through an interactive network, the Tuning parameters field 1275 is a node carrying related tuning parameters, and the Ext field 1277 is an internal node for additional information.

By the OMA DM mechanism according to the fifth exemplary embodiment of the present invention as described above, a terminal can select a proper ESG bootstrap entry point based on detailed information relating to each ESG bootstrap entry point. The detailed information described above is optional and can be selected by the network or the terminal according to the requirements.

OMA DM Mechanism According to 6$^{Th}$ Exemplary Embodiment

In a mobility scenario, proper management targets include main parameters of the roaming concept. One proper management range corresponds to the roaming of handover, because subscription and roaming agreement occurs in the roaming of handover.

In the current CBMS, an IPDC operator (more specifically, an IPDC KMS and IPDC operator) performs subscription and proper management. In the future, the subject performing the subscription and proper management may be changed. However, the concept and mechanisms of exemplary embodiments of the present invention can be applied to a partial modification in which the IPDC KMS system and IPDC operator are replaced by new parameters.

Within a home coverage, the terminal can search for an ESG bootstrap entry point and then access an ESG relating to the IPDC KMS system and IPDC operator ESG. Even when the terminal is located out of the home coverage, the terminal still has the right to access the service, because there is a kind of roaming agreement between the exterior and home IPDC KMS system and the IPDC operator.

Each local IPDCKMSID and IPDCOperatorID may have a roaming partner.

Figure 13:
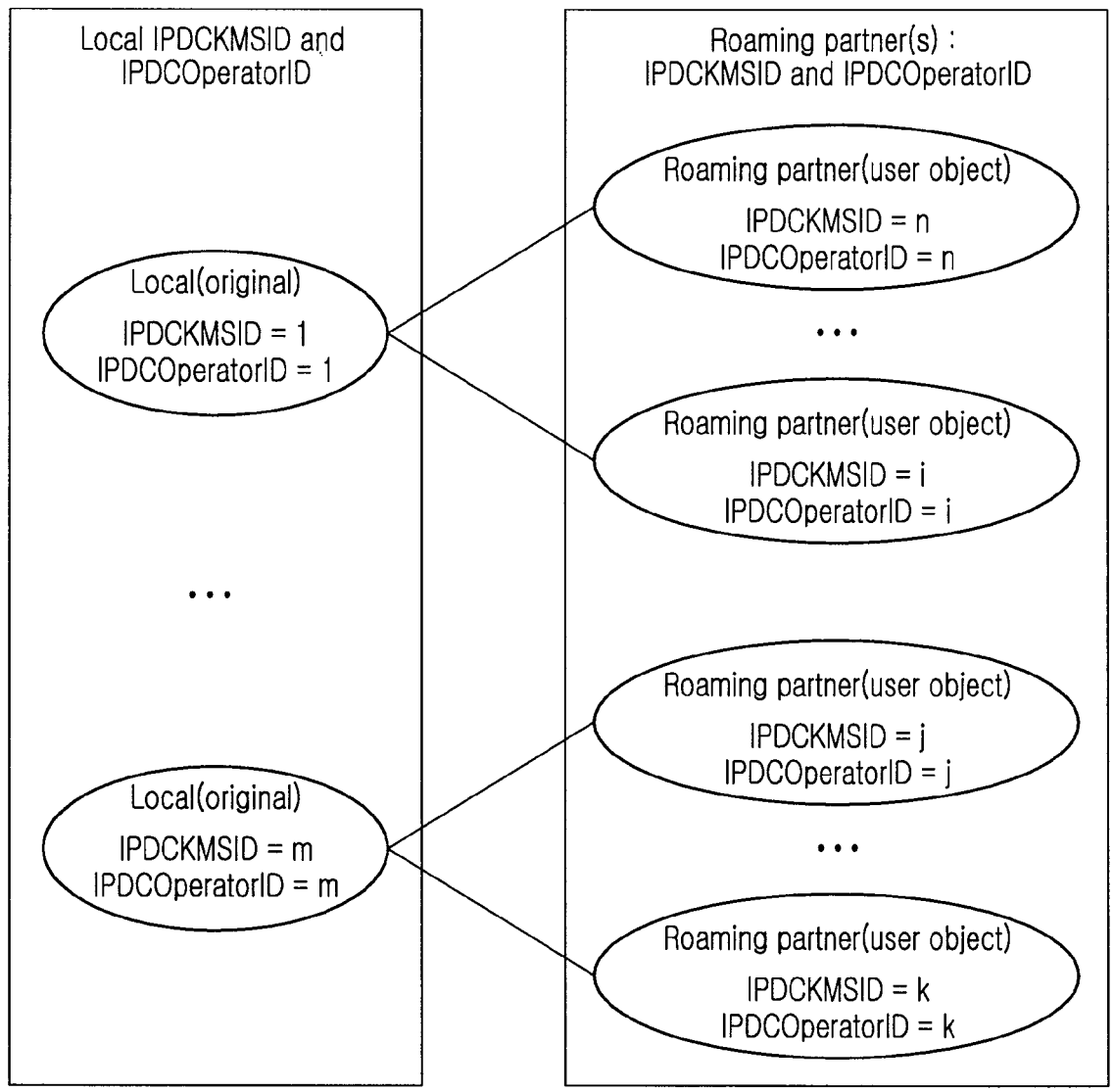
FIG. 13 illustrates roaming partners of each local IPDCK-MSID and IPDCOperatorID applied in a sixth exemplary embodiment of the present invention.

FIG. 13 illustrates roaming partners of each local IPDCK-MSID and IPDCOperatorID applied in a sixth exemplary embodiment of the present invention.

As shown in FIG. 13, when the local IPDCKMSID and IPDCOperatorID include (IPDCKMSID=1 and IPDCOperatorID=1) and (IPDCKMSID=m and IPDCOperatorID=m), each local IPDC KMS system and IPDC operator has roaming partners. That is, (IPDCKMSID=n and IPDCOperatorID=n) and (IPDCKMSID=i and IPDCOperatorID=i) are roaming partners of the local IPDCKMSID=1 and IPDCOperatorID=1, and (IPDCKMSID=j and IPDCOperatorID=j) and (IPDCKMSID=k and IPDCOperatorID=k) are roaming partners of the local IPDCKMSID=m and IPDCOperatorID=m. Two concurrent IPDC operators belonging to the same IPDC KMS system may have established a roaming agreement, and two IPDC operators from two different IPDC KMSs may have failed in establishing a roaming agreement. For example, the (IPDCKMSID=1 and IPDCOperatorID=1) may have established a roaming agreement with the (IPDCKMSID=1 and IPDCOperator=2), while the (IPDCKMSID=1 and IPDCOperatorID=1) may have failed in establishing a roaming agreement with the (IPDCKMSID=2 and IPDCOperatorID=3). In an exemplary implementation, for simplification and for additional extension, i, j, k, m, and n are used as indexes for the IPDCKMSID and IPDCOperatorID. Detailed numerical values and information may be appointed according to actual requirements.

When detailed roaming partner information is not indicated, and if entry points for the local and roaming IPDC KMS system and IPDC operator are simultaneously provided, it is possible to use mechanism 1. In this case, a local terminal, whose home operator is, for example, (IPDCKMSID=1 and IPDCOperator=1), can use an entry point for the (IPDCKMSID=1 and IPDCOperator=1). Further, a roaming terminal, whose home operator is, for example, (IPDCKMSID=1 and IPDCOperator=2), can use an entry point for the (IPDCKMSID=1 and IPDCOperator=2). In the case of a local terminal, it is possible to obtain the entry point information from its home DM server. In the case of a roaming terminal, it is possible to obtain its own entry point information from its home DM server. However, when the roaming terminal is located out of the home DM server coverage, the entry point information can be obtained from the local DM server through negotiation between and support by the local DM server and its own roaming DM server. Therefore, according to mechanism 1, an entry point for the local and roaming terminal is provided based on the IPDCKMSID and IPDCOperatorID. There is no indication for the roaming relation information.

Further, mechanisms 2 to 5 relating to mechanism 1 can be used for both the local and roaming terminal in the manner described above.

An entry point for the local and roaming IPDC KMS and IPDC operator may be separated by an indication within the MO.

An OMA DM mechanism according to the sixth exemplary embodiment of the present invention provides a scheme for indicating ESG bootstrap entry points for the roaming terminal by corresponding IPDCKMSID and IPDCOperatorID.

Figure 14:
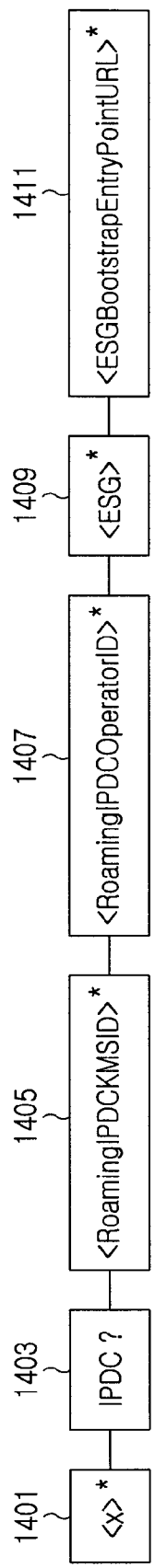
FIG. 14 illustrates an MO of an OMA DM mechanism according to the sixth exemplary embodiment of the present invention.

FIG. 14 illustrates an MO of an OMA DM mechanism according to the sixth exemplary embodiment of the present invention.

Referring to FIG. 14, the X field 1401 is a node functioning as a placeholder, the IPDC field 1403 is a node for an IPDC terminal, the RoamingIPDCKMSID field 1405 is a node indicating that it is for a roaming terminal having an IPDCKMSID, the RoamingIPDCOperatorID field 1407 is a node indicating that it is for a roaming terminal having an OPDCOperatorID, the ESG field 1409 is a node carrying ESG-related information, and the ESGBootstrapEntryPointURL field 1411 is a node indicating a URL, which is an ESG bootstrap entry point for requiring ESG bootstrap information through an interactive network.

By an OMA DM mechanism according to the sixth exemplary embodiment of the present invention as described above, the terminal can obtain an ESG bootstrap entry point for the roaming terminal. By using the ESG bootstrap entry point, the terminal can search for ESGbootstrap information, and select an ESG having an available service for the roaming user.

OMA DM Mechanism According to $7^{th}$ Exemplary Embodiment

An OMA DM mechanism according to a seventh exemplary embodiment of the present invention provides a relation between the local and roaming IPDC KMS system and the IPDC operator, together with ESG bootstrap entry point information of each roaming terminal.

1. $1^{st}$ OMA DM Mechanism

A first OMA DM mechanism according to the seventh exemplary embodiment of the present invention provides a scheme for enumerating roaming partners of each local IPDCKMSID and IPDCOperatorID as roamingIPDCKMSID and roamingIPDCOperatorID, and indicating a corresponding ESG bootstrap entry point of each roaming partner.

Figure 15:
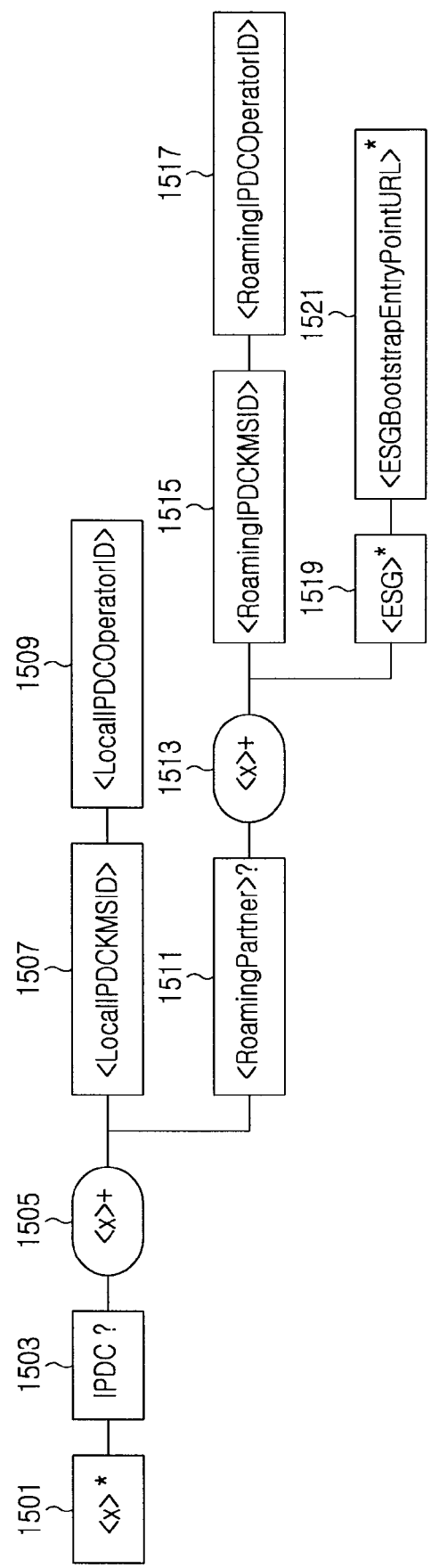
FIG. 15 illustrates an MO of a first OMA DM mechanism according to the seventh exemplary embodiment of the present invention.

FIG. 15 illustrates an MO of a first OMA DM mechanism according to the seventh exemplary embodiment of the present invention.

Referring to FIG. 15, the X field 1501, 1505, or 1513 is a node functioning as a placeholder, the IPDC field 1503 is a node for an IPDC terminal, the LocalIPDCKMSID field 1507 is a node for a local terminal having an IPDCKMSID, the LocalIPDCOperatorID field 1509 is a node for a local terminal having an IPDCOperatorID, the RoamingPartner field 1511 is a node carrying roaming partner-related information for the local IPDC KMS system and IPDC operator, the RoamingIPDCKMSID field 1515 is a node for a roaming terminal having an IPDCKMSID, the RoamingIPDCOperatorID field 1517 is a node for a roaming terminal having an IPDCOperatorID, the ESG field 1519 is a node carrying ESG-related information, and the ESGBootstrapEntryPointURL field 1521 is a node indicating a URL, which is an ESG bootstrap entry point for requiring ESG bootstrap information through an interactive network.

In the first OMA DM mechanism according to the seventh exemplary embodiment of the present invention described above, if the ESG bootstrap entry point has common bootstrap information for both the local and roaming users, the terminal can select an ESG and can find a service usable by itself based on the roaming partner information described in the MO. If the ESG bootstrap entry point has particular bootstrap information for only a particular partner, the terminal can obtain all proper ESG information by using the ESG bootstrap entry point.

2. 2nd OMA DM Mechanism

Figure 16:
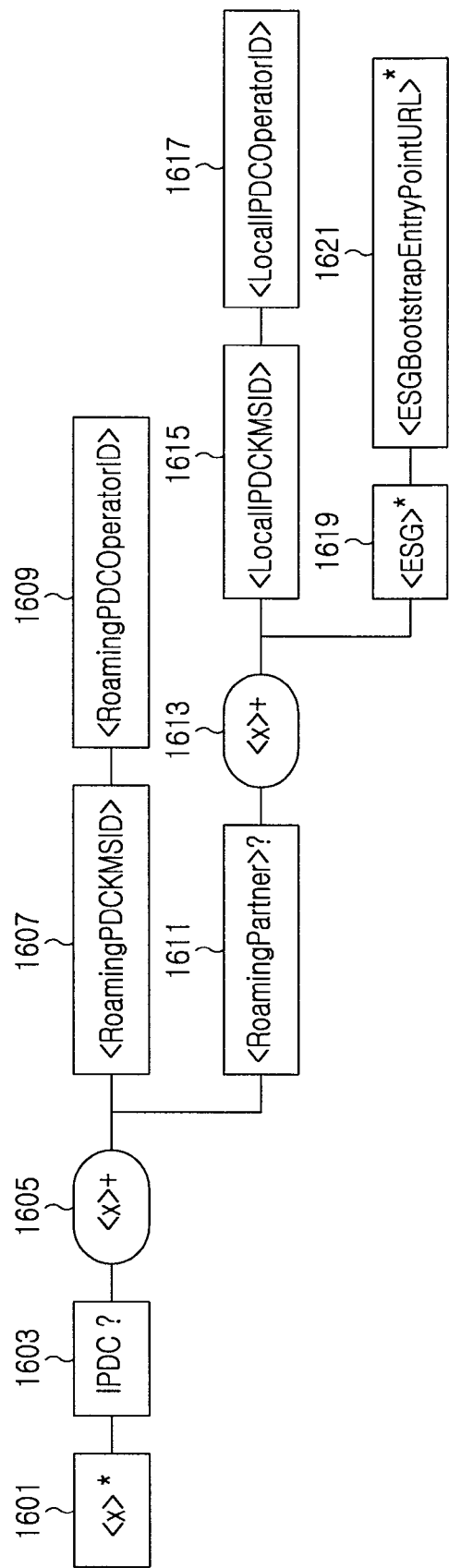
FIG. 16 illustrates an MO of a second OMA DM mechanism according to the seventh exemplary embodiment of the present invention.

FIG. 16 illustrates an MO of a second OMA DM mechanism according to the seventh exemplary embodiment of the present invention.

Referring to FIG. 16, the X field 1601, 1605, or 1613 is a node functioning as a placeholder, the IPDC field 1603 is a node for an IPDC terminal, the RoamingIPDCKMSID field 1607 is a node for a roaming terminal having an IPDCKMSID, the RoamingIPDCOperatorID field 1609 is a node for a roaming terminal having an IPDCOperatorID, the RoamingPartner field 1611 is a node carrying roaming partner-related information. Further, the LocalIPDCKMSID field 1615 is a node for a local terminal having an IPDCKMSID, the LocalIPDCOperatorID field 1617 is a node for a local terminal having an IPDCOperatorID, the ESG field 1619 is a node carrying ESG-related information, and the ESGBootstrapEntryPointURL field 1621 is a node indicating a URL, which is an ESG bootstrap entry point for requiring ESG bootstrap information through an interactive network.

According to the second OMA DM mechanism according to the seventh exemplary embodiment of the present invention described above, the roaming terminal can search for the IPDCKMSID and IPDCOperatorID of the roaming terminal itself in the RoamingIPDCKMSID and RoamingIPDCOperatorID. When the roaming terminal cannot find its own IPDCKMSID and IPDCOperatorID through the search, the roaming terminal cannot obtain proper information. In contrast, when the roaming terminal can find its own IPDCKMSID and IPDCOperatorID through the search, the terminal can find a roaming find of the roaming terminal in the LocalIPDCKMSID and LocalIPDCOperatorID, and indicates the ESG bootstrap entry point also.

OMA DM Mechanism According to 8th Exemplary Embodiment

An OMA DM mechanism according to an eighth exemplary embodiment provides a scheme of additionally providing roaming partner information based on an OMA DM mechanism according to the fifth exemplary embodiment of the present invention.

1. 1st OMA DM Mechanism

A first OMA DM mechanism according to the eighth exemplary embodiment is based on the first OMA DM mechanism according to the fifth exemplary embodiment of the present invention.

Figure 17A:
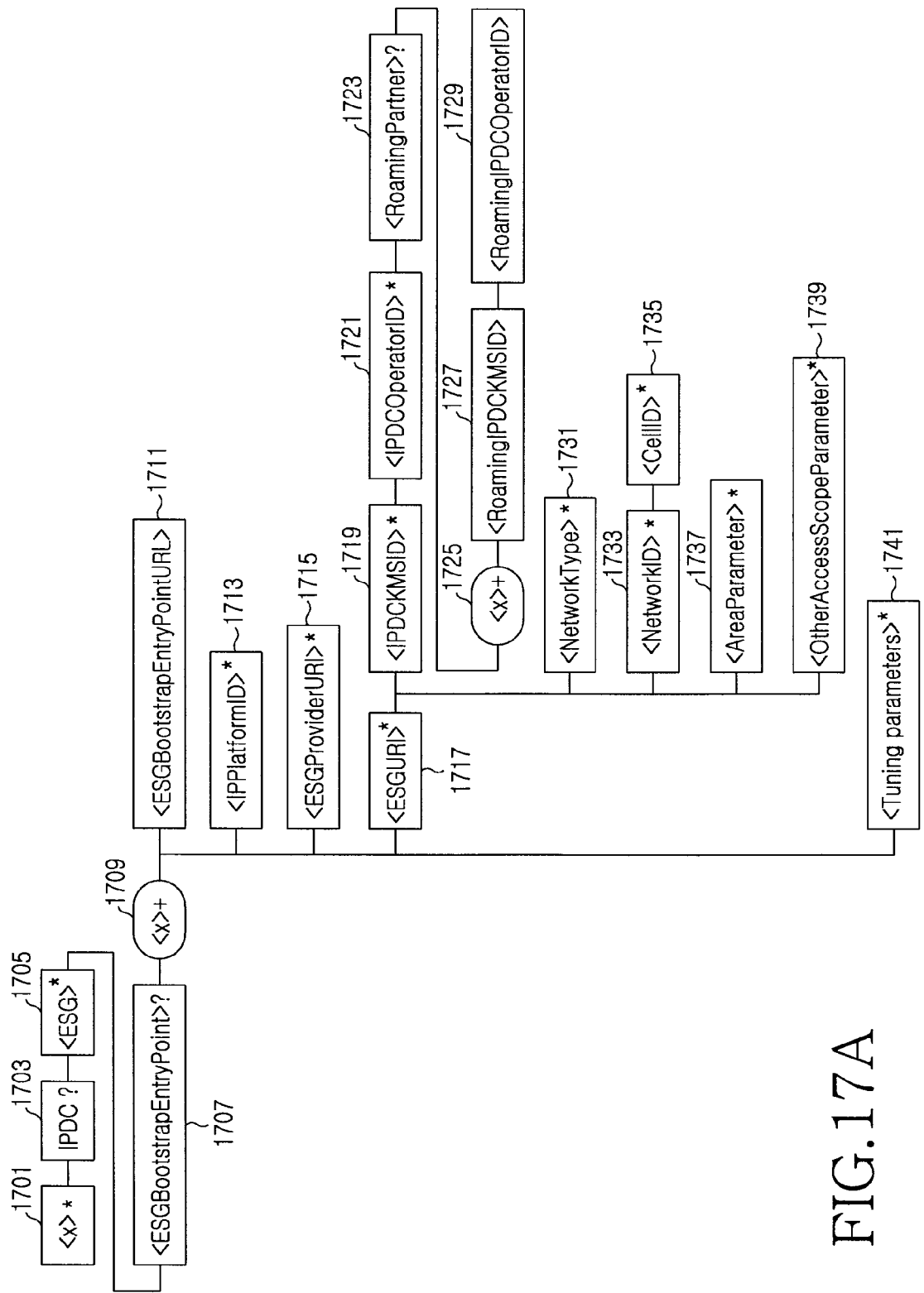
FIGS. 17A and 17B illustrate MOs of OMA DM mechanisms according to an eighth exemplary embodiment of the present invention.
Figure 17B:
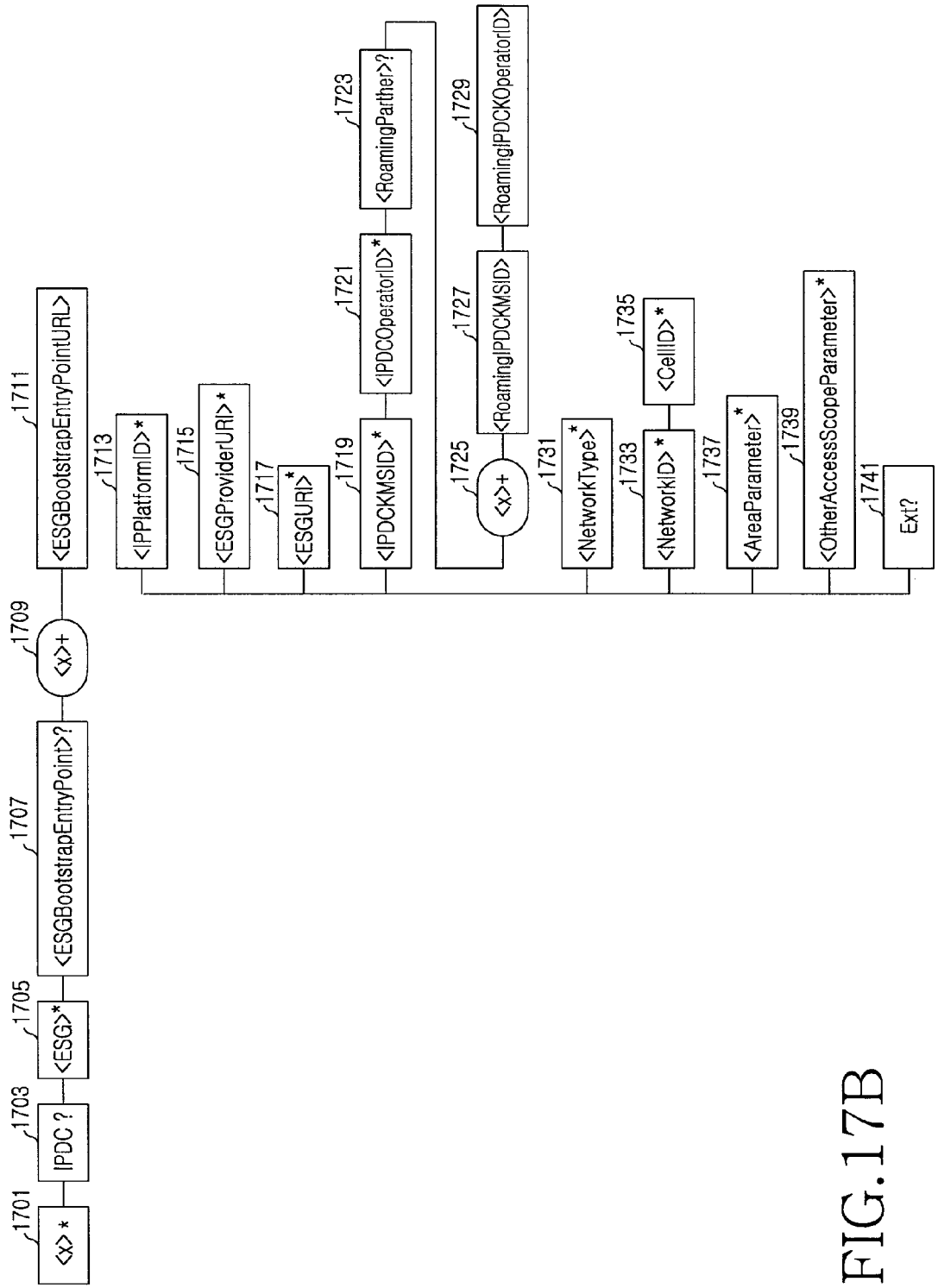

FIGS. 17A and 17B illustrate an MO of a first OMA DM mechanism according to the eighth exemplary embodiment of the present invention.

Referring to FIG. 17A, the X field 1701, 1709, or 1725 is a node functioning as a placeholder, the IPDC field 1703 is a node for an IPDC terminal, the ESG field 1705 is a node carrying ESG-related information, the ESGBootstrapEntryPoint field 1707 is a node carrying ESG bootstrap-related information. Further, the ESGBootstrapEntryPointURL field 1711 is a node indicating an ESG bootstrap entry point URL for requiring ESG bootstrap information through an interactive network, the IPPlatformID field 1713 is a node carrying IP platform-related information, and the ESGProviderURI field 1715 is a node carrying ESG provider-related information. Further, the ESGURI field 1717 is a node indicating an ESGURI that can be found within the ESG bootstrap, the IPDCKMSID field 1719 is a node indicating an IPDCKMSID that can be found within the ESG, and the IPDCOperatorID field 1721 is a node indicating an IPDCOperatorID that can be found within the ESG, the RoamingPartner field 1723 is a node carrying roaming partner-related information for the local IPDC KMS system and IPDC operator. The RoamingIPDCKMSID field 1727 is a node for a roaming terminal having an IPDCKMSID, the RoamingIPDCOperatorID field 1729 is a node for a roaming terminal having an IPDCOperatorID, the NetworkType field 1731 is a node indicating network type-related information, such as DVB-S, DVB-H, DVB-SH, 3GPP, Wimax, and the like, the NetworkID field 1733 is a node carrying a network ID capable of accessing the ESG, the CellID field 1735 is a node carrying a cell ID capable of accessing the ESG, the AreaParameter field 1737 is a node carrying area-related parameters, such as network ID, cell ID, MCC, MNC, GPS, nation code, and the like, the OtherAccessScopeParameter field 1739 is a node carrying other related access range parameters, such as nation code and GPS, and the Tuning parameters field 1741 is a node carrying related tuning parameters.

Based on the OMA DM illustrated in FIG. 17A, Table 6 below shows the above-mentioned node <x> in more detail.

TABLE 6

| Status | Required |
|---|---|
| Occurrence | ZeroOrMore |
| Format | Node |
| Min.Access Types | Get |
| Value | N/A |

Table 7 below shows the above-mentioned node <x>/IPDC/ in more detail.

TABLE 7

| Status | Required |
|---|---|
| Occurrence | ZeroOrOne |
| Format | Node |
| Min.Access Types | Get |
| Value | N/A |

Table 8 shows the above-mentioned node <x>/IPDC/ESG/ in more detail.

TABLE 8

| Status | Required |
|---|---|
| Occurrence | ZeroOrMore |
| Format | Node |
| Min.Access Types | Get |
| Value | N/A |

Table 9 shows the above-mentioned node <x>/IPDC/ESG/ESGBootstrapEntryPoint/ in more detail.

TABLE 9

| Status | Required |
|---|---|
| Occurrence | ZeroOrOne |
| Format | Node |
| Min.Access Types | Get |
| Value | N/A |

Table 10 below shows the above-mentioned node <x>/IPDC/ESG/ESGBootstrapEntryPoint/<x> in more detail.

TABLE 10

| | |
|---|---|
| Status | Required |
| Occurrence | OneOrMore |
| Format | Node |
| Min.Access Types | Get |
| Value | N/A |

Table 11 below shows the above-mentioned node <x>/IPDC/ESG/ESGBootstrapEntryPoint/<x>/ESGBootstrapEntryPointURL/ in more detail.

TABLE 11

| | |
|---|---|
| Status | Required |
| Occurrence | One |
| Format | Chr |
| Min.Access Types | Get |
| Value | URL to the Entry Point to request ESG Bootstrap information over interactive Network |

Table 12 below shows the above-mentioned node <x>/IPDC/ESG/ESGBootstrapEntryPoint/<x>/IPPlatform/ in more detail.

TABLE 12

| | |
|---|---|
| Status | Optional |
| Format | Chr |
| Min.Access Types | Get |
| Value | IP platform identifier |

Table 13 shows the above-mentioned node <x>/IPDC/ESG/ESGBootstrapEntryPoint/<x>/ESGProviderURI/ in more detail.

TABLE 13

| | |
|---|---|
| Status | Optional |
| Occurrence | ZeroOrMore |
| Format | Chr |
| Min.Access Types | Get |
| Value | ESG provider identifier |

Table 14 below shows the above-mentioned node <x>/IPDC/ESG/ESGBootstrapEntryPoint/<x>/ESGURI/ in more detail.

TABLE 14

| | |
|---|---|
| Status | Optional |
| Occurrence | ZeroOrMore |
| Format | Node |
| Min.Access Types | Get |
| Value | ESG identifier |

Table 15 below shows the above-mentioned node <x>/IPDC/ESG/ESGBootstrapEntryPoint/<x>/ESGURI/IPDCKMSID/ in more detail.

TABLE 15

| | |
|---|---|
| Status | Optional |
| Occurrence | ZeroOrMore |
| Format | Node |
| Min.Access Types | Get |
| Value | IPDC KMS identifier |

Table 16 shows the above-mentioned node <x>/IPDC/ESG/ESGBootstrapEntryPoint/<x>/ESGURI/IPDCKMSID/IPDCOperatorID/in more detail.

TABLE 16

| | |
|---|---|
| Status | Optional |
| Occurrence | ZeroOrMore |
| Format | node |
| Min.Access Types | Get |
| Value | IPDC operator identifier |

Table 17 below shows the above-mentioned node <x>/IPDC/ESG/ESGBootstrapEntryPoint/<x>/ESGURI/IPDCKMSID/IPDCOperator ID/RoamingPartner/ in more detail.

TABLE 17

| | |
|---|---|
| Status | Optional |
| Occurrence | ZeroOrOne |
| Format | Node |
| Min.Access Types | Get |
| Value | N/A |

Table 18 shows the above-mentioned node <x>/IPDC/ESG/ESGBootstrapEntryPoint/<x>/ESGURI/IPDCKM-SID/IPDCOperator ID/RoamingPartner/<x> in more detail.

TABLE 18

| | |
|---|---|
| Status | Optional |
| Occurrence | OneOrMore |
| Format | Node |
| Min.Access Types | Get |
| Value | N/A |

Table 19 shows the above-mentioned node <x>/IPDC/ESG/ESGBootstrapEntryPoint/<x>/ESGURI/IPDCKM-SID/IPDCOperator ID/RoamingPartner/<x>/RoamingIPDCKMSID/ in more detail.

TABLE 19

| | |
|---|---|
| Status | Optional |
| Occurrence | ZeroOrMore |
| Format | Node |
| Min.Access Types | Get |
| Value | Roaming IPDC KMS identifier |

Table 20 below shows the above-mentioned node <x>/IPDC/ESG/ESGBootstrapEntryPoint/<x>/ESGURI/IPDCKMSID/IPDCOperator ID/RoamingPartner/<x>/RoamingIPDCKMSID/RoamingIPDCOperatorID/ in more detail.

TABLE 20

| | |
|---|---|
| Status | Optional |
| Occurrence | ZeroOrMore |
| Format | Chr |
| Min.Access Types | Get |
| Value | Roaming IPDC operator identifier |

Table 21 below shows the above-mentioned node <x>/IPDC/ESG/ESGBootstrapEntryPoint/<x>/ESGURI/NetworkType/ in more detail.

TABLE 21

| Status | Optional |
|---|---|
| Occurrence | ZeroOrMore |
| Format | Chr |
| Min.Access Types | Get |
| Value | Network type |

Table 22 below shows the above-mentioned node <x>/IPDC/ESG/ESGBootstrapEntryPoint/<x>/ESGURI/NetworkID/ in more detail.

TABLE 22

| Status | Optional |
|---|---|
| Occurrence | ZeroOrMore |
| Format | Node |
| Min.Access Types | Get |
| Value | Network identifier |

Table 23 shows the above-mentioned node <x>/IPDC/ESG/ESGBootstrapEntryPoint/<x>/ESGURI/NetworkID/CellID/ in more detail.

TABLE 23

| Status | Optional |
|---|---|
| Occurrence | ZeroOrMore |
| Format | Chr |
| Min.Access Types | Get |
| Value | Cell identifier |

Table 24 below shows the above-mentioned node <x>/IPDC/ESG/ESGBootstrapEntryPoint/<x>/ESGURI/AreaParameter/ in more detail.

TABLE 24

| Status | Optional |
|---|---|
| Occurrence | ZeroOrMore |
| Format | Chr |
| Min.Access Types | Get |
| Value | Area identifier |

Table 25 below shows the above-mentioned node <x>/IPDC/ESG/ESGBootstrapEntryPoint/<x>/ESGURI/Ext/ in more detail.

TABLE 25

| Status | Optional |
|---|---|
| Occurrence | ZeroOrOne |
| Format | Chr |
| Min.Access Types | Get |
| Value | N/A |

Table 26 shows the above-mentioned node <x>/IPDC/ESG/ESGBootstrapEntryPoint/<x>/Ext/ in more detail.

TABLE 26

| Status | Optional |
|---|---|
| Occurrence | ZeroOrOne |
| Format | Chr |
| Min.Access Types | Get |
| Value | N/A |

Based on the OMA DM illustrated in FIG. 17B, Table 27 below shows the above-mentioned node <x> in more detail.

TABLE 27

| Status | Required |
|---|---|
| Occurrence | ZeroOrMore |
| Format | Node |
| Min.Access Types | Get |
| Value | N/A |

Table 28 shows the above-mentioned node <x>/IPDC/ in more detail.

TABLE 28

| Status | Required |
|---|---|
| Occurrence | ZeroOrOne |
| Format | Node |
| Min.Access Types | Get |
| Value | N/A |

Table 29 shows the above-mentioned node <x>/IPDC/ESG/ in more detail.

TABLE 29

| Status | Required |
|---|---|
| Occurrence | ZeroOrMore |
| Format | Node |
| Min.Access Types | Get |
| Value | N/A |

Table 30 below shows the above-mentioned node <x>/IPDC/ESG/ESGBootstrapEntryPoint/ in more detail.

TABLE 30

| Status | Required |
|---|---|
| Occurrence | ZeroOrOne |
| Format | Node |
| Min.Access Types | Get |
| Value | N/A |

Table 31 below shows the above-mentioned node <x>/IPDC/ESG/ESGBootstrapEntryPoint/<x> in more detail.

TABLE 31

| Status | Required |
|---|---|
| Occurrence | OneOrMore |
| Format | Node |
| Min.Access Types | Get |
| Value | N/A |

Table 32 below shows the above-mentioned node <x>/IPDC/ESG/ESGBootstrapEntryPoint/<x>/ESGBootstrapEntryPointURL/ in more detail.

TABLE 32

| Status | Required |
|---|---|
| Occurrence | One |
| Format | Chr |
| Min.Access Types | Get |
| Value | URL to the Entry Point to request ESG Bootstrap information over interactive Network |

Table 33 shows the above-mentioned node <x>/IPDC/ESG/ESGBootstrapEntryPoint/<x>/IPPlatform/ in more detail.

TABLE 33

| | |
|---|---|
| Status | Optional |
| Format | Chr |
| Min.Access Types | Get |
| Value | IP platform identifier |

Table 34 below shows the above-mentioned node <x>/IPDC/ESG/ESGBootstrapEntryPoint/<x>/ESGProviderURI/ in more detail.

TABLE 34

| | |
|---|---|
| Status | Optional |
| Occurrence | ZeroOrMore |
| Format | Chr |
| Min.Access Types | Get |
| Value | ESG provider identifier |

Table 35 below shows the above-mentioned node <x>/IPDC/ESG/ESGBootstrapEntryPoint/<x>/ESGURI/ in more detail.

TABLE 35

| | |
|---|---|
| Status | Optional |
| Occurrence | ZeroOrMore |
| Format | Chr |
| Min.Access Types | Get |
| Value | ESG identifier |

Table 36 shows the above-mentioned node <x>/IPDC/ESG/ESGBootstrapEntryPoint/<x>/IPDCKMSID/ in more detail.

TABLE 36

| | |
|---|---|
| Status | Optional |
| Occurrence | ZeroOrMore |
| Format | Node |
| Min.Access Types | Get |
| Value | IPDC KMS identifier |

Table 37 below shows the above-mentioned node <x>/IPDC/ESG/ESGBootstrapEntryPoint/<x>/IPDCKMSID/IPDCOperatorID/ in more detail.

TABLE 37

| | |
|---|---|
| Status | Optional |
| Occurrence | ZeroOrMore |
| Format | node |
| Min.Access Types | Get |
| Value | IPDC operator identifier |

Table 38 shows the above-mentioned node <x>/IPDC/ESG/ESGBootstrapEntryPoint/<x>/IPDCKMSID/IPDCOperatorID/RoamingPartner/in more detail.

TABLE 38

| | |
|---|---|
| Status | Optional |
| Occurrence | ZeroOrOne |
| Format | Node |
| Min.Access Types | Get |
| Value | N/A |

Table 39 shows the above-mentioned node <x>/IPDC/ESG/ESGBootstrapEntryPoint/<x>/IPDCKMSID/IPDCOperatorID/RoamingPartner/<x> in more detail.

TABLE 39

| | |
|---|---|
| Status | Optional |
| Occurrence | OneOrMore |
| Format | Node |
| Min.Access Types | Get |
| Value | N/A |

Table 40 below shows the above-mentioned node <x>/IPDC/ESG/ESGBootstrapEntryPoint/<x>/IPDCKMSID/IPDCOperatorID/RoamingPartner/<x>/RoamingIPDCKMSID/ in more detail.

TABLE 40

| | |
|---|---|
| Status | Optional |
| Occurrence | ZeroOrMore |
| Format | Node |
| Min.Access Types | Get |
| Value | Roaming IPDC KMS identifier |

Table 41 below shows the above-mentioned node <x>/IPDC/ESG/ESGBootstrapEntryPoint/<x>/IPDCKMSID/IPDCOperatorID/RoamingPartner/<x>/RoamingIPDCKMSID/RoamingIPDCOperatorID/ in more detail.

TABLE 41

| | |
|---|---|
| Status | Optional |
| Occurrence | ZeroOrMore |
| Format | Chr |
| Min.Access Types | Get |
| Value | Roaming IPDC operator identifier |

Table 42 below shows the above-mentioned node <x>/IPDC/ESG/ESGBootstrapEntryPoint/<x>/NetworkType/ in more detail.

TABLE 42

| | |
|---|---|
| Status | Optional |
| Occurrence | ZeroOrMore |
| Format | Chr |
| Min.Access Types | Get |
| Value | Network type |

Table 43 shows the above-mentioned node <x>/IPDC/ESG/ESGBootstrapEntryPoint/<x>/NetworkID/ in more detail.

TABLE 43

| | |
|---|---|
| Status | Optional |
| Occurrence | ZeroOrMore |
| Format | Node |
| Min.Access Types | Get |
| Value | Network identifier |

Table 44 below shows the above-mentioned node <x>/IPDC/ESG/ESGBootstrapEntryPoint/<x>/NetworkID/CellID/ in more detail.

TABLE 44

| | |
|---|---|
| Status | Optional |
| Occurrence | ZeroOrMore |
| Format | Chr |
| Min.Access Types | Get |
| Value | Cell identifier |

Table 45 below shows the above-mentioned node <x>/IPDC/ESG/ESGBootstrapEntryPoint/<x>/AreaParameter/ in more detail.

TABLE 45

| Status | Optional |
|---|---|
| Occurrence | ZeroOrMore |
| Format | Chr |
| Min.Access Types | Get |
| Value | Area identifier |

Table 46 shows the above-mentioned node <x>/IPDC/ESG/ESGBootstrapEntryPoint/<x>/Ext/ in more detail.

TABLE 46

| Status | Optional |
|---|---|
| Occurrence | ZeroOrOne |
| Format | Chr |
| Min.Access Types | Get |
| Value | N/A |

2. $2^{nd}$ OMA DM Mechanism

A second OMA DM mechanism according to the eighth exemplary embodiment is based on the second OMA DM mechanism according to the fifth exemplary embodiment of the present invention.

Figure 18:
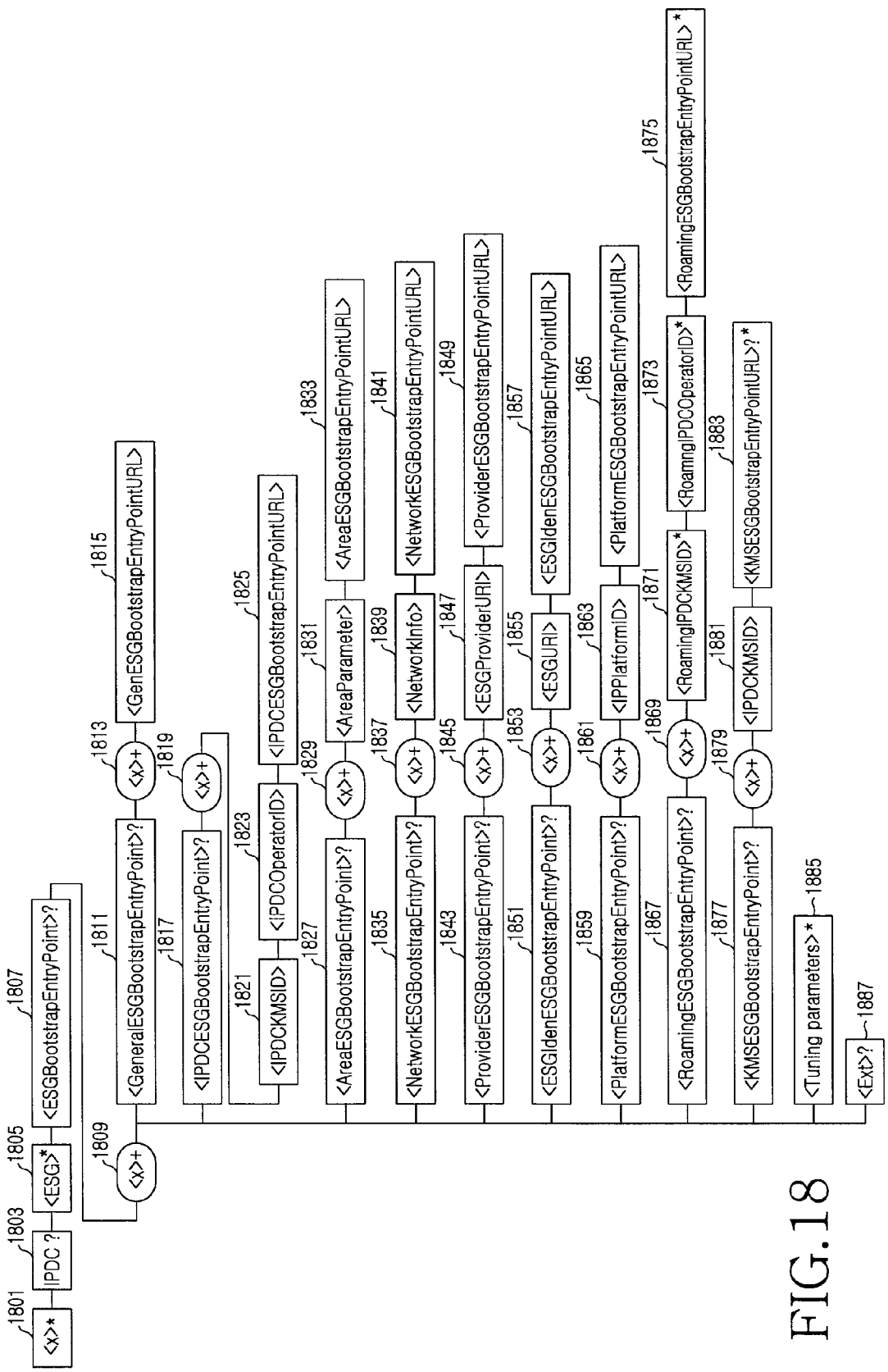
FIG. 18 illustrates an MO of a second OMA DM mechanism according to the eighth exemplary embodiment of the present invention.

FIG. 18 illustrates an MO of a second OMA DM mechanism according to the eighth exemplary embodiment of the present invention.

Referring to FIG. 18, the X field 1801, 1809, 1813, 1819, 1829, 1837, 1845, 1853, 1861, 1869, or 1879 is a node functioning as a placeholder, the IPDC field 1803 is a node for an IPDC terminal, the ESG field 1805 is a node carrying ESG-related information, the ESGBootstrapEntryPoint field 1807 is a node carrying ESG bootstrap-related information, the GeneralESGBootstrapEntryPoint field 1811 is a node carrying typical ESG bootstrap-related information. Further, the GenESGBootstrapEntryPointURL field 1815 is a node indicating a URL, which is a typical ESG bootstrap entry point for requiring ESG bootstrap information through an interactive network, the IPDCESGBootstrapEntryPoint field 1817 is a node carrying information of an ESG bootstrap relating to an IPDC KMS system and IPDC operator, the IPDCKMSID field 1821 is a node indicating an IPDCKMSID that can be found in the ESG, the IPDCOperatorID field 1823 is a node indicating an IPDCOperatorID that can be found in the ESG, the IPDCESGBootstrapEntryPointURL field 1825 is a field indicating a URL, which is an ESG bootstrap entry point for requiring ESG bootstrap information relating to an IPDC KMS system and IPDC operator through an interactive network, the AreaESGBootstrapEntryPoint field 1827 is a node carrying information of an ESG bootstrap relating to an area, the AreaParameter field 1831 is a node carrying area-related parameters, such as network ID, cell ID, GPS, nation code, and the like, the AreaESGBootstrapEntryPointURL field 1833 is a field indicating URL, which is an ESG bootstrap entry point for requiring ESG bootstrap information relating to an area through an interactive network, the NetworkESGBootstrapEntryPoint field 1835 is a node carrying information of an ESG bootstrap relating to a network, the NetworkInfo field 1839 is a node carrying network-related information, such as network type and network ID, the NetworkESGBootstrapEntryPointURL field 1841 is a node indicating a URL, which is an ESG bootstrap entry point for requiring ESG bootstrap information relating to a network through an interactive network, the ProviderESGBootstrapEntryPoint field 1843 is a node carrying information of an ESG bootstrap relating to a provider, the ESGProviderURI field 1847 is a node carrying ESG provider-related information, the ProviderESGBootstrapEntryPointURL field 1849 is a node indicating a URL, which is an ESG bootstrap entry point for requiring ESG bootstrap information relating to a provider through an interactive network, the ESGIdenESGBootstrapEntryPoint field 1851 is a node carrying information of an ESG bootstrap relating to an ESGURI, the ESGURI field 1855 is a node indicating an ESGURI that can be found in the ESG bootstrap, the ESGIdenESGBootstrapEntryPointURL field 1857 is a node indicating a URL, which is an ESG bootstrap entry point for requiring ESG bootstrap information relating to an ESGURI through an interactive network, the PlatformESGBootstrapEntryPoint field 1859 is a node carrying information of an ESG bootstrap relating to an IP platform, the IPPlatformID field 1863 is a node carrying IP platform-related information, the PlatformESGBootstrapEntryPointURL field 1865 is a node indicating a URL, which is an ESG bootstrap entry point for requiring ESG bootstrap information relating to an IP platform through an interactive network, the RoamingESGBootstrapEntryPoint field 1867 is a node carrying information of an ESG bootstrap relating to a roaming IPDC KMS system and IPDC operator, the RoamingIPDCKMSID field 1871 is a node for a roaming terminal having an IPDCKMSID, the RoamingIPDCOperatorID field 1873 is a node for a roaming terminal having an IPDCOperatorID, the RoamingESGBootstrapEntryPointURL field 1875 is a node indicating a URL, which is an ESG bootstrap entry point for requiring ESG bootstrap information relating to a roaming terminal. Further, the KMSEGBootstrapEntryPoint field 1877 is a node carrying information of an ESG bootstrap relating to an IPDC KMS system, the IPDCKMSID field 1881 is a node indicating an IPDCKMSID that can be found in the ESG, the KMSESGBootstrapEntryPointURL field 1883 is a node indicating an entry point URL for requiring ESG bootstrap information relating to an IPDC KMS system through an interactive network, the Tuning parameters field 1885 is a node carrying related tuning parameters, and the Ext field 1887 is an internal node for additional information.

Table 47 below shows the above-mentioned node <x> in more detail.

TABLE 47

| Status | Required |
|---|---|
| Occurrence | ZeroOrMore |
| Format | Node |
| Min.Access Types | Get |
| Value | N/A |

Table 48 shows the above-mentioned node <x>/IPDC/ in more detail.

TABLE 48

| Status | Required |
|---|---|
| Occurrence | ZeroOrOne |
| Format | Node |
| Min.Access Types | Get |
| Value | N/A |

Table 49 shows the above-mentioned node <x>/IPDC/ESG/ in more detail.

TABLE 49

| | |
|---|---|
| Status | Required |
| Occurrence | ZeroOrMore |
| Format | Node |
| Min.Access Types | Get |
| Value | N/A |

Table 50 below shows the above-mentioned node <x>/IPDC/ESG/ESGBootstrapEntryPoint/ in more detail.

TABLE 50

| | |
|---|---|
| Status | Required |
| Occurrence | ZeroOrOne |
| Format | Node |
| Min.Access Types | Get |
| Value | N/A |

Table 51 below shows the above-mentioned node <x>/IPDC/ESG/ESGBootstrapEntryPoint/<x> in more detail.

TABLE 51

| | |
|---|---|
| Status | Required |
| Occurrence | OneOrMore |
| Format | Node |
| Min.Access Types | Get |
| Value | N/A |

Table 52 below shows the above-mentioned node <x>/IPDC/ESG/ESGBootstrapEntryPoint/<x>/GeneralESGEntryPoint/ in more detail.

TABLE 52

| | |
|---|---|
| Status | Optional |
| Occurrence | ZeroOrOne |
| Format | Node |
| Min.Access Types | Get |
| Value | N/A |

Table 53 shows the above-mentioned node <x>/IPDC/ESG/ESGBootstrapEntryPoint/<x>/GeneralESGBootstrapEntryPoint/<x> in more detail.

TABLE 53

| | |
|---|---|
| Status | Optional |
| Occurrence | OneOrMore |
| Format | Node |
| Min.Access Types | Get |
| Value | N/A |

Table 54 below shows the above-mentioned node <x>/IPDC/ESG/ESGBootstrapEntryPoint/<x>/GeneralESGEntryPoint/<x>/GenESGBootstrapEntryPointURL/in more detail.

TABLE 54

| | |
|---|---|
| Status | Optional |
| Occurrence | One |
| Format | Chr |
| Min.Access Types | Get |
| Value | URL to the Entry Point to request ESG Bootstrap information over interactive Network |

Table 55 below shows the above-mentioned node <x>/IPDC/ESG/ESGBootstrapEntryPoint/<x>/IPDCESGEntryPoint/ in more detail.

TABLE 55

| | |
|---|---|
| Status | Optional |
| Occurrence | ZeroOrOne |
| Format | Node |
| Min.Access Types | Get |
| Value | N/A |

Table 56 shows the above-mentioned node <x>/IPDC/ESG/ESGBootstrapEntryPoint/<x>/IPDCESGBootstrapEntryPoint/<x> in more detail.

TABLE 56

| | |
|---|---|
| Status | Optional |
| Occurrence | OneOrMore |
| Format | Node |
| Min.Access Types | Get |
| Value | N/A |

Table 57 below shows the above-mentioned node <x>/IPDC/ESG/ESGBootstrapEntryPoint/<x>/IPDCESGEntryPoint/<x>/IPDCKMSID/in more detail.

TABLE 57

| | |
|---|---|
| Status | Optional |
| Occurrence | One |
| Format | Node |
| Min.Access Types | Get |
| Value | IPDC KIMS identifier |

Table 58 shows the above-mentioned node <x>/IPDC/ESG/ESGBootstrapEntryPoint/<x>/IPDCESGEntryPoint/<x>/IPDCKMSID/IPDCOperatorID/in more detail.

TABLE 58

| | |
|---|---|
| Status | Optional |
| Occurrence | One |
| Format | Node |
| Min.Access Types | Get |
| Value | IPDC operator identifier |

Table 59 shows the above-mentioned node <x>/IPDC/ESG/ESGBootstrapEntryPoint/<x>/IPDCESGEntryPoint/<x>/IPDCKMSID/IPDCOperatorID/IPDCESGEntryPointURL/in more detail.

TABLE 59

| | |
|---|---|
| Status | Optional |
| Occurrence | One |
| Format | Chr |
| Min.Access Types | Get |
| Value | URL to the Entry Point to request ESG Bootstrap information over interactive Network |

Table 60 below shows the above-mentioned node <x>/IPDC/ESG/ESGBootstrapEntryPoint/<x>/AreaESGEntryPoint/ in more detail.

TABLE 60

| | |
|---|---|
| Status | Optional |
| Occurrence | ZeroOrOne |
| Format | Node |
| Min.Access Types | Get |
| Value | N/A |

Table 61 below shows the above-mentioned node <x>/IPDC/ESG/ESGBootstrapEntryPoint/<x>/AreaESGEntryPoint/<x> in more detail.

TABLE 61

| | |
|---|---|
| Status | Optional |
| Occurrence | OneOrMore |
| Format | Node |
| Min.Access Types | Get |
| Value | N/A |

Table 62 below shows the above-mentioned node <x>/IPDC/ESG/ESGBootstrapEntryPoint/<x>/AreaESGEntryPoint/<x>/AreaParameter/in more detail.

TABLE 62

| | |
|---|---|
| Status | Optional |
| Occurrence | One |
| Format | Node |
| Min.Access Types | Get |
| Value | Area identifier |

Table 63 shows the above-mentioned node <x>/IPDC/ESG/ESGBootstrapEntryPoint/<x>/AreaESGEntryPoint/<x>/AreaParameter/AreaESGBootstrapEntryPointURL/in more detail.

TABLE 63

| | |
|---|---|
| Status | Optional |
| Occurrence | One |
| Format | Chr |
| Min.Access Types | Get |
| Value | URL to the Entry Point to request ESG Bootstrap information over interactive Network |

Table 64 below shows the above-mentioned node <x>/IPDC/ESG/ESGBootstrapEntryPoint/<x>/NetworkESGEntryPoint/ in more detail.

TABLE 64

| | |
|---|---|
| Status | Optional |
| Occurrence | ZeroOrOne |
| Format | Node |
| Min.Access Types | Get |
| Value | N/A |

Table 65 below shows the above-mentioned node <x>/IPDC/ESG/ESGBootstrapEntryPoint/<x>/NetworkESGEntryPoint/<x> in more detail.

TABLE 65

| | |
|---|---|
| Status | Optional |
| Occurrence | OneOrMore |
| Format | Node |
| Min.Access Types | Get |
| Value | N/A |

Table 66 shows the above-mentioned node <x>/IPDC/ESG/ESGBootstrapEntryPoint/<x>/NetworkESGEntryPoint/<x>/NetworkInfo/in more detail.

TABLE 66

| | |
|---|---|
| Status | Optional |
| Occurrence | One |
| Format | Node |
| Min.Access Types | Get |
| Value | Network information |

Table 67 below shows the above-mentioned node <x>/IPDC/ESG/ESGBootstrapEntryPoint/<x>/NetworkESGEntryPoint/<x>/NetworkInfo/NetworkESGBootstrapEntryPointURL/in more detail.

TABLE 67

| | |
|---|---|
| Status | Optional |
| Occurrence | One |
| Format | Chr |
| Min.Access Types | Get |
| Value | URL to the Entry Point to request ESG Bootstrap information over interactive Network |

Table 68 shows the above-mentioned node <x>/IPDC/ESG/ESGBootstrapEntryPoint/<x>/ProviderESGEntryPoint/ in more detail.

TABLE 68

| | |
|---|---|
| Status | Optional |
| Occurrence | ZeroOrOne |
| Format | Node |
| Min.Access Types | Get |
| Value | N/A |

Table 69 shows the above-mentioned node <x>/IPDC/ESG/ESGBootstrapEntryPoint/<x>/ProviderESGEntryPoint/<x> in more detail.

TABLE 69

| | |
|---|---|
| Status | Optional |
| Occurrence | OneOrMore |
| Format | Node |
| Min.Access Types | Get |
| Value | N/A |

Table 70 below shows the above-mentioned node <x>/IPDC/ESG/ESGBootstrapEntryPoint/<x>/ProviderESGEntryPoint/<x>/ESGProviderURI/in more detail.

TABLE 70

| | |
|---|---|
| Status | Optional |
| Occurrence | One |
| Format | Node |
| Min.Access Types | Get |
| Value | ESG provider identifier |

Table 71 below shows the above-mentioned node <x>/IPDC/ESG/ESGBootstrapEntryPoint/<x>/ProviderESGEntryPoint/<x>/ESGProviderURI/ProviderESGBootstrapEntryPointURL/in more detail.

TABLE 71

| | |
|---|---|
| Status | Optional |
| Occurrence | One |
| Format | Chr |
| Min.Access Types | Get |
| Value | URL to the Entry Point to request ESG Bootstrap information over interactive Network |

Table 72 below shows the above-mentioned node <x>/IPDC/ESG/ESGBootstrapEntryPoint/<x>/ESGIdenESGEntryPoint/ in more detail.

TABLE 72

| | |
|---|---|
| Status | Optional |
| Occurrence | ZeroOrOne |
| Format | Node |
| Min.Access Types | Get |
| Value | N/A |

Table 73 shows the above-mentioned node <x>/IPDC/ESG/ESGBootstrapEntryPoint/<x>/ESGIdenESGEntryPoint/<x> in more detail.

TABLE 73

| | |
|---|---|
| Status | Optional |
| Occurrence | OneOrMore |
| Format | Node |
| Min.Access Types | Get |
| Value | N/A |

Table 74 below shows the above-mentioned node <x>/IPDC/ESG/ESGBootstrapEntryPoint/<x>/ESGIdenESGEntryPoint/<x>/ESGURI/in more detail.

TABLE 74

| | |
|---|---|
| Status | Optional |
| Occurrence | One |
| Format | Node |
| Min.Access Types | Get |
| Value | ESG identifier |

Table 75 below shows the above-mentioned node <x>/IPDC/ESG/ESGBootstrapEntryPoint/<x>/ESGIdenESGEntryPoint/<x>/ESGURI/ESGIdenESGBootstrapEntryPointURL/in more detail.

TABLE 75

| | |
|---|---|
| Status | Optional |
| Occurrence | One |
| Format | Chr |
| Min.Access Types | Get |
| Value | URL to the Entry Point to request ESG Bootstrap information over interactive Network |

Table 76 shows the above-mentioned node <x>/IPDC/ESG/ESGBootstrapEntryPoint/<x>/PlatformESGEntryPoint/ in more detail.

TABLE 76

| | |
|---|---|
| Status | Optional |
| Occurrence | ZeroOrOne |
| Format | Node |
| Min.Access Types | Get |
| Value | N/A |

Table 77 below shows the above-mentioned node <x>/IPDC/ESG/ESGBootstrapEntryPoint/<x>/PlatformESGEntryPoint/<x> in more detail.

TABLE 77

| | |
|---|---|
| Status | Optional |
| Occurrence | OneOrMore |
| Format | Node |
| Min.Access Types | Get |
| Value | N/A |

Table 78 shows the above-mentioned node <x>/IPDC/ESG/ESGBootstrapEntryPoint/<x>/PlatformESGEntryPoint/<x>/IPPlatformID/in more detail.

TABLE 78

| | |
|---|---|
| Status | Optional |
| Occurrence | One |
| Format | Node |
| Min.Access Types | Get |
| Value | IP platform identifier |

Table 79 shows the above-mentioned node <x>/IPDC/ESG/ESGBootstrapEntryPoint/<x>/PlatformESGEntryPoint/<x>/IPPlatformID/PlatformESGBootstrapEntryPointURL/in more detail.

TABLE 79

| | |
|---|---|
| Status | Optional |
| Occurrence | One |
| Format | Chr |
| Min.Access Types | Get |
| Value | URL to the Entry Point to request ESG Bootstrap information over interactive Network |

Table 80 below shows the above-mentioned node <x>/IPDC/ESG/ESGBootstrapEntryPoint/<x>/RoamingESGEntryPoint/ in more detail.

TABLE 80

| | |
|---|---|
| Status | Required |
| Occurrence | ZeroOrOne |
| Format | Node |
| Min.Access Types | Get |
| Value | N/A |

Table 81 below shows the above-mentioned node <x>/IPDC/ESG/ESGBootstrapEntryPoint/<x>/RoamingESGEntryPoint/<x> in more detail.

TABLE 81

| | |
|---|---|
| Status | Required |
| Occurrence | OneOrMore |
| Format | Node |
| Min.Access Types | Get |
| Value | N/A |

Table 82 below shows the above-mentioned node <x>/IPDC/ESG/ESGBootstrapEntryPoint/<x>/RoamingESGEntryPoint/<x>/RoamingIPDCKMSID/in more detail.

TABLE 82

| | |
|---|---|
| Status | Required |
| Occurrence | One |
| Format | Node |

TABLE 82-continued

| | |
|---|---|
| Min.Access Types | Get |
| Value | IPDC KMS identifier |

Table 83 shows the above-mentioned node <x>/IPDC/ESG/ESGBootstrapEntryPoint/<x>/RoamingESGEntryPoint/<x>/RoamingIPDCKMSID/Roaming IPDCOperatorID/ in more detail.

TABLE 83

| | |
|---|---|
| Status | Required |
| Occurrence | One |
| Format | Node |
| Min.Access Types | Get |
| Value | IPDC operator identifier |

Table 84 below shows the above-mentioned node <x>/IPDC/ESG/ESGBootstrapEntryPoint/<x>/RoamingESGEntryPoint/<x>/RoamingIPDCKMSID/RoamingIPDCOperatorID/ESGBootstrapEntryPointURL/in more detail.

TABLE 84

| | |
|---|---|
| Status | Required |
| Occurrence | One |
| Format | Chr |
| Min.Access Types | Get |
| Value | URL to the Entry Point to request ESG Bootstrap information over interactive Network |

Table 85 below shows the above-mentioned node <x>/IPDC/ESG/ESGBootstrapEntryPoint/<x>/KMSESGEntryPoint/ in more detail.

TABLE 85

| | |
|---|---|
| Status | Optional |
| Occurrence | ZeroOrOne |
| Format | Node |
| Min.Access Types | Get |
| Value | N/A |

Table 86 shows the above-mentioned node <x>/IPDC/ESG/ESGBootstrapEntryPoint/<x>/KMSESGEntryPoint/<x> in more detail.

TABLE 86

| | |
|---|---|
| Status | Optional |
| Occurrence | OneOrMore |
| Format | Node |
| Min.Access Types | Get |
| Value | N/A |

Table 87 below shows the above-mentioned node <x>/IPDC/ESG/ESGBootstrapEntryPoint/<x>/KMSESGEntryPoint/<x>/IPDCKMSID/in more detail.

TABLE 87

| | |
|---|---|
| Status | Optional |
| Occurrence | One |
| Format | Node |
| Min.Access Types | Get |
| Value | IPDC KMS identifier |

Table 88 shows the above-mentioned node <x>/IPDC/ESG/ESGBootstrapEntryPoint/<x>/KMSESGEntryPoint/<x>/IPDCKMSID/KMSESGBootstrapEntryPointURL/in more detail.

TABLE 88

| | |
|---|---|
| Status | Optional |
| Occurrence | One |
| Format | Chr |
| Min.Access Types | Get |
| Value | URL to the Entry Point to request ESG Bootstrap information over interactive Network |

Table 89 shows the above-mentioned node <x>/IPDC/ESG/ESGBootstrapEntryPoint/<x>/tuning parameters/ in more detail.

TABLE 89

| | |
|---|---|
| Status | Optional |
| Occurrence | ZeroOrOne |
| Format | Chr |
| Min.Access Types | Get |
| Value | Tuning parameters |

Table 90 below shows the above-mentioned node <x>/IPDC/ESG/ESGBootstrapEntryPoint/<x>/Ext/ in more detail.

TABLE 90

| | |
|---|---|
| Status | Optional |
| Occurrence | ZeroOrOne |
| Format | Chr |
| Min.Access Types | Get |
| Value | N/A |

3. $3^{rd}$ OMA DM Mechanism

Figure 19:
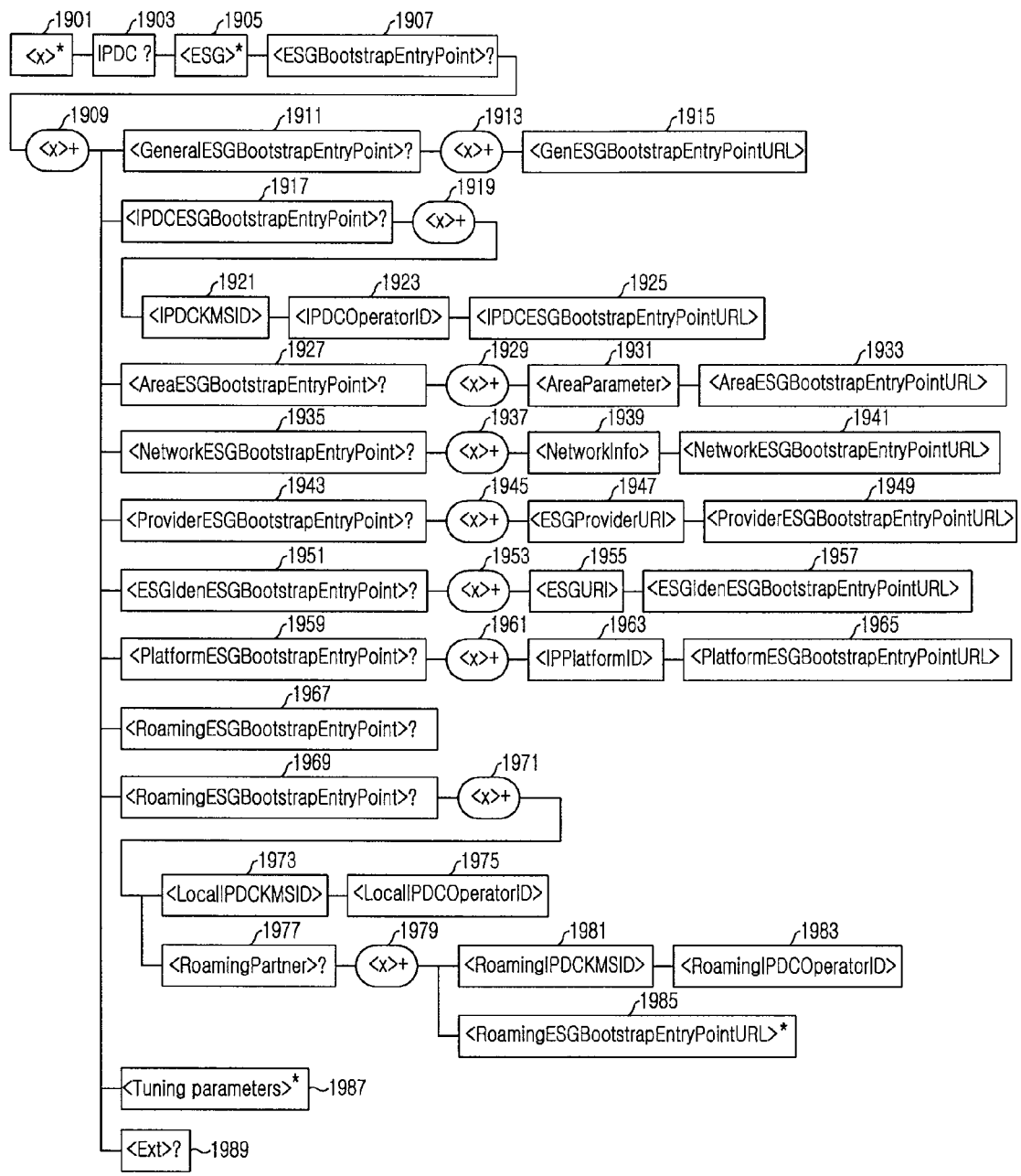
FIG. 19 illustrates an MO of a third OMA DM mechanism according to the eighth exemplary embodiment of the present invention.

FIG. 19 illustrates an MO of a third OMA DM mechanism according to the eighth exemplary embodiment of the present invention.

Referring to FIG. 19, the X field 1901, 1909, 1913, 1919, 1929, 1937, 1945, 1953, 1961, 1971, or 1979 is a node functioning as a placeholder, the IPDC field 1903 is a node for an IPDC terminal, the ESG field 1905 is a node carrying ESG-related information, the ESGBootstrapEntryPoint field 1907 is a node carrying ESG bootstrap-related information, the GeneralESGBootstrapEntryPoint field 1911 is a node carrying typical ESG bootstrap-related information. Further, the GenESGBootstrapEntryPointURL field 1915 is a node indicating a URL, which is a typical ESG bootstrap entry point for requiring ESG bootstrap information through an interactive network, the IPDCESGBootstrapEntryPoint field 1917 is a node carrying information of an ESG bootstrap relating to an IPDC KMS system and IPDC operator, the IPDCKMSID field 1921 is a node indicating an IPDCKMSID that can be found in the ESG, the IPDCOperatorID field 1923 is a node indicating an IPDCOperatorID that can be found in the ESG, the IPDCESGBootstrapEntryPointURL field 1925 is a field indicating a URL, which is an ESG bootstrap entry point for requiring ESG bootstrap information relating to an IPDC KMS system and IPDC operator through an interactive network, the AreaESGBootstrapEntryPoint field 1927 is a node carrying information of an ESG bootstrap relating to an area, the AreaParameter field 1931 is a node carrying area-related parameters, such as network ID, cell ID, GPS, nation code, and the like, the AreaESGBootstrapEntryPointURL field

1933 is a field indicating URL, which is an ESG bootstrap entry point for requiring ESG bootstrap information relating to an area through an interactive network, the NetworkESGBootstrapEntryPoint field 1935 is a node carrying information of an ESG bootstrap relating to a network, the NetworkInfo field 1939 is a node carrying network-related information, such as network type and network ID, the NetworkESGBootstrapEntryPointURL field 1941 is a node indicating a URL, which is an ESG bootstrap entry point for requiring ESG bootstrap information relating to a network through an interactive network, the ProviderESGBootstrapEntryPoint field 1943 is a node carrying information of an ESG bootstrap relating to a provider, the ESGProviderURI field 1947 is a node carrying ESG provider-related information, the ProviderESGBootstrapEntryPointURL field 1949 is a node indicating a URL, which is an ESG bootstrap entry point for requiring ESG bootstrap information relating to a provider through an interactive network, the ESGIdenESGBootstrapEntryPoint field 1951 is a node carrying information of an ESG bootstrap relating to an ESGURI, the ESGURI field 1955 is a node indicating an ESGURI that can be found in the ESG bootstrap, the ESGIdenESGBootstrapEntryPointURL field 1957 is a node indicating a URL, which is an ESG bootstrap entry point for requiring ESG bootstrap information relating to an ESGURI through an interactive network, the PlatformESGBootstrapEntryPoint field 1959 is a node carrying information of an ESG bootstrap relating to an IP platform, the IPPlatformID field 1963 is a node carrying IP platform-related information, the PlatformESGBootstrapEntryPointURL field 1965 is a node indicating a URL, which is an ESG bootstrap entry point for requiring ESG bootstrap information relating to an IP platform through an interactive network, the RoamingESGBootstrapEntryPoint field 1967 or 1969 is a node carrying information of an ESG bootstrap relating to a roaming IPDC KMS system and IPDC operator, the LocalIPDCKMSID field 1973 is a node for a local terminal having an IPDCKMSID, the LocalIPDCOperatorID field 1975 is a node for a local terminal having an IPDCOperatorID, the RoamingPartner field 1977 is a node carrying roaming partner-related information for the local IPDC KMS system and IPDC operator, the RoamingIPDCKMSID field 1981 is a node for a roaming terminal having an IPDCKMSID, the RoamingIPDCOperatorID field 1983 is a node for a roaming terminal having an IPDCOperatorID, the RoamingESGBootstrapEntryPointURL field 1985 is a node indicating a URL, which is an ESG bootstrap entry point for requiring ESG bootstrap information relating to a roaming terminal, the Tuning parameters field 1987 is a node carrying related tuning parameters, and the Ext field 1989 is an internal node for additional information.

Table 91 below shows the above-mentioned node <x> in more detail.

TABLE 91

| Status | Required |
|---|---|
| Occurrence | ZeroOrMore |
| Format | Node |
| Min.Access Types | Get |
| Value | N/A |

Table 92 below shows the above-mentioned node <x>/IPDC/ in more detail.

TABLE 92

| Status | Required |
|---|---|
| Occurrence | ZeroOrOne |
| Format | Node |
| Min.Access Types | Get |
| Value | N/A |

Table 93 shows the above-mentioned node <x>/IPDC/ESG/ in more detail.

TABLE 93

| Status | Required |
|---|---|
| Occurrence | ZeroOrMore |
| Format | Node |
| Min.Access Types | Get |
| Value | N/A |

Table 94 below shows the above-mentioned node <x>/IPDC/ESG/ESGBootstrapEntryPoint/ in more detail.

TABLE 94

| Status | Required |
|---|---|
| Occurrence | ZeroOrOne |
| Format | Node |
| Min.Access Types | Get |
| Value | N/A |

Table 95 below shows the above-mentioned node <x>/IPDC/ESG/ESGBootstrapEntryPoint/<x> in more detail.

TABLE 95

| Status | Required |
|---|---|
| Occurrence | OneOrMore |
| Format | Node |
| Min.Access Types | Get |
| Value | N/A |

Table 96 shows the above-mentioned node <x>/IPDC/ESG/ESGBootstrapEntryPoint/<x>/GeneralESGEntryPoint/ in more detail.

TABLE 96

| Status | Optional |
|---|---|
| Occurrence | ZeroOrOne |
| Format | Node |
| Min.Access Types | Get |
| Value | N/A |

Table 97 below shows the above-mentioned node <x>/IPDC/ESG/ESGBootstrapEntryPoint/<x>/GeneralESGBootstrapEntryPoint/<x> in more detail.

TABLE 97

| Status | Optional |
|---|---|
| Occurrence | OneOrMore |
| Format | Node |
| Min.Access Types | Get |
| Value | N/A |

Table 98 shows the above-mentioned node <x>/IPDC/ESG/ESGBootstrapEntryPoint/<x>/GeneralESGEntryPoint/<x>/GenESGBootstrapEntryPointURL/in more detail.

TABLE 98

| | |
|---|---|
| Status | Optional |
| Occurrence | One |
| Format | Chr |
| Min.Access Types | Get |
| Value | URL to the Entry Point to request ESG Bootstrap information over interactive Network |

Table 99 shows the above-mentioned node <x>/IPDC/ESG/ESGBootstrapEntryPoint/<x>/IPDCESGEntryPoint/ in more detail.

TABLE 99

| | |
|---|---|
| Status | Optional |
| Occurrence | ZeroOrOne |
| Format | Node |
| Min.Access Types | Get |
| Value | N/A |

Table 100 below shows the above-mentioned node <x>/IPDC/ESG/ESGBootstrapEntryPoint/<x>/IPDCESGBootstrapEntryPoint/<x> in more detail.

TABLE 100

| | |
|---|---|
| Status | Optional |
| Occurrence | OneOrMore |
| Format | Node |
| Min.Access Types | Get |
| Value | N/A |

Table 101 below shows the above-mentioned node <x>/IPDC/ESG/ESGBootstrapEntryPoint/<x>/IPDCESGEntryPoint/<x>/IPDCKMSID/in more detail.

TABLE 101

| | |
|---|---|
| Status | Optional |
| Occurrence | One |
| Format | Node |
| Min.Access Types | Get |
| Value | IPDC KMS identifier |

Table 102 below shows the above-mentioned node <x>/IPDC/ESG/ESGBootstrapEntryPoint/<x>/IPDCESGEntryPoint/<x>/IPDCKMSID/IPDCOperatorID/in more detail.

TABLE 102

| | |
|---|---|
| Status | Optional |
| Occurrence | One |
| Format | Node |
| Min.Access Types | Get |
| Value | IPDC operator identifier |

Table 103 shows the above-mentioned node <x>/IPDC/ESG/ESGBootstrapEntryPoint/<x>/IPDCESGEntryPoint/<x>/IPDCKMSID/IPDCOperatorID/IPDCESGEntryPointURL/in more detail.

TABLE 103

| | |
|---|---|
| Status | Optional |
| Occurrence | One |
| Format | Chr |
| Min.Access Types | Get |
| Value | URL to the Entry Point to request ESG Bootstrap information over interactive Network |

Table 104 below shows the above-mentioned node <x>/IPDC/ESG/ESGBootstrapEntryPoint/<x>/AreaESGEntryPoint/ in more detail.

TABLE 104

| | |
|---|---|
| Status | Optional |
| Occurrence | ZeroOrOne |
| Format | Node |
| Min.Access Types | Get |
| Value | N/A |

Table 105 below shows the above-mentioned node <x>/IPDC/ESG/ESGBootstrapEntryPoint/<x>/AreaESGEntryPoint/<x> in more detail.

TABLE 105

| | |
|---|---|
| Status | Optional |
| Occurrence | OneOrMore |
| Format | Node |
| Min.Access Types | Get |
| Value | N/A |

Table 106 shows the above-mentioned node <x>/IPDC/ESG/ESGBootstrapEntryPoint/<x>/AreaESGEntryPoint/<x>/AreaParameter/in more detail.

TABLE 106

| | |
|---|---|
| Status | Optional |
| Occurrence | One |
| Format | Node |
| Min.Access Types | Get |
| Value | Area identifier |

Table 107 below shows the above-mentioned node <x>/IPDC/ESG/ESGBootstrapEntryPoint/<x>/AreaESGEntryPoint/<x>/AreaParameter/AreaESGBootstrapEntryPointURL/in more detail.

TABLE 107

| | |
|---|---|
| Status | Optional |
| Occurrence | One |
| Format | Chr |
| Min.Access Types | Get |
| Value | URL to the Entry Point to request ESG Bootstrap information over interactive Network |

Table 108 shows the above-mentioned node <x>/IPDC/ESG/ESGBootstrapEntryPoint/<x>/NetworkESGEntryPoint/ in more detail.

TABLE 108

| | |
|---|---|
| Status | Optional |
| Occurrence | ZeroOrOne |
| Format | Node |
| Min.Access Types | Get |
| Value | N/A |

Table 109 shows the above-mentioned node <x>/IPDC/ESG/ESGBootstrapEntryPoint/<x>/NetworkESGEntryPoint/<x> in more detail.

TABLE 109

| | |
|---|---|
| Status | Optional |
| Occurrence | OneOrMore |
| Format | Node |

TABLE 109-continued

| | |
|---|---|
| Min.Access Types | Get |
| Value | N/A |

Table 110 below shows the above-mentioned node <x>/IPDC/ESG/ESGBootstrapEntryPoint/<x>/NetworkESGEntryPoint/<x>/NetworkInfo/in more detail.

TABLE 110

| | |
|---|---|
| Status | Optional |
| Occurrence | One |
| Format | Node |
| Min.Access Types | Get |
| Value | Network information |

Table 111 below shows the above-mentioned node <x>/IPDC/ESG/ESGBootstrapEntryPoint/<x>/NetworkESGEntryPoint/<x>/NetworkInfo/NetworkESGBootstrapEntryPointURL/in more detail.

TABLE 111

| | |
|---|---|
| Status | Optional |
| Occurrence | One |
| Format | Chr |
| Min.Access Types | Get |
| Value | URL to the Entry Point to request ESG Bootstrap information over interactive Network |

Table 112 below shows the above-mentioned node <x>/IPDC/ESG/ESGBootstrapEntryPoint/<x>/ProviderESGEntryPoint/ in more detail.

TABLE 112

| | |
|---|---|
| Status | Optional |
| Occurrence | ZeroOrOne |
| Format | Node |
| Min.Access Types | Get |
| Value | N/A |

Table 113 shows the above-mentioned node <x>/IPDC/ESG/ESGBootstrapEntryPoint/<x>/ProviderESGEntryPoint/<x> in more detail.

TABLE 113

| | |
|---|---|
| Status | Optional |
| Occurrence | OneOrMore |
| Format | Node |
| Min.Access Types | Get |
| Value | N/A |

Table 114 below shows the above-mentioned node <x>/IPDC/ESG/ESGBootstrapEntryPoint/<x>/ProviderESGEntryPoint/<x>/ESGProviderURI/in more detail.

TABLE 114

| | |
|---|---|
| Status | Optional |
| Occurrence | One |
| Format | Node |
| Min.Access Types | Get |
| Value | ESG provider identifier |

Table 115 below shows the above-mentioned node <x>/IPDC/ESG/ESGBootstrapEntryPoint/<x>/ProviderESGEntryPoint/<x>/ESGProviderURI/ProviderESGBootstrapEntryPointURL/in more detail.

TABLE 115

| | |
|---|---|
| Status | Optional |
| Occurrence | One |
| Format | Chr |
| Min.Access Types | Get |
| Value | URL to the Entry Point to request ESG Bootstrap information over interactive Network |

Table 116 shows the above-mentioned node <x>/IPDC/ESG/ESGBootstrapEntryPoint/<x>/ESGIdenESGEntryPoint/ in more detail.

TABLE 116

| | |
|---|---|
| Status | Optional |
| Occurrence | ZeroOrOne |
| Format | Node |
| Min.Access Types | Get |
| Value | N/A |

Table 117 below shows the above-mentioned node <x>/IPDC/ESG/ESGBootstrapEntryPoint/<x>/ESGIdenESGEntryPoint/<x> in more detail.

TABLE 117

| | |
|---|---|
| Status | Optional |
| Occurrence | OneOrMore |
| Format | Node |
| Min.Access Types | Get |
| Value | N/A |

Table 118 shows the above-mentioned node <x>/IPDC/ESG/ESGBootstrapEntryPoint/<x>/ESGIdenESGEntryPoint/<x>/ESGURI/in more detail.

TABLE 118

| | |
|---|---|
| Status | Optional |
| Occurrence | One |
| Format | Node |
| Min.Access Types | Get |
| Value | ESG identifier |

Table 119 shows the above-mentioned node <x>/IPDC/ESG/ESGBootstrapEntryPoint/<x>/ESGIdenESGEntryPoint/<x>/ESGURI/ESGIdenESGBootstrapEntryPointURL/in more detail.

TABLE 119

| | |
|---|---|
| Status | Optional |
| Occurrence | One |
| Format | Chr |
| Min.Access Types | Get |
| Value | URL to the Entry Point to request ESG Bootstrap information over interactive Network |

Table 120 below shows the above-mentioned node <x>/IPDC/ESG/ESGBootstrapEntryPoint/<x>/PlatformESGEntryPoint/ in more detail.

TABLE 120

| | |
|---|---|
| Status | Optional |
| Occurrence | ZeroOrOne |
| Format | Node |
| Min.Access Types | Get |
| Value | N/A |

Table 121 below shows the above-mentioned node <x>/IPDC/ESG/ESGBootstrapEntryPoint/<x>/PlatformESGEntryPoint/<x> in more detail.

TABLE 121

| | |
|---|---|
| Status | Optional |
| Occurrence | OneOrMore |
| Format | Node |
| Min.Access Types | Get |
| Value | N/A |

Table 122 below shows the above-mentioned node <x>/IPDC/ESG/ESGBootstrapEntryPoint/<x>/PlatformESGEntryPoint/<x>/IPPlatformID/in more detail.

TABLE 122

| | |
|---|---|
| Status | Optional |
| Occurrence | One |
| Format | Node |
| Min.Access Types | Get |
| Value | IP platform identifier |

Table 123 shows the above-mentioned node <x>/IPDC/ESG/ESGBootstrapEntryPoint/<x>/PlatformESGEntryPoint/<x>/IPPlatformID/PlatformESGBootstrapEntryPointURL/in more detail.

TABLE 123

| | |
|---|---|
| Status | Optional |
| Occurrence | One |
| Format | Chr |
| Min.Access Types | Get |
| Value | URL to the Entry Point to request ESG Bootstrap information over interactive Network |

Table 124 below shows the above-mentioned node <x>/IPDC/ESG/ESGBootstrapEntryPoint/<x>/RoamingESGEntryPoint/ in more detail.

TABLE 124

| | |
|---|---|
| Status | Required |
| Occurrence | ZeroOrOne |
| Format | Node |
| Min.Access Types | Get |
| Value | N/A |

Table 125 below shows the above-mentioned node <x>/IPDC/ESG/ESGBootstrapEntryPoint/<x>/RoamingESGEntryPoint/<x> in more detail.

TABLE 125

| | |
|---|---|
| Status | Required |
| Occurrence | OneOrMore |
| Format | Node |
| Min.Access Types | Get |
| Value | N/A |

Table 126 shows the above-mentioned node <x>/IPDC/ESG/ESGBootstrapEntryPoint/<x>/RoamingESGEntryPoint/<x>/LocalIPDCKMSID/in more detail.

TABLE 126

| | |
|---|---|
| Status | Required |
| Occurrence | One |
| Format | Node |
| Min.Access Types | Get |
| Value | Local IPDC KMS identifier |

Table 127 below shows the above-mentioned node <x>/IPDC/ESG/ESGBootstrapEntryPoint/<x>/RoamingESGEntryPoint/<x>/LocalIPDCKMSID/LocalIPDCOperatorID/in more detail.

TABLE 127

| | |
|---|---|
| Status | Required |
| Occurrence | One |
| Format | Chr |
| Min.Access Types | Get |
| Value | Local IPDC operator identifier |

Table 128 shows the above-mentioned node <x>/IPDC/ESG/ESGBootstrapEntryPoint/<x>/RoamingESGEntryPoint/<x>/RoamingPartner/in more detail.

TABLE 128

| | |
|---|---|
| Status | Required |
| Occurrence | ZeroOrOne |
| Format | Node |
| Min.Access Types | Get |
| Value | N/A |

Table 129 shows the above-mentioned node <x>/IPDC/ESG/ESGBootstrapEntryPoint/<x>/RoamingESGEntryPoint/<x>/RoamingPartner/<x> in more detail.

TABLE 129

| | |
|---|---|
| Status | Required |
| Occurrence | OneOrMore |
| Format | Node |
| Min.Access Types | Get |
| Value | N/A |

Table 130 below shows the above-mentioned node <x>/IPDC/ESG/ESGBootstrapEntryPoint/<x>/RoamingESGEntryPoint/<x>/RoamingPartner/<x>RoamingIPDCKMSID/ in more detail.

TABLE 130

| | |
|---|---|
| Status | Required |
| Occurrence | One |
| Format | Node |
| Min.Access Types | Get |
| Value | Roaming IPDC KMS identifier |

Table 131 below shows the above-mentioned node <x>/IPDC/ESG/ESGBootstrapEntryPoint/<x>/RoamingESGEntryPoint/<x>/RoamingPartner/<x>RoamingIPDCKMSID/Roaming IPDCOperatorID/ in more detail.

TABLE 131

| | |
|---|---|
| Status | Required |
| Occurrence | One |
| Format | Node |
| Min.Access Types | Get |
| Value | Roaming IPDC operator identifier |

Table 132 below shows the above-mentioned node <x>/IPDC/ESG/ESGBootstrapEntryPoint/<x>/RoamingESGEntryPoint/<x>/RoamingPartner/<x>RoamingESGBootstrapEntryPointURL in more detail.

TABLE 132

| Status | Optional |
| --- | --- |
| Occurrence | ZeroOrMore |
| Format | Chr |
| Min.Access Types | Get |
| Value | URL to the Entry Point to request ESG Bootstrap information over interactive Network |

Table 133 shows the above-mentioned node <x>/IPDC/ESG/ESGBootstrapEntryPoint/<x>/KMSESGEntryPoint/ in more detail.

TABLE 133

| Status | Optional |
| --- | --- |
| Occurrence | ZeroOrOne |
| Format | Node |
| Min.Access Types | Get |
| Value | N/A |

Table 134 below shows the above-mentioned node <x>/IPDC/ESG/ESGBootstrapEntryPoint/<x>/KMSESGEntryPoint/<x> in more detail.

TABLE 134

| Status | Optional |
| --- | --- |
| Occurrence | OneOrMore |
| Format | Node |
| Min.Access Types | Get |
| Value | N/A |

Table 135 below shows the above-mentioned node <x>/IPDC/ESG/ESGBootstrapEntryPoint/<x>/KMSESGEntryPoint/<x>/IPDCKMSID/in more detail.

TABLE 135

| Status | Optional |
| --- | --- |
| Occurrence | One |
| Format | Node |
| Min.Access Types | Get |
| Value | IPDC KMS identifier |

Table 136 shows the above-mentioned node <x>/IPDC/ESG/ESGBootstrapEntryPoint/<x>/KMSESGEntryPoint/<x>/IPDCKMSID/KMSESGBootstrapEntryPointURL/in more detail.

TABLE 136

| Status | Optional |
| --- | --- |
| Occurrence | One |
| Format | Chr |
| Min.Access Types | Get |
| Value | URL to the Entry Point to request ESG Bootstrap information over interactive Network |

Table 137 below shows the above-mentioned node <x>/IPDC/ESG/ESGBootstrapEntryPoint/<x>/tuning parameters in more detail.

TABLE 137

| Status | Optional |
| --- | --- |
| Occurrence | ZeroOrOne |
| Format | Chr |
| Min.Access Types | Get |
| Value | Tuning parameters |

Table 138 shows the above-mentioned node <x>/IPDC/ESG/ESGBootstrapEntryPoint/<x>/Ext/ in more detail.

TABLE 138

| Status | Optional |
| --- | --- |
| Occurrence | ZeroOrOne |
| Format | Chr |
| Min.Access Types | Get |
| Value | N/A |

4. 4$^{th}$ OMA DM Mechanism

Figure 20:
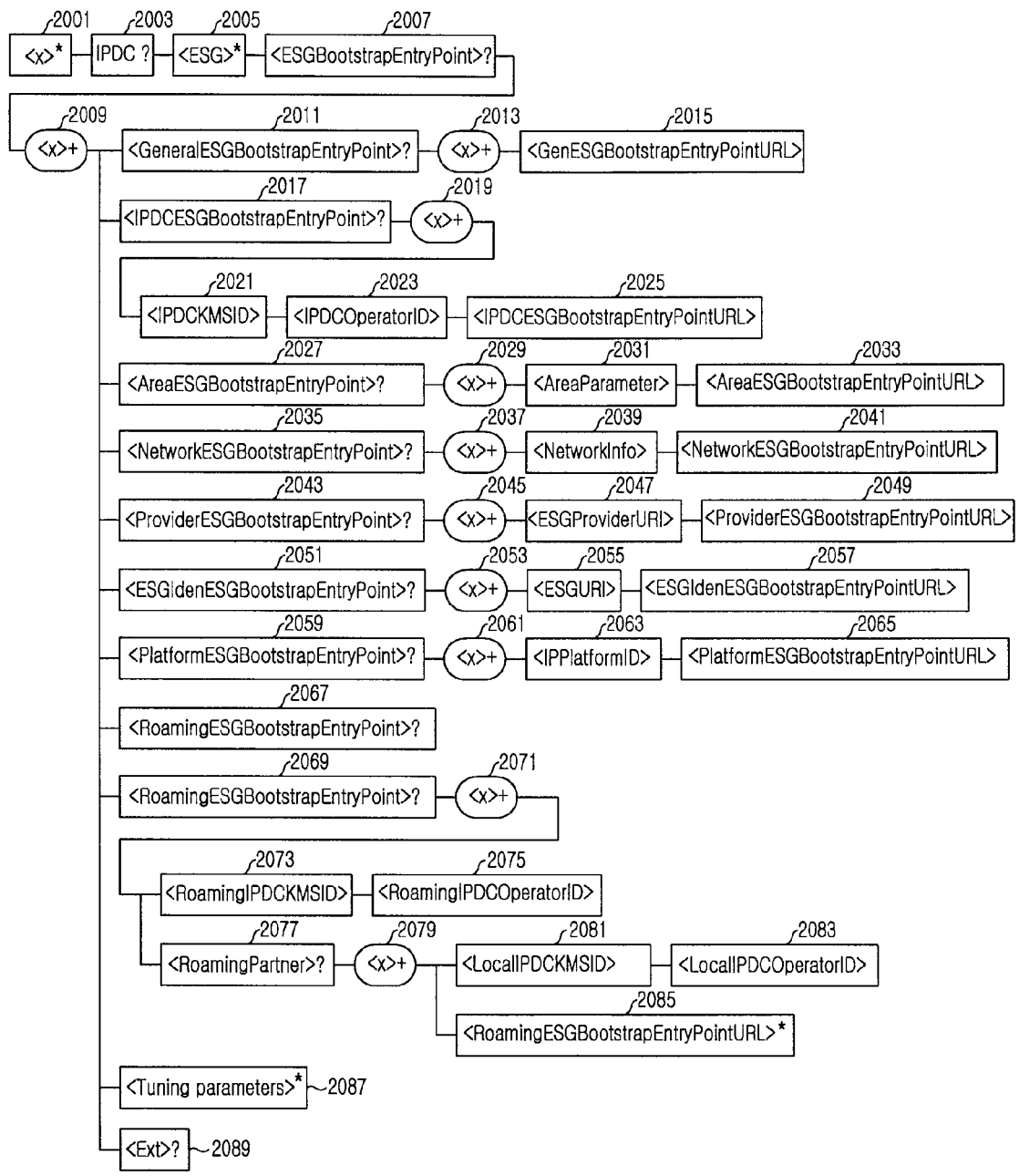
FIG. 20 illustrates an MO of a fourth OMA DM mechanism according to the eighth exemplary embodiment of the present invention.

FIG. 20 illustrates an MO of a fourth OMA DM mechanism according to the eighth exemplary embodiment of the present invention.

Referring to FIG. 20, the X field 2001, 2009, 2013, 2019, 2029, 2037, 2045, 2053, 2061, 2071, or 2079 is a node functioning as a placeholder, the IPDC field 2003 is a node for an IPDC terminal, the ESG field 2005 is a node carrying ESG-related information, the ESGBootstrapEntryPoint field 2007 is a node carrying ESG bootstrap-related information, the GeneralESGBootstrapEntryPoint field 2011 is a node carrying typical ESG bootstrap-related information. Further, the GenESGBootstrapEntryPointURL field 2015 is a node indicating a URL, which is a typical ESG bootstrap entry point for requiring ESG bootstrap information through an interactive network, the IPDCESGBootstrapEntryPoint field 2017 is a node carrying information of an ESG bootstrap relating to an IPDC KMS system and IPDC operator, the IPDCKMSID field 2021 is a node indicating an IPDCKMSID that can be found in the ESG, the IPDCOperatorID field 2023 is a node indicating an IPDCOperatorID that can be found in the ESG, the IPDCESGBootstrapEntryPointURL field 2025 is a field indicating a URL, which is an ESG bootstrap entry point for requiring ESG bootstrap information relating to an IPDC KMS system and IPDC operator through an interactive network, the AreaESGBootstrapEntryPoint field 2027 is a node carrying information of an ESG bootstrap relating to an area, the AreaParameter field 2031 is a node carrying area-related parameters, such as network ID, cell ID, GPS, and nation code, the AreaESGBootstrapEntryPointURL field 2033 is a field indicating URL, which is an ESG bootstrap entry point for requiring ESG bootstrap information relating to an area through an interactive network, the NetworkESGBootstrapEntryPoint field 2035 is a node carrying information of an ESG bootstrap relating to a network, the NetworkInfo field 2039 is a node carrying network-related information, such as network type and network ID, the NetworkESGBootstrapEntryPointURL field 2041 is a node indicating a URL, which is an ESG bootstrap entry point for requiring ESG bootstrap information relating to a network through an interactive network, the ProviderESGBootstrapEntryPoint field 2043 is a node carrying information of an ESG bootstrap relating to a provider, the ESGProviderURI field 2047 is a node carrying ESG provider-related information, the ProviderESGBootstrapEntryPointURL field 2049 is a node indicating a URL, which is an ESG bootstrap entry point for requiring ESG bootstrap information relating to a provider through an interactive network, the ESGIdenESGBootstrapEntryPoint field 2051 is a node carrying information of an ESG bootstrap relating to an ESGURI, the ESGURI field 2055 is a node indicating an ESGURI that can be found in the ESG bootstrap, the ESGIdenESGBootstrapEntryPointURL field 2057 is a node indicating a URL, which is an ESG bootstrap entry point for requiring ESG bootstrap information relating to an ESGURI through an interactive network, the PlatformESGBootstrapEntryPoint field 2059 is a node carrying information of an ESG bootstrap relating to an IP platform, the IPPlatformID field 2063 is a node carrying IP platform-related information, the PlatformESGBootstrapEntryPointURL field 2065 is a node indicating a URL, which is an ESG bootstrap entry point for requiring ESG bootstrap information relating to an IP platform through an interactive network, the RoamingESGBootstrapEntryPoint field 2067 or 2069 is a node carrying information of an ESG bootstrap relating to a roaming IPDC KMS system and IPDC operator, the RoamingIPDCKMSID field 2073 is a node for a roaming terminal having an IPDCKMSID, the RoamingIPDCOperatorID field 2075 is a node for a roaming terminal having an IPDCOperatorID, the RoamingPartner field 2077 is a node carrying roaming partner-related information, the LocalIPDCKMSID field 2081 is a node for a local terminal having an IPDCKMSID, the LocalIPDCOperatorID field 2083 is a node for a local terminal having an IPDCOperatorID, the RoamingESGBootstrapEntryPointURL field 2085 is a node indicating a URL, which is an ESG bootstrap entry point for requiring ESG bootstrap information relating to a roaming terminal, the Tuning parameters field 2087 is a node carrying related tuning parameters, and the Ext field 2089 is an internal node for additional information.

Table 139 below shows the above-mentioned node <x> in more detail.

TABLE 139

| | |
|---|---|
| Status | Required |
| Occurrence | ZeroOrMore |
| Format | Node |
| Min.Access Types | Get |
| Value | N/A |

Table 140 below shows the above-mentioned node <x>/IPDC/ in more detail.

TABLE 140

| | |
|---|---|
| Status | Required |
| Occurrence | ZeroOrOne |
| Format | Node |
| Min.Access Types | Get |
| Value | N/A |

Table 141 below shows the above-mentioned node <x>/IPDC/ESG/ in more detail.

TABLE 141

| | |
|---|---|
| Status | Required |
| Occurrence | ZeroOrMore |
| Format | Node |
| Min.Access Types | Get |
| Value | N/A |

Table 142 below shows the above-mentioned node <x>/IPDC/ESG/ESGBootstrapEntryPoint/ in more detail.

TABLE 142

| | |
|---|---|
| Status | Required |
| Occurrence | ZeroOrOne |
| Format | Node |
| Min.Access Types | Get |
| Value | N/A |

Table 143 shows the above-mentioned node <x>/IPDC/ESG/ESGBootstrapEntryPoint/<x>/ in more detail.

TABLE 143

| | |
|---|---|
| Status | Required |
| Occurrence | OneOrMore |
| Format | Node |
| Min.Access Types | Get |
| Value | N/A |

Table 144 below shows the above-mentioned node <x>/IPDC/ESG/ESGBootstrapEntryPoint/<x>/GeneralESGEntryPoint/ in more detail.

TABLE 144

| | |
|---|---|
| Status | Optional |
| Occurrence | ZeroOrOne |
| Format | Node |
| Min.Access Types | Get |
| Value | N/A |

Table 145 below shows the above-mentioned node <x>/IPDC/ESG/ESGBootstrapEntryPoint/<x>/GeneralESGBootstrapEntryPoint/<x> in more detail.

TABLE 145

| | |
|---|---|
| Status | Optional |
| Occurrence | OneOrMore |
| Format | Node |
| Min.Access Types | Get |
| Value | N/A |

Table 146 shows the above-mentioned node <x>/IPDC/ESG/ESGBootstrapEntryPoint/<x>/GeneralESGEntryPoint/<x>/GenESGBootstrapEntryPointURL/ in more detail.

TABLE 146

| | |
|---|---|
| Status | Optional |
| Occurrence | One |
| Format | Chr |
| Min.Access Types | Get |
| Value | URL to the Entry Point to request ESG Bootstrap information over interactive Network |

Table 147 below shows the above-mentioned node <x>/IPDC/ESG/ESGBootstrapEntryPoint/<x>/IPDCESGEntryPoint/ in more detail.

TABLE 147

| | |
|---|---|
| Status | Optional |
| Occurrence | ZeroOrOne |
| Format | Node |
| Min.Access Types | Get |
| Value | N/A |

Table 148 below shows the above-mentioned node <x>/IPDC/ESG/ESGBootstrapEntryPoint/<x>/IPDCESGBootstrapEntryPoint/<x> in more detail.

TABLE 148

| | |
|---|---|
| Status | Optional |
| Occurrence | OneOrMore |
| Format | Node |
| Min.Access Types | Get |
| Value | N/A |

Table 149 below shows the above-mentioned node <x>/IPDC/ESG/ESGBootstrapEntryPoint/<x>/IPDCESGEntryPoint/<x>/IPDCKMSID/in more detail.

TABLE 149

| | |
|---|---|
| Status | Optional |
| Occurrence | One |
| Format | Node |
| Min.Access Types | Get |
| Value | IPDC KMS identifier |

Table 150 below shows the above-mentioned node <x>/IPDC/ESG/ESGBootstrapEntryPoint/<x>/IPDCESGEntryPoint/<x>/IPDCKMSID/IPDCOperatorID/in more detail.

TABLE 150

| | |
|---|---|
| Status | Optional |
| Occurrence | One |
| Format | Node |
| Min.Access Types | Get |
| Value | IPDC operator identifier |

Table 151 below shows the above-mentioned node <x>/IPDC/ESG/ESGBootstrapEntryPoint/<x>/IPDCESGEntryPoint/<x>/IPDCKMSID/IPDCOperatorID/IPDCESGEntryPointURL/in more detail.

TABLE 151

| | |
|---|---|
| Status | Optional |
| Occurrence | One |
| Format | Chr |
| Min.Access Types | Get |
| Value | URL to the Entry Point to request ESG Bootstrap information over interactive Network |

Table 152 below shows the above-mentioned node <x>/IPDC/ESG/ESGBootstrapEntryPoint/<x>/AreaESGEntryPoint/ in more detail.

TABLE 152

| | |
|---|---|
| Status | Optional |
| Occurrence | ZeroOrOne |
| Format | Node |
| Min.Access Types | Get |
| Value | N/A |

Table 153 shows the above-mentioned node <x>/IPDC/ESG/ESGBootstrapEntryPoint/<x>/AreaESGEntryPoint/<x> in more detail.

TABLE 153

| | |
|---|---|
| Status | Optional |
| Occurrence | OneOrMore |
| Format | Node |

TABLE 153-continued

| | |
|---|---|
| Min.Access Types | Get |
| Value | N/A |

Table 154 below shows the above-mentioned node <x>/IPDC/ESG/ESGBootstrapEntryPoint/<x>/AreaESGEntryPoint/<x>/AreaParameter/in more detail.

TABLE 154

| | |
|---|---|
| Status | Optional |
| Occurrence | One |
| Format | Node |
| Min.Access Types | Get |
| Value | Area identifier |

Table 155 below shows the above-mentioned node <x>/IPDC/ESG/ESGBootstrapEntryPoint/<x>/AreaESGEntryPoint/<x>/AreaParameter/AreaESGBootstrapEntryPointURL/in more detail.

TABLE 155

| | |
|---|---|
| Status | Optional |
| Occurrence | One |
| Format | Chr |
| Min.Access Types | Get |
| Value | URL to the Entry Point to request ESG Bootstrap information over interactive Network |

Table 156 shows the above-mentioned node <x>/IPDC/ESG/ESGBootstrapEntryPoint/<x>/NetworkESGEntryPoint/ in more detail.

TABLE 156

| | |
|---|---|
| Status | Optional |
| Occurrence | ZeroOrOne |
| Format | Node |
| Min.Access Types | Get |
| Value | N/A |

Table 157 below shows the above-mentioned node <x>/IPDC/ESG/ESGBootstrapEntryPoint/<x>/NetworkESGEntryPoint/<x> in more detail.

TABLE 157

| | |
|---|---|
| Status | Optional |
| Occurrence | OneOrMore |
| Format | Node |
| Min.Access Types | Get |
| Value | N/A |

Table 158 shows the above-mentioned node <x>/IPDC/ESG/ESGBootstrapEntryPoint/<x>/NetworkESGEntryPoint/<x>/NetworkInfo/in more detail.

TABLE 158

| | |
|---|---|
| Status | Optional |
| Occurrence | One |
| Format | Node |
| Min.Access Types | Get |
| Value | Network information |

Table 159 shows the above-mentioned node <x>/IPDC/ESG/ESGBootstrapEntryPoint/<x>/NetworkESGEntryPoint/<x>/NetworkInfo/NetworkESGBootstrapEntryPointURL/in more detail.

TABLE 159

| | |
|---|---|
| Status | Optional |
| Occurrence | One |
| Format | Chr |
| Min.Access Types | Get |
| Value | URL to the Entry Point to request ESG Bootstrap information over interactive Network |

Table 160 below shows the above-mentioned node <x>/IPDC/ESG/ESGBootstrapEntryPoint/<x>/ProviderESGEntryPoint/ in more detail.

TABLE 160

| | |
|---|---|
| Status | Optional |
| Occurrence | ZeroOrOne |
| Format | Node |
| Min.Access Types | Get |
| Value | N/A |

Table 161 below shows the above-mentioned node <x>/IPDC/ESG/ESGBootstrapEntryPoint/<x>/ProviderESGEntryPoint/<x> in more detail.

TABLE 161

| | |
|---|---|
| Status | Optional |
| Occurrence | OneOrMore |
| Format | Node |
| Min.Access Types | Get |
| Value | N/A |

Table 162 below shows the above-mentioned node <x>/IPDC/ESG/ESGBootstrapEntryPoint/<x>/ProviderESGEntryPoint/<x>/ESGProviderURI/in more detail.

TABLE 162

| | |
|---|---|
| Status | Optional |
| Occurrence | One |
| Format | Node |
| Min.Access Types | Get |
| Value | ESG provider identifier |

Table 163 shows the above-mentioned node <x>/IPDC/ESG/ESGBootstrapEntryPoint/<x>/ProviderESGEntryPoint/<x>/ESGProviderURI/ProviderESGBootstrapEntryPointURL/in more detail.

TABLE 163

| | |
|---|---|
| Status | Optional |
| Occurrence | One |
| Format | Chr |
| Min.Access Types | Get |
| Value | URL to the Entry Point to request ESG Bootstrap information over interactive Network |

Table 164 below shows the above-mentioned node <x>/IPDC/ESG/ESGBootstrapEntryPoint/<x>/ESGIdenESGEntryPoint/ in more detail.

TABLE 164

| | |
|---|---|
| Status | Optional |
| Occurrence | ZeroOrOne |
| Format | Node |
| Min.Access Types | Get |
| Value | N/A |

Table 165 below shows the above-mentioned node <x>/IPDC/ESG/ESGBootstrapEntryPoint/<x>/ESGIdenESGEntryPoint/<x> in more detail.

TABLE 165

| | |
|---|---|
| Status | Optional |
| Occurrence | OneOrMore |
| Format | Node |
| Min.Access Types | Get |
| Value | N/A |

Table 166 shows the above-mentioned node <x>/IPDC/ESG/ESGBootstrapEntryPoint/<x>/ESGIdenESGEntryPoint/<x>/ESGURI/in more detail.

TABLE 166

| | |
|---|---|
| Status | Optional |
| Occurrence | One |
| Format | Node |
| Min.Access Types | Get |
| Value | ESG identifier |

Table 167 below shows the above-mentioned node <x>/IPDC/ESG/ESGBootstrapEntryPoint/<x>/ESGIdenESGEntryPoint/<x>/ESGURI/ESGIdenESGBootstrapEntryPointURL/in more detail.

TABLE 167

| | |
|---|---|
| Status | Optional |
| Occurrence | One |
| Format | Chr |
| Min.Access Types | Get |
| Value | URL to the Entry Point to request ESG Bootstrap information over interactive Network |

Table 168 shows the above-mentioned node <x>/IPDC/ESG/ESGBootstrapEntryPoint/<x>/PlatformESGEntryPoint/ in more detail.

TABLE 168

| | |
|---|---|
| Status | Optional |
| Occurrence | ZeroOrOne |
| Format | Node |
| Min.Access Types | Get |
| Value | N/A |

Table 169 shows the above-mentioned node <x>/IPDC/ESG/ESGBootstrapEntryPoint/<x>/PlatformESGEntryPoint/<x> in more detail.

TABLE 169

| | |
|---|---|
| Status | Optional |
| Occurrence | OneOrMore |
| Format | Node |
| Min.Access Types | Get |
| Value | N/A |

Table 170 below shows the above-mentioned node <x>/IPDC/ESG/ESGBootstrapEntryPoint/<x>/PlatformESGEntryPoint/<x>/IPPlatformID/in more detail.

TABLE 170

| | |
|---|---|
| Status | Optional |
| Occurrence | One |
| Format | Node |

TABLE 170-continued

| | |
|---|---|
| Min.Access Types | Get |
| Value | IP platform identifier |

Table 171 below shows the above-mentioned node <x>/IPDC/ESG/ESGBootstrapEntryPoint/<x>/PlatformESGEntryPoint/<x>/IPPlatformID/PlatformESGBootstrapEntryPointURL/in more detail.

TABLE 171

| | |
|---|---|
| Status | Optional |
| Occurrence | One |
| Format | Chr |
| Min.Access Types | Get |
| Value | URL to the Entry Point to request ESG Bootstrap information over interactive Network |

Table 172 below shows the above-mentioned node <x>/IPDC/ESG/ESGBootstrapEntryPoint/<x>/RoamingESGEntryPoint/ in more detail.

TABLE 172

| | |
|---|---|
| Status | Required |
| Occurrence | ZeroOrOne |
| Format | Node |
| Min.Access Types | Get |
| Value | N/A |

Table 173 shows the above-mentioned node <x>/IPDC/ESG/ESGBootstrapEntryPoint/<x>/RoamingESGEntryPoint/<x> in more detail.

TABLE 173

| | |
|---|---|
| Status | Required |
| Occurrence | OneOrMore |
| Format | Node |
| Min.Access Types | Get |
| Value | N/A |

Table 174 below shows the above-mentioned node <x>/IPDC/ESG/ESGBootstrapEntryPoint/<x>/RoamingESGEntryPoint/<x>/RoamingIPDCKMSID/in more detail.

TABLE 174

| | |
|---|---|
| Status | Required |
| Occurrence | One |
| Format | Node |
| Min.Access Types | Get |
| Value | Roaming IPDC KMS identifier |

Table 175 below shows the above-mentioned node <x>/IPDC/ESG/ESGBootstrapEntryPoint/<x>/RoamingESGEntryPoint/<x>/RoamingIPDCKMSID/LocalIPDCOperatorID/in more detail.

TABLE 175

| | |
|---|---|
| Status | Required |
| Occurrence | One |
| Format | Chr |
| Min.Access Types | Get |
| Value | RoamingIPDC operator identifier |

Table 176 shows the above-mentioned node <x>/IPDC/ESG/ESGBootstrapEntryPoint/<x>/RoamingESGEntryPoint/<x>/RoamingPartner/in more detail.

TABLE 176

| | |
|---|---|
| Status | Required |
| Occurrence | ZeroOrOne |
| Format | Node |
| Min.Access Types | Get |
| Value | N/A |

Table 177 below shows the above-mentioned node <x>/IPDC/ESG/ESGBootstrapEntryPoint/<x>/RoamingESGEntryPoint/<x>/RoamingPartner/<x> in more detail.

TABLE 177

| | |
|---|---|
| Status | Required |
| Occurrence | OneOrMore |
| Format | Node |
| Min.Access Types | Get |
| Value | N/A |

Table 178 shows the above-mentioned node <x>/IPDC/ESG/ESGBootstrapEntryPoint/<x>/RoamingESGEntryPoint/<x>/RoamingPartner/<x>LocalIPDCKMSID/ in more detail.

TABLE 178

| | |
|---|---|
| Status | Required |
| Occurrence | One |
| Format | Node |
| Min.Access Types | Get |
| Value | Local IPDC KMS identifier |

Table 179 shows the above-mentioned node <x>/IPDC/ESG/ESGBootstrapEntryPoint/<x>/RoamingESGEntryPoint/<x>/RoamingPartner/<x>LocalIPDCKMSID/LocalIPDCOperatorID/ in more detail.

TABLE 179

| | |
|---|---|
| Status | Required |
| Occurrence | One |
| Format | Node |
| Min.Access Types | Get |
| Value | Local IPDC operator identifier |

Table 180 below shows the above-mentioned node <x>/IPDC/ESG/ESGBootstrapEntryPoint/<x>/RoamingESGEntryPoint/<x>/RoamingPartner/<x>RoamingESGBootstrapEntryPointURL/ in more detail.

TABLE 180

| | |
|---|---|
| Status | Optional |
| Occurrence | ZeroOrMore |
| Format | Chr |
| Min.Access Types | Get |
| Value | URL to the Entry Point to request ESG Bootstrap information over interactive Network |

Table 181 below shows the above-mentioned node <x>/IPDC/ESG/ESGBootstrapEntryPoint/<x>/KMSESGEntryPoint/ in more detail.

TABLE 181

| | |
|---|---|
| Status | Optional |
| Occurrence | ZeroOrOne |

TABLE 181-continued

| Format | Node |
|---|---|
| Min.Access Types | Get |
| Value | N/A |

Table 182 below shows the above-mentioned node <x>/IPDC/ESG/ESGBootstrapEntryPoint/<x>/KMSESGEntryPoint/<x> in more detail.

TABLE 182

| Status | Optional |
|---|---|
| Occurrence | OneOrMore |
| Format | Node |
| Min.Access Types | Get |
| Value | N/A |

Table 183 shows the above-mentioned node <x>/IPDC/ESG/ESGBootstrapEntryPoint/<x>/KMSESGEntryPoint/<x>/IPDCKMSID/in more detail.

TABLE 183

| Status | Optional |
|---|---|
| Occurrence | One |
| Format | Node |
| Min.Access Types | Get |
| Value | IPDC KMS identifier |

Table 184 below shows the above-mentioned node <x>/IPDC/ESG/ESGBootstrapEntryPoint/<x>/KMSESGEntryPoint/<x>/IPDCKMSID/KMSESGBootstrapEntryPointURL/in more detail.

TABLE 184

| Status | Optional |
|---|---|
| Occurrence | One |
| Format | Chr |
| Min.Access Types | Get |
| Value | URL to the Entry Point to request ESG Bootstrap information over interactive Network |

Table 185 below shows the above-mentioned node <x>/IPDC/ESG/ESGBootstrapEntryPoint/<x>/tuning parameters/ in more detail.

TABLE 185

| Status | Optional |
|---|---|
| Occurrence | ZeroOrOne |
| Format | Chr |
| Min.Access Types | Get |
| Value | Tuning parameters |

Table 186 shows the above-mentioned node <x>/IPDC/ESG/ESGBootstrapEntryPoint/<x>/Ext in more detail.

TABLE 186

| Status | Optional |
|---|---|
| Occurrence | ZeroOrOne |
| Format | Chr |
| Min.Access Types | Get |
| Value | N/A |

5. 5$^{th}$ OMA DM Mechanism

Figure 21:
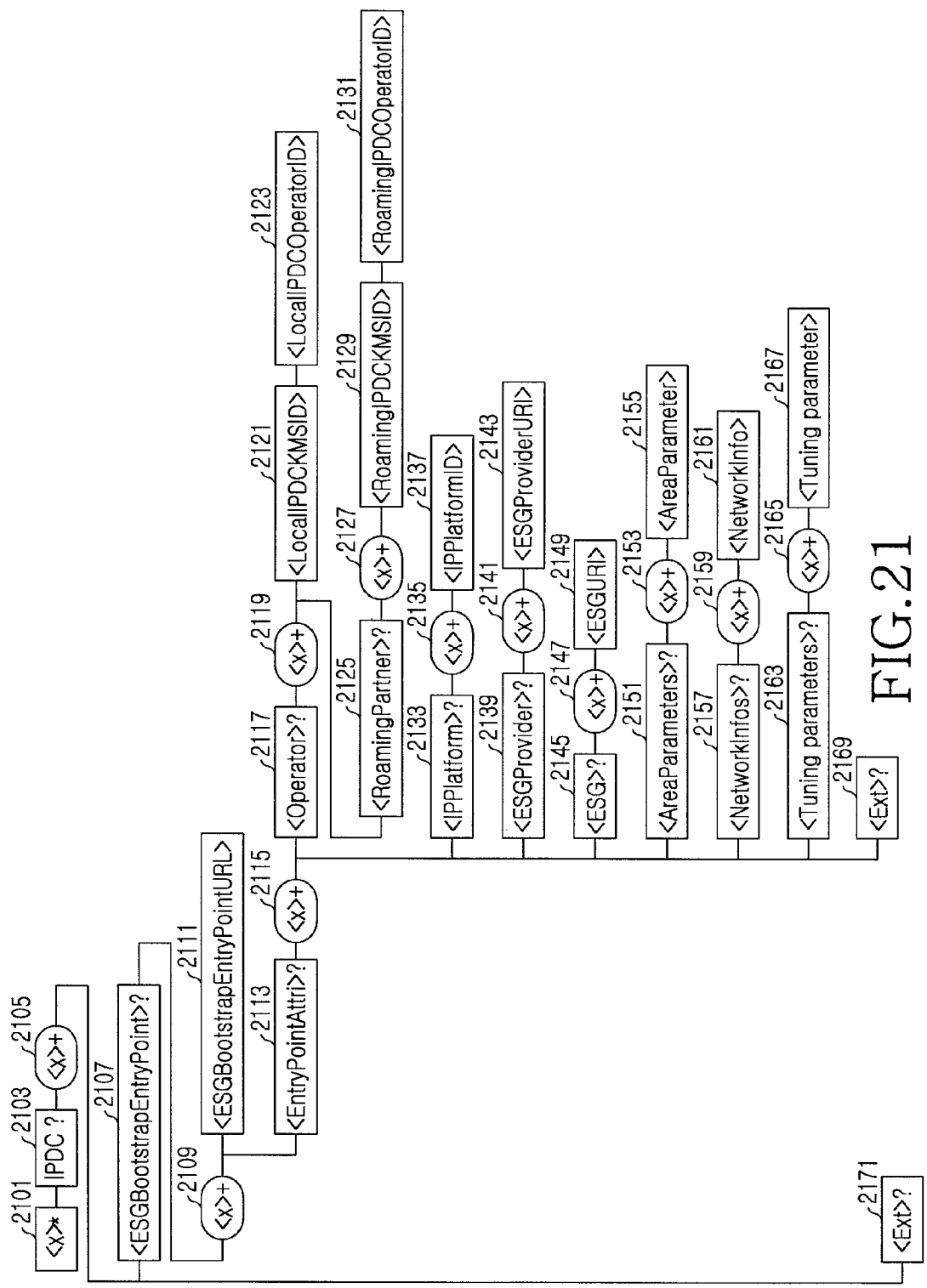
FIG. 21 illustrates an MO of a fifth OMA DM mechanism according to the eighth exemplary embodiment of the present invention.

FIG. 21 illustrates an MO of a fifth OMA DM mechanism according to the eighth exemplary embodiment of the present invention.

Referring to FIG. 21, the X field 2101, 2105, 2109, 2115, 2119, 2127, 2135, 2141, 2147, 2153, 2159, or 2165 is a node functioning as a placeholder, the IPDC field 2103 is a node for an IPDC terminal, the ESGBootstrapEntryPoint field 2107 is a node carrying ESG bootstrap-related information, the ESGBootstrapEntryPointURL field 2111 is a node indicating an entry point URL for requiring ESG bootstrap information through an interactive network, the EntryPointAttri field 2113 is a node carrying characteristic information of an entry point, the Operator field 2117 is a node carrying operator information, the LocalIPDCKMSID field 2121 is a node for a local terminal having an IPDCKMSID, the LocalIPDCOperatorID field 2123 is a node for a local terminal having an IPDCOperatorID, the RoamingPartner field 2125 is a node carrying roaming partner-related information for the local IPDC KMS system and IPDC operator, the RoamingIPDCKMSID field 2129 is a node for a roaming terminal having an IPDCKMSID, the RoamingIPDCOperatorID field 2131 is a node for a roaming terminal having an IPDCOperatorID, the IPPlatform field 2133 is a node carrying IP platform-related information, the IPPlatformID field 2137 is a node carrying an IP platform identifier (ID), the ESGProvider field 2139 is a node carrying ESG provider-related information, the ESGProviderURI field 2143 is a node carrying a URI identifying an ESG provider, the ESG field 2145 is a node carrying ESG-related information, the ESGURI field 2149 is a node indicating an ESGURI that can be found within the ESG bootstrap, the AreaParameters field 2151 is a node carrying area-related parameters, the AreaParameter field 2155 is a node carrying area-related parameters, such as network ID, cell ID, MCC, MNC, GPS, nation code, and the like, the NetworkInfos field 2157 is a node carrying network-related information, the NetworkInfo field 2161 is a node carrying network-related parameters, such as network type (satellite, terrestrial, interactive network, etc.) and network ID, the Tuning parameters field 2163 is a node carrying related tuning-related information, the Tuning parameter field 2167 is a node carrying related tuning parameters, and the Ext field 2169 or 2171 is a node for addition or extension. As used herein, the tuning parameters are parameters used for terminal tuning, such as frequency, decode, power and the like.

Table 187 below shows the above-mentioned node <x> in more detail.

TABLE 187

| Status | Required |
|---|---|
| Occurrence | ZeroOrMore |
| Format | Node |
| Min.Access Types | Get |
| Value | N/A |

Table 188 shows the above-mentioned node <x>/IPDC/ in more detail.

TABLE 188

| Status | Required |
|---|---|
| Occurrence | ZeroOrOne |
| Format | Node |
| Min.Access Types | Get |
| Value | N/A |

Table 189 shows the above-mentioned node <x>/IPDC/<x> in more detail.

TABLE 189

| | |
|---|---|
| Status | Required |
| Occurrence | OneOrMore |
| Format | Node |
| Min.Access Types | Get |
| Value | N/A |

Table 190 below shows the above-mentioned node <x>/IPDC/<x>/ESGBootstrapEntryPoint/ in more detail.

TABLE 190

| | |
|---|---|
| Status | Required |
| Occurrence | ZeroOrOne |
| Format | Node |
| Min.Access Types | Get |
| Value | N/A |

Table 191 below shows the above-mentioned node <x>/IPDC/<x>/ESGBootstrapEntryPoint/<x> in more detail.

TABLE 191

| | |
|---|---|
| Status | Required |
| Occurrence | OneOrMore |
| Format | Node |
| Min.Access Types | Get |
| Value | N/A |

Table 192 below shows the above-mentioned node <x>/IPDC/<x>/ESGBootstrapEntryPoint/<x>/ESGBootstrapEntryPointURL/ in more detail.

TABLE 192

| | |
|---|---|
| Status | Required |
| Occurrence | One |
| Format | Chr |
| Min.Access Types | Get |
| Value | URL to the Entry Point to request ESG Bootstrap information over interactive Network |

Table 193 shows the above-mentioned node <x>/IPDC/<x>/ESGBootstrapEntryPoint/<x>/EntryPointAttri/ in more detail.

TABLE 193

| | |
|---|---|
| Status | Required |
| Occurrence | ZeroOrOne |
| Format | Node |
| Min.Access Types | Get |
| Value | N/A |

Table 194 below shows the above-mentioned node <x>/IPDC/<x>/ESGBootstrapEntryPoint/EntryPointAttri/<x> in more detail.

TABLE 194

| | |
|---|---|
| Status | Required |
| Occurrence | OneOrMore |
| Format | Node |
| Min.Access Types | Get |
| Value | N/A |

Table 195 below shows the above-mentioned node <x>/IPDC/<x>/ESGBootstrapEntryPoint/EntryPointAttri/<x>/Operator/ in more detail.

TABLE 195

| | |
|---|---|
| Status | Optional |
| Occurrence | ZeroOrOne |
| Format | node |
| Min.Access Types | Get |
| Value | N/A |

Table 196 shows the above-mentioned node <x>/IPDC/<x>/ESGBootstrapEntryPoint/EntryPointAttri/<x>/Operator/<x> in more detail.

TABLE 196

| | |
|---|---|
| Status | Optional |
| Occurrence | OneOrMore |
| Format | node |
| Min.Access Types | Get |
| Value | N/A |

Table 197 below shows the above-mentioned node <x>/IPDC/<x>/ESGBootstrapEntryPoint/Operator/<x>/LocalIPDCKMSID/ in more detail.

TABLE 197

| | |
|---|---|
| Status | Required |
| Occurrence | One |
| Format | Node |
| Min.Access Types | Get |
| Value | Local IPDC KMS identifier |

Table 198 shows the above-mentioned node <x>/IPDC/<x>/ESGBootstrapEntryPoint/<x>/EntryPointAttri/<x>/Operator/<x>/LocalIPDCKMSID/LocalIPDCOperatorID/ in more detail.

TABLE 198

| | |
|---|---|
| Status | Required |
| Occurrence | One |
| Format | Chr |
| Min.Access Types | Get |
| Value | Local IPDC operator identifier |

Table 199 shows the above-mentioned node <x>/IPDC/<x>/ESGBootstrapEntryPoint/EntryPointAttri/<x>/Operator/<x>RoamingPartner/in more detail.

TABLE 199

| | |
|---|---|
| Status | Optional |
| Occurrence | ZeroOrOne |
| Format | node |
| Min.Access Types | Get |
| Value | N/A |

Table 200 below shows the above-mentioned node <x>/IPDC/<x>/ESGBootstrapEntryPoint/EntryPointAttri/<x>/Operator/<x>RoamingPartner/<x> in more detail.

TABLE 200

| | |
|---|---|
| Status | Optional |
| Occurrence | OneOrMore |

TABLE 200-continued

| | |
|---|---|
| Format | node |
| Min.Access Types | Get |
| Value | N/A |

Table 201 below shows the above-mentioned node <x>/IPDC/<x>/ESGBootstrapEntryPoint/EntryPointAttri/<x>/Operator/<x>RoamingPartner/<x>/RoamingIPDCKMSID/ in more detail.

TABLE 201

| | |
|---|---|
| Status | Required |
| Occurrence | One |
| Format | Node |
| Min.Access Types | Get |
| Value | IPDC KMS identifier of the Roaming partner |

Table 202 below shows the above-mentioned node <x>/IPDC/<x>/ESGBootstrapEntryPoint/<x>/EntryPointAttri/<x>/Operator/<x>/LocalIPDCKMSID/LocalIPDCOperatorID/in more detail.

TABLE 202

| | |
|---|---|
| Status | Required |
| Occurrence | One |
| Format | Chr |
| Min.Access Types | Get |
| Value | IPDC operator identifier of the Roaming partner |

Table 203 shows the above-mentioned node <x>/IPDC/<x>/ESGBootstrapEntryPoint/<x>/EntryPointAttri/<x>/IPPlatform/ in more detail.

TABLE 203

| | |
|---|---|
| Status | Optional |
| Occurrence | ZeroOrOne |
| Format | node |
| Min.Access Types | Get |
| Value | N/A |

Table 204 below shows the above-mentioned node <x>/IPDC/<x>/ESGBootstrapEntryPoint/<x>/EntryPointAttri/<x>/IPPlatform/<x> in more detail.

TABLE 204

| | |
|---|---|
| Status | Optional |
| Occurrence | OneOrMore |
| Format | node |
| Min.Access Types | Get |
| Value | N/A |

Table 205 below shows the above-mentioned node <x>/IPDC/<x>/ESGBootstrapEntryPoint/<x>/EntryPointAttri/<x>/IPPlatformID/ in more detail.

TABLE 205

| | |
|---|---|
| Status | Optional |
| Occurrence | One |
| Format | Chr |
| Min.Access Types | Get |
| Value | IP platform identifier |

Table 206 shows the above-mentioned node <x>/IPDC/<x>/ESGBootstrapEntryPoint/<x>/EntryPointAttri/<x>/ESGProvider/ in more detail.

TABLE 206

| | |
|---|---|
| Status | Optional |
| Occurrence | ZeroOrOne |
| Format | node |
| Min.Access Types | Get |
| Value | N/A |

Table 207 below shows the above-mentioned node <x>/IPDC/<x>/ESGBootstrapEntryPoint/<x>/EntryPointAttri/<x>/ESGProvider/<x> in more detail.

TABLE 207

| | |
|---|---|
| Status | Optional |
| Occurrence | OneOrMore |
| Format | node |
| Min.Access Types | Get |
| Value | N/A |

Table 208 shows the above-mentioned node <x>/IPDC/<x>/ESGBootstrapEntryPoint/<x>/EntryPointAttri/<x>/ESGProvider/<x>/ESGProviderURI/in more detail.

TABLE 208

| | |
|---|---|
| Status | Optional |
| Occurrence | One |
| Format | Chr |
| Min.Access Types | Get |
| Value | ESG Provider identifier |

Table 209 shows the above-mentioned node <x>/IPDC/<x>/ESGBootstrapEntryPoint/<x>/EntryPointAttri/<x>/ESG/ in more detail.

TABLE 209

| | |
|---|---|
| Status | Optional |
| Occurrence | ZeroOrOne |
| Format | node |
| Min.Access Types | Get |
| Value | N/A |

Table 210 below shows the above-mentioned node <x>/IPDC/<x>/ESGBootstrapEntryPoint/<x>/EntryPointAttri/<x>/ESG/<x> in more detail.

TABLE 210

| | |
|---|---|
| Status | Optional |
| Occurrence | OneOrMore |
| Format | node |
| Min.Access Types | Get |
| Value | N/A |

Table 211 below shows the above-mentioned node <x>/IPDC/<x>/ESGBootstrapEntryPoint/<x>/EntryPointAttri/<x>/ESG/<x>/ESGURI/in more detail.

TABLE 211

| | |
|---|---|
| Status | Optional |
| Occurrence | One |
| Format | Chr |

Table 212 below shows the above-mentioned node <x>/IPDC/<x>/ESGBootstrapEntryPoint/<x>/EntryPointAttri/<x>/AreaParameters/ in more detail.

TABLE 212

| | |
|---|---|
| Status | Optional |
| Occurrence | ZeroOrOne |
| Format | node |
| Min.Access Types | Get |
| Value | N/A |

Table 213 shows the above-mentioned node <x>/IPDC/<x>/ESGBootstrapEntryPoint/<x>/EntryPointAttri/<x>/AreaParameters/<x> in more detail.

TABLE 213

| | |
|---|---|
| Status | Optional |
| Occurrence | OneOrMore |
| Format | node |
| Min.Access Types | Get |
| Value | N/A |

Table 214 below shows the above-mentioned node <x>/IPDC/<x>/ESGBootstrapEntryPoint/<x>/EntryPointAttri/<x>/AreaParameters/<x>/AreaParameter/ in more detail.

TABLE 214

| | |
|---|---|
| Status | Optional |
| Occurrence | One |
| Format | Chr |
| Min.Access Types | Get |
| Value | Area identifier, e.g. NetworkID, CellID, MCC, MNC, GPS, country code, GPS and so on |

Table 215 below shows the above-mentioned node <x>/IPDC/<x>/ESGBootstrapEntryPoint/<x>/EntryPointAttri/<x>/NetworkInfos/ in more detail.

TABLE 215

| | |
|---|---|
| Status | Optional |
| Occurrence | ZeroOrOne |
| Format | node |
| Min.Access Types | Get |
| Value | N/A |

Table 216 shows the above-mentioned node <x>/IPDC/<x>/ESGBootstrapEntryPoint/<x>/EntryPointAttri/<x>/NetworkInfos/<x> in more detail.

TABLE 216

| | |
|---|---|
| Status | Optional |
| Occurrence | OneOrMore |
| Format | node |
| Min.Access Types | Get |
| Value | N/A |

Table 217 below shows the above-mentioned node <x>/IPDC/<x>/ESGBootstrapEntryPoint/<x>/EntryPointAttri/<x>/NetworkInfos/<x>/NetworkInfo/ in more detail.

TABLE 217

| | |
|---|---|
| Status | Optional |
| Occurrence | One |
| Format | Chr |
| Min.Access Types | Get |
| Value | Network information, e.g. network ID, CellID, network type |

Table 218 shows the above-mentioned node <x>/IPDC/<x>/ESGBootstrapEntryPoint/<x>/EntryPointAttri/<x>/Tuningparameters/ in more detail.

TABLE 218

| | |
|---|---|
| Status | Optional |
| Occurrence | ZeroOrOne |
| Format | node |
| Min.Access Types | Get |
| Value | N/A |

Table 219 shows the above-mentioned node <x>/IPDC/<x>/ESGBootstrapEntryPoint/<x>/EntryPointAttri/<x>/Tuningparameters/<x> in more detail.

TABLE 219

| | |
|---|---|
| Status | Optional |
| Occurrence | OneOrMore |
| Format | node |
| Min.Access Types | Get |
| Value | N/A |

Table 220 below shows the above-mentioned node <x>/IPDC/<x>/ESGBootstrapEntryPoint/<x>/EntryPointAttri/<x>/Tuningparameters/<x>/Tuningparameter/ in more detail.

TABLE 220

| | |
|---|---|
| Status | Optional |
| Occurrence | ZeroOrMore |
| Format | Chr |
| Min.Access Types | Get |
| Value | Tuning parameters |

Table 221 below shows the above-mentioned node <x>/IPDC/<x>/ESGBootstrapEntryPoint/<x>/EntryPointAttri/<x>/Ext/ in more detail.

TABLE 221

| | |
|---|---|
| Status | Optional |
| Occurrence | ZeroOrOne |
| Format | Chr |
| Min.Access Types | Get |
| Value | N/A |

Table 222 below shows the above-mentioned node <x>/IPDC/<x>/Ext in more detail.

TABLE 222

| | |
|---|---|
| Status | Optional |
| Occurrence | ZeroOrOne |
| Format | Chr |
| Min.Access Types | Get |
| Value | N/A |

The fifth OMA DM mechanism according to the eighth exemplary embodiment of the present invention provides characteristics of each ESG bootstrap entry point. Therefore, a local terminal may select an ESG bootstrap entry point for a home operator, and a roaming terminal may receive the MO information from a home DM server or a local DM server. Further, the terminal may search for home operator information from the RoamingIPDCKMSID and RoamingIPDCOperatorID. If the terminal finds the home operator information, a related entry point has bootstrap information for the terminal.

6. $6.1^{st}$ OMA DM Mechanism

The $6.1^{st}$ OMA DM mechanism according to the eighth exemplary embodiment of the present invention relates to one ESG bootstrap for an IP platform, in view of the above-described exemplary embodiments. That is, the $6.1^{st}$ OMA DM mechanism according to the eighth embodiment of the present invention as illustrated in FIG. 22 relates to a case in which each IP platform has one corresponding ESGBootstrapEntryPointURL.

Figure 22:
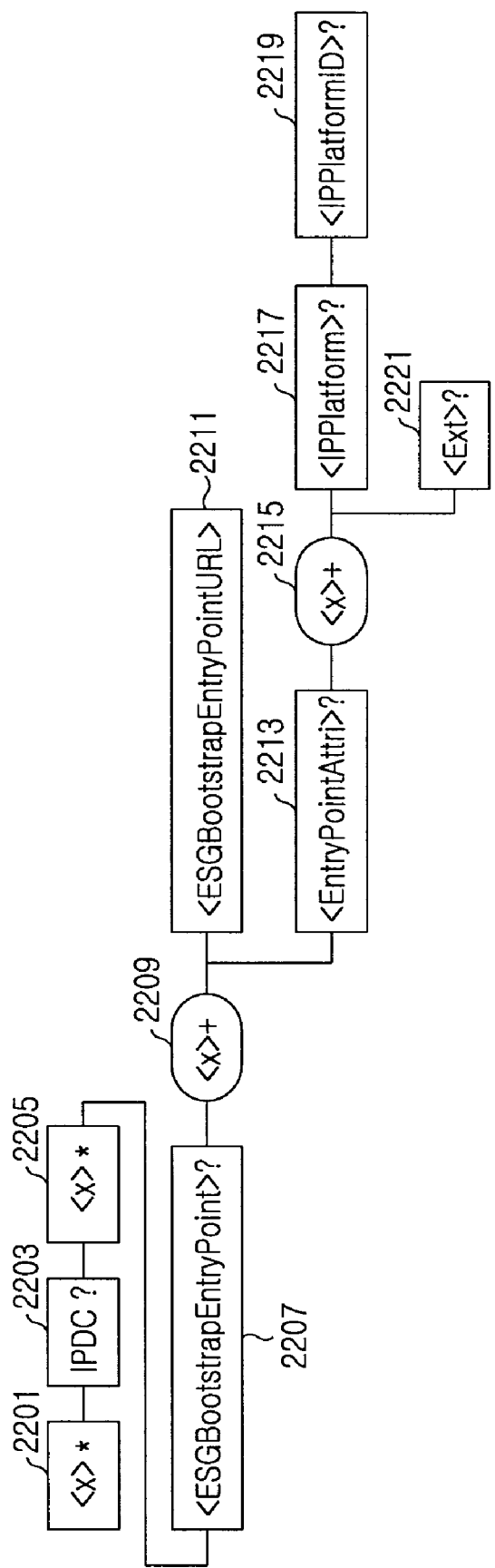
FIG. 22 illustrates an MO of a $6.1^{st}$ OMA DM mechanism according to the eighth exemplary embodiment of the present invention.

FIG. 22 illustrates an MO of the $6.1^{st}$ OMA DM mechanism according to the eighth embodiment of the present invention.

In FIG. 22, fields indicated by reference numerals 2201 to 2223 are nodes performing substantially the same operations as those described in the above exemplary embodiments of the present invention.

7. $6.2^{nd}$ OMA DM Mechanism

In the $6.2^{nd}$ OMA DM mechanism according to the eighth exemplary embodiment of the present invention, an ESG bootstrap entry point for each IPDC operator is provided. That is, in the $6.2^{nd}$ OMA DM mechanism according to the eighth exemplary embodiment of the present invention as illustrated in FIG. 23, each IP platform has one corresponding ESGBootstrapEntryPointURL.

Figure 23:
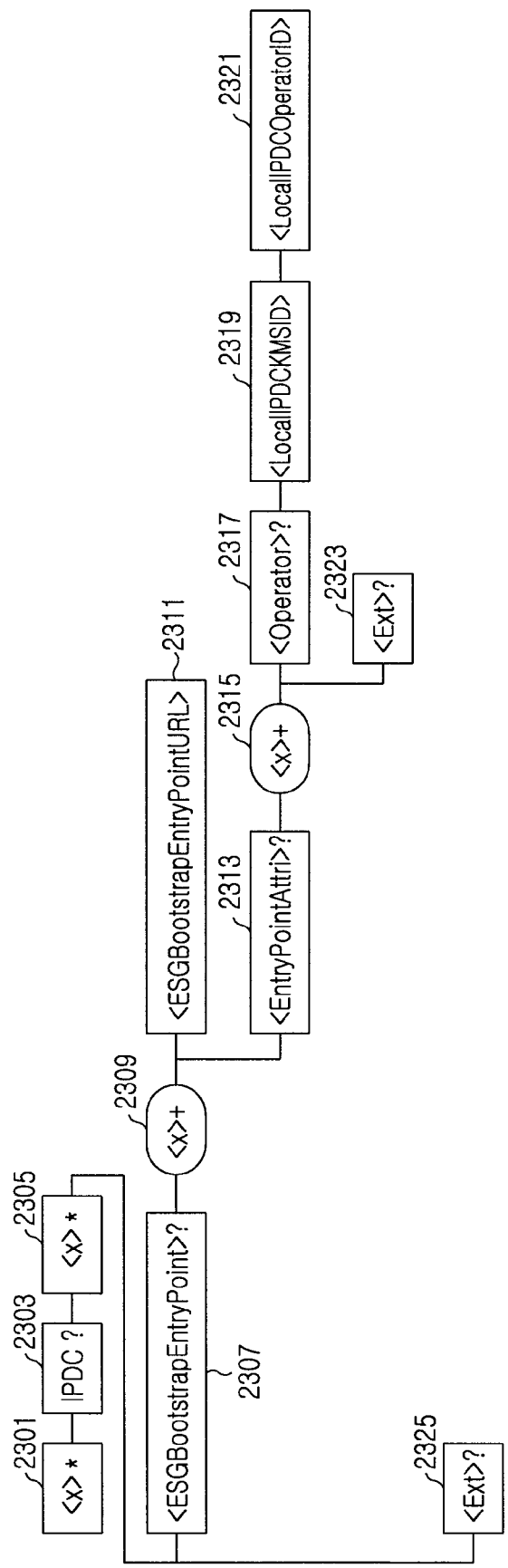
FIG. 23 illustrates an MO of a $6.2^{nd}$ OMA DM mechanism according to the eighth exemplary embodiment of the present invention.

FIG. 23 illustrates an MO of the $6.2^{nd}$ OMA DM mechanism according to the eighth exemplary embodiment of the present invention.

In FIG. 23, fields indicated by reference numerals 2301 to 2325 are nodes performing substantially the same operations as those described in the above exemplary embodiments of the present invention.

8. $6.3^{rd}$ OMA DM Mechanism

In the $6.3^{rd}$ OMA DM mechanism according to the eighth exemplary embodiment of the present invention, each IP platform provides an ESG bootstrap entry point for each IPDC operator. That is, in the $6.3^{rd}$ OMA DM mechanism according to the eighth exemplary embodiment of the present invention as shown in FIG. 24, each IP platform has one ESGBootstrapEntryPointURL for each IP operator.

Figure 24:
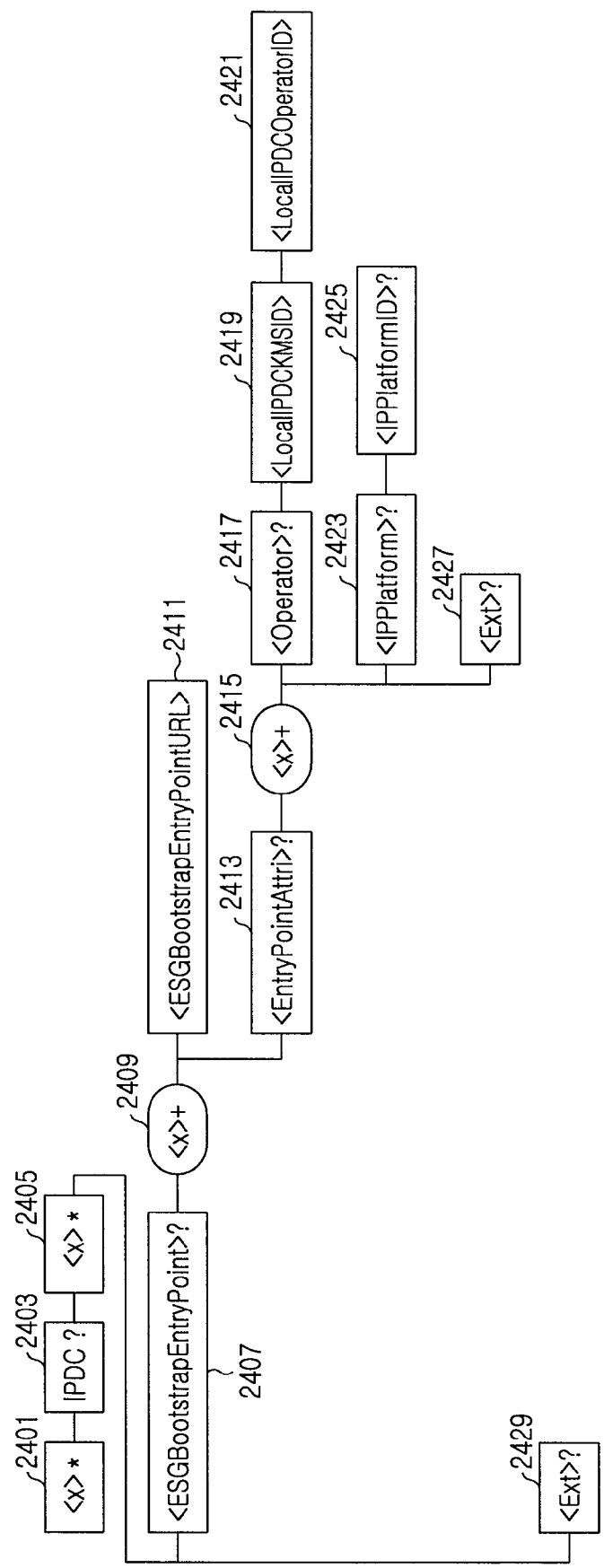
FIG. 24 illustrates an MO of the $6.3^{rd}$ OMA DM mechanism according to the eighth exemplary embodiment of the present invention.

FIG. 24 illustrates an MO of the $6.3^{rd}$ OMA DM mechanism according to the eighth exemplary embodiment of the present invention.

In FIG. 24, fields indicated by reference numerals 2401 to 2429 are nodes performing substantially the same operations as those described in the above exemplary embodiments of the present invention.

Hereinafter, operations of a DM server and a terminal according to the eighth exemplary embodiment of the present invention will be described with reference to FIGS. 25 to 26D.

Figure 25:
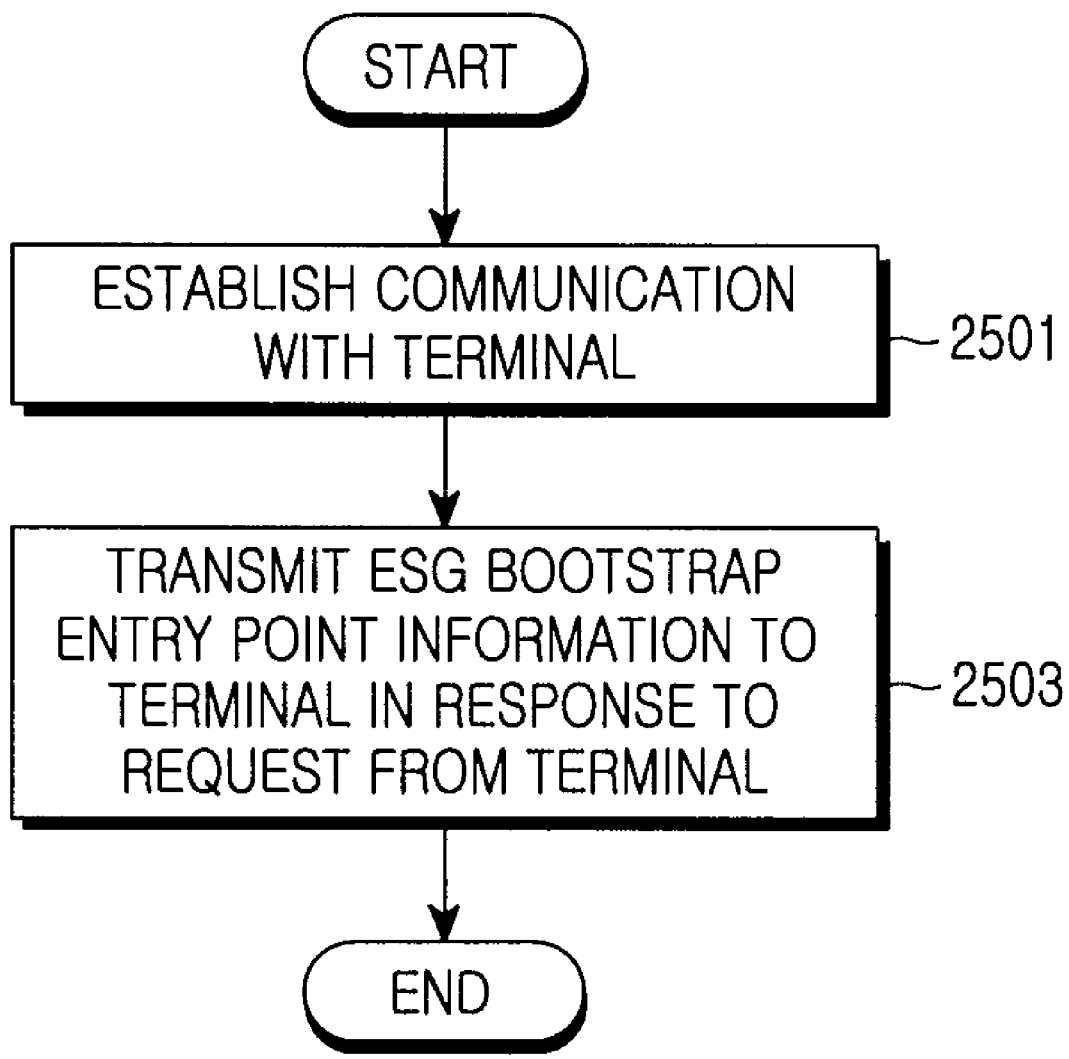
FIG. 25 illustrates an operation of a DM server according to the eighth exemplary embodiment of the present invention.

FIG. 25 illustrates an operation of a DM server according to the eighth exemplary embodiment of the present invention.

Referring to FIG. 25, the DM server establishes communication with the terminal in step 2501, and transmits ESG bootstrap entry point information to the terminal in response to a request from the terminal in step 2503.

FIGS. 26A to 26D illustrate an operation of a terminal according to the eighth exemplary embodiment of the present invention.

Figure 26A:
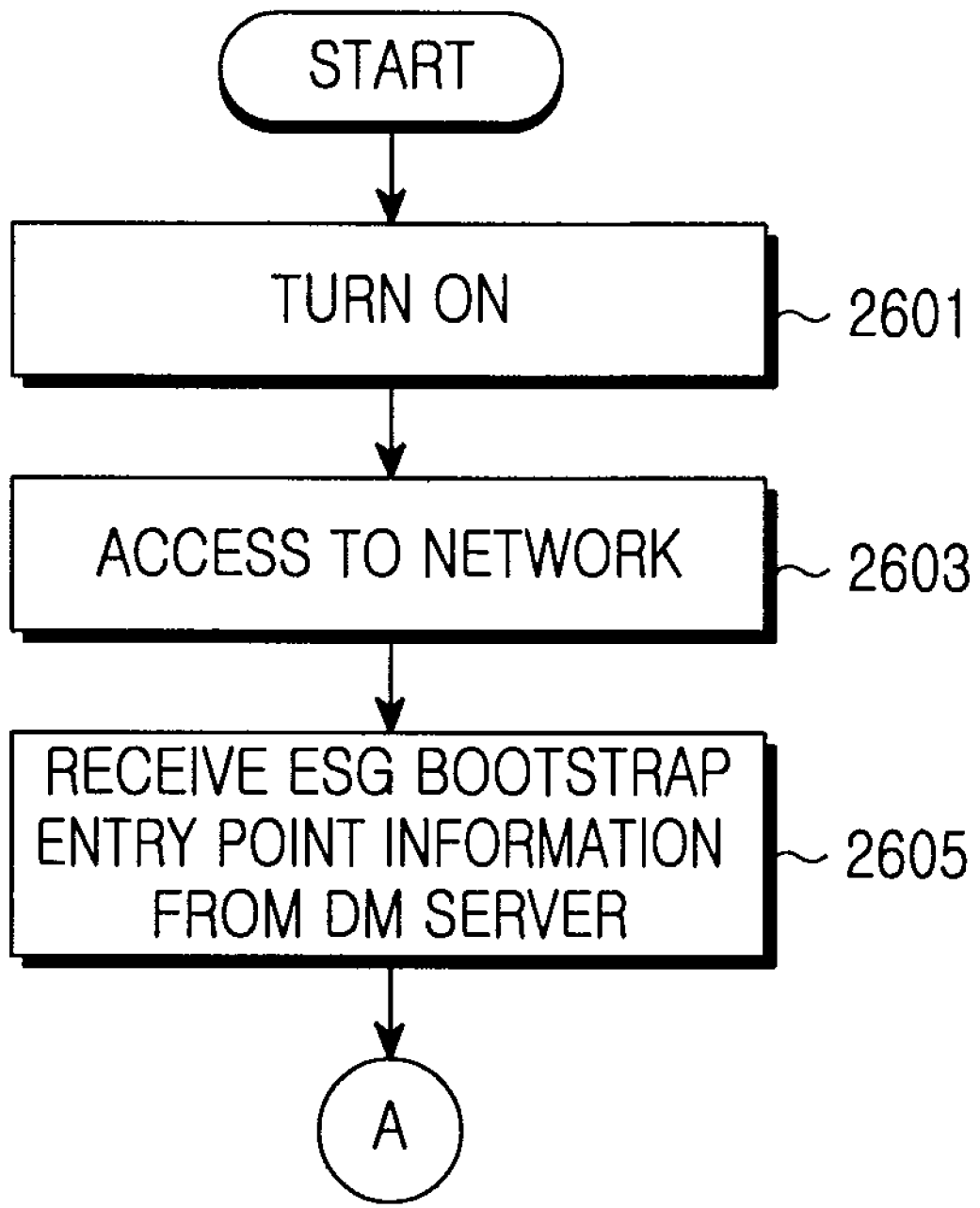
FIGS. 26A to 26D illustrate an operation of a terminal according to the eighth exemplary embodiment of the present invention.

Referring to FIG. 26A, the terminal turns on in step 2601, and accesses the DM server in step 2603. Then, in step 2605, after communication is established, the terminal receives the ESG bootstrap entry point information from the DM server.

Figure 26B:
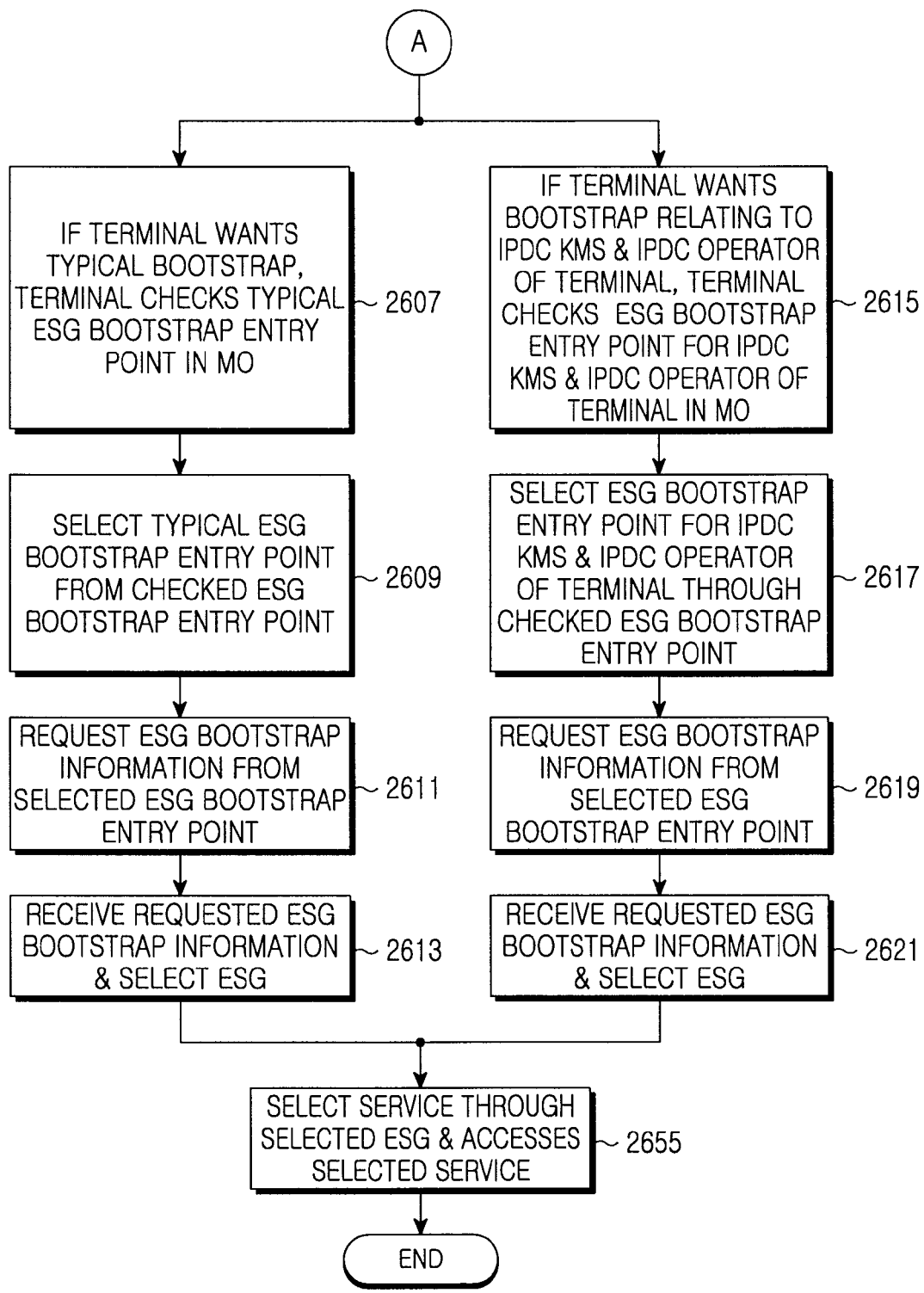
Figure 26C:
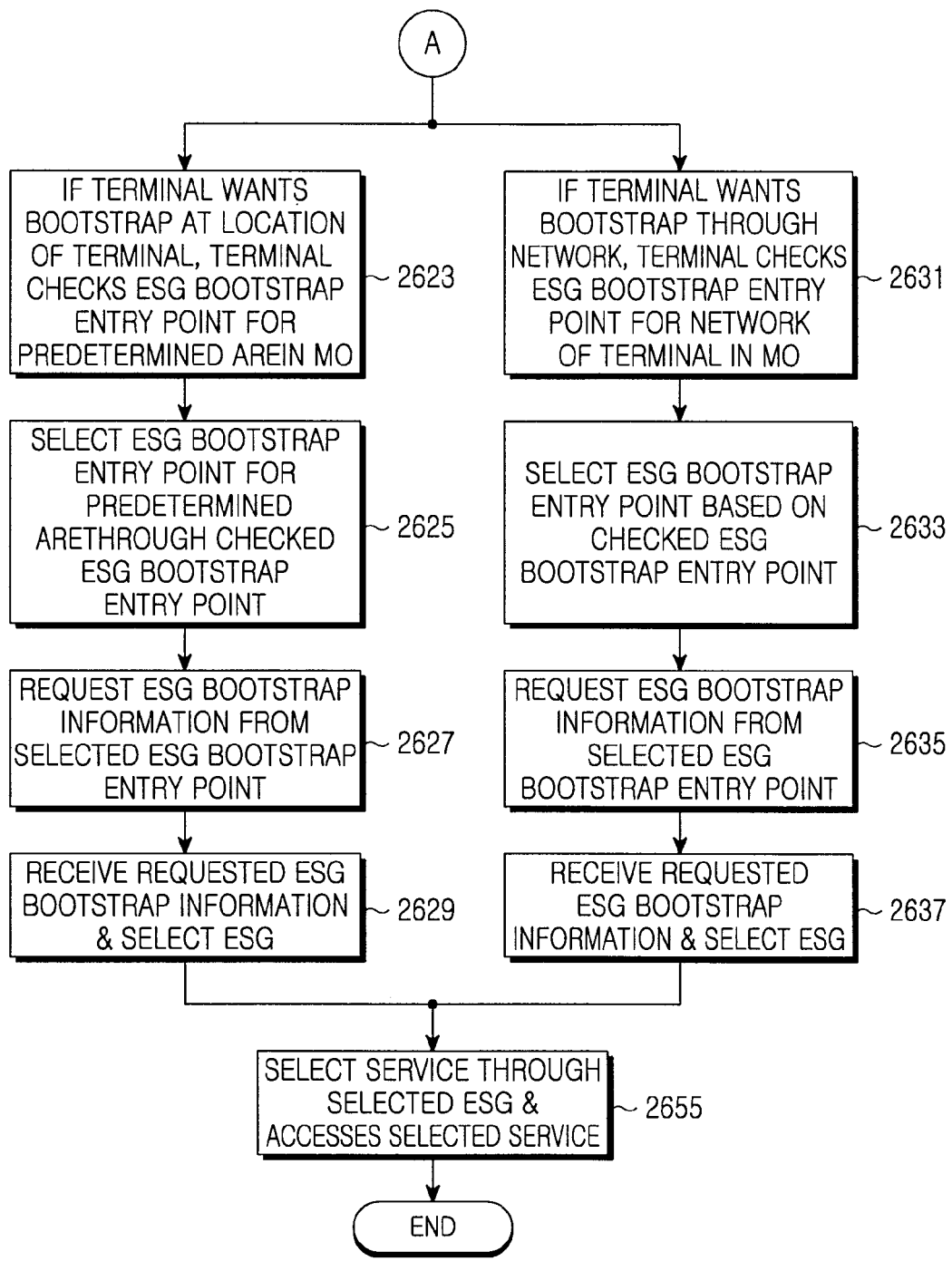
Figure 26D:
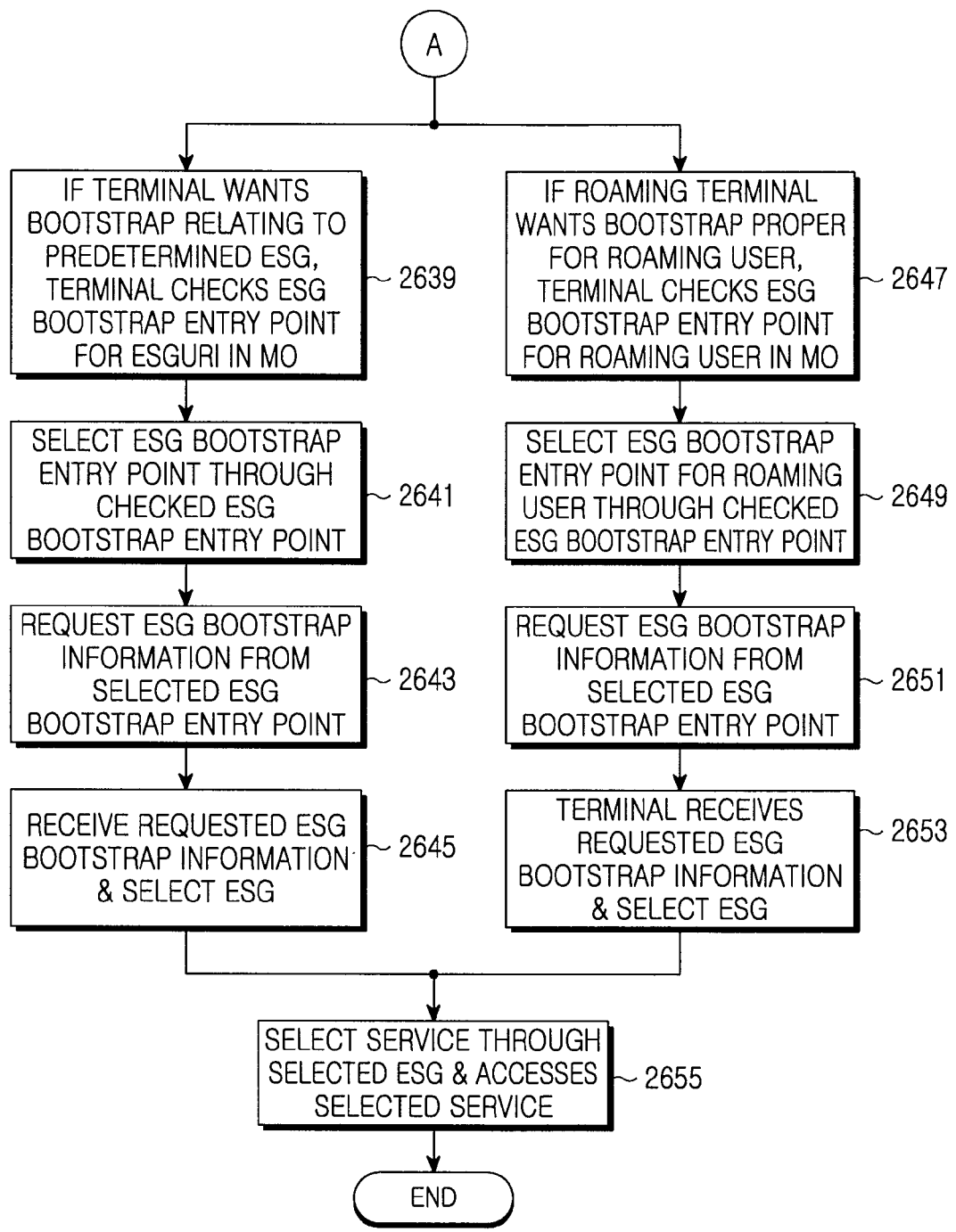

After receiving the ESG bootstrap entry point information, the terminal may search for an entry point expected according to requirements for a desired bootstrap as illustrated in FIGS. 26B to 26D. The expected entry point may include, for example, an entry point relating to the home IPDCKMSID and IPDCOperatorID of the terminal, an entry point relating to a network, an entry point relating to an ESG, and an entry point relating to a roaming user.

That is, in step 2607, if the terminal wants a typical bootstrap, the terminal determines a typical ESG bootstrap entry point in the MO. Then, the terminal selects a typical ESG bootstrap entry point from the determined ESG bootstrap entry point in step 2609, and requests ESG bootstrap information from the selected ESG bootstrap entry point in step 2611. Then, in step 2613, the terminal receives the requested ESG bootstrap information and selects an ESG.

Meanwhile, in step 2615, if the terminal wants a bootstrap relating to the IPDC KMS and IPDC operator of the terminal, the terminal determines an ESG bootstrap entry point for the IPDC KMS and IPDC operator of the terminal in the MO. Then, the terminal selects the ESG bootstrap entry point for the IPDC KMS and IPDC operator of the terminal through the determined ESG bootstrap entry point in step 2617, and requests ESG bootstrap information from the selected ESG bootstrap entry point in step 2619. Then, in step 2621, the terminal receives the requested ESG bootstrap information and selects an ESG.

In step 2623, if the terminal wants a bootstrap at the location of the terminal, the terminal determines an ESG bootstrap entry point for an area in the MO. Then, the terminal selects the ESG bootstrap entry point for the area through the determined ESG bootstrap entry point in step 2625, and requests ESG bootstrap information from the selected ESG bootstrap entry point in step 2627. Then, in step 2629, the terminal receives the requested ESG bootstrap information and selects an ESG.

In step 2631, if the terminal wants a bootstrap through a network, the terminal determines an ESG bootstrap entry point for the network of the terminal in the MO. Then, the terminal selects the ESG bootstrap entry point based on the determined ESG bootstrap entry point in step 2633, and requests ESG bootstrap information from the selected ESG bootstrap entry point in step 2635. Then, in step 2637, the terminal receives the requested ESG bootstrap information and selects an ESG.

In step 2639, if the terminal wants a bootstrap relating to an ESG, the terminal determines an ESG bootstrap entry point for ESGURI in the MO. Then, the terminal selects the ESG bootstrap entry point through the determined ESG bootstrap entry point in step 2641, and requests ESG bootstrap information from the selected ESG bootstrap entry point in step 2643. Then, in step 2645, the terminal receives the requested ESG bootstrap information and selects an ESG.

In step 2647, if a roaming terminal wants a bootstrap appropriate for a roaming user, the terminal determines an ESG bootstrap entry point for the roaming user in the MO. Then, the terminal selects the ESG bootstrap entry point for the roaming user through the determined ESG bootstrap entry point in step 2649, and requests ESG bootstrap information from the selected ESG bootstrap entry point in step 2651. Then, in step 2653, the terminal receives the requested ESG bootstrap information and selects an ESG.

In step 2655, the terminal selects a service to be accessed through the selected ESG, and accesses or subscribes to the selected service.

OMA DM Mechanism According to 9$^{th}$ Exemplary Embodiment

An OMA DM mechanism according to a ninth exemplary embodiment of the present invention provides each home (local) terminal with a scheme for preliminarily providing information on a roaming partner of a roaming terminal (itself) in an outer network. When an ESG bootstrap entry point is known, a server can preliminarily provide information on a roaming partner of a roaming terminal. At this time, the terminal has a large amount of roaming information in advance in a home network of the terminal, and uses the roaming information when it moves to an outer area.

1. 1$^{st}$ OMA DM Mechanism

Figure 27:
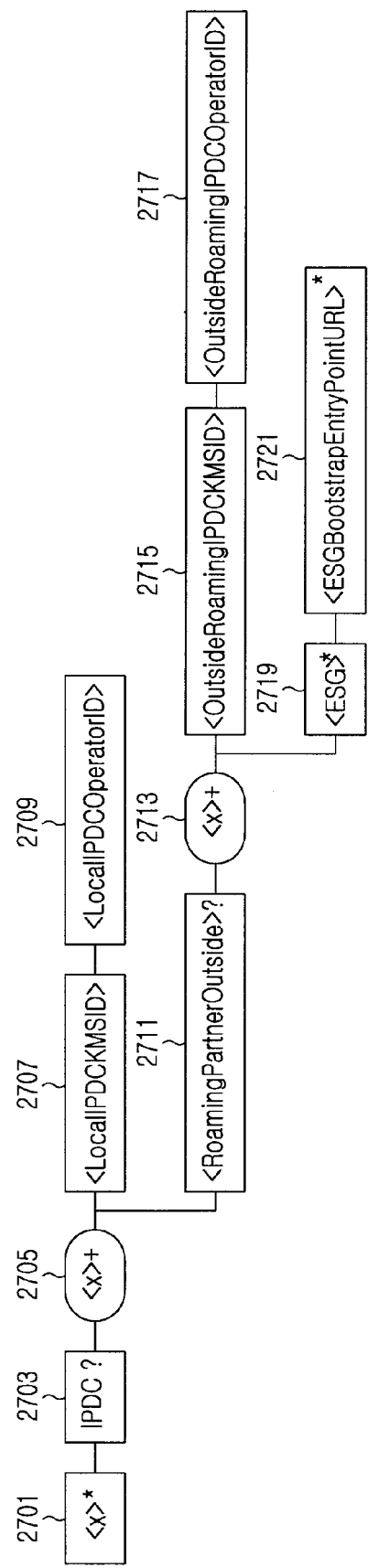
FIG. 27 illustrates an MO of a first OMA DM mechanism according to a ninth exemplary embodiment of the present invention.

FIG. 27 illustrates an MO of a first OMA DM mechanism according to the ninth exemplary embodiment of the present invention.

Referring to FIG. 27, the X field 2701, 2705, or 2713 is a node functioning as a placeholder, the IPDC field 2703 is a node for an IPDC terminal, the LocalIPDCKMSID field 2707 is a node for a local terminal having an IPDCKMSID, and the LocalIPDCOperatorID field 2709 is a node for a local terminal having an IPDCOperatorID. Further, the RoamingPartnerOutside field 2711 is a node carrying roaming partner-related information for the local IPDC KMS system and IPDC operator in an area out of the home coverage, the OutsideRoamingIPDCKMSID field 2715 is a node carrying a roaming IPDC KMS system having an IPDCKMSID for a local terminal and indicates the IPDC KMS system having made a roaming agreement with the home (local) IPDC KMS system and operator, the OutsideRoamingIPDCOperatorID field 2717 is a node carrying a roaming IPDC operator having an IPDCOperatorID for a local terminal and indicates the IPDC operator having made a roaming agreement with the home (local) IPDC operator, the ESG field 2719 is a node carrying ESG-related information, and the ESGBootstrapEntryPointURL field 2721 is a node indicating a URL, which is an ESG bootstrap entry point for requiring ESG bootstrap information through an interactive network.

Table 223 below shows the above-mentioned node <x> in more detail.

TABLE 223

| | |
|---|---|
| Status | Required |
| Occurrence | ZeroOrMore |
| Format | Node |
| Min.Access Types | Get |
| Value | N/A |

Table 224 shows the above-mentioned node <x>/IPDC/ in more detail.

TABLE 224

| | |
|---|---|
| Status | Required |
| Occurrence | ZeroOrOne |
| Format | Node |
| Min.Access Types | Get |
| Value | N/A |

Table 225 shows the above-mentioned node <x>/IPDC/<x> in more detail.

TABLE 225

| | |
|---|---|
| Status | Required |
| Occurrence | OneOrMore |
| Format | Node |
| Min.Access Types | Get |
| Value | N/A |

Table 226 below shows the above-mentioned node <x>/IPDC/<x>/LocalIPDCKMSID/ in more detail.

TABLE 226

| | |
|---|---|
| Status | Required |
| Occurrence | One |
| Format | Node |
| Min.Access Types | Get |
| Value | Local IPDC KMS identifier |

Table 227 below shows the above-mentioned node <x>/IPDC/<x>/LocalIPDCKMSID/LocalIPDCOperatorID/ in more detail.

TABLE 227

| | |
|---|---|
| Status | Required |
| Occurrence | One |
| Format | Chr |
| Min.Access Types | Get |
| Value | Local IPDC operator identifier |

Table 228 below shows the above-mentioned node <x>/IPDC/<x>/RoamingPartnerOutside/ in more detail.

TABLE 228

| | |
|---|---|
| Status | Required |
| Occurrence | ZeroOrOne |
| Format | Node |
| Min.Access Types | Get |
| Value | N/A |

Table 229 shows the above-mentioned node <x>/IPDC/<x>/RoamingPartnerOutside/<x> in more detail.

TABLE 229

| | |
|---|---|
| Status | Required |
| Occurrence | OneOrMore |
| Format | Node |
| Min.Access Types | Get |
| Value | N/A |

Table 230 below shows the above-mentioned node <x>/IPDC/<x>/RoamingPartnerOutside/<x>/OutsideRoamingIPDCKMSID/ in more detail.

TABLE 230

| | |
|---|---|
| Status | Required |
| Occurrence | One |
| Format | Node |
| Min.Access Types | Get |
| Value | IPDC KMS identifier of the Roaming partner |

Table 231 below shows the above-mentioned node <x>/IPDC/<x>/RoamingPartnerOutside/<x>/OutsideRoamingIPDCKMSID/OutsideRoaming IPDCOperatorID/ in more detail.

TABLE 231

| | |
|---|---|
| Status | Required |
| Occurrence | One |
| Format | Node |
| Min.Access Types | Get |
| Value | IPDC operator identifier of the Roaming partner |

Table 232 shows the above-mentioned node <x>/IPDC/<x>/RoamingPartnerOutside/<x>/ESG/ in more detail.

TABLE 232

| | |
|---|---|
| Status | Optional |
| Occurrence | ZeroOrMore |
| Format | Node |
| Min.Access Types | Get |
| Value | N/A |

Table 233 below shows the above-mentioned node <x>/IPDC/<x>/RoamingPartnerOutside/<x>/ESG/ESGBootstrapEntryPointURL/ in more detail.

TABLE 233

| | |
|---|---|
| Status | Optional |
| Occurrence | ZeroOrMore |
| Format | Chr |
| Min.Access Types | Get |
| Value | URL to the Entry Point to request ESG Bootstrap information over interactive Network |

2. 2$^{nd}$ OMA DM Mechanism

A second OMA DM mechanism according to the ninth exemplary embodiment of the present invention provides a scheme capable of indicating more detailed information on an outer coverage.

Figure 28:
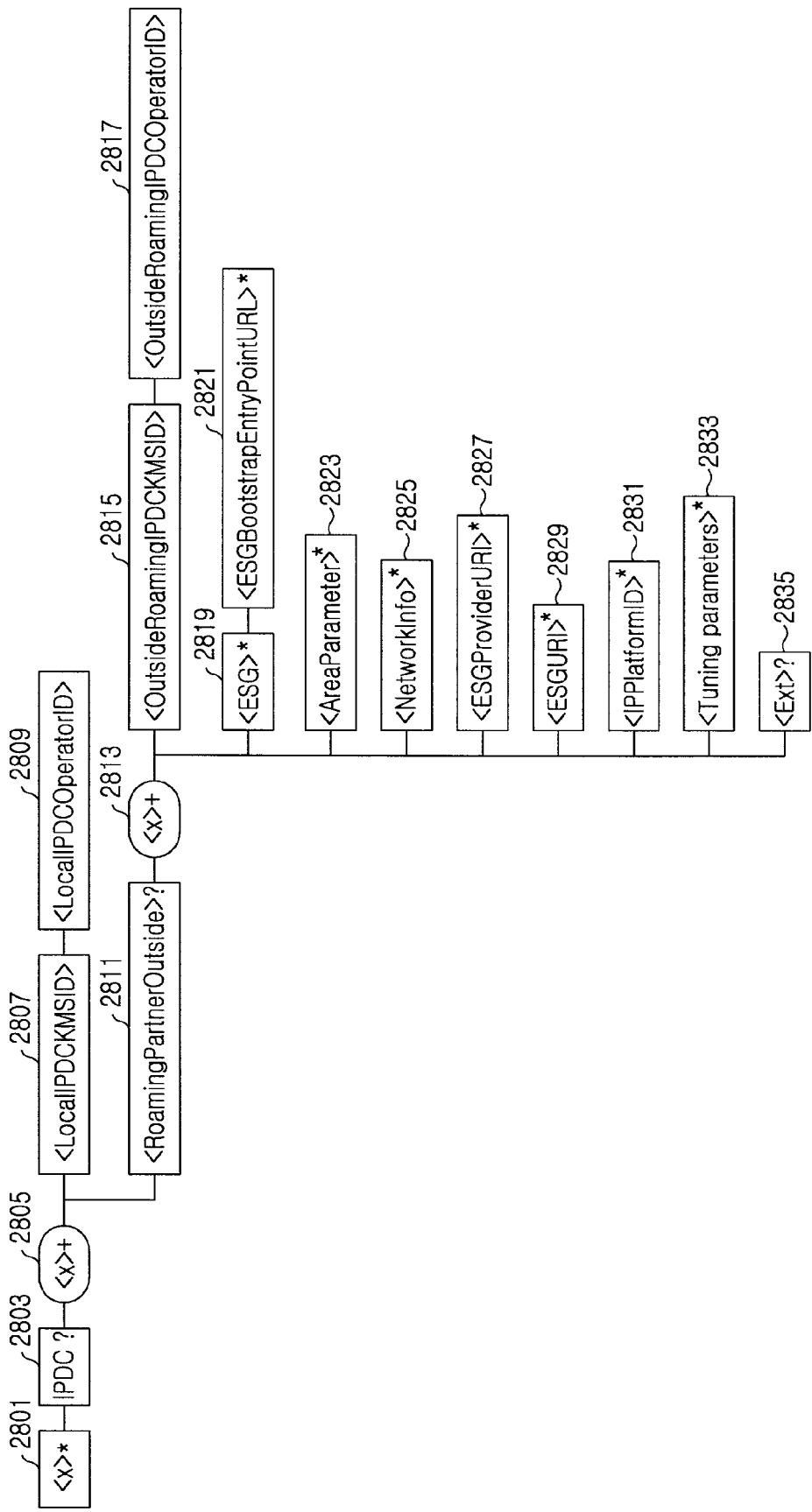
FIG. 28 illustrates an MO of a second OMA DM mechanism according to the ninth exemplary embodiment of the present invention.

FIG. 28 illustrates an MO of the second OMA DM mechanism according to the ninth exemplary embodiment of the present invention.

Referring to FIG. 28, the X field 2801, 2805, or 2813 is a node functioning as a placeholder, the IPDC field 2803 is a node for an IPDC terminal, the LocalIPDCKMSID field 2807 is a node for a local terminal having an IPDCKMSID, and the LocalIPDCOperatorID field 2809 is a node for a local terminal having an IPDCOperatorID. Further, the RoamingPartnerOutside field 2811 is a node carrying roaming partner-related information for the local IPDC KMS system and IPDC operator in an area out of the home coverage, the OutsideRoamingIPDCKMSID field 2815 is a node carrying a roaming IPDC KMS system having an IPDCKMSID for a local terminal and indicates the IPDC KMS system having made a roaming agreement with the home (local) IPDC KMS system and operator, the OutsideRoamingIPDCOperatorID field 2817 is a node carrying a roaming IPDC operator having an IPDCOperatorID for a local terminal and indicates the IPDC operator having made a roaming agreement with the home (local) IPDC operator, the ESG field 2819 is a node carrying ESG-related information, and the ESGBootstrapEntryPointURL field 2821 is a node indicating a URL, which is an ESG bootstrap entry point for requiring ESG bootstrap information through an interactive network. Further, the AreaParameter field 2823 is a node carrying area-related parameters, such as network ID, cell ID, MCC, MNC, GPS, and nation code, the NetworkInfo field 2825 is a node carrying network-related information, such as network type and network ID, the ESGProviderURI field 2827 is a node carrying ESG provider-related information, the ESGURI field 2829 is a node indicating an ESGURI that can be found within the ESG bootstrap, the IPPlatformID field 2831 is a node carrying IP platform-related information, the Tuning parameters field 2833 is a node carrying related tuning parameters, and the Ext field 2835 is an internal node for additional information.

Table 234 shows the above-mentioned node <x> in more detail.

TABLE 234

| | |
|---|---|
| Status | Required |
| Occurrence | ZeroOrMore |
| Format | Node |
| Min.Access Types | Get |
| Value | N/A |

Table 235 shows the above-mentioned node <x>/IPDC/ in more detail.

TABLE 235

| | |
|---|---|
| Status | Required |
| Occurrence | ZeroOrOne |
| Format | Node |
| Min.Access Types | Get |
| Value | N/A |

Table 236 below shows the above-mentioned node <x>/IPDC/<x> in more detail.

TABLE 236

| | |
|---|---|
| Status | Required |
| Occurrence | OneOrMore |
| Format | Node |
| Min.Access Types | Get |
| Value | N/A |

Table 237 below shows the above-mentioned node <x>/IPDC/<x>/LocalIPDCKMSID/ in more detail.

TABLE 237

| | |
|---|---|
| Status | Required |
| Occurrence | One |
| Format | Node |
| Min.Access Types | Get |
| Value | Local IPDC KMS identifier |

Table 238 below shows the above-mentioned node <x>/IPDC/<x>/LocalIPDCKMSID/LocalIPDCOperatorID/ in more detail.

TABLE 238

| | |
|---|---|
| Status | Required |
| Occurrence | One |
| Format | Chr |
| Min.Access Types | Get |
| Value | Local IPDC operator identifier |

Table 239 shows the above-mentioned node <x>/IPDC/<x>/RoamingPartnerOutside/ in more detail.

TABLE 239

| | |
|---|---|
| Status | Required |
| Occurrence | ZeroOrOne |
| Format | Node |
| Min.Access Types | Get |
| Value | N/A |

Table 240 below shows the above-mentioned node <x>/IPDC/<x>/RoamingPartnerOutside/<x> in more detail.

TABLE 240

| | |
|---|---|
| Status | Required |
| Occurrence | OneOrMore |
| Format | Node |
| Min.Access Types | Get |
| Value | N/A |

Table 241 below shows the above-mentioned node <x>/IPDC/<x>/RoamingPartnerOutside/<x>/OutsideRoamingIPDCKMSID/ in more detail.

TABLE 241

| | |
|---|---|
| Status | Required |
| Occurrence | One |
| Format | Node |
| Min.Access Types | Get |
| Value | IPDC KMS identifier of the Roaming partner |

Table 242 shows the above-mentioned node <x>/IPDC/<x>/RoamingPartnerOutside/<x>/OutsideRoamingIPDCKMSID/OutsideRoaming IPDCOperatorID/ in more detail.

TABLE 242

| | |
|---|---|
| Status | Required |
| Occurrence | One |
| Format | Chr |
| Min.Access Types | Get |
| Value | IPDC operator identifier of the Roaming partner |

Table 243 below shows the above-mentioned node <x>/IPDC/<x>/RoamingPartnerOutside/<x>/ESG/ in more detail.

TABLE 243

| | |
|---|---|
| Status | Required |
| Occurrence | ZeroOrMore |
| Format | Node |
| Min.Access Types | Get |
| Value | N/A |

Table 244 shows the above-mentioned node <x>/IPDC/<x>/RoamingPartnerOutside/<x>/ESG/ESGBootstrapEntryPointURL/ in more detail.

TABLE 244

| | |
|---|---|
| Status | Required |
| Occurrence | ZeroOrMore |
| Format | Chr |
| Min.Access Types | Get |
| Value | URL to the Entry Point to request ESG Bootstrap information over interactive Network |

Table 245 shows the above-mentioned node <x>/IPDC/<x>/RoamingPartnerOutside/<x>/AreaParameter/ in more detail.

TABLE 245

| | |
|---|---|
| Status | Optional |
| Occurrence | ZeroOrMore |
| Format | Chr |

TABLE 245-continued

| | |
|---|---|
| Min.Access Types | Get |
| Value | Area identifier |

Table 246 below shows the above-mentioned node <x>/IPDC/<x>/RoamingPartnerOutside/<x>/NetworkInfo/ in more detail.

TABLE 246

| | |
|---|---|
| Status | Optional |
| Occurrence | ZeroOrMore |
| Format | Chr |
| Min.Access Types | Get |
| Value | Network information |

Table 247 below shows the above-mentioned node <x>/IPDC/<x>/RoamingPartnerOutside/<x>/ESGProviderURI/ in more detail.

TABLE 247

| | |
|---|---|
| Status | Optional |
| Occurrence | ZeroOrMore |
| Format | Chr |
| Min.Access Types | Get |
| Value | ESG Provider identifier |

Table 248 below shows the above-mentioned node <x>/IPDC/<x>/RoamingPartnerOutside/<x>/ESGURI/ in more detail.

TABLE 248

| | |
|---|---|
| Status | Optional |
| Occurrence | ZeroOrMore |
| Format | Chr |
| Min.Access Types | Get |
| Value | ESG identifier |

Table 249 shows the above-mentioned node <x>/IPDC/<x>/RoamingPartnerOutside/<x>/IPPlatformID/ in more detail.

TABLE 249

| | |
|---|---|
| Status | Optional |
| Occurrence | ZeroOrMore |
| Format | Chr |
| Min.Access Types | Get |
| Value | IP platform identifier |

Table 250 below shows the above-mentioned node <x>/IPDC/<x>/RoamingPartnerOutside/<x>/Tuningparameter/ in more detail.

TABLE 250

| | |
|---|---|
| Status | Optional |
| Occurrence | ZeroOrMore |
| Format | Chr |
| Min.Access Types | Get |
| Value | Tuning parameters |

Table 251 below shows the above-mentioned node <x>/IPDC/<x>/RoamingPartnerOutside/<x>/Ext/ in more detail.

TABLE 251

| Status | Optional |
|---|---|
| Occurrence | ZeroOrOne |
| Format | Chr |
| Min.Access Types | Get |
| Value | N/A |

In the second OMA DM mechanism according to the ninth exemplary embodiment of the present invention as described above, since a roaming partner for each local IPDC KMS and IPDC operator is provided to the terminal, the terminal can find a proper ESG having a roaming partner of the terminal when the terminal roams in an outer network and accesses outer bootstrap-related information. If a bootstrap entry point in a roaming situation is also provided, the terminal can request bootstrap information by using the entry point at the time of roaming. If a roaming ESG is provided, the terminal can find a roaming ESG in the roaming situation. As presented in the above Tables, if other related information is also provided, the terminal can request a particular entry point based on its roaming partner, location, network type, etc.

3. 3$^{rd}$ OMA DM Mechanism

Figure 29:
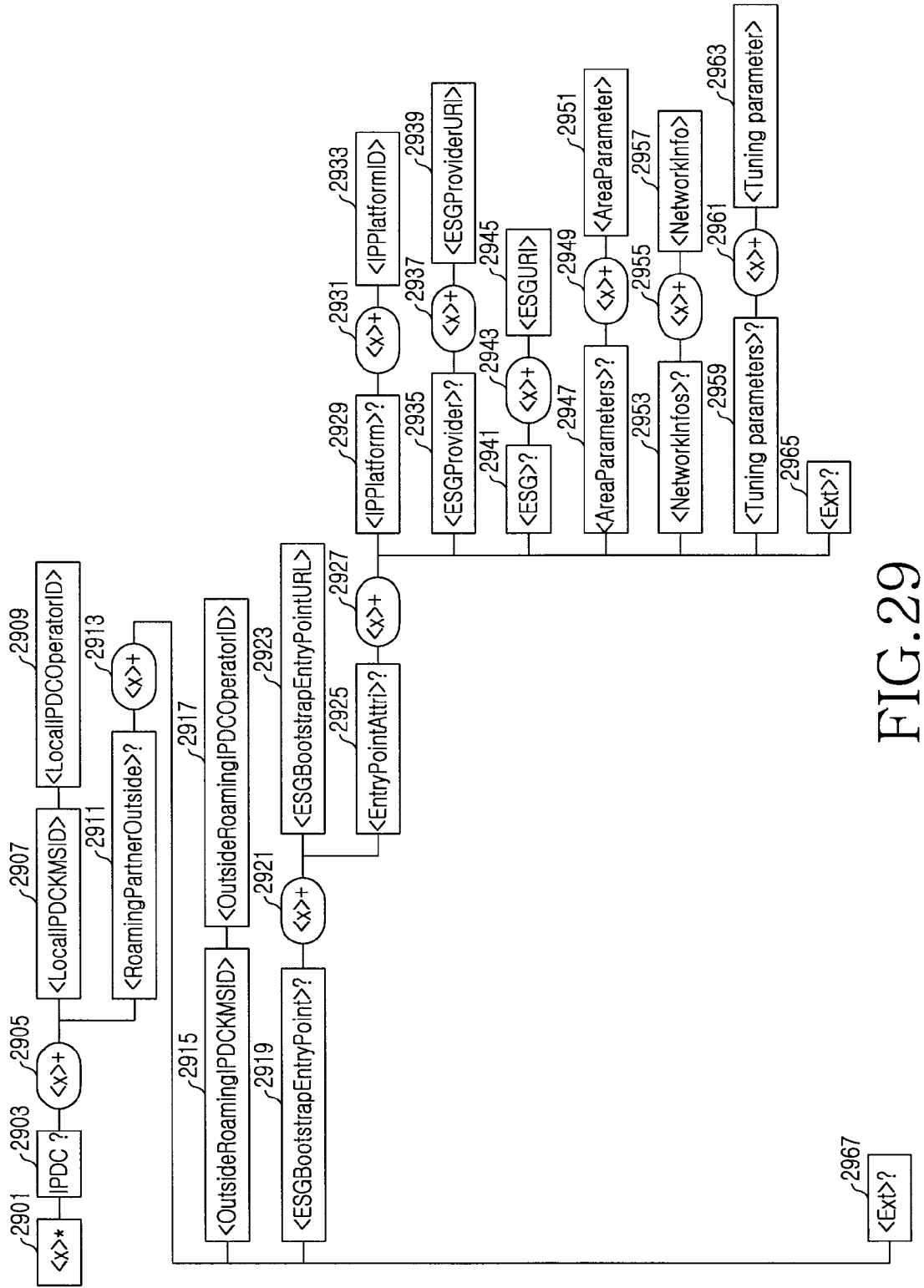
FIG. 29 illustrates an MO of a third OMA DM mechanism according to the ninth exemplary embodiment of the present invention.

FIG. 29 illustrates an MO of a third OMA DM mechanism according to the ninth exemplary embodiment of the present invention.

Referring to FIG. 29, the X field 2901, 2905, 2913, 2921, 2927, 2931, 2937, 2943, 2949, 2955, or 2961 is a node functioning as a placeholder, the IPDC field 2903 is a node for an IPDC terminal, the LocalIPDCKMSID field 2907 is a node for a local terminal having an IPDCKMSID, the LocalIPDCOperatorID field 2909 is a node for a local terminal having an IPDCOperatorID, the RoamingPartnerOutside field 2911 is a node carrying roaming partner-related information for the local IPDC KMS system and IPDC operator in an area out of the home coverage, the OutsideRoamingIPDCKMSID field 2915 is a node carrying a roaming IPDC KMS system having an IPDCKMSID for a local terminal and indicates the IPDC KMS system having made a roaming agreement with the home (local) IPDC KMS system and operator, and the OutsideRoamingIPDCOperatorID field 2917 is a node carrying a roaming IPDC operator having an IPDCOperatorID for a local terminal and indicates the IPDC operator having made a roaming agreement with the home (local) IPDC operator. Further, the ESGBootstrapEntryPoint field 2919 is a node carrying ESG bootstrap-related information, the ESGBootstrapEntryPointURL field 2923 is a node indicating an entry point URL for requiring ESG bootstrap information through an interactive network, the EntryPointAttri field 2925 is a node carrying characteristic information of an entry point, the IPPlatform field 2929 is a node carrying IP platform-related information, the IPPlatformID field 2933 is a node carrying an IP platform identifier (ID), the ESGProvider field 2935 is a node carrying ESG provider-related information, the ESGProviderURI field 2939 is a node carrying a URI identifying an ESG provider, the ESG field 2941 is a node carrying ESG-related information, the ESGURI field 2945 is a node indicating an ESGURI that can be found within the ESG bootstrap, the AreaParameters field 2947 is a node carrying area-related parameters, the AreaParameter field 2951 is a node carrying area-related parameters, such as network ID, cell ID, MCC, MNC, GPS, and nation code, the NetworkInfos field 2953 is a node carrying network-related information, the NetworkInfo field 2957 is a node carrying network-related parameters, such as network type (satellite, terrestrial, interactive network, etc.) and network ID, the Tuning parameters field 2959 is a node carrying related tuning-related information, the Tuning parameter field 2963 is a node carrying related tuning parameters, and the Ext field 2965 or 2967 is a node for addition or extension.

Table 252 shows the above-mentioned node <x> in more detail.

TABLE 252

| Status | Required |
|---|---|
| Occurrence | ZeroOrMore |
| Format | Node |
| Min.Access Types | Get |
| Value | N/A |

Table 253 below shows the above-mentioned node <x>/IPDC/ in more detail.

TABLE 253

| Status | Required |
|---|---|
| Occurrence | ZeroOrOne |
| Format | Node |
| Min.Access Types | Get |
| Value | N/A |

Table 254 shows the above-mentioned node <x>/IPDC/<x> in more detail.

TABLE 254

| Status | Required |
|---|---|
| Occurrence | OneOrMore |
| Format | Node |
| Min.Access Types | Get |
| Value | N/A |

Table 255 shows the above-mentioned node <x>/IPDC/<x>/LocalIPDCKMSID/ in more detail.

TABLE 255

| Status | Required |
|---|---|
| Occurrence | One |
| Format | Node |
| Min.Access Types | Get |
| Value | Local IPDC KMS identifier |

Table 256 below shows the above-mentioned node <x>/IPDC/<x>/LocalIPDCKMSID/LocalIPDCOperatorID/ in more detail.

TABLE 256

| Status | Required |
|---|---|
| Occurrence | One |
| Format | Chr |
| Min.Access Types | Get |
| Value | Local IPDC operator identifier |

Table 257 below shows the above-mentioned node <x>/IPDC/<x>/RoamingPartnerOutside/ in more detail.

TABLE 257

| Status | Required |
|---|---|
| Occurrence | ZeroOrOne |

TABLE 257-continued

| | |
|---|---|
| Format | Node |
| Min.Access Types | Get |
| Value | N/A |

Table 258 below shows the above-mentioned node <x>/IPDC/<x>/RoamingPartnerOutside/<x> in more detail.

TABLE 258

| | |
|---|---|
| Status | Required |
| Occurrence | OneOrMore |
| Format | Node |
| Min.Access Types | Get |
| Value | N/A |

Table 259 shows the above-mentioned node <x>/IPDC/<x>/RoamingPartnerOutside/<x>/OutsideRoamingIPDCKMSID/ in more detail.

TABLE 259

| | |
|---|---|
| Status | Required |
| Occurrence | One |
| Format | Node |
| Min.Access Types | Get |
| Value | IPDC KMS identifier of the Roaming partner |

Table 260 below shows the above-mentioned node <x>/IPDC/<x>/RoamingPartnerOutside/<x>/OutsideRoamingIPDCKMSID/OutsideRoaming IPDCOperatorID/ in more detail.

TABLE 260

| | |
|---|---|
| Status | Required |
| Occurrence | One |
| Format | Chr |
| Min.Access Types | Get |
| Value | IPDC operator identifier of the Roaming partner |

Table 261 below shows the above-mentioned node <x>/IPDC/<x>/RoamingPartnerOutside/<x>/ESGBootstrapEntryPoint/ in more detail.

TABLE 261

| | |
|---|---|
| Status | Required |
| Occurrence | ZeroOrOne |
| Format | Node |
| Min.Access Types | Get |
| Value | N/A |

Table 262 shows the above-mentioned node <x>/IPDC/<x>/RoamingPartnerOutside/<x>/ESGBootstrapEntryPoint/<x> in more detail.

TABLE 262

| | |
|---|---|
| Status | Required |
| Occurrence | OneOrMore |
| Format | Node |
| Min.Access Types | Get |
| Value | N/A |

Table 263 below shows the above-mentioned node <x>/IPDC/<x>/RoamingPartnerOutside/<x>/ESGBootstrapEntryPoint/<x>/ESGBootstrapEntryPointURL in more detail.

TABLE 263

| | |
|---|---|
| Status | Required |
| Occurrence | One |
| Format | Chr |
| Min.Access Types | Get |
| Value | URL to the Entry Point to request ESG Bootstrap information over interactive Network |

Table 264 shows the above-mentioned node <x>/IPDC/<x>/RoamingPartnerOutside/<x>/ESGBootstrapEntryPoint/<x>/EntryPointAttri/in more detail.

TABLE 264

| | |
|---|---|
| Status | Required |
| Occurrence | ZeroOrOne |
| Format | Node |
| Min.Access Types | Get |
| Value | N/A |

Table 265 shows the above-mentioned node <x>/IPDC/<x>/RoamingPartnerOutside/<x>/ESGBootstrapEntryPoint/<x>/EntryPointAttri/<x> in more detail.

TABLE 265

| | |
|---|---|
| Status | Required |
| Occurrence | OneOrMore |
| Format | Node |
| Min.Access Types | Get |
| Value | N/A |

Table 266 below shows the above-mentioned node <x>/IPDC/<x>/RoamingPartnerOutside/<x>/ESGBootstrapEntryPoint/<x>/EntryPointAttri/<x>/IPPlatform/ in more detail.

TABLE 266

| | |
|---|---|
| Status | Optional |
| Occurrence | ZeroOrOne |
| Format | node |
| Min.Access Types | Get |
| Value | N/A |

Table 267 below shows the above-mentioned node <x>/IPDC/<x>/RoamingPartnerOutside/<x>/ESGBootstrapEntryPoint/<x>/EntryPointAttri/<x>/IPPlatform/<x>/ in more detail.

TABLE 267

| | |
|---|---|
| Status | Optional |
| Occurrence | OneOrMore |
| Format | node |
| Min.Access Types | Get |
| Value | N/A |

Table 268 below shows the above-mentioned node <x>/IPDC/<x>/RoamingPartnerOutside/<x>/ESGBootstrapEntryPoint/<x>/EntryPointAttri/<x>/IPPlatform/<x>/IPPlatformID/ in more detail.

TABLE 268

| | |
|---|---|
| Status | Optional |
| Occurrence | One |

TABLE 268-continued

| | |
|---|---|
| Format | Chr |
| Min.Access Types | Get |
| Value | IP platform identifier |

Table 269 shows the above-mentioned node <x>/IPDC/<x>/RoamingPartnerOutside/<x>/ESGBootstrapEntryPoint/<x>/EntryPointAttri/<x>/ESGProvider/ in more detail.

TABLE 269

| | |
|---|---|
| Status | Optional |
| Occurrence | ZeroOrOne |
| Format | node |
| Min.Access Types | Get |
| Value | N/A |

Table 270 below shows the above-mentioned node <x>/IPDC/<x>/RoamingPartnerOutside/<x>/ESGBootstrapEntryPoint/<x>/EntryPointAttri/<x>/ESGProvider/<x> in more detail.

TABLE 270

| | |
|---|---|
| Status | Optional |
| Occurrence | OneOrMore |
| Format | node |
| Min.Access Types | Get |
| Value | N/A |

Table 271 below shows the above-mentioned node <x>/IPDC/<x>/RoamingPartnerOutside/<x>/ESGBootstrapEntryPoint/<x>/EntryPointAttri/<x>/ESGProvider/<x>/ESGProviderURI/ in more detail.

TABLE 271

| | |
|---|---|
| Status | Optional |
| Occurrence | One |
| Format | Chr |
| Min.Access Types | Get |
| Value | ESG Provider identifier |

Table 272 shows the above-mentioned node <x>/IPDC/<x>/RoamingPartnerOutside/<x>/ESGBootstrapEntryPoint/<x>/EntryPointAttri/<x>/ESG/ in more detail.

TABLE 272

| | |
|---|---|
| Status | Optional |
| Occurrence | ZeroOrOne |
| Format | node |
| Min.Access Types | Get |
| Value | N/A |

Table 273 below shows the above-mentioned node <x>/IPDC/<x>/RoamingPartnerOutside/<x>/ESGBootstrapEntryPoint/<x>/EntryPointAttri/<x>/ESG/<x> in more detail.

TABLE 273

| | |
|---|---|
| Status | Optional |
| Occurrence | OneOrMore |
| Format | node |
| Min.Access Types | Get |
| Value | N/A |

Table 274 shows the above-mentioned node <x>/IPDC/<x>/RoamingPartnerOutside/<x>/ESGBootstrapEntryPoint/<x>/EntryPointAttri/<x>/ESG/<x>/ESGURI/ in more detail.

TABLE 274

| | |
|---|---|
| Status | Optional |
| Occurrence | One |
| Format | Chr |
| Min.Access Types | Get |
| Value | ESG identifier |

Table 275 shows the above-mentioned node <x>/IPDC/<x>/RoamingPartnerOutside/<x>/ESGBootstrapEntryPoint/<x>/EntryPointAttri/<x>/AreaParameters/ in more detail.

TABLE 275

| | |
|---|---|
| Status | Optional |
| Occurrence | ZeroOrOne |
| Format | node |
| Min.Access Types | Get |
| Value | N/A |

Table 276 below shows the above-mentioned node <x>/IPDC/<x>/RoamingPartnerOutside/<x>/ESGBootstrapEntryPoint/<x>/EntryPointAttri/<x>/AreaParameters/<x> in more detail.

TABLE 276

| | |
|---|---|
| Status | Optional |
| Occurrence | OneOrMore |
| Format | node |
| Min.Access Types | Get |
| Value | N/A |

Table 277 below shows the above-mentioned node <x>/IPDC/<x>/RoamingPartnerOutside/<x>/ESGBootstrapEntryPoint/<x>/EntryPointAttri/<x>/AreaParameters/<x>/AreaParameter/ in more detail.

TABLE 277

| | |
|---|---|
| Status | Optional |
| Occurrence | One |
| Format | Chr |
| Min.Access Types | Get |
| Value | Area identifier |

Table 278 below shows the above-mentioned node <x>/IPDC/<x>/RoamingPartnerOutside/<x>/ESGBootstrapEntryPoint/<x>/EntryPointAttri/<x>/NetworkInfos/ in more detail.

TABLE 278

| | |
|---|---|
| Status | Optional |
| Occurrence | ZeroOrOne |
| Format | node |
| Min.Access Types | Get |
| Value | N/A |

Table 279 shows the above-mentioned node <x>/IPDC/<x>/RoamingPartnerOutside/<x>/ESGBootstrapEntryPoint/<x>/EntryPointAttri/<x>/NetworkInfos/<x> in more detail.

TABLE 279

| Status | Optional |
|---|---|
| Occurrence | OneOrMore |
| Format | node |
| Min.Access Types | Get |
| Value | N/A |

Table 280 below shows the above-mentioned node <x>/IPDC/<x>/RoamingPartnerOutside/<x>/ESGBootstrapEntryPoint/<x>/EntryPointAttri/<x>/NetworkInfos/<x>/NetworkInfo in more detail.

TABLE 280

| Status | Optional |
|---|---|
| Occurrence | One |
| Format | Chr |
| Min.Access Types | Get |
| Value | Network information |

Table 281 below shows the above-mentioned node <x>/IPDC/<x>/RoamingPartnerOutside/<x>/ESGBootstrapEntryPoint/<x>/EntryPointAttri/<x>/Tuningparameters/ in more detail.

TABLE 281

| Status | Optional |
|---|---|
| Occurrence | ZeroOrOne |
| Format | node |
| Min.Access Types | Get |
| Value | N/A |

Table 282 shows the above-mentioned node <x>/IPDC/<x>/RoamingPartnerOutside/<x>/ESGBootstrapEntryPoint/<x>/EntryPointAttri/<x>/Tuningparameters/<x> in more detail.

TABLE 282

| Status | Optional |
|---|---|
| Occurrence | OneOrMore |
| Format | node |
| Min.Access Types | Get |
| Value | N/A |

Table 283 below shows the above-mentioned node <x>/IPDC/<x>/RoamingPartnerOutside/<x>/ESGBootstrapEntryPoint/<x>/EntryPointAttri/<x>/Tuningparameters/<x>/Tuningparameter/ in more detail.

TABLE 283

| Status | Optional |
|---|---|
| Occurrence | ZeroOrMore |
| Format | Chr |
| Min.Access Types | Get |
| Value | Tuning parameters |

Table 284 shows the above-mentioned node <x>/IPDC/<x>/RoamingPartnerOutside/<x>/ESGBootstrapEntryPoint/<x>/EntryPointAttri/<x>/Ext/ in more detail.

TABLE 284

| Status | Optional |
|---|---|
| Occurrence | ZeroOrOne |
| Format | Chr |
| Min.Access Types | Get |
| Value | N/A |

Table 285 shows the above-mentioned node <x>/IPDC/<x>/RoamingPartnerOutside/<x>/Ext/ in more detail.

TABLE 285

| Status | Optional |
|---|---|
| Occurrence | ZeroOrOne |
| Format | Chr |
| Min.Access Types | Get |
| Value | N/A |

4. $4^{th}$ OMA DM Mechanism

Figure 30:
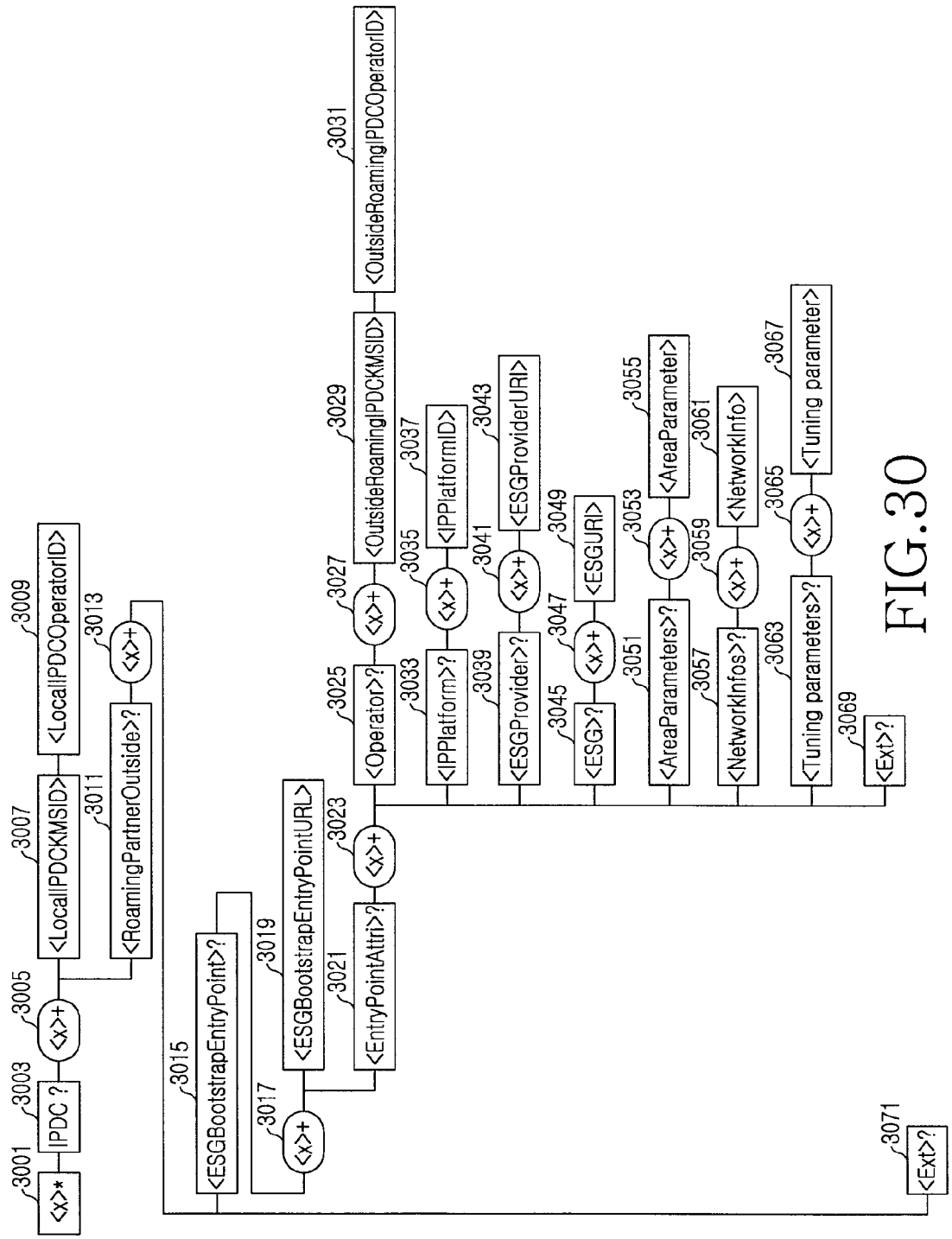
FIG. 30 illustrates an MO of a fourth OMA DM mechanism according to the ninth exemplary embodiment of the present invention.

FIG. 30 illustrates an MO of a fourth OMA DM mechanism according to the ninth exemplary embodiment of the present invention.

Referring to FIG. 30, the X field 3001, 3005, 3013, 3017, 3023, 3027, 3035, 3041, 3047, 3053, 3059, or 3065 is a node functioning as a placeholder, the IPDC field 3003 is a node for an IPDC terminal, the LocalIPDCKMSID field 3007 is a node for a local terminal having an IPDCKMSID, the LocalIPDCOperatorID field 3009 is a node for a local terminal having an IPDCOperatorID, the RoamingPartnerOutside field 3011 is a node carrying roaming partner-related information for the local IPDC KMS system and IPDC operator in an area out of the home coverage, the ESGBootstrapEntryPoint field 3015 is a node carrying ESG bootstrap-related information, the ESGBootstrapEntryPointURL field 3019 is a node indicating an entry point URL for requiring ESG bootstrap information through an interactive network, the EntryPointAttri field 3021 is a node carrying characteristic information of an entry point, the Operator field 3025 is a node carrying operator information, the OutsideRoamingIPDCKMSID field 3029 is a node carrying a roaming IPDC KMS system having an IPDCKMSID for a local terminal and indicates the IPDC KMS system having made a roaming agreement with the home (local) IPDC KMS system and operator, and the OutsideRoamingIPDCOperatorID field 3031 is a node carrying a roaming IPDC operator having an IPDCOperatorID for a local terminal and indicates the IPDC operator having made a roaming agreement with the home (local) IPDC operator. Further, the IPPlatform field 3033 is a node carrying IP platform-related information, the IPPlatformID field 3037 is a node carrying an IP platform identifier (ID), the ESGProvider field 3039 is a node carrying ESG provider-related information, the ESGProviderURI field 3043 is a node carrying a URI identifying an ESG provider, the ESG field 3045 is a node carrying ESG-related information, the ESGURI field 3049 is a node indicating an ESGURI that can be found within the ESG bootstrap, the AreaParameters field 3051 is a node carrying area-related parameters, the AreaParameter field 3055 is a node carrying area-related parameters, such as network ID, cell ID, MCC, MNC, GPS, and nation code, the NetworkInfos field 3057 is a node carrying network-related information, the NetworkInfo field 3061 is a node carrying network-related parameters, such as network type (satellite, terrestrial, interactive network, etc.) and network ID, the Tuning parameters field 3063 is a node carrying related tuning-related information, the Tuning parameter field 3067 is a node carrying related tuning parameters, and the Ext field 3069 or 3071 is a node for addition or extension.

Table 286 below shows the above-mentioned node <x> in more detail.

TABLE 286

| Status | Required |
|---|---|
| Occurrence | ZeroOrMore |
| Format | Node |
| Min.Access Types | Get |
| Value | N/A |

Table 287 below shows the above-mentioned node <x>/IPDC/ in more detail.

TABLE 287

| Status | Required |
|---|---|
| Occurrence | ZeroOrOne |
| Format | Node |
| Min.Access Types | Get |
| Value | N/A |

Table 288 below shows the above-mentioned node <x>/IPDC/<x> in more detail.

TABLE 288

| Status | Required |
|---|---|
| Occurrence | OneOrMore |
| Format | Node |
| Min.Access Types | Get |
| Value | N/A |

Table 289 shows the above-mentioned node <x>/IPDC/<x>/LocalIPDCKMSID/ in more detail.

TABLE 289

| Status | Required |
|---|---|
| Occurrence | One |
| Format | Node |
| Min.Access Types | Get |
| Value | Local IPDC KMS identifier |

Table 290 below shows the above-mentioned node <x>/IPDC/<x>/LocalIPDCKMSID/LocalIPDCOperatorID/ in more detail.

TABLE 290

| Status | Required |
|---|---|
| Occurrence | One |
| Format | Chr |
| Min.Access Types | Get |
| Value | Local IPDC operator identifier |

Table 291 below shows the above-mentioned node <x>/IPDC/<x>/RoamingPartnerOutside/ in more detail.

TABLE 291

| Status | Required |
|---|---|
| Occurrence | ZeroOrOne |
| Format | Node |
| Min.Access Types | Get |
| Value | N/A |

Table 292 shows the above-mentioned node <x>/IPDC/<x>/RoamingPartnerOutside/<x> in more detail.

TABLE 292

| Status | Required |
|---|---|
| Occurrence | OneOrMore |
| Format | Node |
| Min.Access Types | Get |
| Value | N/A |

Table 293 below shows the above-mentioned node <x>/IPDC/<x>/RoamingPartnerOutside/<x>/ESGBootstrapEntryPoint/ in more detail.

TABLE 293

| Status | Required |
|---|---|
| Occurrence | ZeroOrOne |
| Format | Node |
| Min.Access Types | Get |
| Value | N/A |

Table 294 shows the above-mentioned node <x>/IPDC/<x>/RoamingPartnerOutside/<x>/ESGBootstrapEntryPoint/<x> in more detail.

TABLE 294

| Status | Required |
|---|---|
| Occurrence | OneOrMore |
| Format | Node |
| Min.Access Types | Get |
| Value | N/A |

Table 295 shows the above-mentioned node <x>/IPDC/<x>/RoamingPartnerOutside/<x>/ESGBootstrapEntryPoint/<x>/ESGBootstrapEntryPointURL/in more detail.

TABLE 295

| Status | Required |
|---|---|
| Occurrence | One |
| Format | Chr |
| Min.Access Types | Get |
| Value | URL to the Entry Point to request ESG Bootstrap information over interactive Network |

Table 296 below shows the above-mentioned node <x>/IPDC/<x>/RoamingPartnerOutside/<x>/ESGBootstrapEntryPoint/<x>/EntryPointAttri/in more detail.

TABLE 296

| Status | Required |
|---|---|
| Occurrence | ZeroOrOne |
| Format | Node |
| Min.Access Types | Get |
| Value | N/A |

Table 297 below shows the above-mentioned node <x>/IPDC/<x>/RoamingPartnerOutside/<x>/ESGBootstrapEntryPoint/<x>/EntryPointAttri/<x> in more detail.

TABLE 297

| Status | Required |
|---|---|
| Occurrence | OneOrMore |

TABLE 297-continued

| | |
|---|---|
| Format | Node |
| Min.Access Types | Get |
| Value | N/A |

Table 298 below shows the above-mentioned node <x>/IPDC/<x>/RoamingPartnerOutside/<x>/ESGBootstrapEntryPoint/<x>/EntryPointAttri/<x>/Operator/ in more detail.

TABLE 298

| | |
|---|---|
| Status | Optional |
| Occurrence | ZeroOrOne |
| Format | node |
| Min.Access Types | Get |
| Value | N/A |

Table 299 shows the above-mentioned node <x>/IPDC/<x>/RoamingPartnerOutside/<x>/ESGBootstrapEntryPoint/<x>/EntryPointAttri/<x>/Operator/<x> in more detail.

TABLE 299

| | |
|---|---|
| Status | Optional |
| Occurrence | OneOrMore |
| Format | node |
| Min.Access Types | Get |
| Value | N/A |

Table 300 below shows the above-mentioned node <x>/IPDC/<x>/RoamingPartnerOutside/<x>/ESGBootstrapEntryPoint/<x>/EntryPointAttri/<x>/Operator/<x>/OutsideRoamingIPDCKMSID/ in more detail.

TABLE 300

| | |
|---|---|
| Status | Required |
| Occurrence | One |
| Format | Node |
| Min.Access Types | Get |
| Value | IPDC KMS identifier of the Roaming partner |

Table 301 below shows the above-mentioned node <x>/IPDC/<x>/RoamingPartnerOutside/<x>/ESGBootstrapEntryPoint/<x>/EntryPointAttri/<x>/Operator/<x>/OutsideRoamingIPDCKMSID/OutsideRoaming IPDCOperatorID in more detail.

TABLE 301

| | |
|---|---|
| Status | Required |
| Occurrence | One |
| Format | Chr |
| Min.Access Types | Get |
| Value | IPDC operator identifier of the Roaming partner |

Table 302 shows the above-mentioned node <x>/IPDC/<x>/RoamingPartnerOutside/<x>/ESGBootstrapEntryPoint/<x>/EntryPointAttri/<x>/IPPlatform/ in more detail.

TABLE 302

| | |
|---|---|
| Status | Optional |
| Occurrence | ZeroOrOne |
| Format | node |
| Min.Access Types | Get |
| Value | N/A |

Table 303 below shows the above-mentioned node <x>/IPDC/<x>/RoamingPartnerOutside/<x>/ESGBootstrapEntryPoint/<x>/EntryPointAttri/<x>/IPPlatform/<x> in more detail.

TABLE 303

| | |
|---|---|
| Status | Optional |
| Occurrence | OneOrMore |
| Format | node |
| Min.Access Types | Get |
| Value | N/A |

Table 304 shows the above-mentioned node <x>/IPDC/<x>/RoamingPartnerOutside/<x>/ESGBootstrapEntryPoint/<x>/EntryPointAttri/<x>/IPPlatform/<x>/IPPlatformID in more detail.

TABLE 304

| | |
|---|---|
| Status | Optional |
| Occurrence | One |
| Format | Chr |
| Min.Access Types | Get |
| Value | IP platform identifier |

Table 305 shows the above-mentioned node <x>/IPDC/<x>/RoamingPartnerOutside/<x>/ESGBootstrapEntryPoint/<x>/EntryPointAttri/<x>/ESGProvider/ in more detail.

TABLE 305

| | |
|---|---|
| Status | Optional |
| Occurrence | ZeroOrOne |
| Format | node |
| Min.Access Types | Get |
| Value | N/A |

Table 306 below shows the above-mentioned node <x>/IPDC/<x>/RoamingPartnerOutside/<x>/ESGBootstrapEntryPoint/<x>/EntryPointAttri/<x>/ESGProvider/<x> in more detail.

TABLE 306

| | |
|---|---|
| Status | Optional |
| Occurrence | OneOrMore |
| Format | node |
| Min.Access Types | Get |
| Value | N/A |

Table 307 below shows the above-mentioned node <x>/IPDC/<x>/RoamingPartnerOutside/<x>/ESGBootstrapEntryPoint/<x>/EntryPointAttri/<x>/ESGProvider/<x>/ESGProviderURI/ in more detail.

TABLE 307

| | |
|---|---|
| Status | Optional |
| Occurrence | One |
| Format | Chr |
| Min.Access Types | Get |
| Value | ESG Provider identifier |

Table 308 below shows the above-mentioned node <x>/IPDC/<x>/RoamingPartnerOutside/<x>/ESGBootstrapEntryPoint/<x>/EntryPointAttri/<x>/ESG/ in more detail.

TABLE 308

| | |
|---|---|
| Status | Optional |
| Occurrence | ZeroOrOne |
| Format | node |
| Min.Access Types | Get |
| Value | N/A |

Table 309 shows the above-mentioned node <x>/IPDC/<x>/RoamingPartnerOutside/<x>/ESGBootstrapEntryPoint/<x>/EntryPointAttri/<x>/ESG/<x> in more detail.

TABLE 309

| | |
|---|---|
| Status | Optional |
| Occurrence | OneOrMore |
| Format | node |
| Min.Access Types | Get |
| Value | N/A |

Table 310 below shows the above-mentioned node <x>/IPDC/<x>/RoamingPartnerOutside/<x>/ESGBootstrapEntryPoint/<x>/EntryPointAttri/<x>/ESG/<x>/ESGURI in more detail.

TABLE 310

| | |
|---|---|
| Status | Optional |
| Occurrence | One |
| Format | Chr |
| Min.Access Types | Get |
| Value | ESG identifier |

Table 311 below shows the above-mentioned node <x>/IPDC/<x>/RoamingPartnerOutside/<x>/ESGBootstrapEntryPoint/<x>/EntryPointAttri/<x>/AreaParameters/ in more detail.

TABLE 311

| | |
|---|---|
| Status | Optional |
| Occurrence | ZeroOrOne |
| Format | node |
| Min.Access Types | Get |
| Value | N/A |

Table 312 shows the above-mentioned node <x>/IPDC/<x>/RoamingPartnerOutside/<x>/ESGBootstrapEntryPoint/<x>/EntryPointAttri/<x>/AreaParameters/<x> in more detail.

TABLE 312

| | |
|---|---|
| Status | Optional |
| Occurrence | OneOrMore |
| Format | node |
| Min.Access Types | Get |
| Value | N/A |

Table 313 below shows the above-mentioned node <x>/IPDC/<x>/RoamingPartnerOutside/<x>/ESGBootstrapEntryPoint/<x>/EntryPointAttri/<x>/AreaParameters/<x>/AreaParameter/ in more detail.

TABLE 313

| | |
|---|---|
| Status | Optional |
| Occurrence | One |
| Format | Chr |

TABLE 313-continued

| | |
|---|---|
| Min.Access Types | Get |
| Value | Area identifier, e.g. NetworkID, CellID, MCC, MNC, GPS, country code, GPS and so on |

Table 314 shows the above-mentioned node <x>/IPDC/<x>/RoamingPartnerOutside/<x>/ESGBootstrapEntryPoint/<x>/EntryPointAttri/<x>/NetworkInfos/ in more detail.

TABLE 314

| | |
|---|---|
| Status | Optional |
| Occurrence | ZeroOrOne |
| Format | node |
| Min.Access Types | Get |
| Value | N/A |

Table 315 shows the above-mentioned node <x>/IPDC/<x>/RoamingPartnerOutside/<x>/ESGBootstrapEntryPoint/<x>/EntryPointAttri/<x>/NetworkInfos/<x> in more detail.

TABLE 315

| | |
|---|---|
| Status | Optional |
| Occurrence | OneOrMore |
| Format | node |
| Min.Access Types | Get |
| Value | N/A |

Table 316 below shows the above-mentioned node <x>/IPDC/<x>/RoamingPartnerOutside/<x>/ESGBootstrapEntryPoint/<x>/EntryPointAttri/<x>/NetworkInfos/<x>/NetworkInfo/ in more detail.

TABLE 316

| | |
|---|---|
| Status | Optional |
| Occurrence | One |
| Format | Chr |
| Min.Access Types | Get |
| Value | Network information, e.g. network ID, CellID, network type |

Table 317 below shows the above-mentioned node <x>/IPDC/<x>/RoamingPartnerOutside/<x>/ESGBootstrapEntryPoint/<x>/EntryPointAttri/<x>/Tuningparameters/ in more detail.

TABLE 317

| | |
|---|---|
| Status | Optional |
| Occurrence | ZeroOrOne |
| Format | node |
| Min.Access Types | Get |
| Value | N/A |

Table 318 below shows the above-mentioned node <x>/IPDC/<x>/RoamingPartnerOutside/<x>/ESGBootstrapEntryPoint/<x>/EntryPointAttri/<x>/Tuningparameters/<x> in more detail.

TABLE 318

| | |
|---|---|
| Status | Optional |
| Occurrence | OneOrMore |
| Format | node |
| Min.Access Types | Get |
| Value | N/A |

Table 319 shows the above-mentioned node <x>/IPDC/<x>/RoamingPartnerOutside/<x>/ESGBootstrapEntryPoint/<x>/EntryPointAttri/<x>/Tuningparameters/<x>/Tuningparameter in more detail.

TABLE 319

| | |
|---|---|
| Status | Optional |
| Occurrence | ZeroOrMore |
| Format | Chr |
| Min.Access Types | Get |
| Value | Tuning parameters |

Table 320 below shows the above-mentioned node <x>/IPDC/<x>/RoamingPartnerOutside/<x>/ESGBootstrapEntryPoint/<x>/EntryPointAttri/<x>/Ext/ in more detail.

TABLE 320

| | |
|---|---|
| VStatus | Optional |
| Occurrence | ZeroOrOne |
| Format | Chr |
| Min.Access Types | Get |
| Value | N/A |

Table 321 below shows the above-mentioned node <x>/IPDC/<x>/RoamingPartnerOutside/<x>/Ext/ in more detail.

TABLE 321

| | |
|---|---|
| Status | Optional |
| Occurrence | ZeroOrOne |
| Format | Chr |
| Min.Access Types | Get |
| Value | N/A |

5. 5$^{th}$ OMA DM Mechanism

A fifth OMA DM mechanism according to the ninth exemplary embodiment of the present invention may provide an ESG entry point for a local IPDC operator. The fifth OMA DM mechanism according to the ninth exemplary embodiment of the present invention is based on an MO for a local IPDC operator similarly to the third exemplary embodiment of the present invention.

Figure 31:
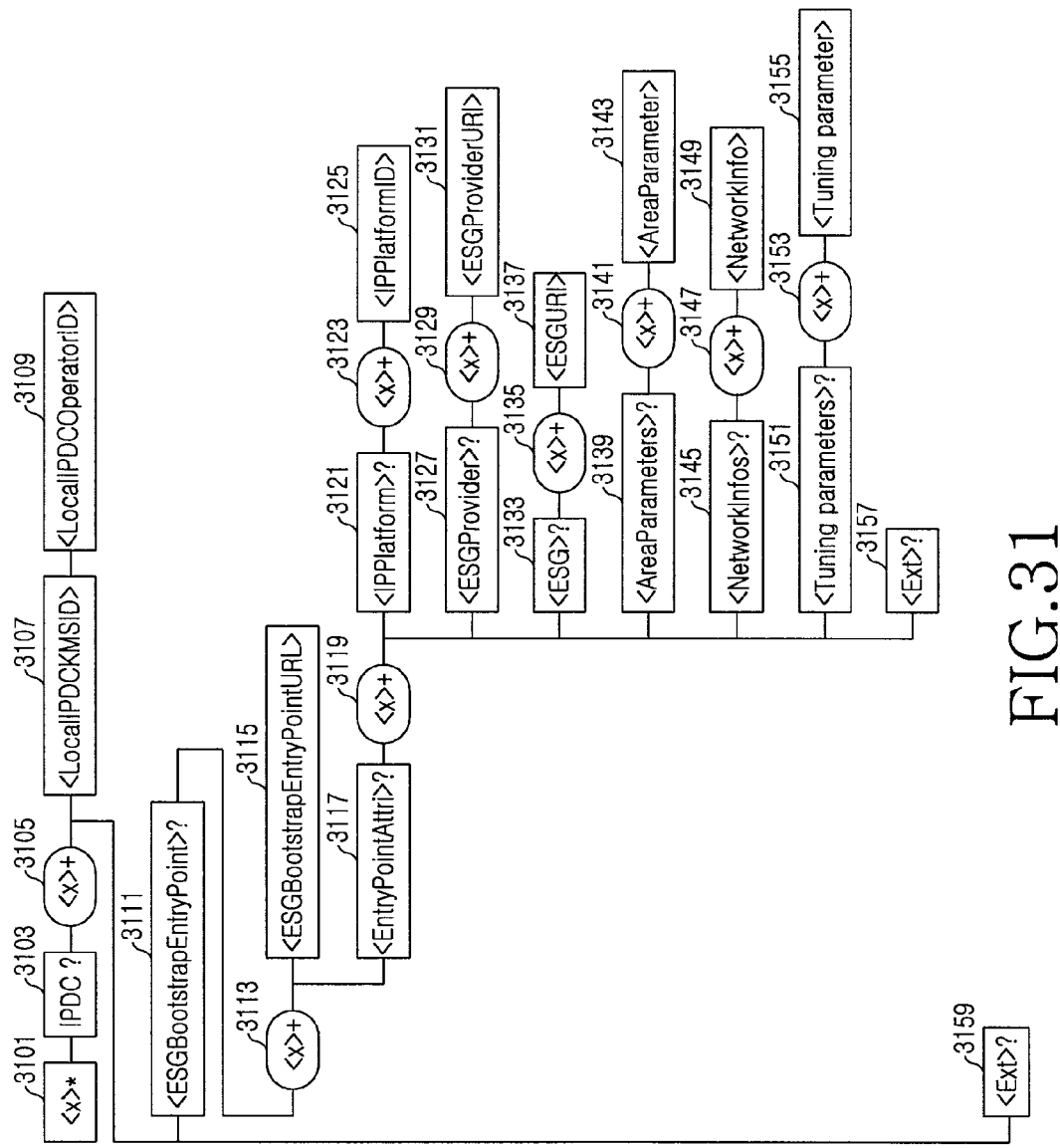
FIG. 31 illustrates an MO of a fifth OMA DM mechanism according to the ninth exemplary embodiment of the present invention.

FIG. 31 illustrates an MO of the fifth OMA DM mechanism according to the ninth exemplary embodiment of the present invention.

Referring to FIG. 31, the X field 3101, 3105, 3113, 3119, 3123, 3129, 3135, 3141, 3147, or 3153 is a node functioning as a placeholder, the IPDC field 3103 is a node for an IPDC terminal, the LocalIPDCKMSID field 3107 is a node for a local terminal having an IPDCKMSID, the LocalIPDCOperatorID field 3109 is a node for a local terminal having an IPDCOperatorID, the ESGBootstrapEntryPoint field 3111 is a node carrying ESG bootstrap-related information, the ESGBootstrapEntryPointURL field 3115 is a node indicating an entry point URL for requiring ESG bootstrap information through an interactive network, the EntryPointAttri field 3117 is a node carrying characteristic information of an entry point, the IPPlatform field 3121 is a node carrying IP platform-related information, the IPPlatformID field 3125 is a node carrying an IP platform identifier (ID), the ESGProvider field 3127 is a node carrying ESG provider-related information, the ESGProviderURI field 3131 is a node carrying a URI identifying an ESG provider, the ESG field 3133 is a node carrying ESG-related information, the ESGURI field 3137 is a node indicating an ESGURI that can be found within the ESG bootstrap, the AreaParameters field 3139 is a node carrying area-related parameters, the AreaParameter field 3143 is a node carrying area-related parameters, such as network ID, cell ID, MCC, MNC, GPS, and nation code, the NetworkInfos field 3145 is a node carrying network-related information, the NetworkInfo field 3149 is a node carrying network-related parameters, such as network type (satellite, terrestrial, interactive network, etc.) and network ID, the Tuning parameters field 3151 is a node carrying related tuning-related information, the Tuning parameter field 3155 is a node carrying related tuning parameters, and the Ext field 3157 or 3159 is a node for addition or extension.

Table 322 shows the above-mentioned node <x> in more detail.

TABLE 322

| | |
|---|---|
| Status | Required |
| Occurrence | ZeroOrMore |
| Format | Node |
| Min.Access Types | Get |
| Value | N/A |

Table 323 below shows the above-mentioned node <x>/IPDC/ in more detail.

TABLE 323

| | |
|---|---|
| Status | Required |
| Occurrence | ZeroOrOne |
| Format | Node |
| Min.Access Types | Get |
| Value | N/A |

Table 324 shows the above-mentioned node <x>/IPDC/<x> in more detail.

TABLE 324

| | |
|---|---|
| Status | Required |
| Occurrence | OneOrMore |
| Format | Node |
| Min.Access Types | Get |
| Value | N/A |

Table 325 shows the above-mentioned node <x>/IPDC/<x>/LocalIPDCKMSID/ in more detail.

TABLE 325

| | |
|---|---|
| Status | Required |
| Occurrence | One |
| Format | Node |
| Min.Access Types | Get |
| Value | Local IPDC KMS identifier |

Table 326 below shows the above-mentioned node <x>/IPDC/<x>/LocalIPDCKMSID/LocalIPDCOperatorID/ in more detail.

TABLE 326

| | |
|---|---|
| Status | Required |
| Occurrence | One |
| Format | Chr |
| Min.Access Types | Get |
| Value | Local IPDC operator identifier |

Table 327 below shows the above-mentioned node <x>/IPDC/<x>/ESGBootstrapEntryPoint/ in more detail.

TABLE 327

| Status | Required |
|---|---|
| Occurrence | ZeroOrOne |
| Format | Node |
| Min.Access Types | Get |
| Value | N/A |

Table 328 below shows the above-mentioned node <x>/IPDC/<x>/ESGBootstrapEntryPoint/<x> in more detail.

TABLE 328

| Status | Required |
|---|---|
| Occurrence | OneOrMore |
| Format | Node |
| Min.Access Types | Get |
| Value | N/A |

Table 329 shows the above-mentioned node <x>/IPDC/<x>/ESGBootstrapEntryPoint/<x>/ESGBootstrapEntryPointURL in more detail.

TABLE 329

| Status | Required |
|---|---|
| Occurrence | One |
| Format | Chr |
| Min.Access Types | Get |
| Value | URL to the Entry Point to request ESG Bootstrap information over interactive Network |

Table 330 below shows the above-mentioned node <x>/IPDC/<x>/ESGBootstrapEntryPoint/<x>/EntryPointAttri/ in more detail.

TABLE 330

| Status | Required |
|---|---|
| Occurrence | ZeroOrOne |
| Format | Node |
| Min.Access Types | Get |
| Value | N/A |

Table 331 below shows the above-mentioned node <x>/IPDC/<x>/ESGBootstrapEntryPoint/<x>/EntryPointAttri/<x> in more detail.

TABLE 331

| Status | Required |
|---|---|
| Occurrence | OneOrMore |
| Format | Node |
| Min.Access Types | Get |
| Value | N/A |

Table 332 shows the above-mentioned node <x>/IPDC/<x>/ESGBootstrapEntryPoint/<x>/EntryPointAttri/<x>/IPPlatform/ in more detail.

TABLE 332

| Status | Optional |
|---|---|
| Occurrence | ZeroOrOne |
| Format | node |
| Min.Access Types | Get |
| Value | N/A |

Table 333 below shows the above-mentioned node <x>/IPDC/<x>/ESGBootstrapEntryPoint/<x>/EntryPointAttri/<x>/IPPlatform/<x> in more detail.

TABLE 333

| Status | Optional |
|---|---|
| Occurrence | OneOrMore |
| Format | node |
| Min.Access Types | Get |
| Value | N/A |

Table 334 shows the above-mentioned node <x>/IPDC/<x>/ESGBootstrapEntryPoint/<x>/EntryPointAttri/<x>/IPPlatform/<x>/IPPlatformID/in more detail.

TABLE 334

| Status | Optional |
|---|---|
| Occurrence | One |
| Format | Chr |
| Min.Access Types | Get |
| Value | IP platform identifier |

Table 335 shows the above-mentioned node <x>/IPDC/<x>/ESGBootstrapEntryPoint/<x>/EntryPointAttri/<x>/ESGProvider/ in more detail.

TABLE 335

| Status | Optional |
|---|---|
| Occurrence | ZeroOrOne |
| Format | node |
| Min.Access Types | Get |
| Value | N/A |

Table 336 below shows the above-mentioned node <x>/IPDC/<x>/ESGBootstrapEntryPoint/<x>/EntryPointAttri/<x>/ESGProvider/<x> in more detail.

TABLE 336

| Status | Optional |
|---|---|
| Occurrence | OneOrMore |
| Format | node |
| Min.Access Types | Get |
| Value | N/A |

Table 337 below shows the above-mentioned node <x>/IPDC/<x>/ESGBootstrapEntryPoint/<x>/EntryPointAttri/<x>/ESGProvider/<x>/ESGProviderURI/in more detail.

TABLE 337

| Status | Optional |
|---|---|
| Occurrence | One |
| Format | Chr |
| Min.Access Types | Get |
| Value | ESG Provider identifier |

Table 338 below shows the above-mentioned node <x>/IPDC/<x>/ESGBootstrapEntryPoint/<x>/EntryPointAttri/<x>/ESG/ in more detail.

TABLE 338

| Status | Optional |
|---|---|
| Occurrence | ZeroOrOne |

Table 339 shows the above-mentioned node <x>/IPDC/<x>/ESGBootstrapEntryPoint/<x>/EntryPointAttri/<x>/ESG/<x> in more detail.

TABLE 339

| | |
|---|---|
| Status | Optional |
| Occurrence | OneOrMore |
| Format | node |
| Min.Access Types | Get |
| Value | N/A |

Table 340 below shows the above-mentioned node <x>/IPDC/<x>/ESGBootstrapEntryPoint/<x>/EntryPointAttri/<x>/ESG/<x>/ESGURI/in more detail.

TABLE 340

| | |
|---|---|
| Status | Optional |
| Occurrence | One |
| Format | Chr |
| Min.Access Types | Get |
| Value | ESG identifier |

Table 341 below shows the above-mentioned node <x>/IPDC/<x>/ESGBootstrapEntryPoint/<x>/EntryPointAttri/<x>/AreaParameters/in more detail.

TABLE 341

| | |
|---|---|
| Status | Optional |
| Occurrence | ZeroOrOne |
| Format | node |
| Min.Access Types | Get |
| Value | N/A |

Table 342 shows the above-mentioned node <x>/IPDC/<x>/ESGBootstrapEntryPoint/<x>/EntryPointAttri/<x>/AreaParameters/<x> in more detail.

TABLE 342

| | |
|---|---|
| Status | Optional |
| Occurrence | OneOrMore |
| Format | node |
| Min.Access Types | Get |
| Value | N/A |

Table 343 below shows the above-mentioned node <x>/IPDC/<x>/ESGBootstrapEntryPoint/<x>/EntryPointAttri/<x>/AreaParameters/<x>/AreaParameter/ in more detail.

TABLE 343

| | |
|---|---|
| Status | Optional |
| Occurrence | One |
| Format | Chr |
| Min.Access Types | Get |
| Value | Area identifier |

Table 344 shows the above-mentioned node <x>/IPDC/<x>/ESGBootstrapEntryPoint/<x>/EntryPointAttri/<x>/NetworkInfos/ in more detail.

TABLE 344

| | |
|---|---|
| Status | Optional |
| Occurrence | ZeroOrOne |
| Format | node |
| Min.Access Types | Get |
| Value | N/A |

Table 345 shows the above-mentioned node <x>/IPDC/<x>/ESGBootstrapEntryPoint/<x>/EntryPointAttri/<x>/NetworkInfos/<x> in more detail.

TABLE 345

| | |
|---|---|
| Status | Optional |
| Occurrence | OneOrMore |
| Format | node |
| Min.Access Types | Get |
| Value | N/A |

Table 346 below shows the above-mentioned node <x>/IPDC/<x>/ESGBootstrapEntryPoint/<x>/EntryPointAttri/<x>/NetworkInfos/<x>/NetworkInfo/in more detail.

TABLE 346

| | |
|---|---|
| Status | Optional |
| Occurrence | One |
| Format | Chr |
| Min.Access Types | Get |
| Value | Network information |

Table 347 below shows the above-mentioned node <x>/IPDC/<x>/ESGBootstrapEntryPoint/<x>/EntryPointAttri/<x>/Tuningparameters/in more detail.

TABLE 347

| | |
|---|---|
| Status | Optional |
| Occurrence | ZeroOrOne |
| Format | node |
| Min.Access Types | Get |
| Value | N/A |

Table 348 below shows the above-mentioned node <x>/IPDC/<x>/ESGBootstrapEntryPoint/<x>/EntryPointAttri/<x>/Tuningparameters/<x> in more detail.

TABLE 348

| | |
|---|---|
| Status | Optional |
| Occurrence | OneOrMore |
| Format | node |
| Min.Access Types | Get |
| Value | N/A |

Table 349 shows the above-mentioned node <x>/IPDC/<x>/ESGBootstrapEntryPoint/<x>/EntryPointAttri/<x>/Tuningparameters/<x>/Tuningparameter/ in more detail.

TABLE 349

| | |
|---|---|
| Status | Optional |
| Occurrence | ZeroOrMore |
| Format | Chr |
| Min.Access Types | Get |
| Value | Tuning parameters |

Table 350 below shows the above-mentioned node <x>/IPDC/<x>/ESGBootstrapEntryPoint/<x>/EntryPointAttri/<x>/Ext in more detail.

TABLE 350

| Status | Optional |
|---|---|
| Occurrence | ZeroOrOne |
| Format | Chr |
| Min.Access Types | Get |
| Value | N/A |

Table 351 below shows the above-mentioned node <x>/IPDC/<x>/ESGBootstrapEntryPoint/<x>/Ext in more detail.

TABLE 351

| Status | Optional |
|---|---|
| Occurrence | ZeroOrOne |
| Format | Chr |
| Min.Access Types | Get |
| Value | N/A |

6. 6$^{th}$ OMA DM Mechanism

A sixth OMA DM mechanism according to the ninth exemplary embodiment of the present invention provides an ESG entry point for a local IPDC operator in a similar way to that of the third or fourth OMA DM mechanism according to the ninth exemplary embodiment of the present invention.

Figure 32:
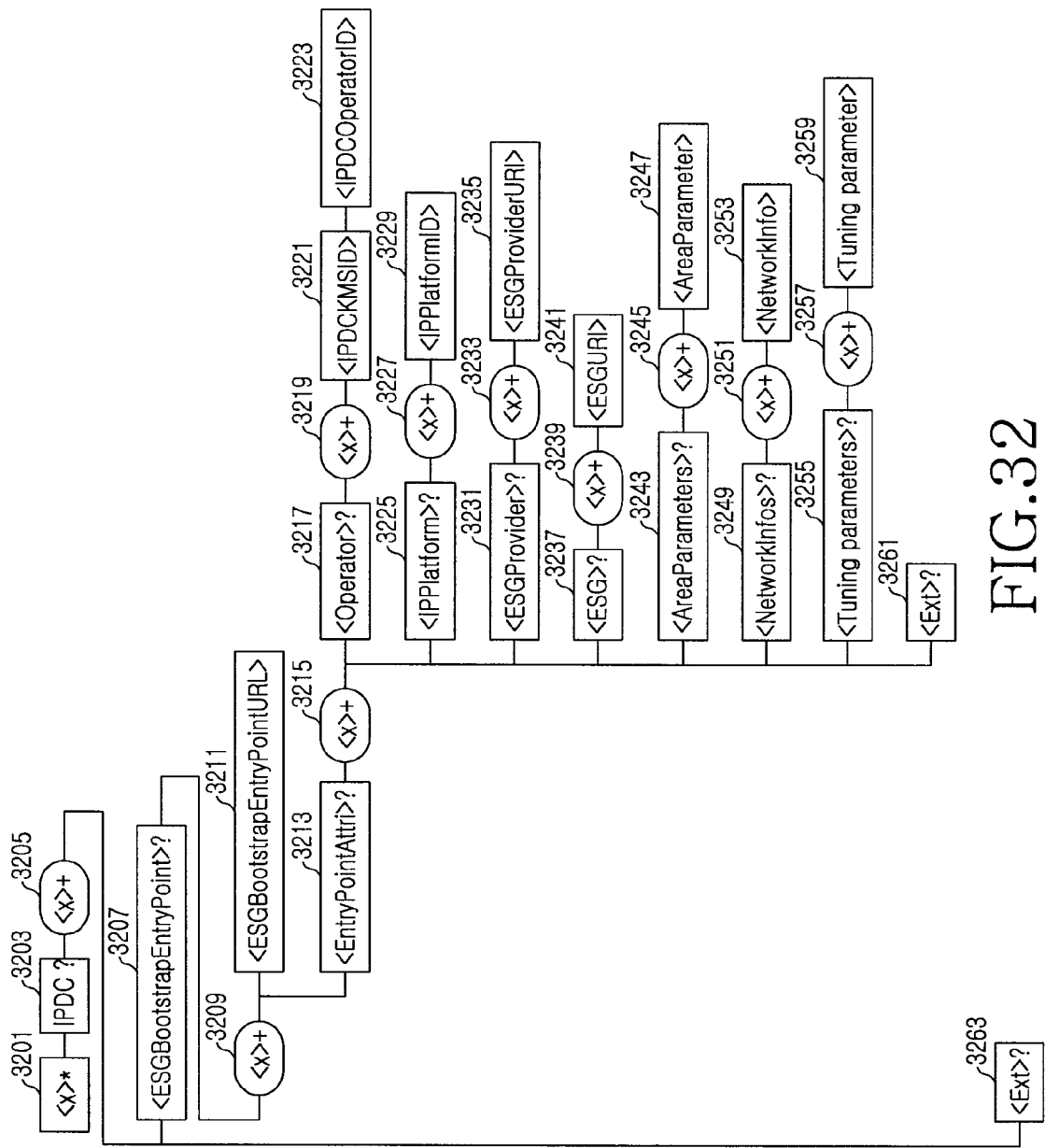
FIG. 32 illustrates an MO of a sixth OMA DM mechanism according to the ninth exemplary embodiment of the present invention.

FIG. 32 illustrates an MO of the sixth OMA DM mechanism according to the ninth exemplary embodiment of the present invention.

Referring to FIG. 32, the X field 3201, 3205, 3209, 3215, 3219, 3227, 3233, 3239, 3245, 3251, or 3257 is a node functioning as a placeholder, the IPDC field 3203 is a node for an IPDC terminal, the ESGBootstrapEntryPoint field 3207 is a node carrying ESG bootstrap-related information, the ESGBootstrapEntryPointURL field 3211 is a node indicating an entry point URL for requiring ESG bootstrap information through an interactive network, the EntryPointAttri field 3213 is a node carrying characteristic information of an entry point, the Operator field 3217 is a node carrying operator information, the IPDCKMSID field 3221 is a node indicating a home IPDC KMS for the terminal, and the IPDCOperatorID field 3223 is a node indicating a home IPDC operator for the terminal. Further, the IPPlatform field 3225 is a node carrying IP platform-related information, the IPPlatformID field 3229 is a node carrying an IP platform identifier (ID), the ESGProvider field 3231 is a node carrying ESG provider-related information, the ESGProviderURI field 3235 is a node carrying a URI identifying an ESG provider, the ESG field 3237 is a node carrying ESG-related information, the ESGURI field 3241 is a node indicating an ESGURI that can be found within the ESG bootstrap, the AreaParameters field 3243 is a node carrying area-related parameters, the AreaParameter field 3247 is a node carrying area-related parameters, such as network ID, cell ID, MCC, MNC, GPS, and nation code, the NetworkInfos field 3249 is a node carrying network-related information, the NetworkInfo field 3253 is a node carrying network-related parameters, such as network type (satellite, terrestrial, interactive network, etc.) and network ID, the Tuning parameters field 3255 is a node carrying related tuning-related information, the Tuning parameter field 3259 is a node carrying related tuning parameters, and the Ext field 3261 or 3263 is a node for addition or extension.

Table 352 shows the above-mentioned node <x> in more detail.

TABLE 352

| Status | Required |
|---|---|
| Occurrence | ZeroOrMore |
| Format | Node |
| Min.Access Types | Get |
| Value | N/A |

Table 353 below shows the above-mentioned node <x>/IPDC/ in more detail.

TABLE 353

| Status | Required |
|---|---|
| Occurrence | ZeroOrOne |
| Format | Node |
| Min.Access Types | Get |
| Value | N/A |

Table 354 shows the above-mentioned node <x>/IPDC/<x> in more detail.

TABLE 354

| Status | Required |
|---|---|
| Occurrence | OneOrMore |
| Format | Node |
| Min.Access Types | Get |
| Value | N/A |

Table 355 shows the above-mentioned node <x>/IPDC/<x>/ESGBootstrapEntryPoint/ in more detail.

TABLE 355

| Status | Required |
|---|---|
| Occurrence | ZeroOrOne |
| Format | Node |
| Min.Access Types | Get |
| Value | N/A |

Table 356 below shows the above-mentioned node <x>/IPDC/<x>/ESGBootstrapEntryPoint/<x> in more detail.

TABLE 356

| Status | Required |
|---|---|
| Occurrence | OneOrMore |
| Format | Node |
| Min.Access Types | Get |
| Value | N/A |

Table 357 below shows the above-mentioned node <x>/IPDC/<x>/ESGBootstrapEntryPoint/<x>/ESGBootstrapEntryPointURL in more detail.

TABLE 357

| Status | Required |
|---|---|
| Occurrence | One |
| Format | Chr |
| Min.Access Types | Get |
| Value | URL to the Entry Point to request ESG Bootstrap information over interactive Network |

Table 358 below shows the above-mentioned node <x>/IPDC/<x>/ESGBootstrapEntryPoint/<x>/EntryPointAttri/ in more detail.

TABLE 358

| Status | Required |
|---|---|
| Occurrence | ZeroOrOne |

TABLE 358-continued

| | |
|---|---|
| Format | Node |
| Min.Access Types | Get |
| Value | N/A |

Table 359 shows the above-mentioned node <x>/IPDC/<x>/ESGBootstrapEntryPoint/EntryPointAttri/<x> in more detail.

TABLE 359

| | |
|---|---|
| Status | Required |
| Occurrence | OneOrMore |
| Format | Node |
| Min.Access Types | Get |
| Value | N/A |

Table 360 below shows the above-mentioned node <x>/IPDC/<x>/ESGBootstrapEntryPoint/EntryPointAttri/<x>/Operator/ in more detail.

TABLE 360

| | |
|---|---|
| Status | Optional |
| Occurrence | ZeroOrOne |
| Format | node |
| Min.Access Types | Get |
| Value | N/A |

Table 361 below shows the above-mentioned node <x>/IPDC/<x>/ESGBootstrapEntryPoint/EntryPointAttri/<x>/Operator/<x> in more detail.

TABLE 361

| | |
|---|---|
| Status | Optional |
| Occurrence | OneOrMore |
| Format | node |
| Min.Access Types | Get |
| Value | N/A |

Table 362 shows the above-mentioned node <x>/IPDC/<x>/ESGBootstrapEntryPoint/Operator/<x>/IPDCKMSID/ in more detail.

TABLE 362

| | |
|---|---|
| Status | Required |
| Occurrence | One |
| Format | Node |
| Min.Access Types | Get |
| Value | IPDC KMS identifier |

Table 363 below shows the above-mentioned node <x>/IPDC/<x>/ESGBootstrapEntryPoint/<x>/EntryPointAttri/<x>/Operator/<x>/IPDCKMSID/IPDCOperatorID/in more detail.

TABLE 363

| | |
|---|---|
| Status | Required |
| Occurrence | One |
| Format | Chr |
| Min.Access Types | Get |
| Value | IPDC operator identifier |

Table 364 shows the above-mentioned node <x>/IPDC/<x>/ESGBootstrapEntryPoint/<x>/EntryPointAttri/<x>/IP-Platform/ in more detail.

TABLE 364

| | |
|---|---|
| Status | Optional |
| Occurrence | ZeroOrOne |
| Format | node |
| Min.Access Types | Get |
| Value | N/A |

Table 365 shows the above-mentioned node <x>/IPDC/<x>/ESGBootstrapEntryPoint/<x>/EntryPointAttri/<x>/IP-Platform/<x> in more detail.

TABLE 365

| | |
|---|---|
| Status | Optional |
| Occurrence | OneOrMore |
| Format | node |
| Min.Access Types | Get |
| Value | N/A |

Table 366 below shows the above-mentioned node <x>/IPDC/<x>/ESGBootstrapEntryPoint/<x>/EntryPointAttri/<x>/IPPlatformID/ in more detail.

TABLE 366

| | |
|---|---|
| Status | Optional |
| Occurrence | One |
| Format | Chr |
| Min.Access Types | Get |
| Value | IP platform identifier |

Table 367 below shows the above-mentioned node <x>/IPDC/<x>/ESGBootstrapEntryPoint/<x>/EntryPointAttri/<x>/ESGProvider/ in more detail.

TABLE 367

| | |
|---|---|
| Status | Optional |
| Occurrence | ZeroOrOne |
| Format | node |
| Min.Access Types | Get |
| Value | N/A |

Table 368 below shows the above-mentioned node <x>/IPDC/<x>/ESGBootstrapEntryPoint/<x>/EntryPointAttri/<x>/ESGProvider/<x> in more detail.

TABLE 368

| | |
|---|---|
| Status | Optional |
| Occurrence | OneOrMore |
| Format | node |
| Min.Access Types | Get |
| Value | N/A |

Table 369 shows the above-mentioned node <x>/IPDC/<x>/ESGBootstrapEntryPoint/<x>/EntryPointAttri/<x>/ESGProvider/<x>/ESGProviderURI/in more detail.

TABLE 369

| | |
|---|---|
| Status | Optional |
| Occurrence | One |
| Format | Chr |
| Min.Access Types | Get |
| Value | ESG Provider identifier |

Table 370 below shows the above-mentioned node <x>/IPDC/<x>/ESGBootstrapEntryPoint/<x>/EntryPointAttri/<x>/ESG/ in more detail.

TABLE 370

| | |
|---|---|
| Status | Optional |
| Occurrence | ZeroOrOne |
| Format | node |
| Min.Access Types | Get |
| Value | N/A |

Table 371 below shows the above-mentioned node <x>/IPDC/<x>/ESGBootstrapEntryPoint/<x>/EntryPointAttri/<x>/ESG/<x> in more detail.

TABLE 371

| | |
|---|---|
| Status | Optional |
| Occurrence | OneOrMore |
| Format | node |
| Min.Access Types | Get |
| Value | N/A |

Table 372 shows the above-mentioned node <x>/IPDC/<x>/ESGBootstrapEntryPoint/<x>/EntryPointAttri/<x>/ESG/<x>/ESGURI/in more detail.

TABLE 372

| | |
|---|---|
| Status | Optional |
| Occurrence | One |
| Format | Chr |
| Min.Access Types | Get |
| Value | ESG identifier |

Table 373 below shows the above-mentioned node <x>/IPDC/<x>/ESGBootstrapEntryPoint/<x>/EntryPointAttri/<x>/AreaParameters/in more detail.

TABLE 373

| | |
|---|---|
| Status | Optional |
| Occurrence | ZeroOrOne |
| Format | node |
| Min.Access Types | Get |
| Value | N/A |

Table 374 shows the above-mentioned node <x>/IPDC/<x>/ESGBootstrapEntryPoint/<x>/EntryPointAttri/<x>/AreaParameters/<x> in more detail.

TABLE 374

| | |
|---|---|
| Status | Optional |
| Occurrence | OneOrMore |
| Format | node |
| Min.Access Types | Get |
| Value | N/A |

Table 375 shows the above-mentioned node <x>/IPDC/<x>/ESGBootstrapEntryPoint/<x>/EntryPointAttri/<x>/AreaParameters/<x>/AreaParameter/ in more detail.

TABLE 375

| | |
|---|---|
| Status | Optional |
| Occurrence | One |
| Format | Chr |
| Min.Access Types | Get |
| Value | Area identifier, e.g. NetworkID, CellID, MCC, MNC, GPS, country code, GPS and so on |

Table 376 below shows the above-mentioned node <x>/IPDC/<x>/ESGBootstrapEntryPoint/<x>/EntryPointAttri/<x>/NetworkInfos/ in more detail.

TABLE 376

| | |
|---|---|
| Status | Optional |
| Occurrence | ZeroOrOne |
| Format | node |
| Min.Access Types | Get |
| Value | N/A |

Table 377 below shows the above-mentioned node <x>/IPDC/<x>/ESGBootstrapEntryPoint/<x>/EntryPointAttri/<x>/NetworkInfos/<x> in more detail.

TABLE 377

| | |
|---|---|
| Status | Optional |
| Occurrence | OneOrMore |
| Format | node |
| Min.Access Types | Get |
| Value | N/A |

Table 378 below shows the above-mentioned node <x>/IPDC/<x>/ESGBootstrapEntryPoint/<x>/EntryPointAttri/<x>/NetworkInfos/<x>/NetworkInfo/in more detail.

TABLE 378

| | |
|---|---|
| Status | Optional |
| Occurrence | One |
| Format | Chr |
| Min.Access Types | Get |
| Value | Network information, e.g. network ID, CellID, network type |

Table 379 shows the above-mentioned node <x>/IPDC/<x>/ESGBootstrapEntryPoint/<x>/EntryPointAttri/<x>/Tuningparameters/in more detail.

TABLE 379

| | |
|---|---|
| Status | Optional |
| Occurrence | ZeroOrOne |
| Format | node |
| Min.Access Types | Get |
| Value | N/A |

Table 380 below shows the above-mentioned node <x>/IPDC/<x>/ESGBootstrapEntryPoint/<x>/EntryPointAttri/<x>/Tuningparameters/<x> in more detail.

TABLE 380

| | |
|---|---|
| Status | Optional |
| Occurrence | OneOrMore |
| Format | node |
| Min.Access Types | Get |
| Value | N/A |

Table 381 below shows the above-mentioned node <x>/IPDC/<x>/ESGBootstrapEntryPoint/<x>/EntryPointAttri/<x>/Tuningparameters/<x>/Tuningparameter/ in more detail.

TABLE 381

| | |
|---|---|
| Status | Optional |
| Occurrence | ZeroOrMore |
| Format | Chr |
| Min.Access Types | Get |
| Value | Tuning parameters |

Table 382 shows the above-mentioned node <x>/IPDC/<x>/ESGBootstrapEntryPoint/<x>/EntryPointAttri/<x>/Ext/ in more detail.

TABLE 382

| | |
|---|---|
| Status | Optional |
| Occurrence | ZeroOrOne |
| Format | Chr |
| Min.Access Types | Get |
| Value | N/A |

Table 383 below shows the above-mentioned node <x>/IPDC/<x>/Ext/in more detail.

TABLE 383

| | |
|---|---|
| Status | Optional |
| Occurrence | ZeroOrOne |
| Format | Chr |
| Min.Access Types | Get |
| Value | N/A |

7. 7$^{th}$ OMA DM Mechanism

A seventh OMA DM mechanism according to the ninth exemplary embodiment of the present invention corresponds to a combination of the third OMA DM mechanism and the fifth OMA DM mechanism according to the ninth exemplary embodiment of the present invention or the fourth OMA DM mechanism and the fifth OMA DM mechanism according to the ninth exemplary embodiment of the present invention.

Figure 33:
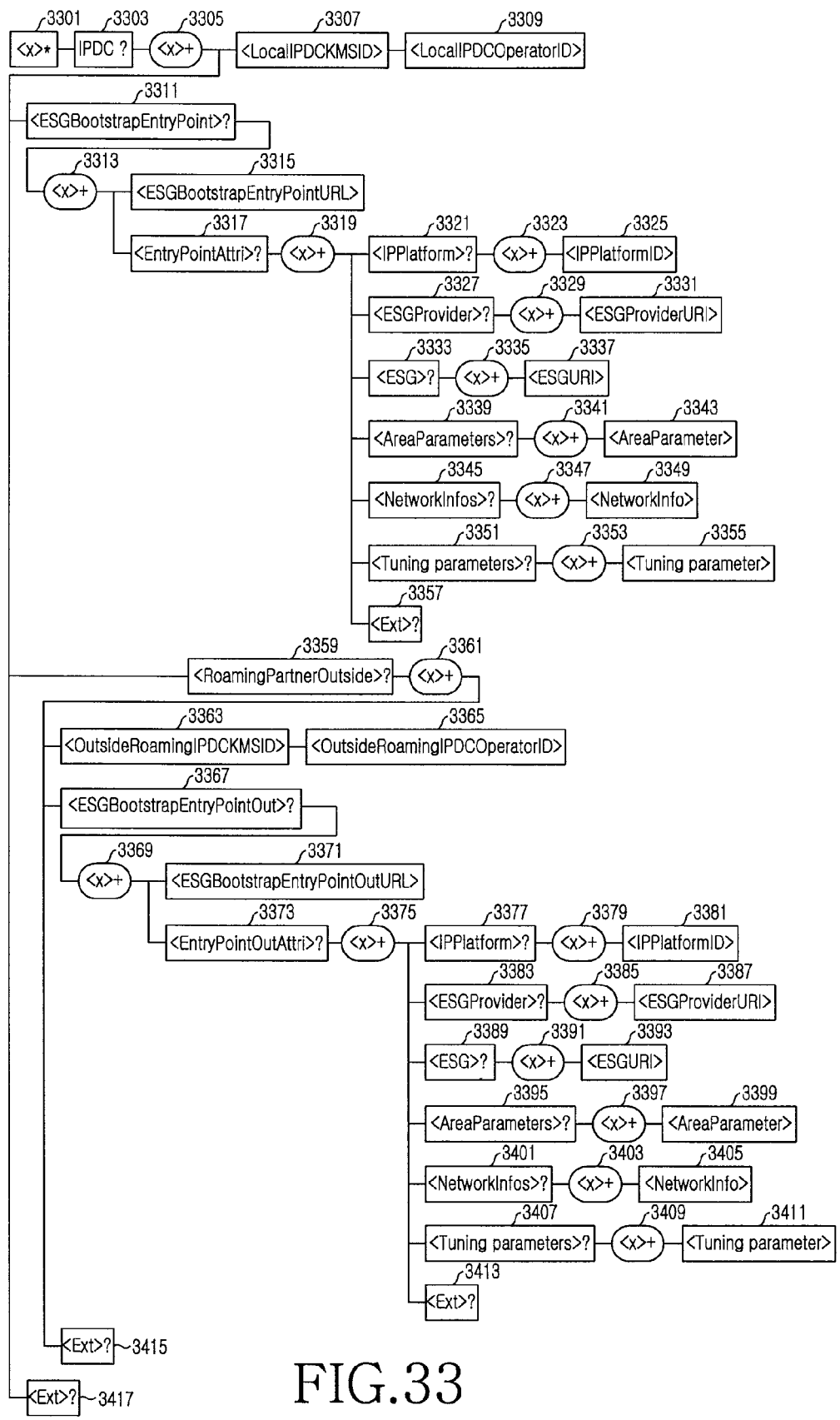
FIG. 33 illustrates an MO of a seventh OMA DM mechanism according to the ninth exemplary embodiment of the present invention.

FIG. 33 illustrates an MO of the seventh OMA DM mechanism according to the ninth exemplary embodiment of the present invention.

Referring to FIG. 33, the X field 3301, 3305, 3313, 3319, 3323, 3329, 3335, 3341, 3347, 3353, 3361, 3369, 3375, 3379, 3385, 3391, 3397, 3403, or 3409 is a node functioning as a placeholder, the IPDC field 3303 is a node for an IPDC terminal, the LocalIPDCKMSID field 3307 is a node for a local terminal having an IPDCKMSID, the LocalIPDCOperatorID field 3309 is a node for a local terminal having an IPDCOperatorID, the ESGBootstrapEntryPoint field 3311 is a node carrying ESG bootstrap-related information, the ESGBootstrapEntryPointURL field 3315 is a node indicating an entry point URL for requiring ESG bootstrap information through an interactive network, the EntryPointAttri field 3317 or 3373 is a node carrying characteristic information of an entry point, the IPPlatform field 3321 or 3377 is a node carrying IP platform-related information, the IPPlatformID field 3325 or 3381 is a node carrying an IP platform identifier (ID), the ESGProvider field 3327 or 3383 is a node carrying ESG provider-related information, the ESGProviderURI field 3331 or 3387 is a node carrying a URI identifying an ESG provider, the ESG field 3333 or 3389 is a node carrying ESG-related information, the ESGURI field 3337 or 3393 is a node indicating an ESGURI that can be found within the ESG bootstrap, the AreaParameters field 3339 or 3395 is a node carrying area-related parameters, the AreaParameter field 3343 or 3399 is a node carrying area-related parameters, such as network ID, cell ID, MCC, MNC, GPS, and nation code, the NetworkInfos field 3345 or 3401 is a node carrying network-related information, the NetworkInfo field 3349 or 3405 is a node carrying network-related parameters, such as network type (satellite, terrestrial, interactive network, etc.) and network ID, the Tuning parameters field 3351 or 3407 is a node carrying related tuning-related information, the Tuning parameter field 3355 or 3411 is a node carrying related tuning parameters, and the Ext field 3357, 3413, 3415, or 3417 is a node for additional information.

The RoamingPartnerOutside field 3359 is a node carrying roaming partner-related information for the local IPDC KMS system and IPDC operator in an area out of the home coverage area, the OutsideRoamingIPDCKMSID field 3363 is a node carrying a roaming IPDC KMS system having an IPDCKMSID for a local terminal and indicates the IPDC KMS system having made a roaming agreement with the home (local) IPDC KMS system and operator, the OutsideRoamingIPDCOperatorID field 3365 is a node carrying a roaming IPDC operator having an IPDCOperatorID for a local terminal and indicates the IPDC operator having made a roaming agreement with the home (local) IPDC operator, the ESGBootstrapEntryPointout field 3367 is a node carrying ESG bootstrap entry point-related information, the ESGBootstrapEntryPointoutURL field 3371 is a node indicating an entry point URL for requiring ESG bootstrap information through and interactive network.

Table 384 shows the above-mentioned node <x> in more detail.

TABLE 384

| | |
|---|---|
| Status | Required |
| Occurrence | ZeroOrMore |
| Format | Node |
| Min.Access Types | Get |
| Value | N/A |

Table 385 shows the above-mentioned node <x>/IPDC/ in more detail.

TABLE 385

| | |
|---|---|
| Status | Required |
| Occurrence | ZeroOrOne |
| Format | Node |
| Min.Access Types | Get |
| Value | N/A |

Table 386 below shows the above-mentioned node <x>/IPDC/<x> in more detail.

TABLE 386

| | |
|---|---|
| Status | Required |
| Occurrence | OneOrMore |
| Format | Node |
| Min.Access Types | Get |
| Value | N/A |

Table 387 below shows the above-mentioned node <x>/IPDC/<x>/LocalIPDCKMSID/ in more detail.

TABLE 387

| | |
|---|---|
| Status | Required |
| Occurrence | One |
| Format | Node |
| Min.Access Types | Get |
| Value | Local IPDC KMS identifier |

Table 388 below shows the above-mentioned node <x>/IPDC/<x>/LocalIPDCKMSID/LocalIPDCOperatorID/ in more detail.

TABLE 388

| Status | Required |
|---|---|
| Occurrence | One |
| Format | Chr |
| Min.Access Types | Get |
| Value | Local IPDC operator identifier |

Table 389 shows the above-mentioned node <x>/IPDC/<x>/ESGBootstrapEntryPoint/ in more detail.

TABLE 389

| Status | Required |
|---|---|
| Occurrence | ZeroOrOne |
| Format | Node |
| Min.Access Types | Get |
| Value | N/A |

Table 390 below shows the above-mentioned node <x>/IPDC/<x>/ESGBootstrapEntryPoint/<x> in more detail.

TABLE 390

| Status | Required |
|---|---|
| Occurrence | OneOrMore |
| Format | Node |
| Min.Access Types | Get |
| Value | N/A |

Table 391 below shows the above-mentioned node <x>/IPDC/<x>/ESGBootstrapEntryPoint/<x>/ESGBootstrapEntryPointURL/ in more detail.

TABLE 391

| Status | Required |
|---|---|
| Occurrence | One |
| Format | Chr |
| Min.Access Types | Get |
| Value | URL to the Entry Point to request ESG Bootstrap information over interactive Network |

Table 392 shows the above-mentioned node <x>/IPDC/<x>/ESGBootstrapEntryPoint/<x>/EntryPointAttri/ in more detail.

TABLE 392

| Status | Required |
|---|---|
| Occurrence | ZeroOrOne |
| Format | Node |
| Min.Access Types | Get |
| Value | N/A |

Table 393 below shows the above-mentioned node <x>/IPDC/<x>/ESGBootstrapEntryPoint/<x>/EntryPointAttri/<x> in more detail.

TABLE 393

| Status | Required |
|---|---|
| Occurrence | OneOrMore |
| Format | Node |
| Min.Access Types | Get |
| Value | N/A |

Table 394 shows the above-mentioned node <x>/IPDC/<x>/ESGBootstrapEntryPoint/<x>/EntryPointAttri/<x>/IPPlatform/ in more detail.

TABLE 394

| Status | Optional |
|---|---|
| Occurrence | ZeroOrOne |
| Format | node |
| Min.Access Types | Get |
| Value | N/A |

Table 395 shows the above-mentioned node <x>/IPDC/<x>/ESGBootstrapEntryPoint/<x>/EntryPointAttri/<x>/IPPlatform/<x> in more detail.

TABLE 395

| Status | Optional |
|---|---|
| Occurrence | OneOrMore |
| Format | node |
| Min.Access Types | Get |
| Value | N/A |

Table 396 below shows the above-mentioned node <x>/IPDC/<x>/ESGBootstrapEntryPoint/<x>/EntryPointAttri/<x>/IPPlatform/<x>/IPPlatformID/ in more detail.

TABLE 396

| Status | Optional |
|---|---|
| Occurrence | One |
| Format | Chr |
| Min.Access Types | Get |
| Value | IP platform identifier |

Table 397 below shows the above-mentioned node <x>/IPDC/<x>/ESGBootstrapEntryPoint/<x>/EntryPointAttri/<x>/ESGProvider/ in more detail.

TABLE 397

| Status | Optional |
|---|---|
| Occurrence | ZeroOrOne |
| Format | node |
| Min.Access Types | Get |
| Value | N/A |

Table 398 below shows the above-mentioned node <x>/IPDC/<x>/ESGBootstrapEntryPoint/<x>/EntryPointAttri/<x>/ESGProvider/<x> in more detail.

TABLE 398

| Status | Optional |
|---|---|
| Occurrence | OneOrMore |
| Format | node |
| Min.Access Types | Get |
| Value | N/A |

Table 399 shows the above-mentioned node <x>/IPDC/<x>/ESGBootstrapEntryPoint/<x>/EntryPointAttri/<x>/ESGProvider/<x>/ESGProviderURI/ in more detail.

TABLE 399

| Status | Optional |
|---|---|
| Occurrence | One |
| Format | Chr |
| Min.Access Types | Get |
| Value | ESG Provider identifier |

Table 400 below shows the above-mentioned node <x>/IPDC/<x>/ESGBootstrapEntryPoint/<x>/EntryPointAttri/<x>/ESG/ in more detail.

TABLE 400

| Status | Optional |
|---|---|
| Occurrence | ZeroOrOne |
| Format | node |
| Min.Access Types | Get |
| Value | N/A |

Table 401 below shows the above-mentioned node <x>/IPDC/<x>/ESGBootstrapEntryPoint/<x>/EntryPointAttri/<x>/ESG/<x> in more detail.

TABLE 401

| Status | Optional |
|---|---|
| Occurrence | OneOrMore |
| Format | node |
| Min.Access Types | Get |
| Value | N/A |

Table 402 shows the above-mentioned node <x>/IPDC/<x>/ESGBootstrapEntryPoint/<x>/EntryPointAttri/<x>/ESG/<x>/ESGURI/in more detail.

TABLE 402

| Status | Optional |
|---|---|
| Occurrence | One |
| Format | Chr |
| Min.Access Types | Get |
| Value | ESG identifier |

Table 403 below shows the above-mentioned node <x>/IPDC/<x>/ESGBootstrapEntryPoint/<x>/EntryPointAttri/<x>/AreaParameters/in more detail.

TABLE 403

| Status | Optional |
|---|---|
| Occurrence | ZeroOrOne |
| Format | node |
| Min.Access Types | Get |
| Value | N/A |

Table 404 shows the above-mentioned node <x>/IPDC/<x>/ESGBootstrapEntryPoint/<x>/EntryPointAttri/<x>/AreaParameters/<x> in more detail.

TABLE 404

| Status | Optional |
|---|---|
| Occurrence | OneOrMore |
| Format | node |
| Min.Access Types | Get |
| Value | N/A |

Table 405 shows the above-mentioned node <x>/IPDC/<x>/ESGBootstrapEntryPoint/<x>/EntryPointAttri/<x>/AreaParameters/<x>/AreaParameter/ in more detail.

TABLE 405

| Status | Optional |
|---|---|
| Occurrence | One |
| Format | Chr |
| Min.Access Types | Get |
| Value | Area identifier |

Table 406 below shows the above-mentioned node <x>/IPDC/<x>/ESGBootstrapEntryPoint/<x>/EntryPointAttri/<x>/NetworkInfos/ in more detail.

TABLE 406

| Status | Optional |
|---|---|
| Occurrence | ZeroOrOne |
| Format | node |
| Min.Access Types | Get |
| Value | N/A |

Table 407 below shows the above-mentioned node <x>/IPDC/<x>/ESGBootstrapEntryPoint/<x>/EntryPointAttri/<x>/NetworkInfos/<x> in more detail.

TABLE 407

| Status | Optional |
|---|---|
| Occurrence | OneOrMore |
| Format | node |
| Min.Access Types | Get |
| Value | N/A |

Table 408 below shows the above-mentioned node <x>/IPDC/<x>/ESGBootstrapEntryPoint/<x>/EntryPointAttri/<x>/NetworkInfos/<x>/NetworkInfo/in more detail.

TABLE 408

| Status | Optional |
|---|---|
| Occurrence | One |
| Format | Chr |
| Min.Access Types | Get |
| Value | Network information |

Table 409 shows the above-mentioned node <x>/IPDC/<x>/ESGBootstrapEntryPoint/<x>/EntryPointAttri/<x>/Tuningparameters/in more detail.

TABLE 409

| Status | Optional |
|---|---|
| Occurrence | ZeroOrOne |
| Format | node |
| Min.Access Types | Get |
| Value | N/A |

Table 410 below shows the above-mentioned node <x>/IPDC/<x>/ESGBootstrapEntryPoint/<x>/EntryPointAttri/<x>/Tuningparameters/<x> in more detail.

TABLE 410

| Status | Optional |
|---|---|
| Occurrence | OneOrMore |
| Format | node |
| Min.Access Types | Get |
| Value | N/A |

Table 411 below shows the above-mentioned node <x>/IPDC/<x>/ESGBootstrapEntryPoint/<x>/EntryPointAttri/<x>/Tuningparameters/<x>/Tuningparameter/ in more detail.

TABLE 411

| Status | Optional |
|---|---|
| Occurrence | ZeroOrMore |
| Format | Chr |
| Min.Access Types | Get |
| Value | Tuning parameters |

Table 412 shows the above-mentioned node <x>/IPDC/<x>/ESGBootstrapEntryPoint/<x>/EntryPointAttri/<x>/Ext/ in more detail.

TABLE 412

| | |
|---|---|
| Status | Optional |
| Occurrence | ZeroOrOne |
| Format | Chr |
| Min.Access Types | Get |
| Value | N/A |

Table 413 below shows the above-mentioned node <x>/IPDC/<x>/ESGBootstrapEntryPoint/<x>/Ext/ in more detail.

TABLE 413

| | |
|---|---|
| Status | Optional |
| Occurrence | ZeroOrOne |
| Format | Chr |
| Min.Access Types | Get |
| Value | N/A |

Table 414 shows the above-mentioned node <x>/IPDC/<x>/RoamingPartnerOutside/ in more detail.

TABLE 414

| | |
|---|---|
| Status | Required |
| Occurrence | ZeroOrOne |
| Format | Node |
| Min.Access Types | Get |
| Value | N/A |

Table 415 shows the above-mentioned node <x>/IPDC/<x>/RoamingPartnerOutside/<x> in more detail.

TABLE 415

| | |
|---|---|
| Status | Required |
| Occurrence | OneOrMore |
| Format | Node |
| Min.Access Types | Get |
| Value | N/A |

Table 416 below shows the above-mentioned node <x>/IPDC/<x>/RoamingPartnerOutside/<x>/OutsideRoamingIPDCKMSID/ in more detail.

TABLE 416

| | |
|---|---|
| Status | Required |
| Occurrence | One |
| Format | Node |
| Min.Access Types | Get |
| Value | IPDC KMS identifier of the Roaming partner |

Table 417 below shows the above-mentioned node <x>/IPDC/<x>/RoamingPartnerOutside/<x>/OutsideRoamingIPDCKMSID/OutsideRoamingIPDCOperatorID/in more detail.

TABLE 417

| | |
|---|---|
| Status | Required |
| Occurrence | One |
| Format | Chr |
| Min.Access Types | Get |
| Value | IPDC operator identifier of the Roaming partner |

Table 418 below shows the above-mentioned node <x>/IPDC/<x>/RoamingPartnerOutside/<x>/ESGBootstrapEntryPointOut/ in more detail.

TABLE 418

| | |
|---|---|
| Status | Required |
| Occurrence | ZeroOrOne |
| Format | Node |
| Min.Access Types | Get |
| Value | N/A |

Table 419 shows the above-mentioned node <x>/IPDC/<x>/RoamingPartnerOutside/<x>/ESGBootstrapEntryPointOut/<x> in more detail.

TABLE 419

| | |
|---|---|
| Status | Required |
| Occurrence | OneOrMore |
| Format | Node |
| Min.Access Types | Get |
| Value | N/A |

Table 420 below shows the above-mentioned node <x>/IPDC/<x>/RoamingPartnerOutside/<x>/ESGBootstrapEntryPointOut/<x>/ESGBootstrapEntryPointOutURL/in more detail.

TABLE 420

| | |
|---|---|
| Status | Required |
| Occurrence | One |
| Format | Chr |
| Min.Access Types | Get |
| Value | URL to the Entry Point to request ESG Bootstrap information over interactive Network |

Table 421 below shows the above-mentioned node <x>/IPDC/<x>/RoamingPartnerOutside/<x>/ESGBootstrapEntryPointOut/<x>/EntryPointOutAttri/in more detail.

TABLE 421

| | |
|---|---|
| Status | Required |
| Occurrence | ZeroOrOne |
| Format | Node |
| Min.Access Types | Get |
| Value | N/A |

Table 422 shows the above-mentioned node <x>/IPDC/<x>/RoamingPartnerOutside/<x>/ESGBootstrapEntryPointOut/<x>/EntryPointOutAttri/<x>/ in more detail.

TABLE 422

| | |
|---|---|
| Status | Required |
| Occurrence | OneOrMore |
| Format | Node |
| Min.Access Types | Get |
| Value | N/A |

Table 423 below shows the above-mentioned node <x>/IPDC/<x>/RoamingPartnerOutside/<x>/ESGBootstrapEntryPointOut/<x>/EntryPointOutAttri/<x>/IPPlatform/ in more detail.

TABLE 423

| | |
|---|---|
| Status | Optional |
| Occurrence | ZeroOrOne |
| Format | node |
| Min.Access Types | Get |
| Value | N/A |

Table 424 shows the above-mentioned node <x>/IPDC/<x>/RoamingPartnerOutside/<x>/ESGBootstrapEntryPointOut/<x>/EntryPointOutAttri/<x>/IPPlatform/<x> in more detail.

TABLE 424

| | |
|---|---|
| Status | Optional |
| Occurrence | OneOrMore |
| Format | node |
| Min.Access Types | Get |
| Value | N/A |

Table 425 shows the above-mentioned node <x>/IPDC/<x>/RoamingPartnerOutside/<x>/ESGBootstrapEntryPointOut/<x>/EntryPointOutAttri/<x>/IPPlatform/<x>/IPPlatformID/ in more detail.

TABLE 425

| | |
|---|---|
| Status | Optional |
| Occurrence | One |
| Format | Chr |
| Min.Access Types | Get |
| Value | IP platform identifier |

Table 426 below shows the above-mentioned node <x>/IPDC/<x>/RoamingPartnerOutside/<x>/ESGBootstrapEntryPointOut/<x>/EntryPointOutAttri/<x>/ESGProvider/ in more detail.

TABLE 426

| | |
|---|---|
| Status | Optional |
| Occurrence | ZeroOrOne |
| Format | node |
| Min.Access Types | Get |
| Value | N/A |

Table 427 below shows the above-mentioned node <x>/IPDC/<x>/RoamingPartnerOutside/<x>/ESGBootstrapEntryPointOut/<x>/EntryPointOutAttri/<x>/ESGProvider/<x> in more detail.

TABLE 427

| | |
|---|---|
| Status | Optional |
| Occurrence | OneOrMore |
| Format | node |
| Min.Access Types | Get |
| Value | N/A |

Table 428 below shows the above-mentioned node <x>/IPDC/<x>/RoamingPartnerOutside/<x>/ESGBootstrapEntryPointOut/<x>/EntryPointOutAttri/<x>/ESGProvider/<x>/ESGProviderURI/ in more detail.

TABLE 428

| | |
|---|---|
| Status | Optional |
| Occurrence | One |
| Format | Chr |
| Min.Access Types | Get |
| Value | ESG Provider identifier |

Table 429 shows the above-mentioned node <x>/IPDC/<x>/RoamingPartnerOutside/<x>/ESGBootstrapEntryPointOut/<x>/EntryPointOutAttri/<x>/ESG/ in more detail.

TABLE 429

| | |
|---|---|
| Status | Optional |
| Occurrence | ZeroOrOne |
| Format | node |
| Min.Access Types | Get |
| Value | N/A |

Table 430 below shows the above-mentioned node <x>/IPDC/<x>/RoamingPartnerOutside/<x>/ESGBootstrapEntryPointOut/<x>/EntryPointOutAttri/<x>/ESG/<x> in more detail.

TABLE 430

| | |
|---|---|
| Status | Optional |
| Occurrence | OneOrMore |
| Format | node |
| Min.Access Types | Get |
| Value | N/A |

Table 431 below shows the above-mentioned node <x>/IPDC/<x>/RoamingPartnerOutside/<x>/ESGBootstrapEntryPointOut/<x>/EntryPointOutAttri/<x>/ESG/<x>/ESGURI/ in more detail.

TABLE 431

| | |
|---|---|
| Status | Optional |
| Occurrence | One |
| Format | Chr |
| Min.Access Types | Get |
| Value | ESG identifier |

Table 432 shows the above-mentioned node <x>/IPDC/<x>/RoamingPartnerOutside/<x>/ESGBootstrapEntryPointOut/<x>/EntryPointOutAttri/<x>/AreaParameters/ in more detail.

TABLE 432

| | |
|---|---|
| Status | Optional |
| Occurrence | ZeroOrOne |
| Format | node |
| Min.Access Types | Get |
| Value | N/A |

Table 433 below shows the above-mentioned node <x>/IPDC/<x>/RoamingPartnerOutside/<x>/ESGBootstrapEntryPointOut/<x>/EntryPointOutAttri/<x>/AreaParameters/<x> in more detail.

TABLE 433

| | |
|---|---|
| Status | Optional |
| Occurrence | OneOrMore |
| Format | node |
| Min.Access Types | Get |
| Value | N/A |

Table 434 shows the above-mentioned node <x>/IPDC/<x>/RoamingPartnerOutside/<x>/ESGBootstrapEntryPointOut/<x>/EntryPointOutAttri/<x>/AreaParameters/<x>/AreaParameter/ in more detail.

TABLE 434

| | |
|---|---|
| Status | Optional |
| Occurrence | One |
| Format | Chr |

TABLE 434-continued

| | |
|---|---|
| Min.Access Types | Get |
| Value | Area identifier |

Table 435 shows the above-mentioned node <x>/IPDC/<x>/RoamingPartnerOutside/<x>/ESGBootstrapEntryPointOut/<x>/EntryPointOutAttri/<x>/NetworkInfos/ in more detail.

TABLE 435

| | |
|---|---|
| Status | Optional |
| Occurrence | ZeroOrOne |
| Format | node |
| Min.Access Types | Get |
| Value | N/A |

Table 436 below shows the above-mentioned node <x>/IPDC/<x>/RoamingPartnerOutside/<x>/ESGBootstrapEntryPointOut/<x>/EntryPointOutAttri/<x>/NetworkInfos/<x> in more detail.

TABLE 436

| | |
|---|---|
| Status | Optional |
| Occurrence | OneOrMore |
| Format | node |
| Min.Access Types | Get |
| Value | N/A |

Table 437 below shows the above-mentioned node <x>/IPDC/<x>/RoamingPartnerOutside/<x>/ESGBootstrapEntryPointOut/<x>/EntryPointOutAttri/<x>/NetworkInfos/<x>/NetworkInfo/ in more detail.

TABLE 437

| | |
|---|---|
| Status | Optional |
| Occurrence | One |
| Format | Chr |
| Min.Access Types | Get |
| Value | Network information |

Table 438 below shows the above-mentioned node <x>/IPDC/<x>/RoamingPartnerOutside/<x>/ESGBootstrapEntryPointOut/<x>/EntryPointOutAttri/<x>/Tuningparameters/ in more detail.

TABLE 438

| | |
|---|---|
| Status | Optional |
| Occurrence | ZeroOrOne |
| Format | node |
| Min.Access Types | Get |
| Value | N/A |

Table 439 shows the above-mentioned node <x>/IPDC/<x>/RoamingPartnerOutside/<x>/ESGBootstrapEntryPointOut/<x>/EntryPointOutAttri/<x>/Tuningparameters/<x> in more detail.

TABLE 439

| | |
|---|---|
| Status | Optional |
| Occurrence | OneOrMore |
| Format | node |
| Min.Access Types | Get |
| Value | N/A |

Table 440 below shows the above-mentioned node <x>/IPDC/<x>/RoamingPartnerOutside/<x>/ESGBootstrapEntryPointOut/<x>/EntryPointOutAttri/<x>/Tuningparameters/<x>/Tuningparameter/ in more detail.

TABLE 440

| | |
|---|---|
| Status | Optional |
| Occurrence | ZeroOrMore |
| Format | Chr |
| Min.Access Types | Get |
| Value | Tuning parameters |

Table 441 below shows the above-mentioned node <x>/IPDC/<x>/RoamingPartnerOutside/<x>/ESGBootstrapEntryPoint/<x>/EntryPointOutAttri/<x>/Ext/ in more detail.

TABLE 441

| | |
|---|---|
| Status | Optional |
| Occurrence | ZeroOrOne |
| Format | Chr |
| Min.Access Types | Get |
| Value | N/A |

Table 442 shows the above-mentioned node <x>/IPDC/<x>/RoamingPartnerOutOutside/<x>/Ext/ in more detail.

TABLE 442

| | |
|---|---|
| Status | Optional |
| Occurrence | ZeroOrOne |
| Format | Chr |
| Min.Access Types | Get |
| Value | N/A |

8. 8$^{th}$ OMA DM Mechanism

An eighth OMA DM mechanism according to the ninth exemplary embodiment of the present invention corresponds to a combination of the fourth OMA DM mechanism and the fifth OMA DM mechanism according to the ninth exemplary embodiment of the present invention.

Figure 34:
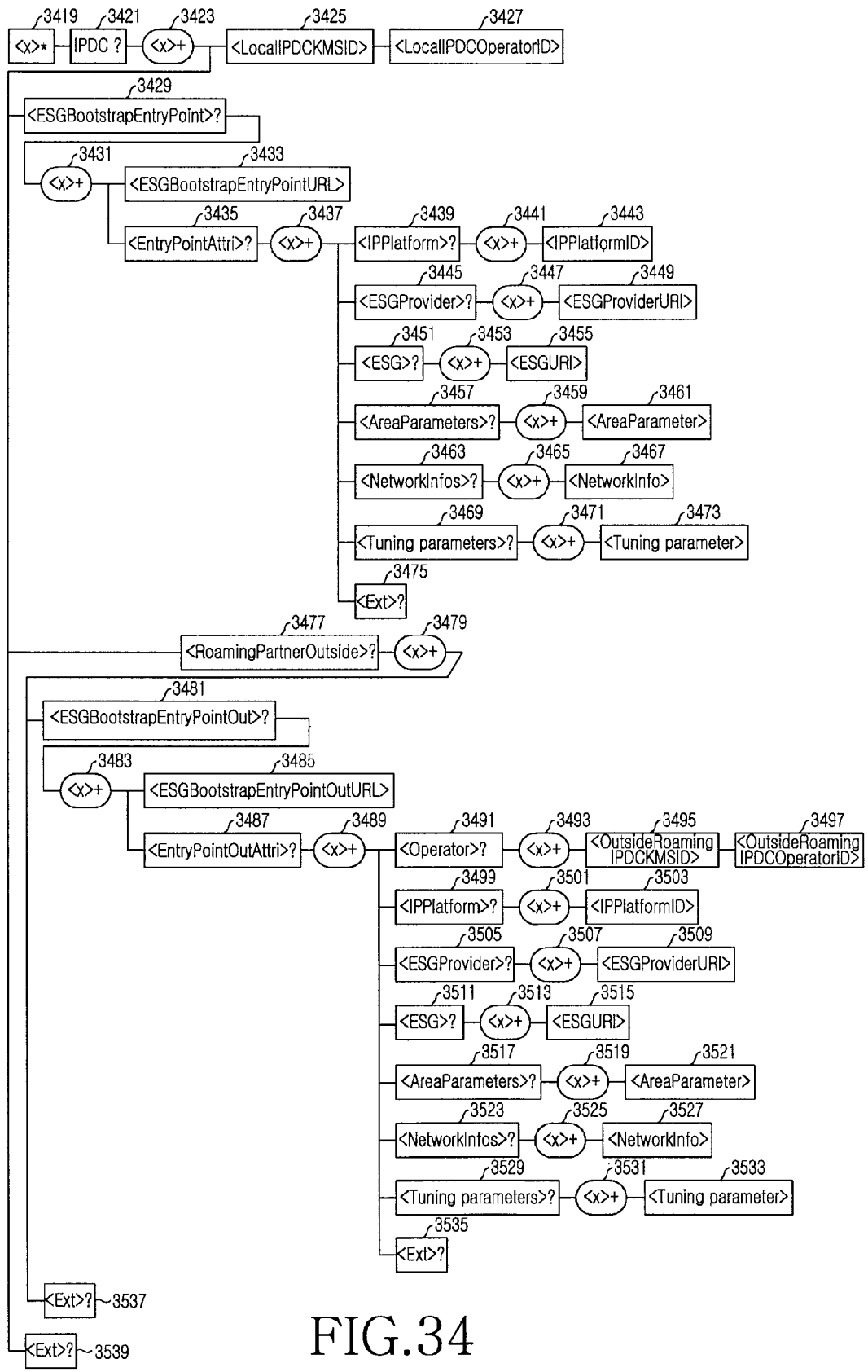
FIG. 34 illustrates an MO of an eighth OMA DM mechanism according to the ninth exemplary embodiment of the present invention.

FIG. 34 illustrates an MO of the eighth OMA DM mechanism according to the ninth exemplary embodiment of the present invention.

Referring to FIG. 34, the X field 3419, 3423, 3431, 3437, 3441, 3447, 3453, 3459, 3465, 3471, 3479, 3483, 3489, 3493, 3501, 3507, 3513, 3519, 3525, or 3531 is a node functioning as a placeholder, the IPDC field 3421 is a node for an IPDC terminal, the LocalIPDCKMSID field 3425 is a node for a local terminal having an IPDCKMSID, the LocalIPDCOperatorID field 3427 is a node for a local terminal having an IPDCOperatorID, the ESGBootstrapEntryPoint field 3429 is a node carrying ESG bootstrap-related information, the ESGBootstrapEntryPointURL field 3433 is a node indicating an ESG bootstrap entry point URL for requiring ESG bootstrap information through an interactive network, the EntryPointAttri field 3435 or 3487 is a node carrying characteristic information of an entry point, the IPPlatform field 3439 or 3499 is a node carrying IP platform-related information, the IPPlatformID field 3443 or 3503 is a node carrying an IP platform identifier (ID), the ESGProvider field 3445 or 3505 is a node carrying ESG provider-related information, the ESGProviderURI field 3449 or 3509 is a node carrying a URI identifying an ESG provider, the ESG field 3451 or 3511 is a node carrying ESG-related information, the ESGURI field 3455 or 3515 is a node indicating an ESGURI that can be found within the ESG bootstrap, the AreaParameters field 3457 or 3517 is a node carrying area-related parameters, the AreaParameter field 3461 or 3521 is a node carrying area-related parameters, such as network ID, cell ID, MCC, MNC, GPS, and nation code, the NetworkInfos field 3463 or 3523 is a node carrying network-related information, the NetworkInfo field 3467 or 3527 is a node carrying network-related parameters, such as network type and network ID, the Tuning parameters field 3469 or 3529 is a node carrying related tuning-related information, the Tuning parameter field 3473 or 3533 is a node carrying related tuning parameters, and the Ext field 3475, 3535, 3537, or 3539 is a node for additional information.

The RoamingPartnerOutside field 3477 is a node carrying roaming partner-related information for the local IPDC KMS system and IPDC operator in an area out of the home coverage, the ESGBootstrapEntryPointout field 3481 is a node carrying ESG bootstrap entry point-related information, and the ESGBootstrapEntryPointoutURL field 3485 is a node indicating an entry point URL for requiring ESG bootstrap information through and interactive network.

The Operator field 3491 is a node carrying operator information, the OutsideRoamingIPDCKMSID field 3495 is a node carrying a roaming IPDC KMS system having an IPDCKMSID for a local terminal and indicates the IPDC KMS system having made a roaming agreement with the home (local) IPDC KMS system and operator, and the OutsideRoamingIPDCOperatorID field 3497 is a node carrying a roaming IPDC operator having an IPDCOperatorID for a local terminal and indicates the IPDC operator having made a roaming agreement with the home (local) IPDC operator.

Table 443 below shows the above-mentioned node <x> in more detail.

TABLE 443

| Status | Required |
|---|---|
| Occurrence | ZeroOrMore |
| Format | Node |
| Min.Access Types | Get |
| Value | N/A |

Table 444 shows the above-mentioned node <x>/IPDC/ in more detail.

TABLE 444

| Status | Required |
|---|---|
| Occurrence | ZeroOrOne |
| Format | Node |
| Min.Access Types | Get |
| Value | N/A |

Table 445 shows the above-mentioned node <x>/IPDC/<x> in more detail.

TABLE 445

| Status | Required |
|---|---|
| Occurrence | OneOrMore |
| Format | Node |
| Min.Access Types | Get |
| Value | N/A |

Table 446 below shows the above-mentioned node <x>/IPDC/<x>/LocalIPDCKMSID/ in more detail.

TABLE 446

| Status | Required |
|---|---|
| Occurrence | One |
| Format | Node |
| Min.Access Types | Get |
| Value | Local IPDC KMS identifier |

Table 447 below shows the above-mentioned node <x>/IPDC/<x>/LocalIPDCKMSID/LocalIPDCOperatorID/ in more detail.

TABLE 447

| Status | Required |
|---|---|
| Occurrence | One |
| Format | Chr |
| Min.Access Types | Get |
| Value | Local IPDC operator identifier |

Table 448 below shows the above-mentioned node <x>/IPDC/<x>/ESGBootstrapEntryPoint/ in more detail.

TABLE 448

| Status | Required |
|---|---|
| Occurrence | ZeroOrOne |
| Format | Node |
| Min.Access Types | Get |
| Value | N/A |

Table 449 shows the above-mentioned node <x>/IPDC/<x>/ESGBootstrapEntryPoint/<x> in more detail.

TABLE 449

| Status | Required |
|---|---|
| Occurrence | OneOrMore |
| Format | Node |
| Min.Access Types | Get |
| Value | N/A |

Table 450 below shows the above-mentioned node <x>/IPDC/<x>/ESGBootstrapEntryPoint/<x>/ESGBootstrapEntryPointURL/ in more detail.

TABLE 450

| Status | Required |
|---|---|
| Occurrence | One |
| Format | Chr |
| Min.Access Types | Get |
| Value | URL to the Entry Point to request ESG Bootstrap information over interactive Network |

Table 451 below shows the above-mentioned node <x>/IPDC/<x>/ESGBootstrapEntryPoint/<x>/EntryPointAttri/ in more detail.

TABLE 451

| Status | Required |
|---|---|
| Occurrence | ZeroOrOne |
| Format | Node |
| Min.Access Types | Get |
| Value | N/A |

Table 452 shows the above-mentioned node <x>/IPDC/<x>/ESGBootstrapEntryPoint/<x>/EntryPointAttri/<x> in more detail.

TABLE 452

| | |
|---|---|
| Status | Required |
| Occurrence | OneOrMore |
| Format | Node |
| Min.Access Types | Get |
| Value | N/A |

Table 453 below shows the above-mentioned node <x>/IPDC/<x>/ESGBootstrapEntryPoint/<x>/EntryPointAttri/<x>/IPPlatform/ in more detail.

TABLE 453

| | |
|---|---|
| Status | Optional |
| Occurrence | ZeroOrOne |
| Format | node |
| Min.Access Types | Get |
| Value | N/A |

Table 454 shows the above-mentioned node <x>/IPDC/<x>/ESGBootstrapEntryPoint/<x>/EntryPointAttri/<x>/IPPlatform/<x> in more detail.

TABLE 454

| | |
|---|---|
| Status | Optional |
| Occurrence | OneOrMore |
| Format | node |
| Min.Access Types | Get |
| Value | N/A |

Table 455 shows the above-mentioned node <x>/IPDC/<x>/ESGBootstrapEntryPoint/<x>/EntryPointAttri/<x>/IPPlatform/<x>/IPPlatformID/in more detail.

TABLE 455

| | |
|---|---|
| Status | Optional |
| Occurrence | One |
| Format | Chr |
| Min.Access Types | Get |
| Value | IP platform identifier |

Table 456 below shows the above-mentioned node <x>/IPDC/<x>/ESGBootstrapEntryPoint/<x>/EntryPointAttri/<x>/ESGProvider/ in more detail.

TABLE 456

| | |
|---|---|
| Status | Optional |
| Occurrence | ZeroOrOne |
| Format | node |
| Min.Access Types | Get |
| Value | N/A |

Table 457 below shows the above-mentioned node <x>/IPDC/<x>/ESGBootstrapEntryPoint/<x>/EntryPointAttri/<x>/ESGProvider/<x> in more detail.

TABLE 457

| | |
|---|---|
| Status | Optional |
| Occurrence | OneOrMore |
| Format | node |
| Min.Access Types | Get |
| Value | N/A |

Table 458 below shows the above-mentioned node <x>/IPDC/<x>/ESGBootstrapEntryPoint/<x>/EntryPointAttri/<x>/ESGProvider/<x>/ESGProviderURI/in more detail.

TABLE 458

| | |
|---|---|
| Status | Optional |
| Occurrence | One |
| Format | Chr |
| Min.Access Types | Get |
| Value | ESG Provider identifier |

Table 459 shows the above-mentioned node <x>/IPDC/<x>/ESGBootstrapEntryPoint/<x>/EntryPointAttri/<x>/ESG/ in more detail.

TABLE 459

| | |
|---|---|
| Status | Optional |
| Occurrence | ZeroOrOne |
| Format | node |
| Min.Access Types | Get |
| Value | N/A |

Table 460 below shows the above-mentioned node <x>/IPDC/<x>/ESGBootstrapEntryPoint/<x>/EntryPointAttri/<x>/ESG/<x> in more detail.

TABLE 460

| | |
|---|---|
| Status | Optional |
| Occurrence | OneOrMore |
| Format | node |
| Min.Access Types | Get |
| Value | N/A |

Table 461 below shows the above-mentioned node <x>/IPDC/<x>/ESGBootstrapEntryPoint/<x>/EntryPointAttri/<x>/ESG/<x>/ESGURI/in more detail.

TABLE 461

| | |
|---|---|
| Status | Optional |
| Occurrence | One |
| Format | Chr |
| Min.Access Types | Get |
| Value | ESG identifier |

Table 462 shows the above-mentioned node <x>/IPDC/<x>/ESGBootstrapEntryPoint/<x>/EntryPointAttri/<x>/AreaParameters/in more detail.

TABLE 462

| | |
|---|---|
| Status | Optional |
| Occurrence | ZeroOrOne |
| Format | node |
| Min.Access Types | Get |
| Value | N/A |

Table 463 below shows the above-mentioned node <x>/IPDC/<x>/ESGBootstrapEntryPoint/<x>/EntryPointAttri/<x>/AreaParameters/<x> in more detail.

TABLE 463

| | |
|---|---|
| Status | Optional |
| Occurrence | OneOrMore |
| Format | node |
| Min.Access Types | Get |
| Value | N/A |

Table 464 shows the above-mentioned node <x>/IPDC/<x>/ESGBootstrapEntryPoint/<x>/EntryPointAttri/<x>/AreaParameters/<x>/AreaParameter/ in more detail.

TABLE 464

| | |
|---|---|
| Status | Optional |
| Occurrence | One |
| Format | Chr |
| Min.Access Types | Get |
| Value | Area identifier |

Table 465 shows the above-mentioned node <x>/IPDC/<x>/ESGBootstrapEntryPoint/<x>/EntryPointAttri/<x>/NetworkInfos/ in more detail.

TABLE 465

| | |
|---|---|
| Status | Optional |
| Occurrence | ZeroOrOne |
| Format | node |
| Min.Access Types | Get |
| Value | N/A |

Table 466 below shows the above-mentioned node <x>/IPDC/<x>/ESGBootstrapEntryPoint/<x>/EntryPointAttri/<x>/NetworkInfos/<x> in more detail.

TABLE 466

| | |
|---|---|
| Status | Optional |
| Occurrence | OneOrMore |
| Format | node |
| Min.Access Types | Get |
| Value | N/A |

Table 467 below shows the above-mentioned node <x>/IPDC/<x>/ESGBootstrapEntryPoint/<x>/EntryPointAttri/<x>/NetworkInfos/<x>/NetworkInfo/in more detail.

TABLE 467

| | |
|---|---|
| Status | Optional |
| Occurrence | One |
| Format | Chr |
| Min.Access Types | Get |
| Value | Network information |

Table 468 below shows the above-mentioned node <x>/IPDC/<x>/ESGBootstrapEntryPoint/<x>/EntryPointAttri/<x>/Tuningparameters/in more detail.

TABLE 468

| | |
|---|---|
| Status | Optional |
| Occurrence | ZeroOrOne |
| Format | node |
| Min.Access Types | Get |
| Value | N/A |

Table 469 shows the above-mentioned node <x>/IPDC/<x>/ESGBootstrapEntryPoint/<x>/EntryPointAttri/<x>/Tuningparameters/<x> in more detail.

TABLE 469

| | |
|---|---|
| Status | Optional |
| Occurrence | OneOrMore |
| Format | node |
| Min.Access Types | Get |
| Value | N/A |

Table 470 below shows the above-mentioned node <x>/IPDC/<x>/ESGBootstrapEntryPoint/<x>/EntryPointAttri/<x>/Tuningparameters/<x>/Tuningparameter/ in more detail.

TABLE 470

| | |
|---|---|
| Status | Optional |
| Occurrence | ZeroOrMore |
| Format | Chr |
| Min.Access Types | Get |
| Value | Tuning parameters |

Table 471 below shows the above-mentioned node <x>/IPDC/<x>/ESGBootstrapEntryPoint/<x>/EntryPointAttri/<x>/Ext/ in more detail.

TABLE 471

| | |
|---|---|
| Status | Optional |
| Occurrence | ZeroOrOne |
| Format | Chr |
| Min.Access Types | Get |
| Value | N/A |

Table 472 shows the above-mentioned node <x>/IPDC/<x>/ESGBootstrapEntryPoint/<x>/Ext/ in more detail.

TABLE 472

| | |
|---|---|
| Status | Optional |
| Occurrence | ZeroOrOne |
| Format | Chr |
| Min.Access Types | Get |
| Value | N/A |

Table 473 below shows the above-mentioned node <x>/IPDC/<x>/RoamingPartnerOutside/ in more detail.

TABLE 473

| | |
|---|---|
| Status | Required |
| Occurrence | ZeroOrOne |
| Format | Node |
| Min.Access Types | Get |
| Value | N/A |

Table 474 shows the above-mentioned node <x>/IPDC/<x>/RoamingPartnerOutside/<x> in more detail.

TABLE 474

| | |
|---|---|
| Status | Required |
| Occurrence | OneOrMore |
| Format | Node |
| Min.Access Types | Get |
| Value | N/A |

Table 475 shows the above-mentioned node <x>/IPDC/<x>/RoamingPartnerOutside/<x>/ESGBootstrapEntryPointOut/ in more detail.

TABLE 475

| | |
|---|---|
| Status | Required |
| Occurrence | ZeroOrOne |
| Format | Node |
| Min.Access Types | Get |
| Value | N/A |

Table 476 below shows the above-mentioned node <x>/IPDC/<x>/RoamingPartnerOutside/<x>/ESGBootstrapEntryPointOut/<x> in more detail.

TABLE 476

| | |
|---|---|
| Status | Required |
| Occurrence | OneOrMore |
| Format | Node |
| Min.Access Types | Get |
| Value | N/A |

Table 477 below shows the above-mentioned node <x>/IPDC/<x>/RoamingPartnerOutside/<x>/ESGBootstrapEntryPointOut/<x>/ESGBootstrapEntryPointOutURL/in more detail.

TABLE 477

| | |
|---|---|
| Status | Required |
| Occurrence | One |
| Format | Chr |
| Min.Access Types | Get |
| Value | URL to the Entry Point to request ESG Bootstrap information over interactive Network |

Table 478 below shows the above-mentioned node <x>/IPDC/<x>/RoamingPartnerOutside/<x>/ESGBootstrapEntryPointOut/<x>/EntryPointOutAttri/in more detail.

TABLE 478

| | |
|---|---|
| Status | Required |
| Occurrence | ZeroOrOne |
| Format | Node |
| Min.Access Types | Get |
| Value | N/A |

Table 479 shows the above-mentioned node <x>/IPDC/<x>/RoamingPartnerOutside/<x>/ESGBootstrapEntryPointOut/<x>/EntryPointOutAttri/<x> in more detail.

TABLE 479

| | |
|---|---|
| Status | Required |
| Occurrence | OneOrMore |
| Format | Node |
| Min.Access Types | Get |
| Value | N/A |

Table 480 below shows the above-mentioned node <x>/IPDC/<x>/RoamingPartnerOutside/<x>/ESGBootstrapEntryPointOut/<x>/EntryPointOutAttri/<x>/Operator/ in more detail.

TABLE 480

| | |
|---|---|
| Status | Optional |
| Occurrence | ZeroOrOne |
| Format | node |
| Min.Access Types | Get |
| Value | N/A |

Table 481 below shows the above-mentioned node <x>/IPDC/<x>/RoamingPartnerOutside/<x>/ESGBootstrapEntryPointOut/<x>/EntryPointOutAttri/<x>/Operator/<x> in more detail.

TABLE 481

| | |
|---|---|
| Status | Optional |
| Occurrence | OneOrMore |
| Format | node |
| Min.Access Types | Get |
| Value | N/A |

Table 482 shows the above-mentioned node <x>/IPDC/<x>/RoamingPartnerOutside/<x>/ESGBootstrapEntryPointOut/<x>/EntryPointOutAttri/<x>/Operator/<x>/OutsideRoamingIPDCKMSID/ in more detail.

TABLE 482

| | |
|---|---|
| Status | Required |
| Occurrence | One |
| Format | Node |
| Min.Access Types | Get |
| Value | IPDC KMS identifier of the Roaming partner |

Table 483 below shows the above-mentioned node <x>/IPDC/<x>/RoamingPartnerOutside/<x>/ESGBootstrapEntryPointOut/<x>/EntryPointOutAttri/<x>/Operator/<x>/OutsideRoamingIPDCKMSID/OutsideRoamingIPDCOperatorID/in more detail.

TABLE 483

| | |
|---|---|
| Status | Required |
| Occurrence | One |
| Format | Chr |
| Min.Access Types | Get |
| Value | IPDC operator identifier of the Roaming partner |

Table 484 shows the above-mentioned node <x>/IPDC/<x>/RoamingPartnerOutside/<x>/ESGBootstrapEntryPointOut/<x>/EntryPointOutAttri/<x>/IPPlatform/ in more detail.

TABLE 484

| | |
|---|---|
| Status | Optional |
| Occurrence | ZeroOrOne |
| Format | node |
| Min.Access Types | Get |
| Value | N/A |

Table 485 shows the above-mentioned node <x>/IPDC/<x>/RoamingPartnerOutside/<x>/ESGBootstrapEntryPointOut/<x>/EntryPointOutAttri/<x>/IPPlatform/<x> in more detail.

TABLE 485

| | |
|---|---|
| Status | Optional |
| Occurrence | OneOrMore |
| Format | node |
| Min.Access Types | Get |
| Value | N/A |

Table 486 below shows the above-mentioned node <x>/IPDC/<x>/RoamingPartnerOutside/<x>/ESGBootstrapEntryPointOut/<x>/EntryPointOutAttri/<x>/IPPlatform/<x>/IPPlatformID/ in more detail.

TABLE 486

| | |
|---|---|
| Status | Optional |
| Occurrence | One |
| Format | Chr |
| Min.Access Types | Get |
| Value | IP platform identifier |

Table 487 below shows the above-mentioned node <x>/IPDC/<x>/RoamingPartnerOutside/<x>/ESGBootstrapEntryPointOut/<x>/EntryPointOutAttri/<x>/ESGProvider/ in more detail.

TABLE 487

| | |
|---|---|
| Status | Optional |
| Occurrence | ZeroOrOne |
| Format | node |
| Min.Access Types | Get |
| Value | N/A |

Table 488 below shows the above-mentioned node <x>/IPDC/<x>/RoamingPartnerOutside/<x>/ESGBootstrapEntryPointOut/<x>/EntryPointOutAttri/<x>/ESGProvider/<x> in more detail.

TABLE 488

| | |
|---|---|
| Status | Optional |
| Occurrence | OneOrMore |
| Format | node |
| Min.Access Types | Get |
| Value | N/A |

Table 489 shows the above-mentioned node <x>/IPDC/<x>/RoamingPartnerOutside/<x>/ESGBootstrapEntryPointOut/<x>/EntryPointOutAttri/<x>/ESGProvider/<x>/ESGProviderURI/ in more detail.

TABLE 489

| | |
|---|---|
| Status | Optional |
| Occurrence | One |
| Format | Chr |
| Min.Access Types | Get |
| Value | ESG Provider identifier |

Table 490 below shows the above-mentioned node <x>/IPDC/<x>/RoamingPartnerOutside/<x>/ESGBootstrapEntryPointOut/<x>/EntryPointOutAttri/<x>/ESG/ in more detail.

TABLE 490

| | |
|---|---|
| Status | Optional |
| Occurrence | ZeroOrOne |
| Format | node |
| Min.Access Types | Get |
| Value | N/A |

Table 491 below shows the above-mentioned node <x>/IPDC/<x>/RoamingPartnerOutside/<x>/ESGBootstrapEntryPointOut/<x>/EntryPointOutAttri/<x>/ESG/<x> in more detail.

TABLE 491

| | |
|---|---|
| Status | Optional |
| Occurrence | OneOrMore |
| Format | node |
| Min.Access Types | Get |
| Value | N/A |

Table 492 shows the above-mentioned node <x>/IPDC/<x>/RoamingPartnerOutside/<x>/ESGBootstrapEntryPointOut/<x>/EntryPointAttriOut/<x>/ESG/<x>/ESGURI/ in more detail.

TABLE 492

| | |
|---|---|
| Status | Optional |
| Occurrence | One |
| Format | Chr |
| Min.Access Types | Get |
| Value | ESG identifier |

Table 493 below shows the above-mentioned node <x>/IPDC/<x>/RoamingPartnerOutside/<x>/ESGBootstrapEntryPointOut/<x>/EntryPointAttriOut/<x>/AreaParameters/ in more detail.

TABLE 493

| | |
|---|---|
| Status | Optional |
| Occurrence | ZeroOrOne |
| Format | node |
| Min.Access Types | Get |
| Value | N/A |

Table 494 shows the above-mentioned node <x>/IPDC/<x>/RoamingPartnerOutside/<x>/ESGBootstrapEntryPointOut/<x>/EntryPointAttriOut/<x>/AreaParameters/<x> in more detail.

TABLE 494

| | |
|---|---|
| Status | Optional |
| Occurrence | OneOrMore |
| Format | node |
| Min.Access Types | Get |
| Value | N/A |

Table 495 shows the above-mentioned node <x>/IPDC/<x>/RoamingPartnerOutside/<x>/ESGBootstrapEntryPointOut/<x>/EntryPointAttriOut/<x>/AreaParameters/<x>/AreaParameter/ in more detail.

TABLE 495

| | |
|---|---|
| Status | Optional |
| Occurrence | One |
| Format | Chr |
| Min.Access Types | Get |
| Value | Area identifier, e.g. NetworkID, CellID, MCC, MNC, GPS, country code, GPS and so on |

Table 496 below shows the above-mentioned node <x>/IPDC/<x>/RoamingPartnerOutside/<x>/ESGBootstrapEntryPointOut/<x>/EntryPointOutAttri/<x>/NetworkInfos/ in more detail.

TABLE 496

| | |
|---|---|
| Status | Optional |
| Occurrence | ZeroOrOne |
| Format | node |
| Min.Access Types | Get |
| Value | N/A |

Table 497 below shows the above-mentioned node <x>/IPDC/<x>/RoamingPartnerOutside/<x>/ESGBootstrapEntryPointOut/<x>/EntryPointOutAttri/<x>/NetworkInfos/<x> in more detail.

TABLE 497

| Status | Optional |
|---|---|
| Occurrence | OneOrMore |
| Format | node |
| Min.Access Types | Get |
| Value | N/A |

Table 498 below shows the above-mentioned node <x>/IPDC/<x>/RoamingPartnerOutside/<x>/ESGBootstrapEntryPointOut/<x>/EntryPointOutAttri/<x>/NetworkInfos/<x>/NetworkInfo/ in more detail.

TABLE 498

| Status | Optional |
|---|---|
| Occurrence | One |
| Format | Chr |
| Min.Access Types | Get |
| Value | Network information, e.g. network ID, CellID, network type |

Table 499 shows the above-mentioned node <x>/IPDC/<x>/RoamingPartnerOutside/<x>/ESGBootstrapEntryPointOut/<x>/EntryPointOutAttri/<x>/Tuningparameters/ in more detail.

TABLE 499

| Status | Optional |
|---|---|
| Occurrence | ZeroOrOne |
| Format | node |
| Min.Access Types | Get |
| Value | N/A |

Table 500 below shows the above-mentioned node <x>/IPDC/<x>/RoamingPartnerOutside/<x>/ESGBootstrapEntryPointOut/<x>/EntryPointOutAttri/<x>/Tuningparameters/<x> in more detail.

TABLE 500

| Status | Optional |
|---|---|
| Occurrence | OneOrMore |
| Format | node |
| Min.Access Types | Get |
| Value | N/A |

Table 501 below shows the above-mentioned node <x>/IPDC/<x>/RoamingPartnerOutside/<x>/ESGBootstrapEntryPointOut/<x>/EntryPointOutAttri/<x>/Tuningparameters/<x>/Tuningparameter/ in more detail.

TABLE 501

| Status | Optional |
|---|---|
| Occurrence | ZeroOrMore |
| Format | Chr |
| Min.Access Types | Get |
| Value | Tuning parameters |

Table 502 shows the above-mentioned node <x>/IPDC/<x>/RoamingPartnerOutside/<x>/ESGBootstrapEntryPointOut/<x>/EntryPointAttriOut/<x>/Ext/ in more detail.

TABLE 502

| Status | Optional |
|---|---|
| Occurrence | ZeroOrOne |
| Format | Chr |
| Min.Access Types | Get |
| Value | N/A |

Table 503 below shows the above-mentioned node <x>/IPDC/<x>/RoamingPartnerOutside/<x>/Ext/ in more detail.

TABLE 503

| Status | Optional |
|---|---|
| Occurrence | ZeroOrOne |
| Format | Chr |
| Min.Access Types | Get |
| Value | N/A |

Hereinafter, operations of a DM server and a terminal according to the ninth exemplary embodiment of the present invention will be described with reference to FIGS. 35 and 36.

Figure 35:
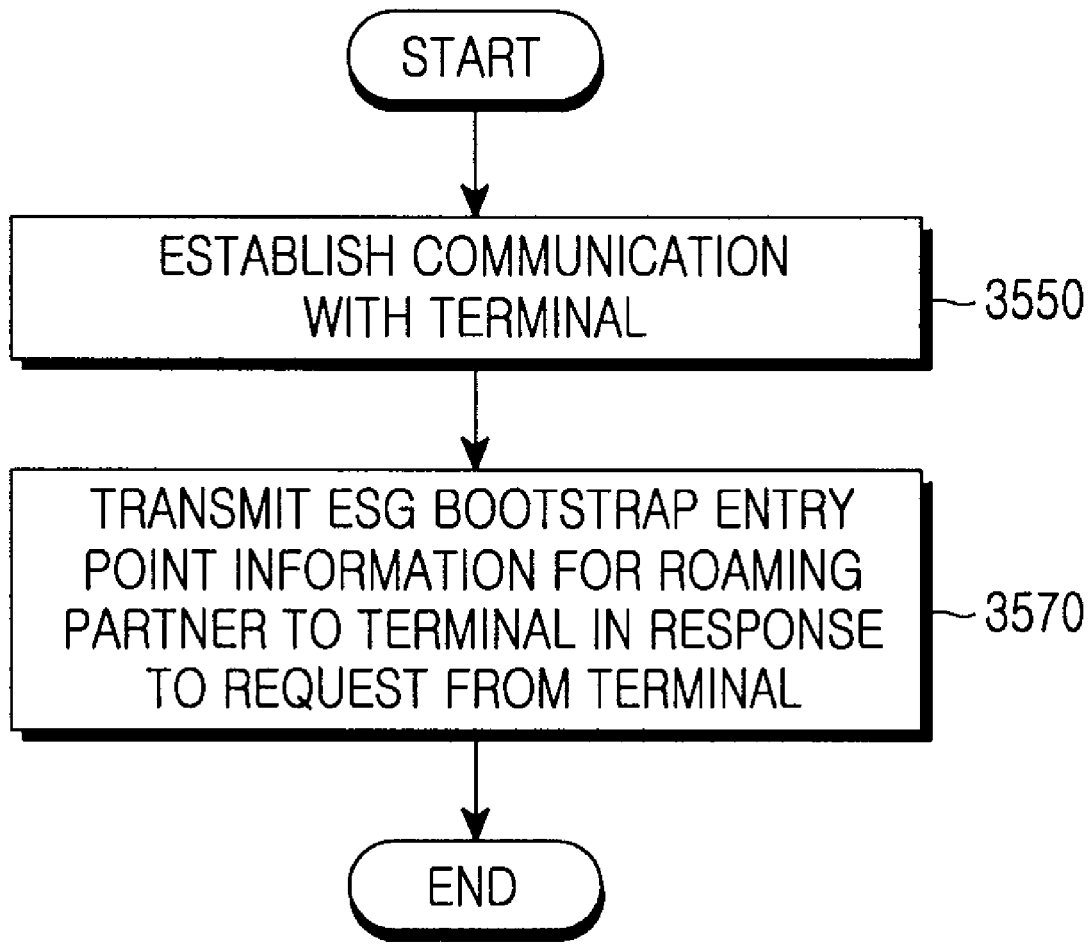
FIG. 35 illustrates an operation of a DM server according to the ninth exemplary embodiment of the present invention.

FIG. 35 illustrates an operation of a DM server according to the ninth exemplary embodiment of the present invention. The operation of the DM server according to the ninth exemplary embodiment of the present invention, which will be described below, is similar to the operation of the DM server according to the eighth exemplary embodiment of the present invention Referring to FIG. 35, the DM server establishes communication with the terminal in step 3550, and transmits ESG bootstrap entry point information for a roaming partner to the terminal in response to a request from the terminal in step 3570.

Figure 36:
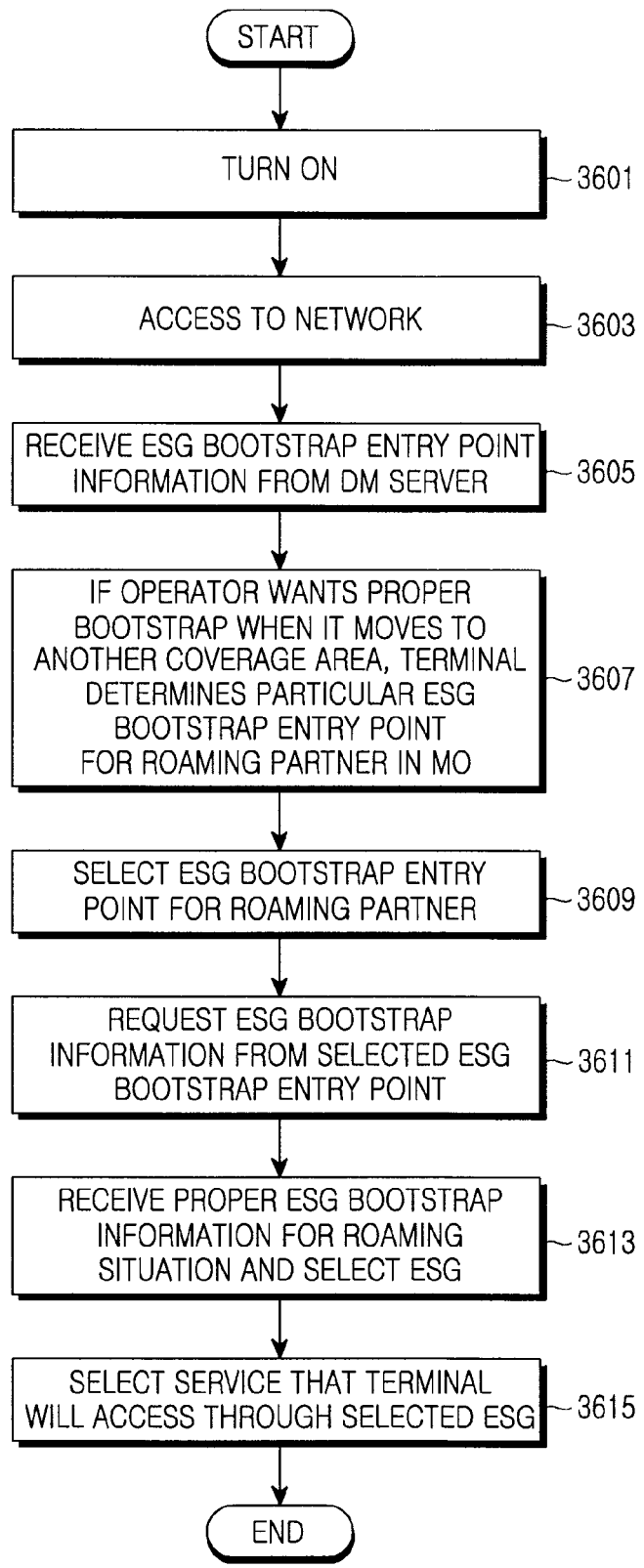
FIG. 36 illustrates an operation of a terminal according to the ninth exemplary embodiment of the present invention.

FIG. 36 illustrates an operation of a terminal according to the ninth exemplary embodiment of the present invention.

Referring to FIG. 36, the terminal turns on in step 3601, and accesses the DM server in step 3603. In step 3605, after the communication is established, the terminal receives the ESG bootstrap entry point information from the DM server. The terminal may search for an ESG bootstrap entry point for its roaming partner within the roaming coverage.

In step 3607, if an operator wants a proper bootstrap when it moves to another coverage area, the terminal determines a particular ESG bootstrap entry point for a roaming partner in the MO. In step 3609, the terminal selects the ESG bootstrap entry point for the roaming partner. In step 3611, the terminal requests ESG bootstrap information from the selected ESG bootstrap entry point. In step 3613, the terminal receives proper ESG bootstrap information for the roaming situation and selects an ESG. As a result, in step 3615, the terminal selects a service that the terminal will access through the selected ESG.

OMA DM Mechanism According to 10$^{th}$ Exemplary Embodiment

The OMA DM mechanism according to the first to ninth exemplary embodiments of the present invention as described above provides an ESG bootstrap entry point by using an OMA DM. However, it is also possible to provide an ESG bootstrap entry point in the same manner using an OMA DM. To this end, the "ESGBootstrapEntryPoint" in the first to ninth exemplary embodiments of the present invention can be replaced by "ESGEntryPoint," and the "ESGBootstrapEntryPointURL" can be replaced by "ESGEntryPointURL." Further, the terminal can directly request an ESG by using an entry point provided by the OMA DM.

The following description on an OMA DM mechanism according to the tenth exemplary embodiment of the present invention presents an example of an ESG entry point for a roaming partner based on the OMA DM mechanism. Meanwhile, it is also possible to provide an ESG entry point for a local operator in a similar way.

Figure 37:
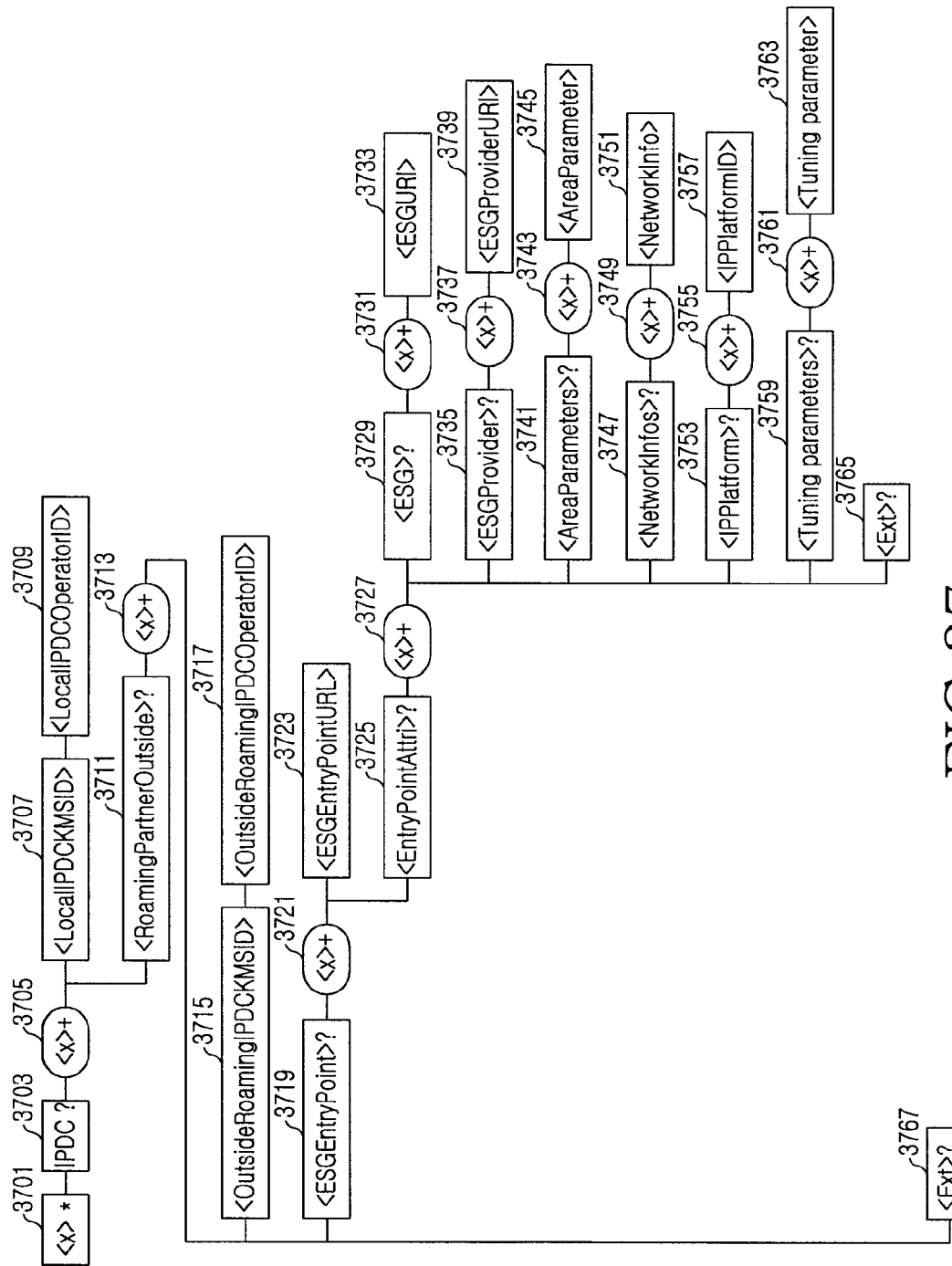
FIG. 37 illustrates an MO of an OMA DM mechanism according to a tenth exemplary embodiment of the present invention.

FIG. 37 illustrates an MO of an OMA DM mechanism according to the tenth exemplary embodiment of the present invention.

Referring to FIG. 37, the X field 3701, 3705, 3713, 3721, 3727, 3731, 3737, 3743, 3749, 3755, or 3761 is a node functioning as a placeholder, the IPDC field 3703 is a node for an IPDC terminal, the LocalIPDCKMSID field 3707 is a node for a local terminal having an IPDCKMSID, the LocalIPDCOperatorID field 3709 is a node for a local terminal having an IPDCOperatorID, and the RoamingPartnerOutside field 3711 is a node carrying roaming partner-related information for the local IPDC KMS system and IPDC operator in an area out of the home coverage. Further, the OutsideRoamingIPDCKMSID field 3715 is a node carrying a roaming IPDC KMS system having an IPDCKMSID for a local terminal and indicates the IPDC KMS system having made a roaming agreement with the home (local) IPDC KMS system and operator, the OutsideRoamingIPDCOperatorID field 3717 is a node carrying a roaming IPDC operator having an IPDCOperatorID for a local terminal and indicates the IPDC operator having made a roaming agreement with the home (local) IPDC operator, the ESGEntryPoint field 3719 is a node carrying ESG bootstrap-related information, and the ESGEntryPointURL field 3723 is a node indicating an entry point URL for requiring ESG bootstrap information through an interactive network. Further, the EntryPointAttri field 3725 is a node carrying characteristic information of an entry point, the ESG field 3729 is a node carrying ESG-related information, the ESGURI field 3733 is a node indicating an ESGURI that can be found within the ESG bootstrap, the ESGProvider field 3735 is a node carrying ESG provider-related information, the ESGProviderURI field 3739 is a node carrying a URI identifying an ESG provider, the AreaParameters field 3741 is a node carrying area-related parameters, the AreaParameter field 3745 is a node carrying area-related parameters, such as network ID, cell ID, MCC, MNC, GPS, and nation code, the NetworkInfos field 3747 is a node carrying network-related information, the NetworkInfo field 3751 is a node carrying network-related parameters, such as network type and network ID, the IPPlatform field 3753 is a node carrying IP platform-related information, the IPPlatformID field 3757 is a node carrying an IP platform identifier (ID), the Tuning parameters field 3759 is a node carrying related tuning-related information, the Tuning parameter field 3763 is a node carrying related tuning parameters, and the Ext field 3765 or 3767 is a node for addition or extension.

Table 504 shows the above-mentioned node <x> in more detail.

TABLE 504

| | |
|---|---|
| Status | Required |
| Occurrence | ZeroOrMore |
| Format | Node |
| Min.Access Types | Get |
| Value | N/A |

Table 505 shows the above-mentioned node <x>/IPDC/ in more detail.

TABLE 505

| | |
|---|---|
| Status | Required |
| Occurrence | ZeroOrOne |
| Format | Node |

TABLE 505-continued

| | |
|---|---|
| Min.Access Types | Get |
| Value | N/A |

Table 506 below shows the above-mentioned node <x>/IPDC/<x> in more detail.

TABLE 506

| | |
|---|---|
| Status | Required |
| Occurrence | OneOrMore |
| Format | Node |
| Min.Access Types | Get |
| Value | N/A |

Table 507 below shows the above-mentioned node <x>/IPDC/<x>/LocalIPDCKMSID/ in more detail.

TABLE 507

| | |
|---|---|
| Status | Required |
| Occurrence | One |
| Format | Node |
| Min.Access Types | Get |
| Value | Local IPDC KMS identifier |

Table 508 below shows the above-mentioned node <x>/IPDC/<x>/LocalIPDCKMSID/LocalIPDCOperatorID/ in more detail.

TABLE 508

| | |
|---|---|
| Status | Required |
| Occurrence | One |
| Format | Chr |
| Min.Access Types | Get |
| Value | Local IPDC operator identifier |

Table 509 shows the above-mentioned node <x>/IPDC/<x>/RoamingPartnerOutside/ in more detail.

TABLE 509

| | |
|---|---|
| Status | Required |
| Occurrence | ZeroOrOne |
| Format | Node |
| Min.Access Types | Get |
| Value | N/A |

Table 510 below shows the above-mentioned node <x>/IPDC/<x>/RoamingPartnerOutside/<x> in more detail.

TABLE 510

| | |
|---|---|
| Status | Required |
| Occurrence | OneOrMore |
| Format | Node |
| Min.Access Types | Get |
| Value | N/A |

Table 511 below shows the above-mentioned node <x>/IPDC/<x>/RoamingPartnerOutside/<x>/OutsideRoamingIPDCKMSID/ in more detail.

TABLE 511

| | |
|---|---|
| Status | Required |
| Occurrence | One |

TABLE 511-continued

| | |
|---|---|
| Format | Node |
| Min.Access Types | Get |
| Value | IPDC KMS identifier of the Roaming partner |

Table 512 shows the above-mentioned node <x>/IPDC/<x>/RoamingPartnerOutside/<x>/OutsideRoamingIPDCKMSID/OutsideRoaming IPDCOperatorID/ in more detail.

TABLE 512

| | |
|---|---|
| Status | Required |
| Occurrence | One |
| Format | Chr |
| Min.Access Types | Get |
| Value | IPDC operator identifier of the Roaming partner |

Table 513 below shows the above-mentioned node <x>/IPDC/<x>/RoamingPartnerOutside/<x>/ESGEntryPoint/ in more detail.

TABLE 513

| | |
|---|---|
| Status | Required |
| Occurrence | ZeroOrOne |
| Format | Node |
| Min.Access Types | Get |
| Value | N/A |

Table 514 shows the above-mentioned node <x>/IPDC/<x>/RoamingPartnerOutside/<x>/ESGBootstrapEntryPoint/<x> in more detail.

TABLE 514

| | |
|---|---|
| Status | Required |
| Occurrence | OneOrMore |
| Format | Node |
| Min.Access Types | Get |
| Value | N/A |

Table 515 shows the above-mentioned node <x>/IPDC/<x>/RoamingPartnerOutside/<x>/ESGBootstrapEntryPoint/<x>/ESGEntryPointURL/in more detail.

TABLE 515

| | |
|---|---|
| Status | Required |
| Occurrence | One |
| Format | Chr |
| Min.Access Types | Get |
| Value | URL to the Entry Point to request ESG over interactive Network |

Table 516 below shows the above-mentioned node <x>/IPDC/<x>/RoamingPartnerOutside/<x>/ESGBootstrapEntryPoint/<x>/EntryPointAttri/in more detail.

TABLE 516

| | |
|---|---|
| Status | Required |
| Occurrence | ZeroOrOne |
| Format | Node |
| Min.Access Types | Get |
| Value | N/A |

Table 517 below shows the above-mentioned node <x>/IPDC/<x>/RoamingPartnerOutside/<x>/ESGBootstrapEntryPoint/<x>/EntryPointAttri/<x> in more detail.

TABLE 517

| | |
|---|---|
| Status | Required |
| Occurrence | OneOrMore |
| Format | Node |
| Min.Access Types | Get |
| Value | N/A |

Table 518 below shows the above-mentioned node <x>/IPDC/<x>/RoamingPartnerOutside/<x>/ESGBootstrapEntryPoint/<x>/EntryPointAttri/<x>/ESG/ in more detail.

TABLE 518

| | |
|---|---|
| Status | Optional |
| Occurrence | ZeroOrOne |
| Format | node |
| Min.Access Types | Get |
| Value | N/A |

Table 519 shows the above-mentioned node <x>/IPDC/<x>/RoamingPartnerOutside/<x>/ESGBootstrapEntryPoint/<x>/EntryPointAttri/<x>/ESG/<x> in more detail.

TABLE 519

| | |
|---|---|
| Status | Optional |
| Occurrence | OneOrMore |
| Format | node |
| Min.Access Types | Get |
| Value | N/A |

Table 520 below shows the above-mentioned node <x>/IPDC/<x>/RoamingPartnerOutside/<x>/ESGBootstrapEntryPoint/<x>/EntryPointAttri/<x>/ESG/<x>/ESGURI/ in more detail.

TABLE 520

| | |
|---|---|
| Status | Optional |
| Occurrence | One |
| Format | Chr |
| Min.Access Types | Get |
| Value | ESG identifier |

Table 521 below shows the above-mentioned node <x>/IPDC/<x>/RoamingPartnerOutside/<x>/ESGBootstrapEntryPoint/<x>/EntryPointAttri/<x>/ESGProvider/ in more detail.

TABLE 521

| | |
|---|---|
| Status | Optional |
| Occurrence | ZeroOrOne |
| Format | node |
| Min.Access Types | Get |
| Value | N/A |

Table 522 shows the above-mentioned node <x>/IPDC/<x>/RoamingPartnerOutside/<x>/ESGBootstrapEntryPoint/<x>/EntryPointAttri/<x>/ESGProvider/<x> in more detail.

TABLE 522

| | |
|---|---|
| Status | Optional |
| Occurrence | OneOrMore |
| Format | node |
| Min.Access Types | Get |
| Value | N/A |

Table 523 below shows the above-mentioned node <x>/IPDC/<x>/RoamingPartnerOutside/<x>/ESGBootstrapEntryPoint/<x>/EntryPointAttri/<x>/ESGProvider/<x>/ESGProviderURI/ in more detail.

TABLE 523

| | |
|---|---|
| Status | Optional |
| Occurrence | One |
| Format | Chr |
| Min.Access Types | Get |
| Value | ESG Provider identifier |

Table 524 shows the above-mentioned node <x>/IPDC/<x>/RoamingPartnerOutside/<x>/ESGBootstrapEntryPoint/<x>/EntryPointAttri/<x>/AreaParameters/ in more detail.

TABLE 524

| | |
|---|---|
| Status | Optional |
| Occurrence | ZeroOrOne |
| Format | node |
| Min.Access Types | Get |
| Value | N/A |

Table 525 shows the above-mentioned node <x>/IPDC/<x>/RoamingPartnerOutside/<x>/ESGBootstrapEntryPoint/<x>/EntryPointAttri/<x>/AreaParameters/<x> in more detail.

TABLE 525

| | |
|---|---|
| Status | Optional |
| Occurrence | OneOrMore |
| Format | node |
| Min.Access Types | Get |
| Value | N/A |

Table 526 below shows the above-mentioned node <x>/IPDC/<x>/RoamingPartnerOutside/<x>/ESGBootstrapEntryPoint/<x>/EntryPointAttri/<x>/AreaParameters/<x>/AreaParameter/ in more detail.

TABLE 526

| | |
|---|---|
| Status | Optional |
| Occurrence | One |
| Format | Chr |
| Min.Access Types | Get |
| Value | Area identifier |

Table 527 below shows the above-mentioned node <x>/IPDC/<x>/RoamingPartnerOutside/<x>/ESGBootstrapEntryPoint/<x>/EntryPointAttri/<x>/NetworkInfos/ in more detail.

TABLE 527

| | |
|---|---|
| Status | Optional |
| Occurrence | ZeroOrOne |
| Format | node |
| Min.Access Types | Get |
| Value | N/A |

Table 528 below shows the above-mentioned node <x>/IPDC/<x>/RoamingPartnerOutside/<x>/ESGBootstrapEntryPoint/<x>/EntryPointAttri/<x>/NetworkInfos/<x> in more detail.

TABLE 528

| | |
|---|---|
| Status | Optional |
| Occurrence | OneOrMore |
| Format | node |
| Min.Access Types | Get |
| Value | N/A |

Table 529 shows the above-mentioned node <x>/IPDC/<x>/RoamingPartnerOutside/<x>/ESGBootstrapEntryPoint/<x>/EntryPointAttri/<x>/NetworkInfos/<x>/NetworkInfo/ in more detail.

TABLE 529

| | |
|---|---|
| Status | Optional |
| Occurrence | One |
| Format | Chr |
| Min.Access Types | Get |
| Value | Network information |

Table 530 below shows the above-mentioned node <x>/IPDC/<x>/RoamingPartnerOutside/<x>/ESGBootstrapEntryPoint/<x>/EntryPointAttri/<x>/IPPlatform/ in more detail.

TABLE 530

| | |
|---|---|
| Status | Optional |
| Occurrence | ZeroOrOne |
| Format | node |
| Min.Access Types | Get |
| Value | N/A |

Table 531 below shows the above-mentioned node <x>/IPDC/<x>/RoamingPartnerOutside/<x>/ESGBootstrapEntryPoint/<x>/EntryPointAttri/<x>/IPPlatform/<x> in more detail.

TABLE 531

| | |
|---|---|
| Status | Optional |
| Occurrence | OneOrMore |
| Format | node |
| Min.Access Types | Get |
| Value | N/A |

Table 532 shows the above-mentioned node <x>/IPDC/<x>/RoamingPartnerOutside/<x>/ESGBootstrapEntryPoint/<x>/EntryPointAttri/<x>/IPPlatform/<x>/IPPlatformID/ in more detail.

TABLE 532

| | |
|---|---|
| Status | Optional |
| Occurrence | One |
| Format | Chr |
| Min.Access Types | Get |
| Value | IP platform identifier |

Table 533 below shows the above-mentioned node <x>/IPDC/<x>/RoamingPartnerOutside/<x>/ESGBootstrapEntryPoint/<x>/EntryPointAttri/<x>/Tuningparameters/ in more detail.

TABLE 533

| | |
|---|---|
| Status | Optional |
| Occurrence | ZeroOrOne |
| Format | node |

TABLE 533-continued

| Min.Access Types | Get |
| Value | N/A |

Table 534 shows the above-mentioned node <x>/IPDC/<x>/RoamingPartnerOutside/<x>/ESGBootstrapEntryPoint/<x>/EntryPointAttri/<x>/Tuningparameters/<x> in more detail.

TABLE 534

| Status | Optional |
| Occurrence | OneOrMore |
| Format | node |
| Min.Access Types | Get |
| Value | N/A |

Table 535 shows the above-mentioned node <x>/IPDC/<x>/RoamingPartnerOutside/<x>/ESGBootstrapEntryPoint/<x>/EntryPointAttri/<x>/Tuningparameter/<x>/Tuningparameter in more detail.

TABLE 535

| Status | Optional |
| Occurrence | ZeroOrMore |
| Format | Chr |
| Min.Access Types | Get |
| Value | Tuning parameters |

Table 536 below shows the above-mentioned node <x>/IPDC/<x>/RoamingPartnerOutside/<x>/ESGBootstrapEntryPoint/<x>/EntryPointAttri/<x>/Ext/ in more detail.

TABLE 536

| Status | Optional |
| Occurrence | ZeroOrOne |
| Format | Chr |
| Min.Access Types | Get |
| Value | N/A |

Table 537 below shows the above-mentioned node <x>/IPDC/<x>/RoamingPartnerOutside/<x>/Ext/ in more detail.

TABLE 537

| Status | Optional |
| Occurrence | ZeroOrOne |
| Format | Chr |
| Min.Access Types | Get |
| Value | N/A |

Hereinafter, operations of a DM server and a terminal according to the tenth exemplary embodiment of the present invention will be described with reference to FIGS. 38 to 39.

Figure 38:
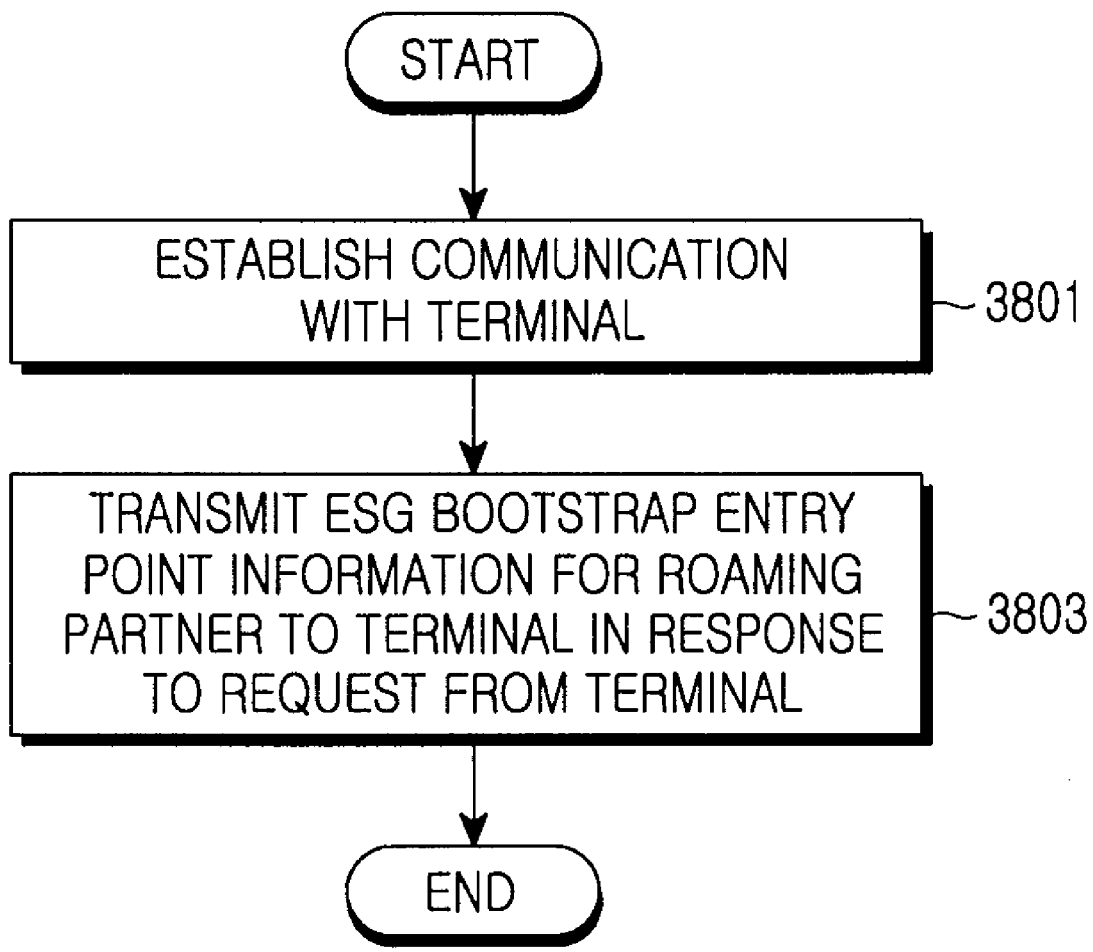
FIG. 38 illustrates an operation of a DM server according to the tenth exemplary embodiment of the present invention.

FIG. 38 illustrates an operation of a DM server according to the tenth exemplary embodiment of the present invention.

The operation of the DM server according to the tenth exemplary embodiment of the present invention, which will be described below, is similar to the operation of the DM server according to the eighth or ninth exemplary embodiment of the present invention Referring to FIG. 38, the DM server establishes communication with the terminal in step 3801, and transmits ESG bootstrap entry point information for a roaming partner to the terminal in response to a request from the terminal in step 3803.

Figure 39:
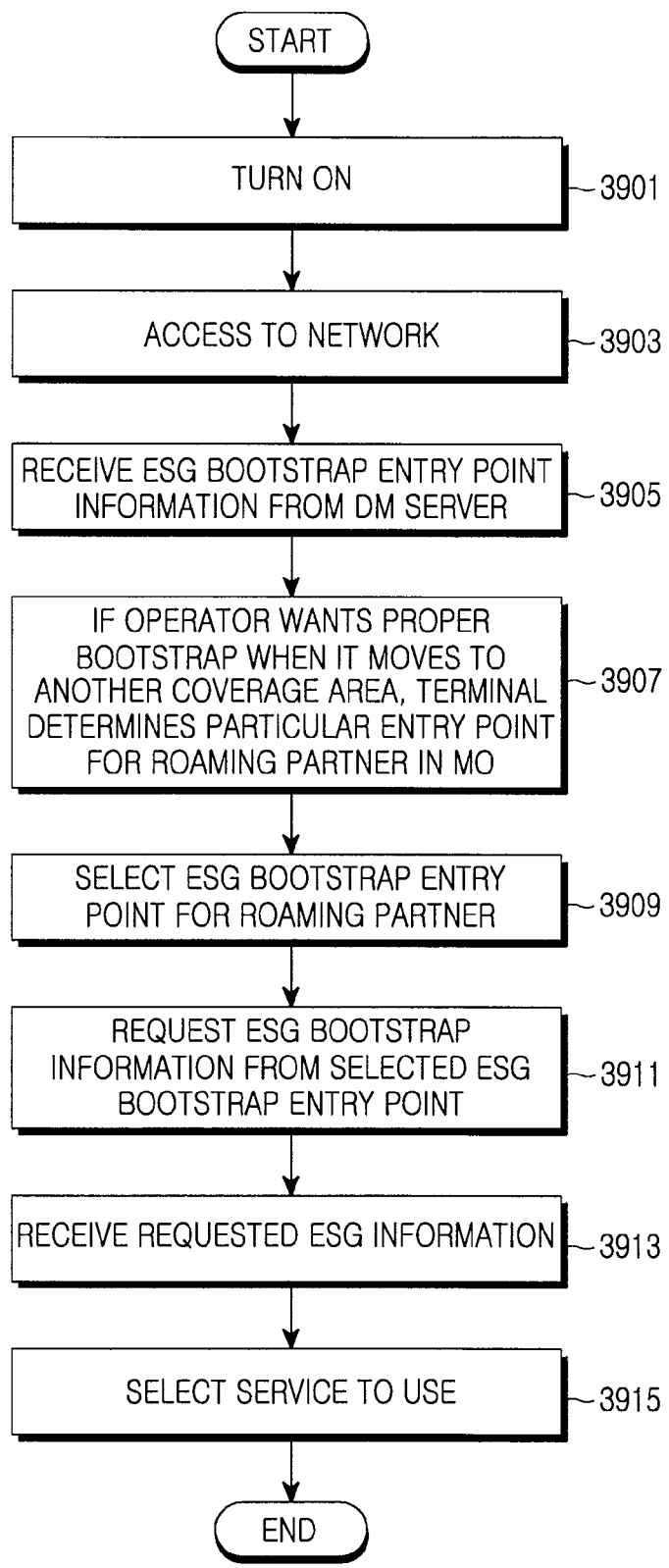
FIG. 39 illustrates an operation of a terminal according to the tenth exemplary embodiment of the present invention.

FIG. 39 illustrates an operation of a terminal according to the tenth exemplary embodiment of the present invention.

Referring to FIG. 39, the terminal turns on in step 3901, and accesses the DM server in step 3903. Then, in step 3905, after the communication is established, the terminal receives the ESG bootstrap entry point information from the DM server. Then, the terminal can search for an ESG bootstrap entry point for its roaming partner within the roaming coverage.

In step 3907, if an operator wants a proper bootstrap when it moves into another coverage area, the terminal determines a particular ESG bootstrap entry point for a roaming partner in the MO. In step 3909, the terminal selects the ESG bootstrap entry point for the roaming partner. In step 3911, the terminal requests ESG information from the selected ESG entry point. In step 3913, the terminal receives proper ESG information for the roaming situation and selects an ESG. As a result, in step 3915, the terminal selects a service that the terminal will access through the selected ESG.

OMA DM Mechanism According to 11$^{th}$ Exemplary Embodiment

The OMA DM can be used either for the bootstrap as described above or for provisioning according to an eleventh exemplary embodiment of the present invention.

An ESG finding mechanism based on stage 1 specification is as follows:

1) A terminal receives a PSI/SI.
2) The terminal selects an IP platform based on enumerated IP platforms in the PSI/SI.
3) The terminal receives an ESG bootstrap for the selected IP platform.
4) The terminal selects an ESG provider from ESG providers enumerated in the ESGProviderDiscovery Descriptor.
5) The terminal selects an ESG from ESGs enumerated in ESGAccessDescriptor of the ESG bootstrap and searches for the ESG.

Since the information on which IP platform, ESG provider, or ESG is proper is omitted, it is possible to provide the terminal with provisioning information. Based on the provisioning information, the terminal can make a decision and can select a proper object to access.

In a roaming scenario, the provisioning information is more important. Therefore, it is possible to provide a provisioning for a roaming scenario also.

Hereinafter, an example of signaling provisioning information by an OMA DM will be described with reference to FIG. 40.

Figure 40:
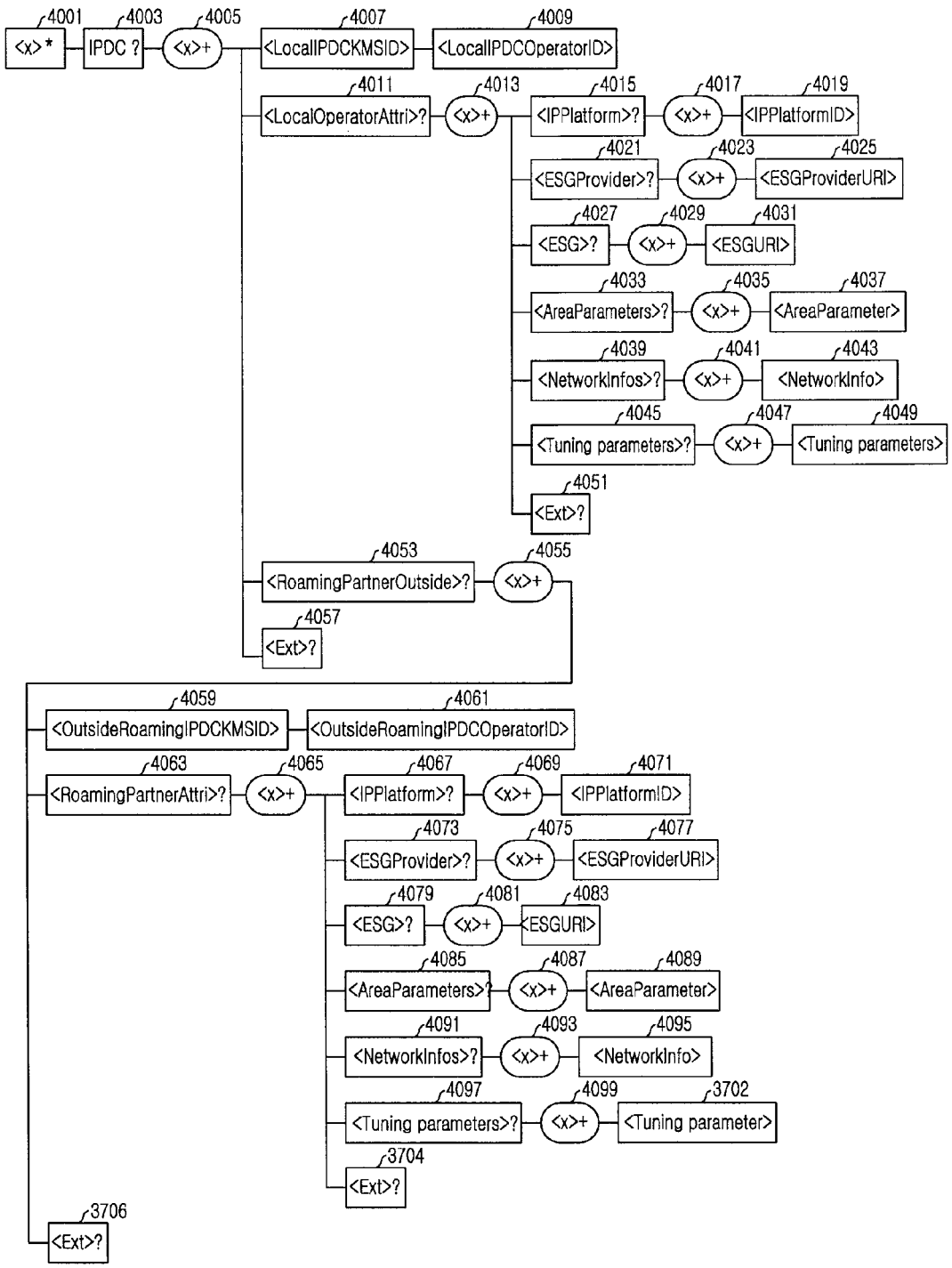
FIG. 40 illustrates an MO of an OMA DM mechanism according to an eleventh exemplary embodiment of the present invention.

FIG. 40 illustrates an MO of an OMA DM mechanism according to an eleventh exemplary embodiment of the present invention.

Referring to FIG. 40, the X field 4001, 4005, 4013, 4017, 4023, 4029, 4035, 4041, 4047, 4055, 4065, 4069, 4075, 4081, 4087, 4093, or 4099 is a node functioning as a placeholder, the IPDC field 4003 is a node for an IPDC terminal, the LocalIPDCKMSID field 4007 is a node for a local terminal having an IPDCKMSID, and the LocalIPDCOperatorID field 4009 is a node for a local terminal having an IPDCOperatorID. Further, the LocalOperatorAttri field 4011 is a node carrying characteristic information on a local IPDC operator, the IPPlatform field 4015 or 4067 is a node carrying IP platform-related information, the IPPlatformID field 4019 or 4071 is a node carrying an IP platform identifier(ID), the ESGProvider field 4021 or 4073 is a node carrying ESG provider-related information, the ESGProviderURI field 4025 or 4077 is a node carrying a URI identifying an ESG provider, the ESG field 4027 or 4079 is a node carrying ESG-related information, the ESGURI field 4031 or 4083 is a node indicating an ESGURI that can be found within the ESG bootstrap, the AreaParameters field 4033 or 4085 is a node carrying area-related parameters, the AreaParameter field 4037 or 4089 is a node carrying area-related parameters, such as network ID, cell ID, MCC, MNC, GPS, and nation code, the NetworkInfos field 4039 or 4091 is a node carrying network-related information, the NetworkInfo field 4043 or 4095 is a node carrying network-related parameters, such as network type (satellite, terrestrial, interactive network, etc.) and network ID, the Tuning parameters field 4045 or 4097 is a node carrying related tuning-related information, the Tuning parameter field 4049 or 3702 is a node carrying related tuning parameters, and the Ext field 4051, 4057, 3704, or 3706 is a node for additional information. Further, the RoamingPartnerOutside field 4053 is a node carrying roaming partner-related information for the local IPDC KMS system and IPDC operator in an area out of the home coverage, the OutsideRoamingIPDCKMSID field 4059 is a node carrying a roaming IPDC KMS system having an IPDCKMSID for a local terminal and indicates the IPDC KMS system having made a roaming agreement with the home (local) IPDC KMS system and operator, the OutsideRoamingIPDCOperatorID field 4061 is a node carrying a roaming IPDC operator having an IPDCOperatorID for a local terminal and indicates the IPDC operator having made a roaming agreement with the home (local) IPDC operator, and the RoamingPartnerAttri field 4063 is a node carrying characteristic information on the roaming partner.

Table 538 below shows the above-mentioned node <x> in more detail.

TABLE 538

| Status | Required |
| --- | --- |
| Occurrence | ZeroOrMore |
| Format | Node |
| Min.Access Types | Get |
| Value | N/A |

Table 539 shows the above-mentioned node <x>/IPDC/ in more detail.

TABLE 539

| Status | Required |
| --- | --- |
| Occurrence | ZeroOrOne |
| Format | Node |
| Min.Access Types | Get |
| Value | N/A |

Table 540 below shows the above-mentioned node <x>/IPDC/<x> in more detail.

TABLE 540

| Status | Required |
| --- | --- |
| Occurrence | OneOrMore |
| Format | Node |
| Min.Access Types | Get |
| Value | N/A |

Table 541 below shows the above-mentioned node <x>/IPDC/<x>/LocalIPDCKMSID/ in more detail.

TABLE 541

| Status | Required |
| --- | --- |
| Occurrence | One |
| Format | Node |
| Min.Access Types | Get |
| Value | Local IPDC KMS identifier |

Table 542 shows the above-mentioned node <x>/IPDC/<x>/LocalIPDCKMSID/LocalIPDCOperatorID/ in more detail.

TABLE 542

| Status | Required |
| --- | --- |
| Occurrence | One |
| Format | Chr |
| Min.Access Types | Get |
| Value | Local IPDC operator identifier |

Table 543 below shows the above-mentioned node <x>/IPDC/<x>/LocalOperatorAttri/ in more detail.

TABLE 543

| Status | Required |
| --- | --- |
| Occurrence | ZeroOrOne |
| Format | Node |
| Min.Access Types | Get |
| Value | N/A |

Table 544 shows the above-mentioned node <x>/IPDC/<x>/LocalOperatorAttri/<x> in more detail.

TABLE 544

| Status | Required |
| --- | --- |
| Occurrence | OneOrMore |
| Format | Node |
| Min.Access Types | Get |
| Value | N/A |

Table 545 shows the above-mentioned node <x>/IPDC/<x>/LocalOperatorAttri/<x>/IPPlatform/ in more detail.

TABLE 545

| Status | Optional |
| --- | --- |
| Occurrence | ZeroOrOne |
| Format | node |
| Min.Access Types | Get |
| Value | N/A |

Table 546 below shows the above-mentioned node <x>/IPDC/<x>/LocalOperatorAttri/<x>/IPPlatform/<x> in more detail.

TABLE 546

| Status | Optional |
| --- | --- |
| Occurrence | OneOrMore |
| Format | node |
| Min.Access Types | Get |
| Value | N/A |

Table 547 below shows the above-mentioned node <x>/IPDC/<x>/LocalOperatorAttri/<x>/IPPlatform/<x>/IPPlatformID in more detail.

TABLE 547

| | |
|---|---|
| Status | Optional |
| Occurrence | One |
| Format | Chr |
| Min.Access Types | Get |
| Value | IP platform identifier |

Table 548 below shows the above-mentioned node <x>/IPDC/<x>/LocalOperatorAttri/<x>/ESGProvider/ in more detail.

TABLE 548

| | |
|---|---|
| Status | Optional |
| Occurrence | ZeroOrOne |
| Format | node |
| Min.Access Types | Get |
| Value | N/A |

Table 549 shows the above-mentioned node <x>/IPDC/<x>/LocalOperatorAttri/<x>/ESGProvider/<x> in more detail.

TABLE 549

| | |
|---|---|
| Status | Optional |
| Occurrence | OneOrMore |
| Format | node |
| Min.Access Types | Get |
| Value | N/A |

Table 550 below shows the above-mentioned node <x>/IPDC/<x>/LocalOperatorAttri/<x>/ESGProvider/<x>/ESGProviderURI in more detail.

TABLE 550

| | |
|---|---|
| Status | Optional |
| Occurrence | One |
| Format | Chr |
| Min.Access Types | Get |
| Value | ESG Provider identifier |

Table 551 below shows the above-mentioned node <x>/IPDC/<x>/LocalOperatorAttri/<x>/EntryPointAttri/<x>/ESG/ in more detail.

TABLE 551

| | |
|---|---|
| Status | Optional |
| Occurrence | ZeroOrOne |
| Format | node |
| Min.Access Types | Get |
| Value | N/A |

Table 552 shows the above-mentioned node <x>/IPDC/<x>/LocalOperatorAttri/<x>/EntryPointAttri/<x>/ESG/<x> in more detail.

TABLE 552

| | |
|---|---|
| Status | Optional |
| Occurrence | OneOrMore |
| Format | node |
| Min.Access Types | Get |
| Value | N/A |

Table 553 below shows the above-mentioned node <x>/IPDC/<x>/LocalOperatorAttri/<x>/EntryPointAttri/<x>/ESG/<x>/ESGURI in more detail.

TABLE 553

| | |
|---|---|
| Status | Optional |
| Occurrence | One |
| Format | Chr |
| Min.Access Types | Get |
| Value | ESG identifier |

Table 554 shows the above-mentioned node <x>/IPDC/<x>/LocalOperatorAttri/<x>/EntryPointAttri/<x>/AreaParameter/ in more detail.

TABLE 554

| | |
|---|---|
| Status | Optional |
| Occurrence | ZeroOrOne |
| Format | node |
| Min.Access Types | Get |
| Value | N/A |

Table 555 shows the above-mentioned node <x>/IPDC/<x>/LocalOperatorAttri/<x>/EntryPointAttri/<x>/AreaParameter/<x> in more detail.

TABLE 555

| | |
|---|---|
| Status | Optional |
| Occurrence | OneOrMore |
| Format | node |
| Min.Access Types | Get |
| Value | N/A |

Table 556 below shows the above-mentioned node <x>/IPDC/<x>/LocalOperatorAttri/<x>/EntryPointAttri/<x>/AreaParameter/<x>/AreaParameter/in more detail.

TABLE 556

| | |
|---|---|
| Status | Optional |
| Occurrence | One |
| Format | Chr |
| Min.Access Types | Get |
| Value | Area identifier |

Table 557 below shows the above-mentioned node <x>/IPDC/<x>/LocalOperatorAttri/<x>/EntryPointAttri/<x>/NetworkInfo/ in more detail.

TABLE 557

| | |
|---|---|
| Status | Optional |
| Occurrence | ZeroOrOne |
| Format | node |
| Min.Access Types | Get |
| Value | N/A |

Table 558 shows the above-mentioned node <x>/IPDC/<x>/LocalOperatorAttri/<x>/EntryPointAttri/<x>/NetworkInfo/<x> in more detail.

TABLE 558

| | |
|---|---|
| Status | Optional |
| Occurrence | OneOrMore |
| Format | node |
| Min.Access Types | Get |
| Value | N/A |

Table 559 below shows the above-mentioned node <x>/IPDC/<x>/LocalOperatorAttri/<x>/EntryPointAttri/<x>/NetworkInfo/<x>/NetworkInfo/in more detail.

TABLE 559

| | |
|---|---|
| Status | Optional |
| Occurrence | One |
| Format | Chr |
| Min.Access Types | Get |
| Value | Network information |

Table 560 below shows the above-mentioned node <x>/IPDC/<x>/LocalOperatorAttri/<x>/EntryPointAttri/<x>/Tuningparameter/ in more detail.

TABLE 560

| | |
|---|---|
| Status | Optional |
| Occurrence | ZeroOrOne |
| Format | node |
| Min.Access Types | Get |
| Value | N/A |

Table 561 shows the above-mentioned node <x>/IPDC/<x>/LocalOperatorAttri/<x>/EntryPointAttri/<x>/Tuningparameter/<x> in more detail.

TABLE 561

| | |
|---|---|
| Status | Optional |
| Occurrence | OneOrMore |
| Format | node |
| Min.Access Types | Get |
| Value | N/A |

Table 562 below shows the above-mentioned node <x>/IPDC/<x>/LocalOperatorAttri/<x>/EntryPointAttri/<x>/Tuningparameter/<x>/Tuningparameter/in more detail.

TABLE 562

| | |
|---|---|
| Status | Optional |
| Occurrence | ZeroOrMore |
| Format | Chr |
| Min.Access Types | Get |
| Value | Tuning parameters |

Table 563 shows the above-mentioned node <x>/IPDC/<x>/LocalOperatorAttri/<x>/EntryPointAttri/<x>/Ext/ in more detail.

TABLE 563

| | |
|---|---|
| Status | Optional |
| Occurrence | ZeroOrOne |
| Format | Chr |
| Min.Access Types | Get |
| Value | N/A |

Table 564 shows the above-mentioned node <x>/IPDC/<x>/RoamingPartnerOutside/ in more detail.

TABLE 564

| | |
|---|---|
| Status | Required |
| Occurrence | ZeroOrOne |
| Format | Node |
| Min.Access Types | Get |
| Value | N/A |

Table 565 below shows the above-mentioned node <x>/IPDC/<x>/RoamingPartnerOutside/<x> in more detail.

TABLE 565

| | |
|---|---|
| Status | Required |
| Occurrence | OneOrMore |
| Format | Node |
| Min.Access Types | Get |
| Value | N/A |

Table 566 below shows the above-mentioned node <x>/IPDC/<x>/RoamingPartnerOutside/<x>/OutsideRoamingIPDCKMSID/ in more detail.

TABLE 566

| | |
|---|---|
| Status | Required |
| Occurrence | One |
| Format | Node |
| Min.Access Types | Get |
| Value | IPDC KMS identifier of the Roaming partner |

Table 567 below shows the above-mentioned node <x>/IPDC/<x>/RoamingPartnerOutside/<x>/OutsideRoamingIPDCKMSID/OutsideRoamingIPDCOperatorID/in more detail.

TABLE 567

| | |
|---|---|
| Status | Required |
| Occurrence | One |
| Format | Chr |
| Min.Access Types | Get |
| Value | IPDC operator identifier of the Roaming partner |

Table 568 shows the above-mentioned node <x>/IPDC/<x>/RoamingPartnerAttri/ in more detail.

TABLE 568

| | |
|---|---|
| Status | Required |
| Occurrence | ZeroOrOne |
| Format | Node |
| Min.Access Types | Get |
| Value | N/A |

Table 569 below shows the above-mentioned node <x>/IPDC/<x>/RoamingPartnerAttri/<x> in more detail.

TABLE 569

| | |
|---|---|
| Status | Required |
| Occurrence | OneOrMore |
| Format | Node |
| Min.Access Types | Get |
| Value | N/A |

Table 570 below shows the above-mentioned node <x>/IPDC/<x>/RoamingPartnerAttri/<x>/IPPlatform/ in more detail.

TABLE 570

| | |
|---|---|
| Status | Optional |
| Occurrence | ZeroOrOne |
| Format | node |
| Min.Access Types | Get |
| Value | N/A |

Table 571 shows the above-mentioned node <x>/IPDC/<x>/RoamingPartnerAttri/<x>/IPPlatform/<x> in more detail.

TABLE 571

| | |
|---|---|
| Status | Optional |
| Occurrence | OneOrMore |
| Format | node |
| Min.Access Types | Get |
| Value | N/A |

Table 572 below shows the above-mentioned node <x>/IPDC/<x>/RoamingPartnerAttri/<x>/IPPlatform/<x>/IPPlatformID in more detail.

TABLE 572

| | |
|---|---|
| Status | Optional |
| Occurrence | One |
| Format | Chr |
| Min.Access Types | Get |
| Value | IP platform identifier |

Table 573 shows the above-mentioned node <x>/IPDC/<x>/RoamingPartnerAttri/<x>/ESGProvider/ in more detail.

TABLE 573

| | |
|---|---|
| Status | Optional |
| Occurrence | ZeroOrOne |
| Format | node |
| Min.Access Types | Get |
| Value | N/A |

Table 574 shows the above-mentioned node <x>/IPDC/<x>/RoamingPartnerAttri/<x>/ESGProvider/<x> in more detail.

TABLE 574

| | |
|---|---|
| Status | Optional |
| Occurrence | OneOrMore |
| Format | node |
| Min.Access Types | Get |
| Value | N/A |

Table 575 below shows the above-mentioned node <x>/IPDC/<x>/RoamingPartnerAttri/<x>/ESGProvider/<x>/ESGProviderURI in more detail.

TABLE 575

| | |
|---|---|
| Status | Optional |
| Occurrence | One |
| Format | Chr |
| Min.Access Types | Get |
| Value | ESG Provider identifier |

Table 576 below shows the above-mentioned node <x>/IPDC/<x>/RoamingPartnerAttri/<x>/EntryPointAttri/<x>/ESG/ in more detail.

TABLE 576

| | |
|---|---|
| Status | Optional |
| Occurrence | ZeroOrOne |
| Format | node |
| Min.Access Types | Get |
| Value | N/A |

Table 577 below shows the above-mentioned node <x>/IPDC/<x>/RoamingPartnerAttri/<x>/EntryPointAttri/<x>/ESG/<x> in more detail.

TABLE 577

| | |
|---|---|
| Status | Optional |
| Occurrence | OneOrMore |
| Format | node |
| Min.Access Types | Get |
| Value | N/A |

Table 578 shows the above-mentioned node <x>/IPDC/<x>/RoamingPartnerAttri/<x>/EntryPointAttri/<x>/ESG/<x>/ESGURI in more detail.

TABLE 578

| | |
|---|---|
| Status | Optional |
| Occurrence | One |
| Format | Chr |
| Min.Access Types | Get |
| Value | ESG identifier |

Table 579 below shows the above-mentioned node <x>/IPDC/<x>/RoamingPartnerAttri/<x>/EntryPointAttri/<x>/AreaParameter/ in more detail.

TABLE 579

| | |
|---|---|
| Status | Optional |
| Occurrence | ZeroOrOne |
| Format | node |
| Min.Access Types | Get |
| Value | N/A |

Table 580 below shows the above-mentioned node <x>/IPDC/<x>/RoamingPartnerAttri/<x>/EntryPointAttri/<x>/AreaParameter/<x> in more detail.

TABLE 580

| | |
|---|---|
| Status | Optional |
| Occurrence | OneOrMore |
| Format | node |
| Min.Access Types | Get |
| Value | N/A |

Table 581 shows the above-mentioned node <x>/IPDC/<x>/RoamingPartnerAttri/<x>/EntryPointAttri/<x>/AreaParameter/<x>/AreaParameter in more detail.

TABLE 581

| | |
|---|---|
| Status | Optional |
| Occurrence | One |
| Format | Chr |
| Min.Access Types | Get |
| Value | Area identifier |

Table 582 below shows the above-mentioned node <x>/IPDC/<x>/RoamingPartnerAttri/<x>/EntryPointAttri/<x>/NetworkInfo/ in more detail.

TABLE 582

| | |
|---|---|
| Status | Optional |
| Occurrence | ZeroOrOne |
| Format | node |

Table 583 shows the above-mentioned node <x>/IPDC/<x>/RoamingPartnerAttri/<x>/EntryPointAttri/<x>/NetworkInfo/<x> in more detail.

TABLE 583

| Status | Optional |
|---|---|
| Occurrence | OneOrMore |
| Format | node |
| Min.Access Types | Get |
| Value | N/A |

Table 584 shows the above-mentioned node <x>/IPDC/<x>/RoamingPartnerAttri/<x>/EntryPointAttri/<x>/NetworkInfo/<x>/NetworkInfo in more detail.

TABLE 584

| Status | Optional |
|---|---|
| Occurrence | One |
| Format | Chr |
| Min.Access Types | Get |
| Value | Network information |

Table 585 below shows the above-mentioned node <x>/IPDC/<x>/RoamingPartnerAttri/<x>/EntryPointAttri/<x>/Tuningparameter/ in more detail.

TABLE 585

| Status | Optional |
|---|---|
| Occurrence | ZeroOrOne |
| Format | node |
| Min.Access Types | Get |
| Value | N/A |

Table 586 below shows the above-mentioned node <x>/IPDC/<x>/RoamingPartnerAttri/<x>/EntryPointAttri/<x>/Tuningparameter/<x> in more detail.

TABLE 586

| Status | Optional |
|---|---|
| Occurrence | OneOrMore |
| Format | node |
| Min.Access Types | Get |
| Value | N/A |

Table 587 below shows the above-mentioned node <x>/IPDC/<x>/RoamingPartnerAttri/<x>/EntryPointAttri/<x>/Tuningparameter/<x>/Tuningparameter/in more detail.

TABLE 587

| Status | Optional |
|---|---|
| Occurrence | ZeroOrMore |
| Format | Chr |
| Min.Access Types | Get |
| Value | Tuning parameters |

Table 588 shows the above-mentioned node <x>/IPDC/<x>/RoamingPartnerAttri/<x>/EntryPointAttri/<x>/Ext/ in more detail.

TABLE 588

| Status | Optional |
|---|---|
| Occurrence | ZeroOrOne |
| Format | Chr |
| Min.Access Types | Get |
| Value | N/A |

Table 589 below shows the above-mentioned node <x>/IPDC/<x>/RoamingPartnerOutside/<x>/Ext/ in more detail.

TABLE 589

| Status | Optional |
|---|---|
| Occurrence | ZeroOrOne |
| Format | Chr |
| Min.Access Types | Get |
| Value | N/A |

Table 590 below shows the above-mentioned node <x>/IPDC/<x>/Ext/in more detail.

TABLE 590

| Status | Optional |
|---|---|
| Occurrence | ZeroOrOne |
| Format | Chr |
| Min.Access Types | Get |
| Value | N/A |

Based on the provisioning information described above, the terminal may query a proper ESG bootstrap entry point, ESG bootstrap information, ESG bootstrap descriptor, ESG, ESG subset, ESG fragment, service bundle, service, etc.

Figure 41A:
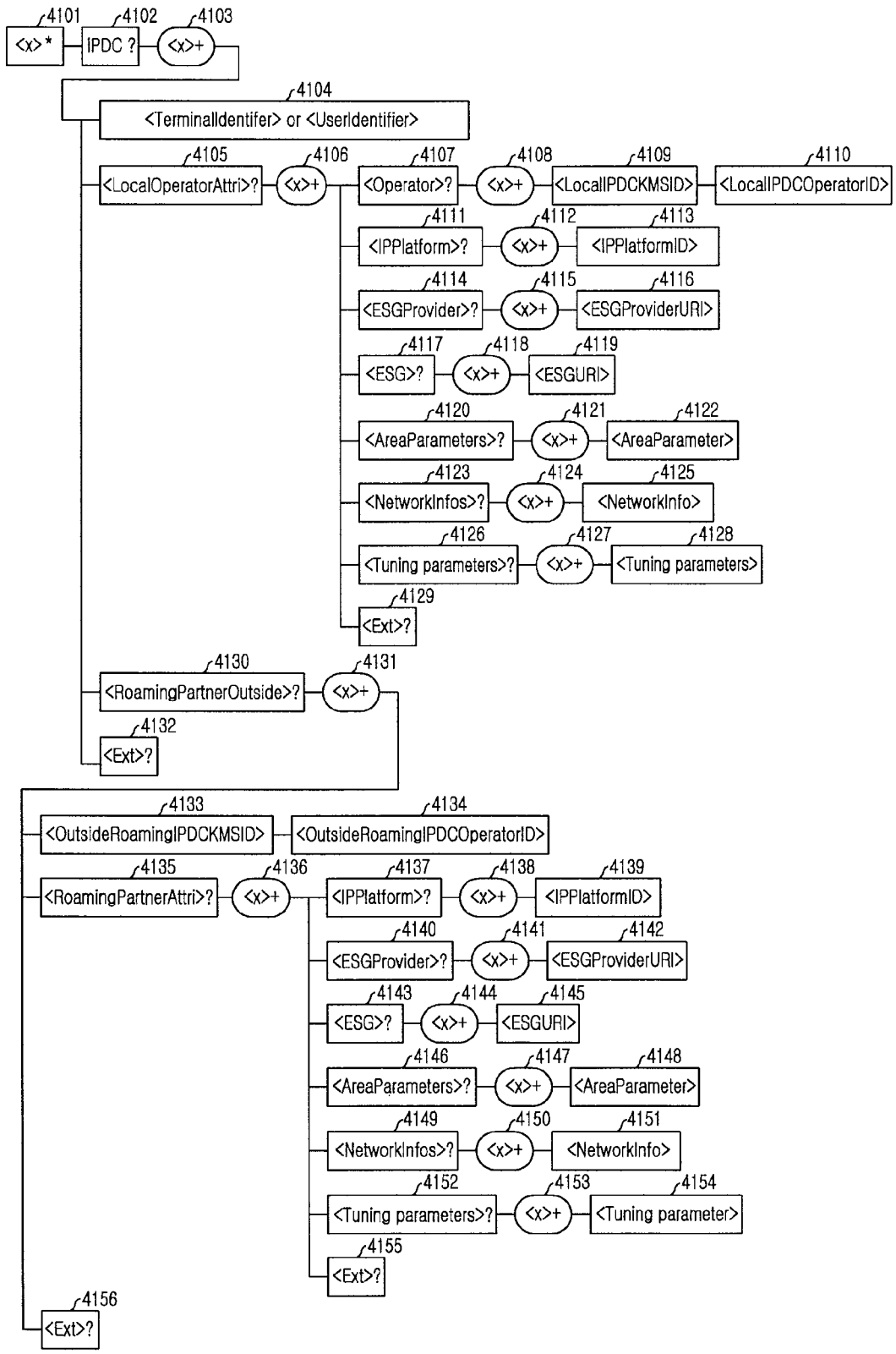
FIGS. 41A and 41B illustrate MOs of other OMA DM mechanisms according to the eleventh exemplary embodiment of the present invention.
Figure 41B:
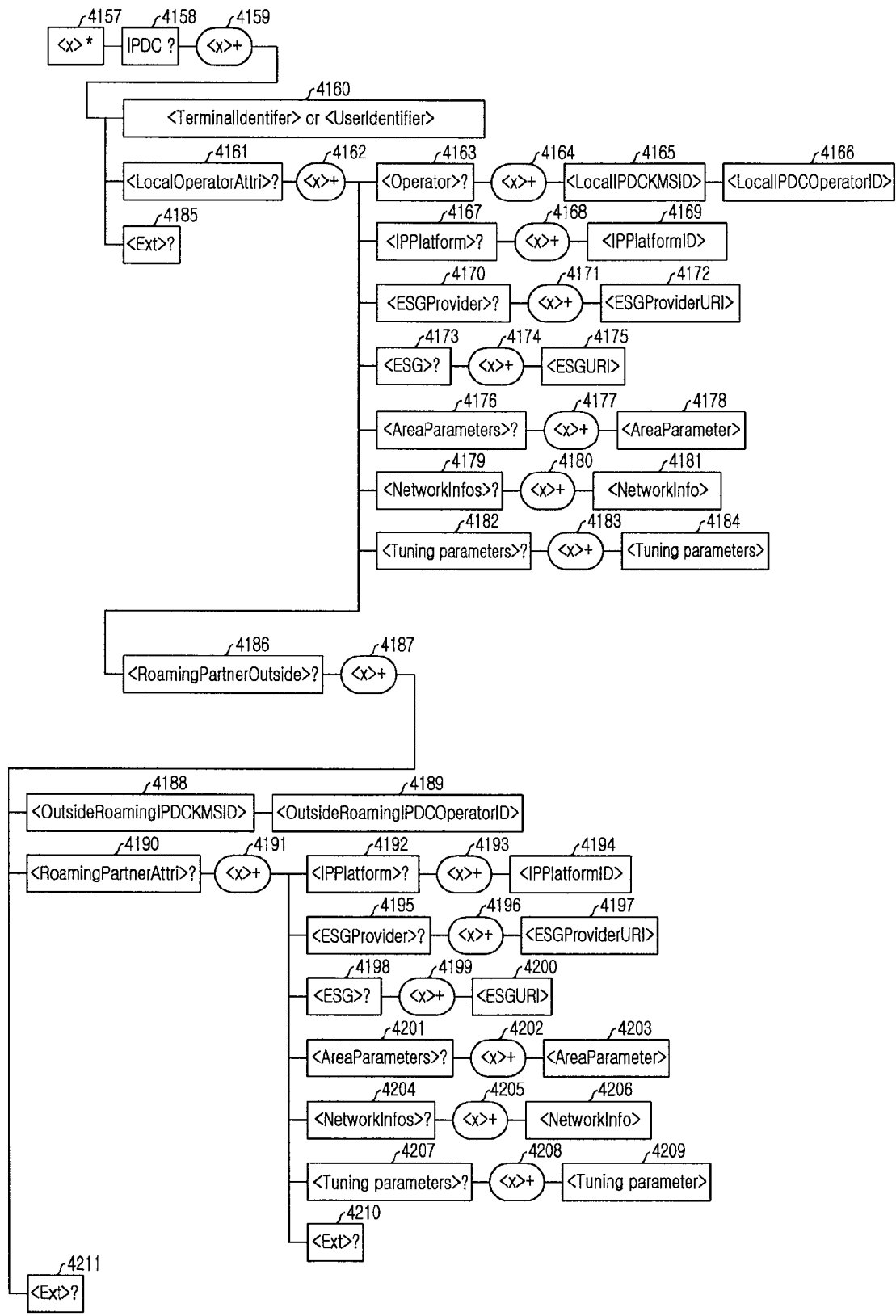

If a terminal or user ID is provided, and if the provisioning for another terminal or user is different, an MO of a mechanism with respect to the different provisioning for another terminal or user may have a construction as illustrated in FIGS. 41A and 41B.

FIGS. 41A and 41B illustrate other examples of an MO of an OMA DM mechanism according to an eleventh exemplary embodiment of the present invention.

Referring to FIGS. 41A and 41B, fields indicated by reference numerals 4101 to 4261 are nodes performing substantially the same functions as the fields described above in the other exemplary embodiments of the present invention.

Hereinafter, operations of a DM server and a terminal according to the eleventh exemplary embodiment of the present invention will be described with reference to FIGS. 42 and 43.

Figure 42:
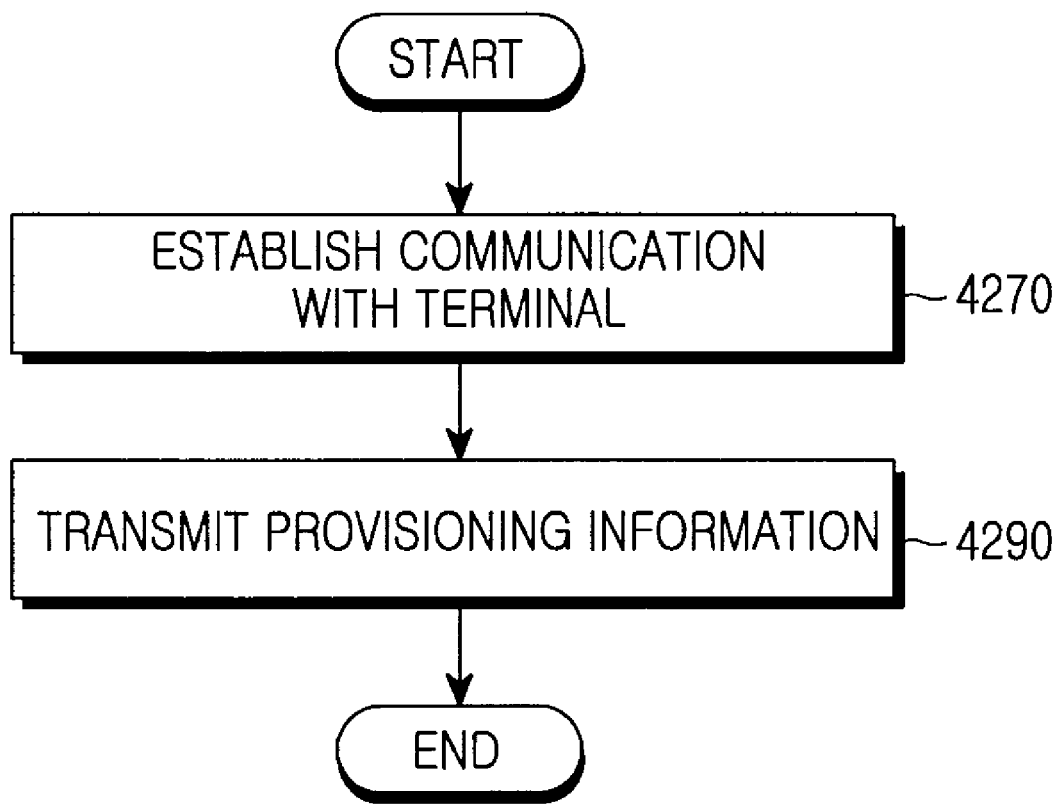
FIG. 42 illustrates an operation of a DM server according to the eleventh exemplary embodiment of the present invention.

FIG. 42 illustrates an operation of a DM server according to the eleventh exemplary embodiment of the present invention.

Referring to FIG. 42, the DM server establishes communication with the terminal in step 4270, and transmits provisioning information to the terminal in step 4290.

Figure 43:
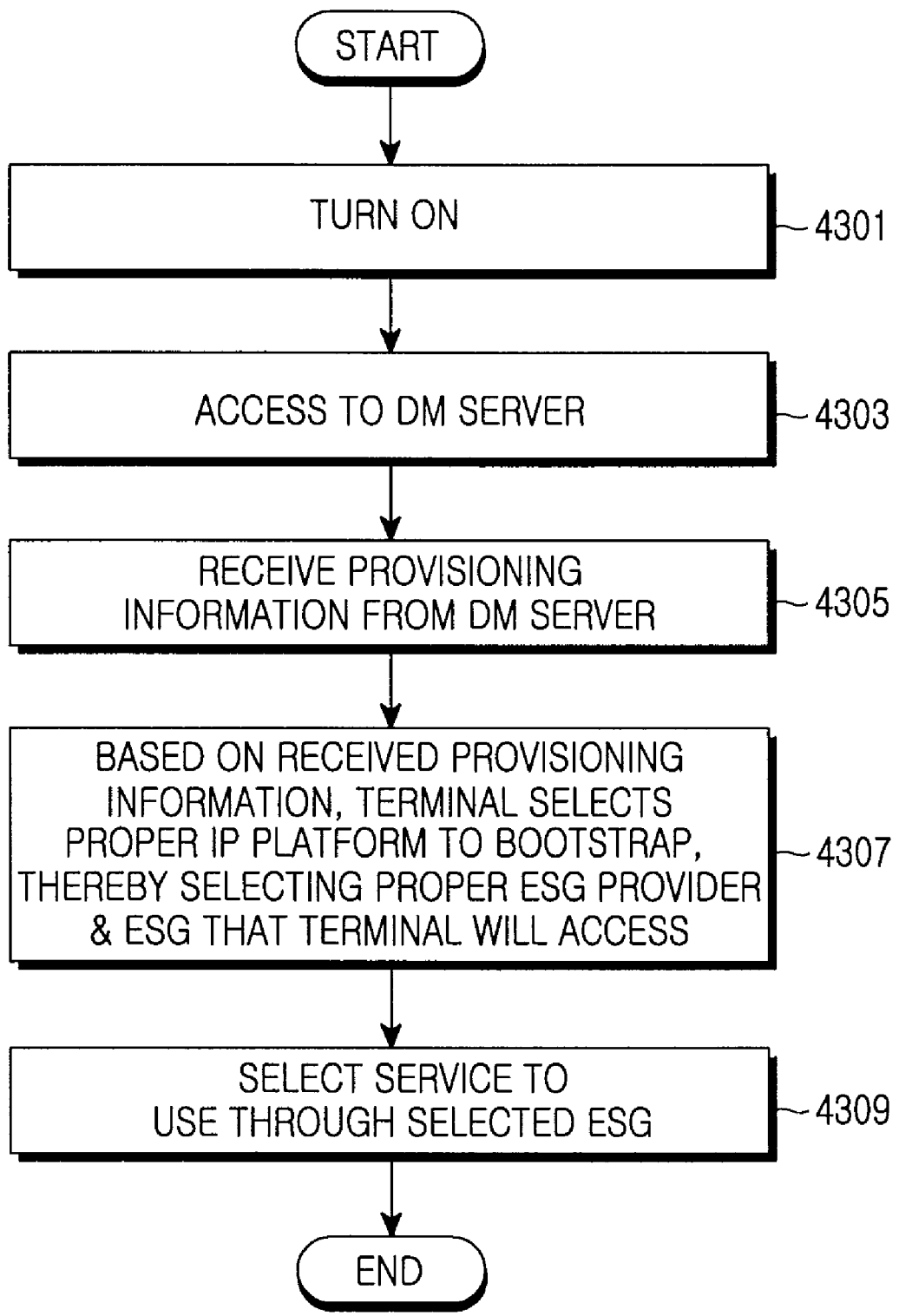
FIG. 43 illustrates an operation of a terminal according to the eleventh exemplary embodiment of the present invention.

FIG. 43 illustrates an operation of a terminal according to the eleventh exemplary embodiment of the present invention.

Referring to FIG. 43, the terminal turns on in step 4301, and accesses the DM server in step 4303. In step 4305, the terminal receives provisioning information from the DM server. In step 4307, based on the received provisioning information, the terminal selects a proper IP platform to the bootstrap, thereby selecting a proper ESG provider and ESG that the terminal will access. In step 4309, the terminal selects a service that the terminal will use through the selected ESG.

OMA DM Mechanism According to 12th Exemplary Embodiment

An OMA DM mechanism according to a twelfth exemplary embodiment of the present invention enables discovery of an ESG entry point using an OMA DM. One MO is defined for ESG discovery from a roaming partner.

1. 1st OMA DM Mechanism

Figure 44:
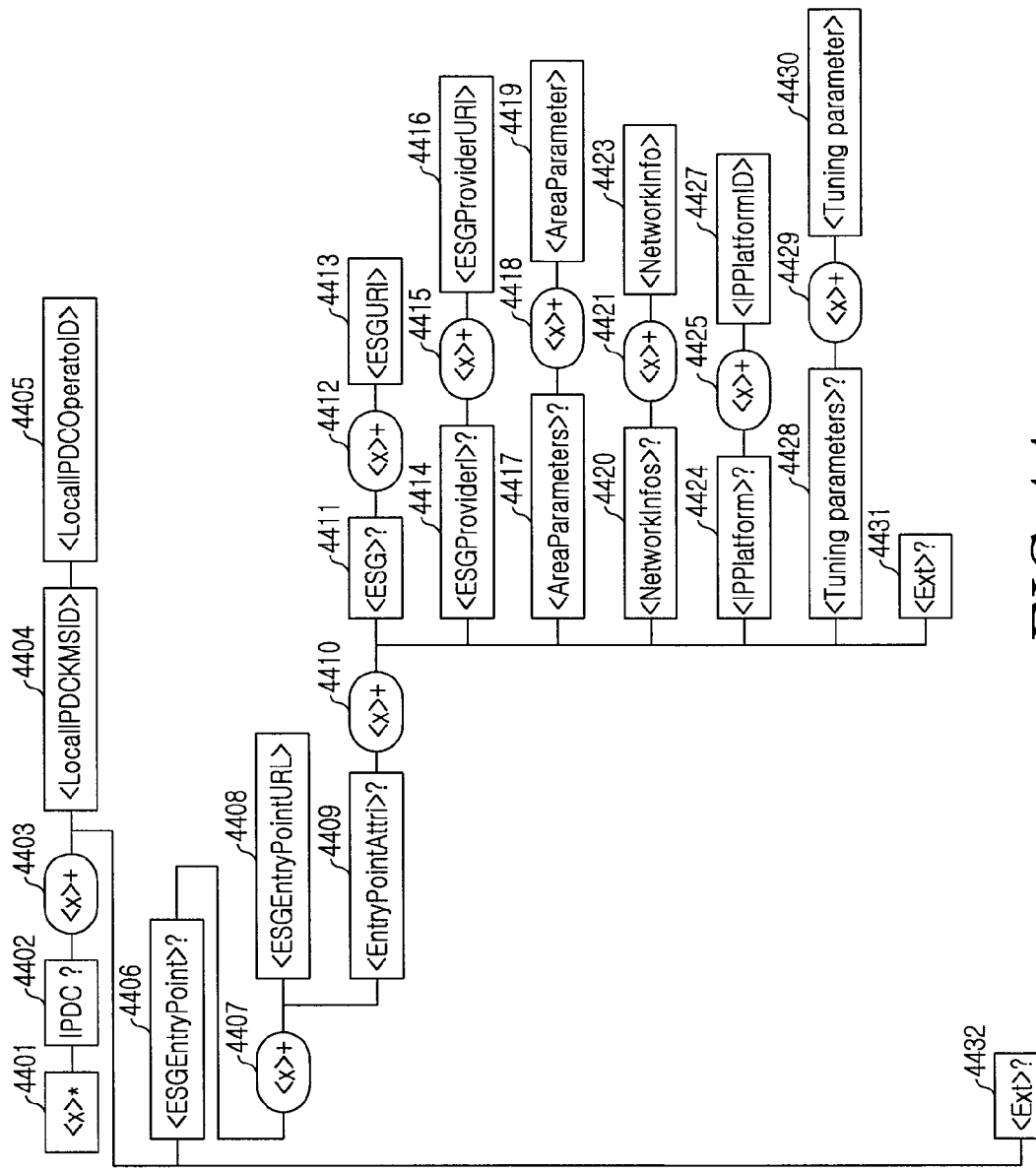
FIG. 44 illustrates an MO of a first OMA DM mechanism according to a twelfth exemplary embodiment of the present invention.

FIG. 44 illustrates an MO of the first OMA DM mechanism according to the twelfth exemplary embodiment of the present invention.

Referring to FIG. 44, in the first OMA DM mechanism according to the twelfth exemplary embodiment of the present invention, an MO similar to the MOs described above is defined for discovery of an ESG from a home IPDC operator. In this mechanism, the ESGEntryPoint 4406 is used for a terminal, which discovers an ESG in a home (local) IPDC operator. Further, the ESGEntryPointURL 4408 is a URL, which enables a terminal to query an ESG through an interactive network. Further, nodes designated by reference numerals 4401 to 4435 perform the same operations as those by the nodes provided by the OMA DM according to the tenth exemplary embodiment of the present invention described above.

2. 2nd OMA DM Mechanism

Figure 45:
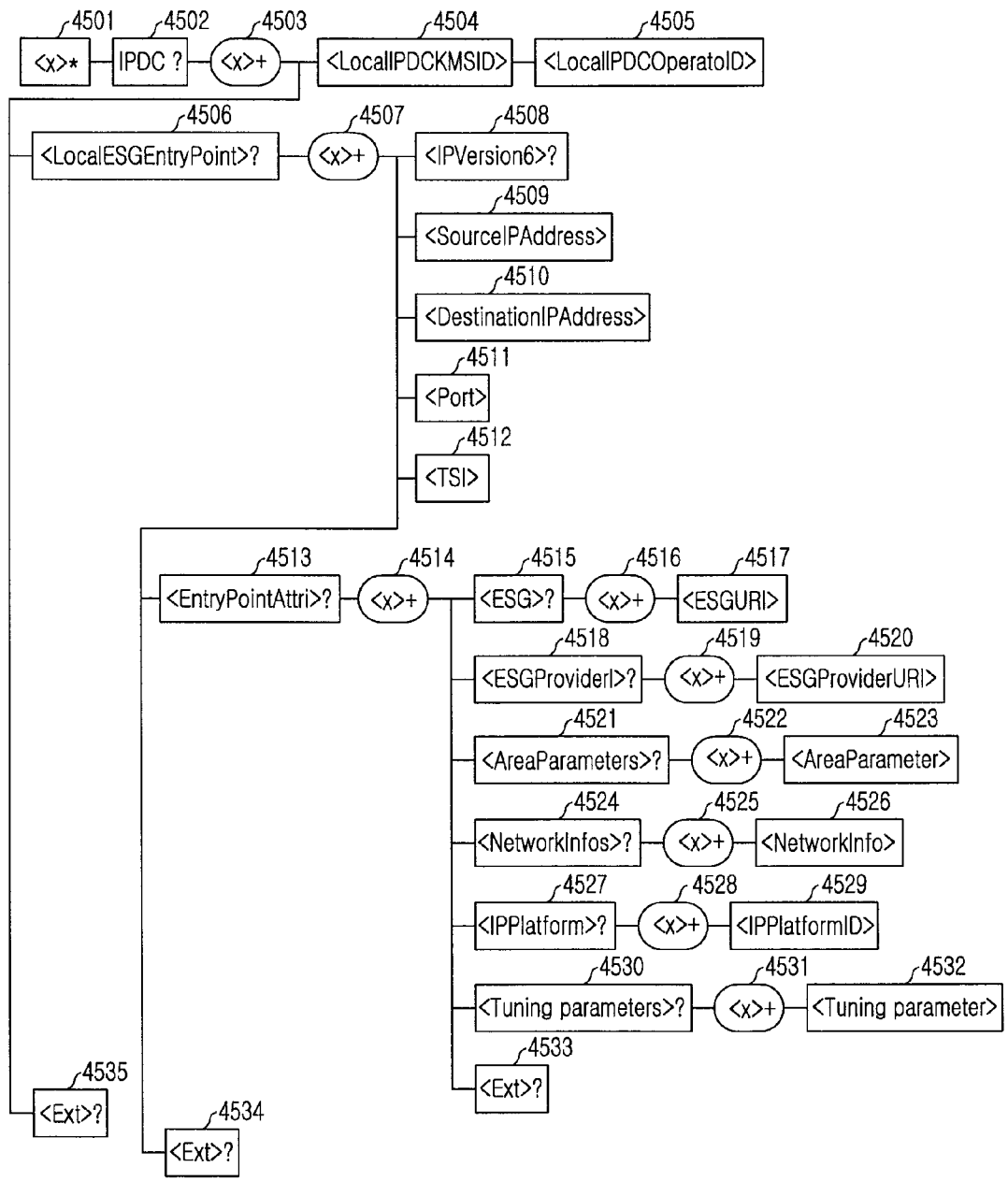
FIG. 45 illustrates an MO of a second OMA DM mechanism according to the twelfth exemplary embodiment of the present invention.

FIG. 45 illustrates an MO of a second OMA DM mechanism according to the twelfth exemplary embodiment of the present invention.

Referring to FIG. 45, in the second OMA DM mechanism according to the twelfth exemplary embodiment of the present invention, although a URL is described for an entry point, it is also possible to use not only the described URL but also an IP address, a port number, both a URL and an IP address/port number, or another address. If both the URL and the IP address/port number are used at the same time, each of them can be indicated by a sub-node. Therefore, all the URLs described in the second OMA DM mechanism according to the twelfth exemplary embodiment of the present invention may be an IP address and a port number (TSI, IP platform ID may be needed), or a URL and an IP address/port number (TSI, IP platform ID may be needed). Further, the entry point may be an entry point (for ESGBootstrap or ESG) that the terminal discovers in a broadcast network.

In the second OMA DM mechanism according to the twelfth exemplary embodiment of the present invention, the MO is defined for discovery of an entry point in a broadcast network.

The IPVersion6 4508 indicates if the SourceIPAddress and the DestinationIPAddress are signals according to IPVersion6. Here, the SourceIPAddress 4509 is a source IP address of a FLUTE session transmitting an ESG, and the DestinationIPAddress 4510 is a target IP address of the FLUTE session transmitting the ESG. Further, the Port 4511 is a port number of an IP stream of the FLUTE session transmitting the ESG, the TSI 4512 is a transport session identifier of the FLUTE session transmitting the ESG, the ESGURI 4517 indicates transmission of the ESG, the IPPlatformID 4529 is an IP platform identifier transmitting the ESG. Further, nodes designated by reference numerals 4501 to 4535 perform the same operations as those of the nodes provided by the OMA DM according to the tenth exemplary embodiment of the present invention described above.

3. 3rd OMA DM Mechanism

Figure 46:
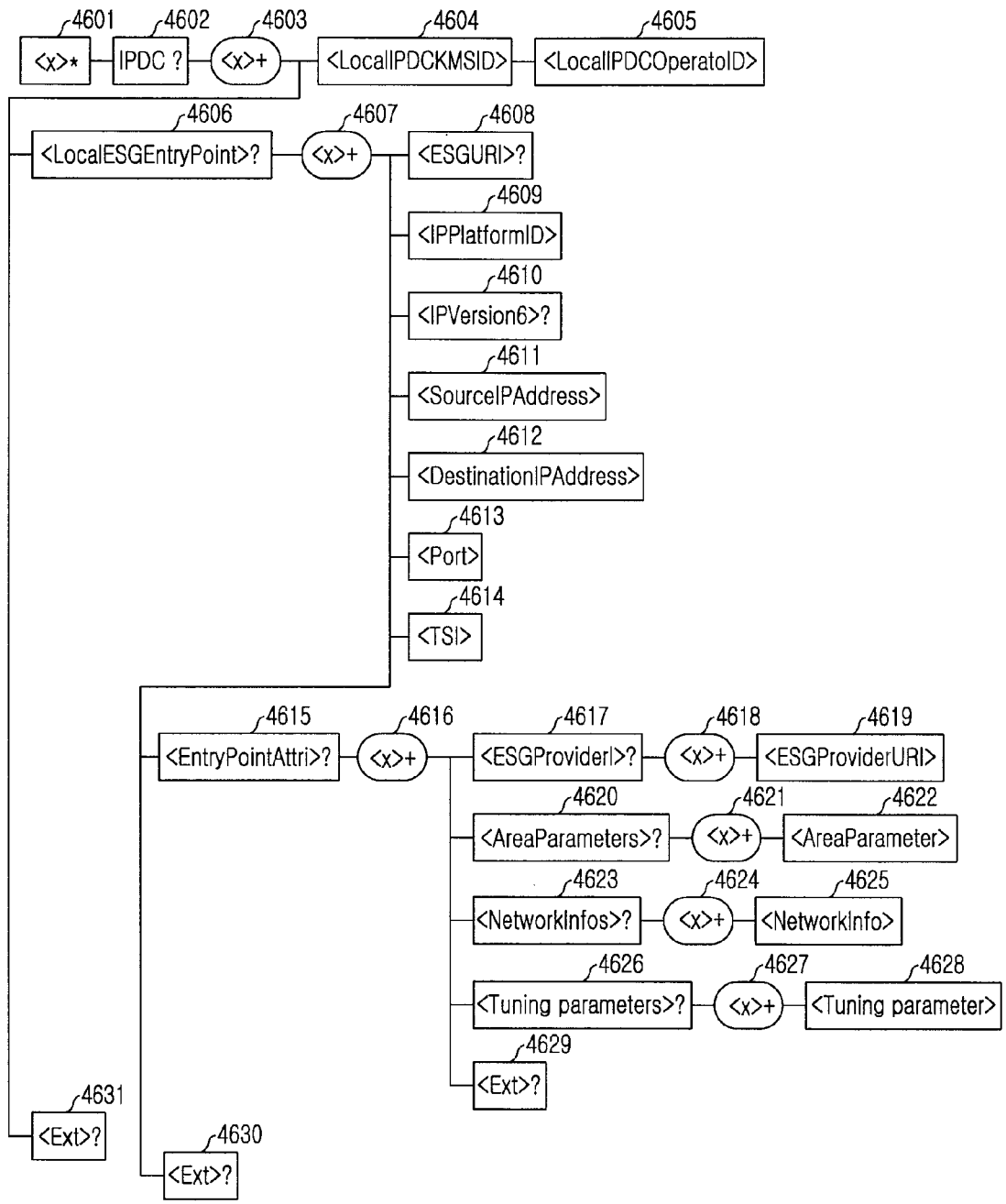
FIG. 46 illustrates an MO of a third OMA DM mechanism according to the twelfth exemplary embodiment of the present invention.

FIG. 46 illustrates an MO of a third OMA DM mechanism according to the twelfth exemplary embodiment of the present invention.

Referring to FIG. 46, for each ESGURI, an entry point of an ESGURI is defined in each IP platform, and nodes designated by reference numerals 4601 to 4631 perform substantially the same operations as those of the nodes provided by the OMA DM according to the tenth exemplary embodiment of the present invention described above.

In the second or third OMA DM mechanism according to the twelfth exemplary embodiment of the present invention, the terminal can search for an ESG directly in a broadcast without parsing ESG bootstrap information. Further, the second and third OMA DM mechanisms according to the twelfth exemplary embodiment of the present invention described above correspond to examples for the home (local) case. Similarly, an ESG of a roaming partner discovery MO can be defined by the fourth and the fifth OMA DM mechanisms according to the twelfth exemplary embodiment of the present invention described below.

4. 4th OMA DM Mechanism

Figure 47:
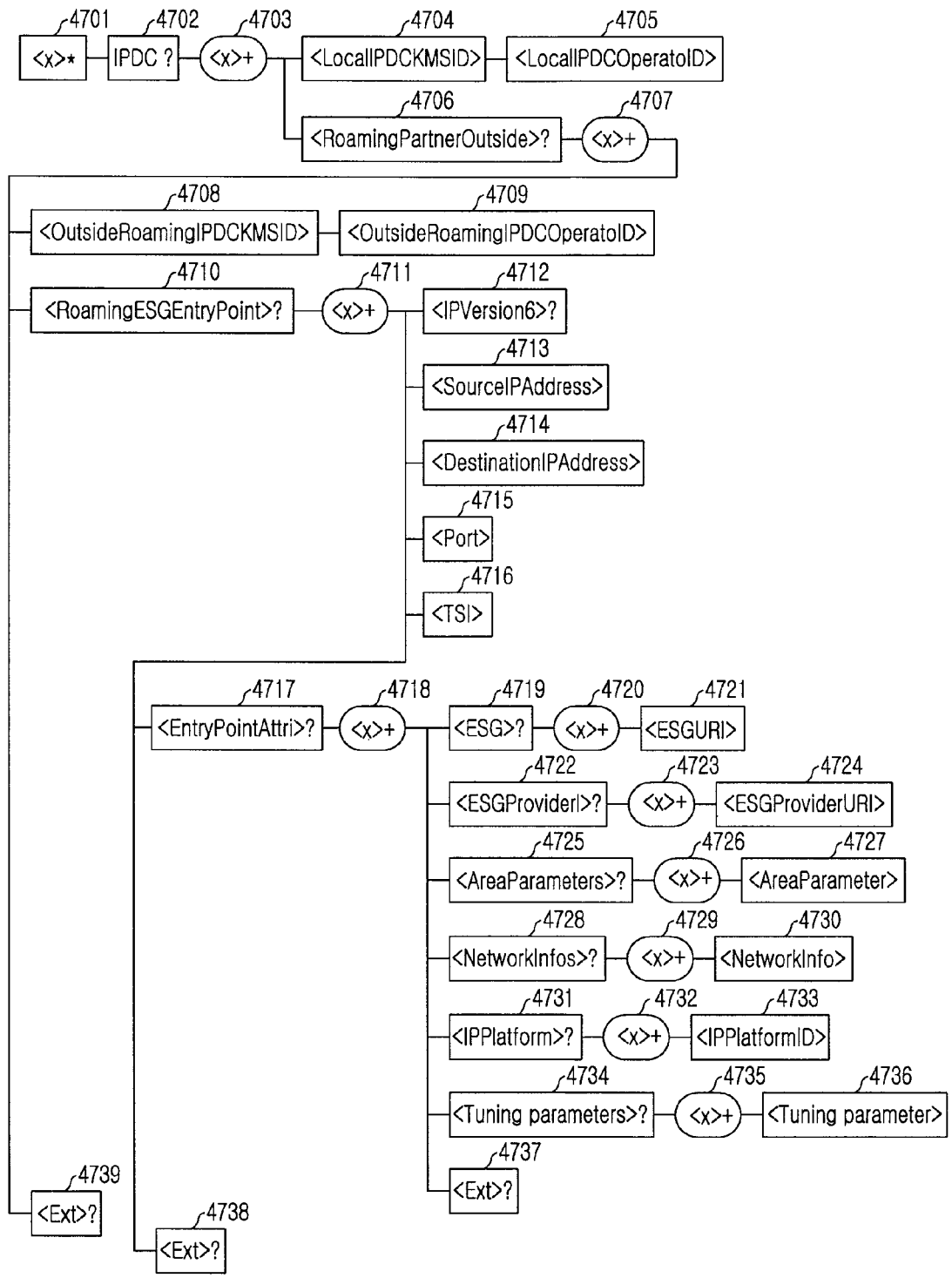
FIG. 47 illustrates an MO of a fourth OMA DM mechanism according to the twelfth exemplary embodiment of the present invention.

FIG. 47 illustrates an MO of a fourth OMA DM mechanism according to the twelfth exemplary embodiment of the present invention.

Referring to FIG. 47, nodes designated by reference numerals 4701 to 4739 perform substantially the same operations as those of the nodes provided by the OMA DM according to the tenth exemplary embodiment of the present invention described above.

5. 5th OMA DM Mechanism

Figure 48:
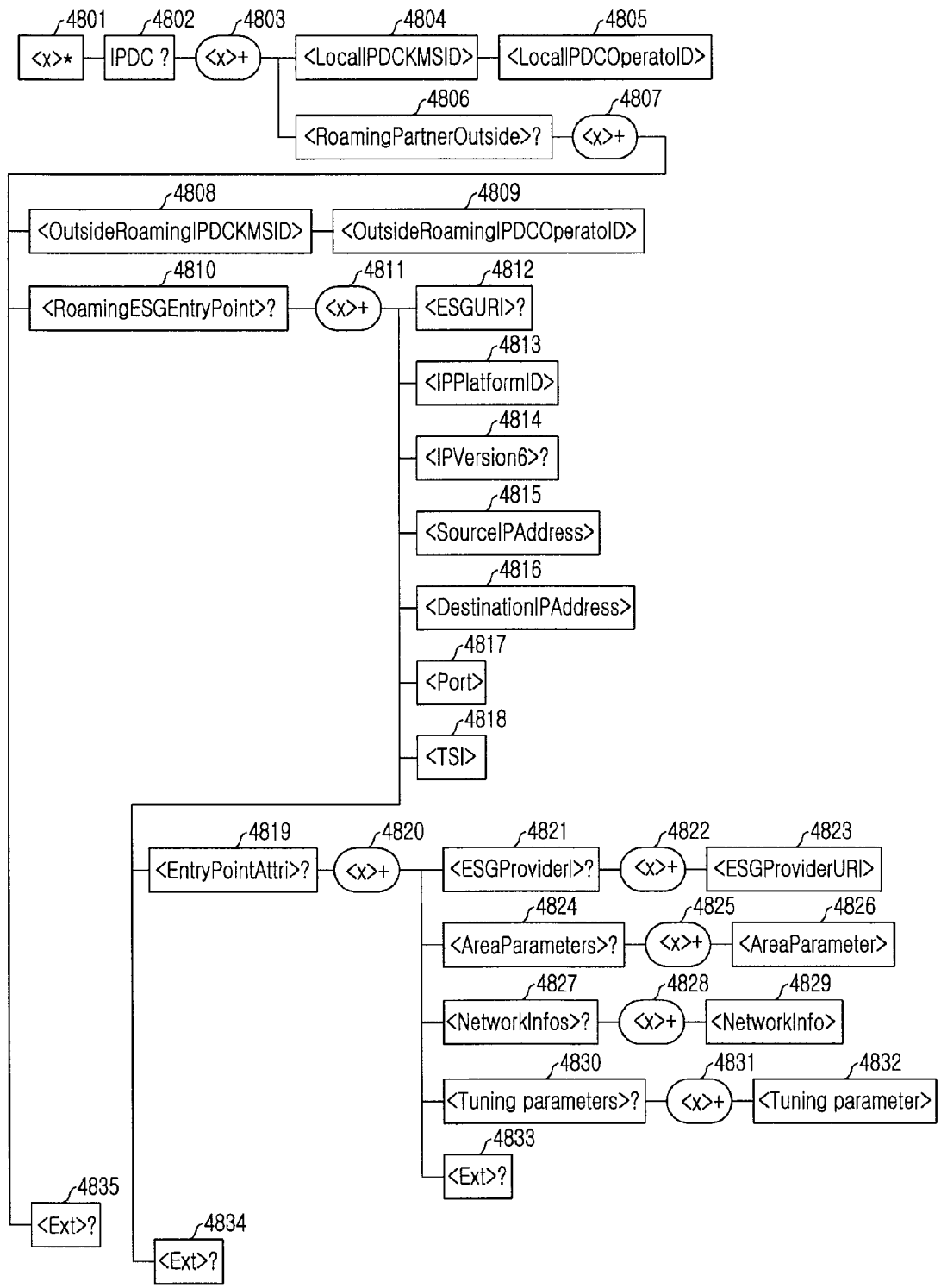
FIG. 48 illustrates an MO of a fifth OMA DM mechanism according to the twelfth exemplary embodiment of the present invention.

FIG. 48 illustrates an MO of a fifth OMA DM mechanism according to the twelfth exemplary embodiment of the present invention.

Referring to FIG. 48, nodes designated by reference numerals 4801 to 4835 perform substantially the same operations as those of the nodes provided by the OMA DM according to the tenth exemplary embodiment of the present invention described above.

In the home IPDC operator scope and the roaming partner scope, the MO for a terminal may have a configuration obtained by combining both scopes. Further, for the URL and the IP address/port/TSI/IPPlatformID, the MO may have a configuration corresponding to a combination for discovery of both entry points in bi-directions and in the broadcast network. Further, for the entry points of all other MOs, the URL may be an IPPlatform, TSI, or both of them. Further, the MO can be modified in a way similar to that described above in the OMA DM mechanism according to the twelfth exemplary embodiment of the present invention.

OMA DM Mechanism According to 13th Exemplary Embodiment

The OMA DM mechanisms according to the tenth to twelfth exemplary embodiments of the present invention are used for ESG search. The mechanism according to the eleventh exemplary embodiment of the present invention is used for supply of configuration information, while the others are used for ESG bootstrap search. For example, these mechanisms can be combined for at least one object for supply of configuration information and ESG bootstrap search.

The configuration may have various forms due to different applications. Therefore, the MO, ESG bootstrap entry point, and ESG entry point, which are defined in order to provide the configuration, also may have various forms. Further, in an exemplary implementation, the mechanisms defined in the present specification can be combined or modified in various ways.

1. 1st OMA DM Mechanism

Figure 49:
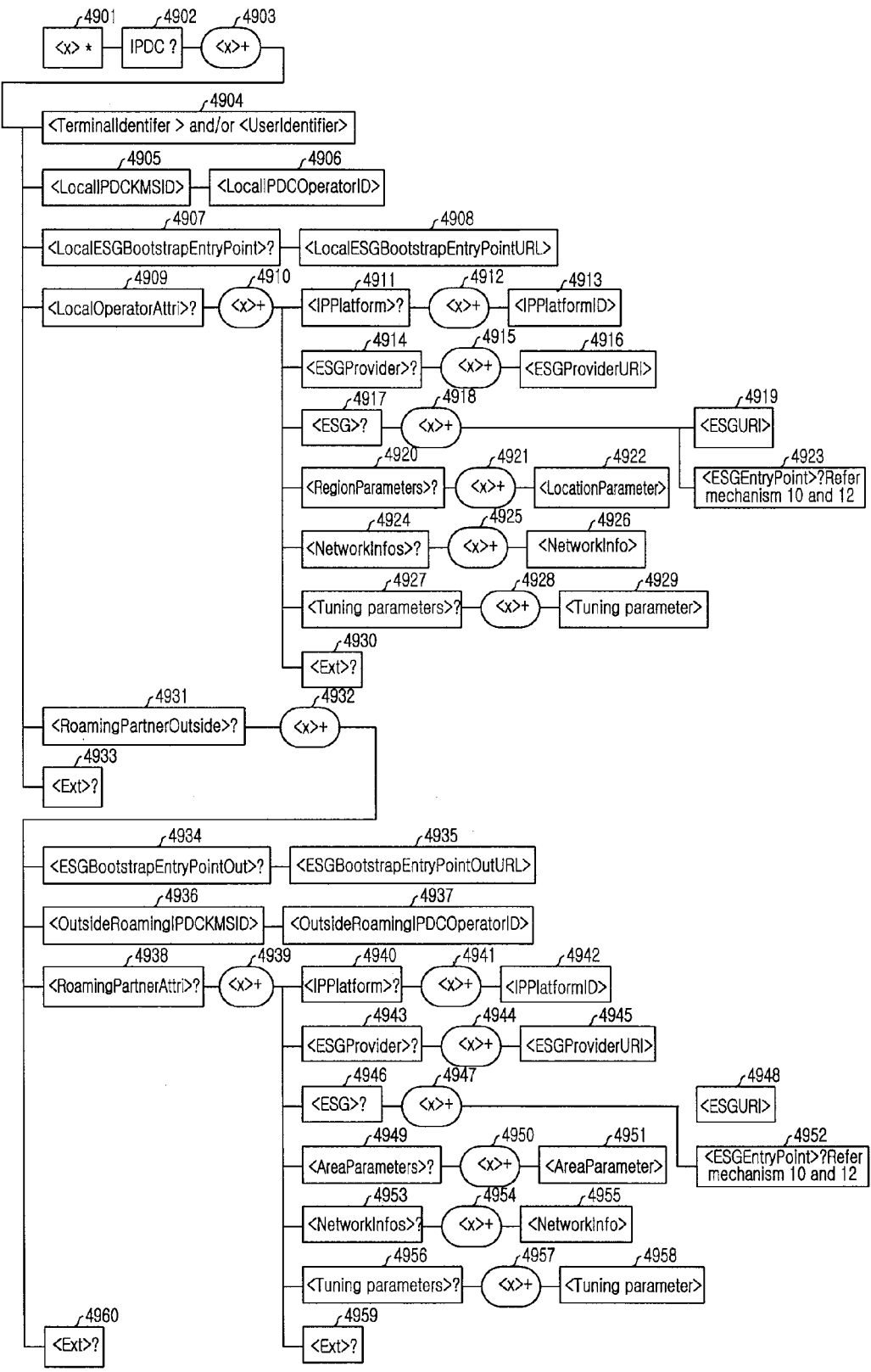
FIG. 49 illustrates an MO of a first OMA DM mechanism according to a thirteenth exemplary embodiment of the present invention.

FIG. 49 illustrates an MO of a first OMA DM mechanism according to the thirteenth exemplary embodiment of the present invention.

FIG. 49 is based on an assumption as follows. In FIG. 49, nodes designated by reference numerals 4901 to 4960 perform substantially the same operations as those of the nodes provided by the OMA DM according to the other exemplary embodiments of the present invention. Further, each home IPDC operator has a roaming configuration different from its home (local) configuration. The roaming configuration is based on a roaming agreement with its roaming partner. Referring to reference numeral 4909 of FIG. 49, the home configuration of the IPDC operator is described in the LocalOperatorAttri. The LocalOperatorAttri 4909 describes a related IP platform, an ESG provider, an ESG, area information, network information, and tuning parameters. The LocalESGBootstrapEntryPointURL is provided for the home configuration.

Referring to reference numeral 4938 of FIG. 49, a configuration of each roaming partner is provided in the RoamingPartnerAttri field. Further, the ESGBootstrapEntryPointOutURL field 4935 of FIG. 49 is provided for bootstrap search when the terminal belongs to the roaming configuration.

In the MO described above, different ESG bootstrap entry point URLs are prepared for local and roaming cases, and one URL may be provided for both of them. When a common URL is used for the local and the roaming cases, the terminal should notify the server of the object to which the terminal queries between the local and roaming cases when the terminal requests bootstrap information using the URL.

Based on the configuration and the entry point information described above, the terminal can select an IP platform for bootstrap, and can select an ESG that is proper for access through a broadcast network or query them through an interactive network. If the ESG entry point information is provided as in the OMA DM mechanism according to the ninth to twelfth exemplary embodiments of the present invention, the terminal can directly access or query the ESG without parsing the bootstrap information.

2. 2nd OMA DM Mechanism

Figure 50:
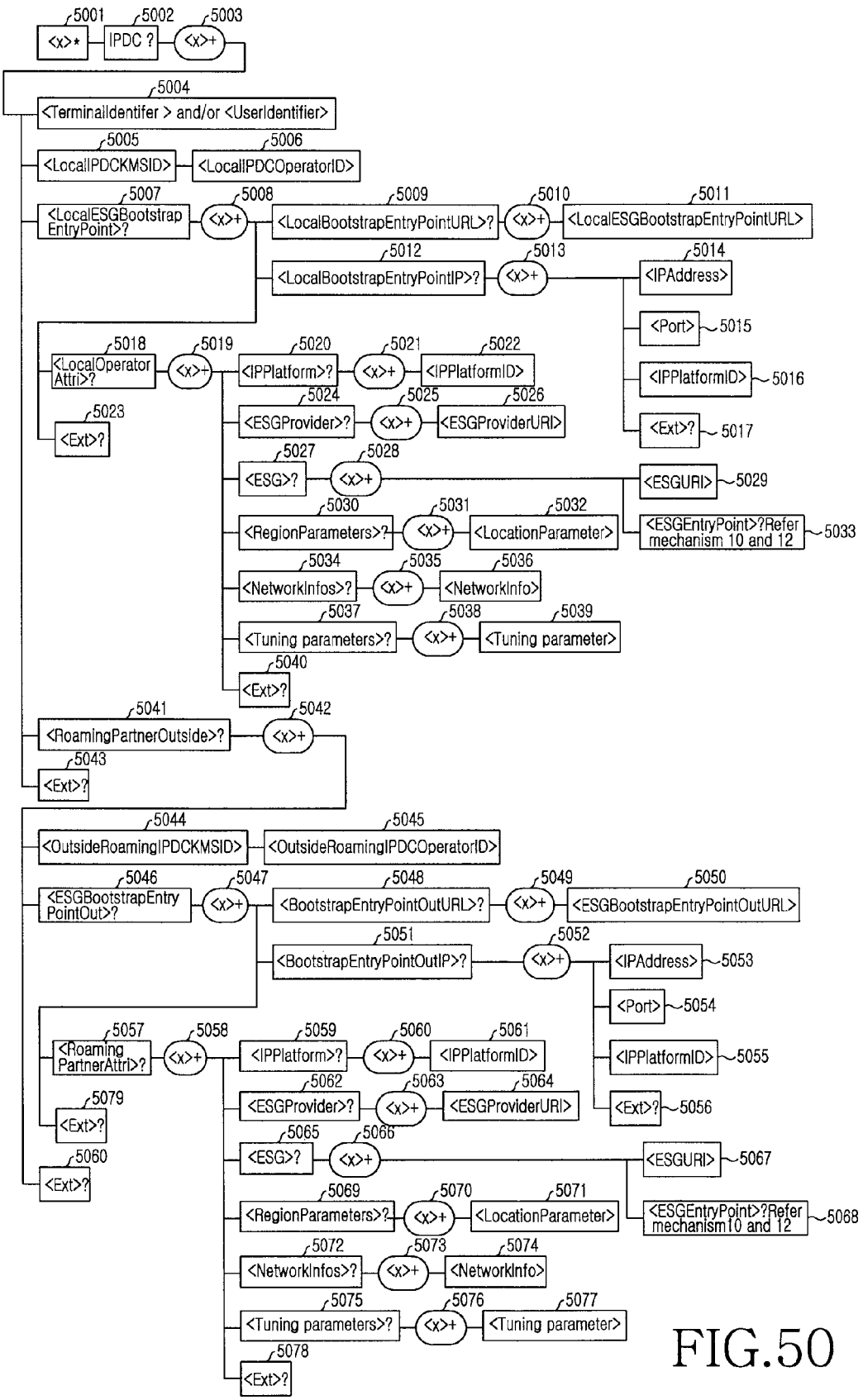
FIG. 50 illustrates an MO of a second OMA DM mechanism according to the thirteenth exemplary embodiment of the present invention.

FIG. 50 illustrates an MO of a second OMA DM mechanism according to the thirteenth exemplary embodiment of the present invention.

In FIG. 50, nodes designated by reference numerals 5001 to 5078 perform substantially the same operations as those of the nodes provided by the OMA DM according to the other exemplary embodiments of the present invention.

In the first OMA DM mechanism according to the thirteenth exemplary embodiment of the present invention described above, one bootstrap entry point URL is provided for each home and roaming configuration. However, a home or roaming configuration may have at least two entry points having different characteristics, for example, one bootstrap entry point for each IP platform. Such characteristics have been described in the previous mechanisms. The characteristics information relates to the configuration information. In the second OMA DM mechanism according to the thirteenth exemplary embodiment of the present invention, the configuration information can be used for both the characteristics and configuration supply of an entry point.

3. 3rd OMA DM Mechanism

Figure 51:
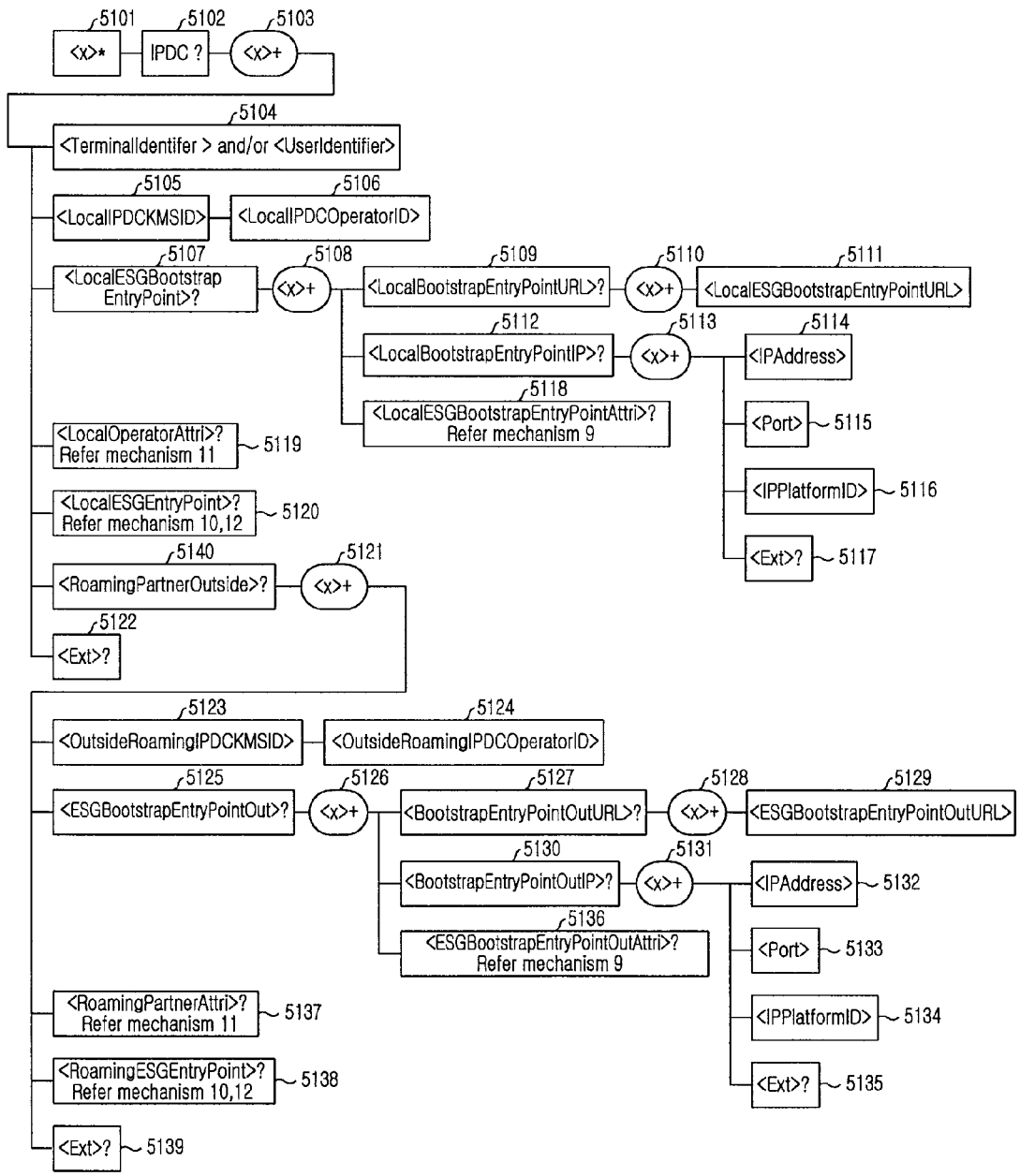
FIG. 51 illustrates an MO of a third OMA DM mechanism according to the thirteenth exemplary embodiment of the present invention.

FIG. 51 illustrates an MO of a third OMA DM mechanism according to the thirteenth exemplary embodiment of the present invention.

In FIG. 51, nodes designated by reference numerals 5101 to 5139 perform substantially the same operations as those of the nodes provided by the OMA DM according to the other exemplary embodiments of the present invention.

If it is desired to provide configuration information and ESG bootstrap entry point information while discriminating between them, some entry point characteristic information overlaps with the configuration information, and the MO can define the overlapping information by different subnodes. Therefore, it is possible to use various schemes for combining mechanisms for various purposes. Although the third OMA DM mechanism according to the thirteenth exemplary embodiment of the present invention provides several examples of the configuration, the present invention is not limited to these examples and includes modification of the configuration based on another application.

4. 4th OMA DM Mechanism

Figure 52:
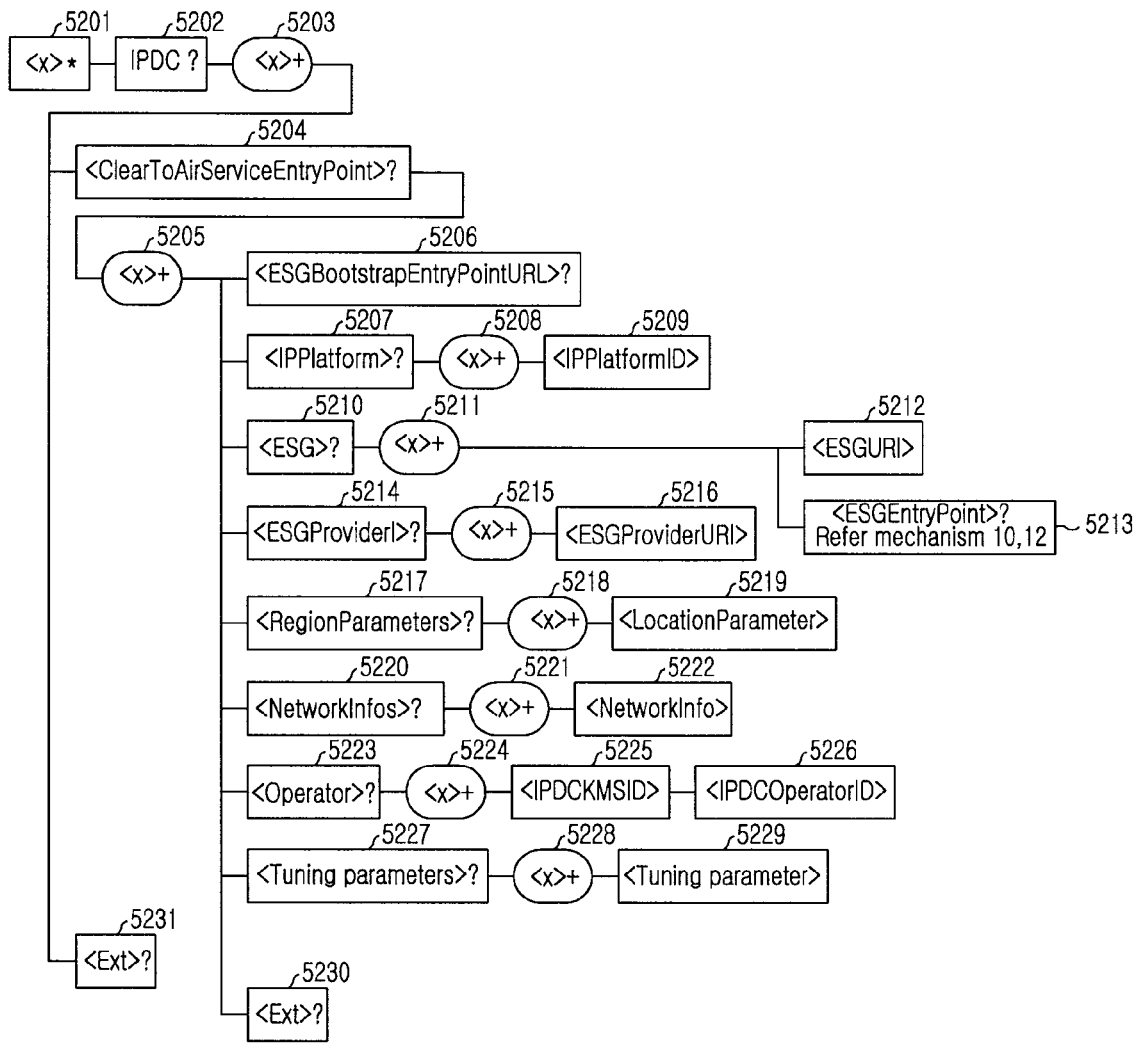
FIG. 52 illustrates an MO of a fourth OMA DM mechanism according to the thirteenth exemplary embodiment of the present invention.

FIG. 52 illustrates an MO of a fourth OMA DM mechanism according to the thirteenth exemplary embodiment of the present invention.

In FIG. 52, nodes designated by reference numerals 5201 to 5230 perform substantially the same operations as those of the nodes provided by the OMA DM according to the other exemplary embodiments of the present invention.

A terminal can access a service based on a registered IPDC operator of the terminal and a roaming partner of the operator. Except for this service, there is a service that cannot be scrambled. Even if the service is not based on a registered IPDC operator of the terminal or a roaming partner of the operator, the terminal can access their service. This type of service is referred to as a "clear to air" service.

The following MO corresponds to an example of searching for a clear to air service.

The ESGBootstrapEntryPointURL is a URL which enables a terminal to query bootstrap information for the clear to air service. The IPPlatformID appoints the IP platform having the clear to air service. The ESGURI appoints the ESG having the clear to air service. The ESGEntryPoint appoints an entry point of an ESG having the clear to air service. For details thereof, it is possible to refer to the mechanisms according to the tenth and twelfth exemplary embodiments of the present invention. There may exist a URL by which a terminal queries an ESG. The URL may be an IP address indicating the location of the ESG, port number, TSI, or IPPlatformID. Other related information can be obtained by referring to the description on other mechanisms.

In the exemplary embodiments described above, when a terminal ID or user ID is provided, the ESG bootstrap entry point, ESG access point, provisioning or any other information may be different according to another terminal or user. Further, nodes relating to the terminal information or user information and the terminal ID or user ID may be added or modified. The ESG bootstrap entry point, access point, provisioning or any other information is provided based on another terminal or user.

Further, the exemplary OMA DM of the present specification uses the ESG bootstrap entry point, access point, and provisioning, the used ESG bootstrap entry point, access point, and provisioning do not limit the described exemplary embodiments.

Further, the definition of the MO in the present specification can be used for the used bootstrap information, ESG bootstrap descriptor, ESG subset, ESG container, ESG fragment, service bundle, service, etc.

Hereinafter, a DM server and a terminal according to an exemplary embodiment of the present invention will be described with reference to FIGS. 53 and 54.

Figure 53:
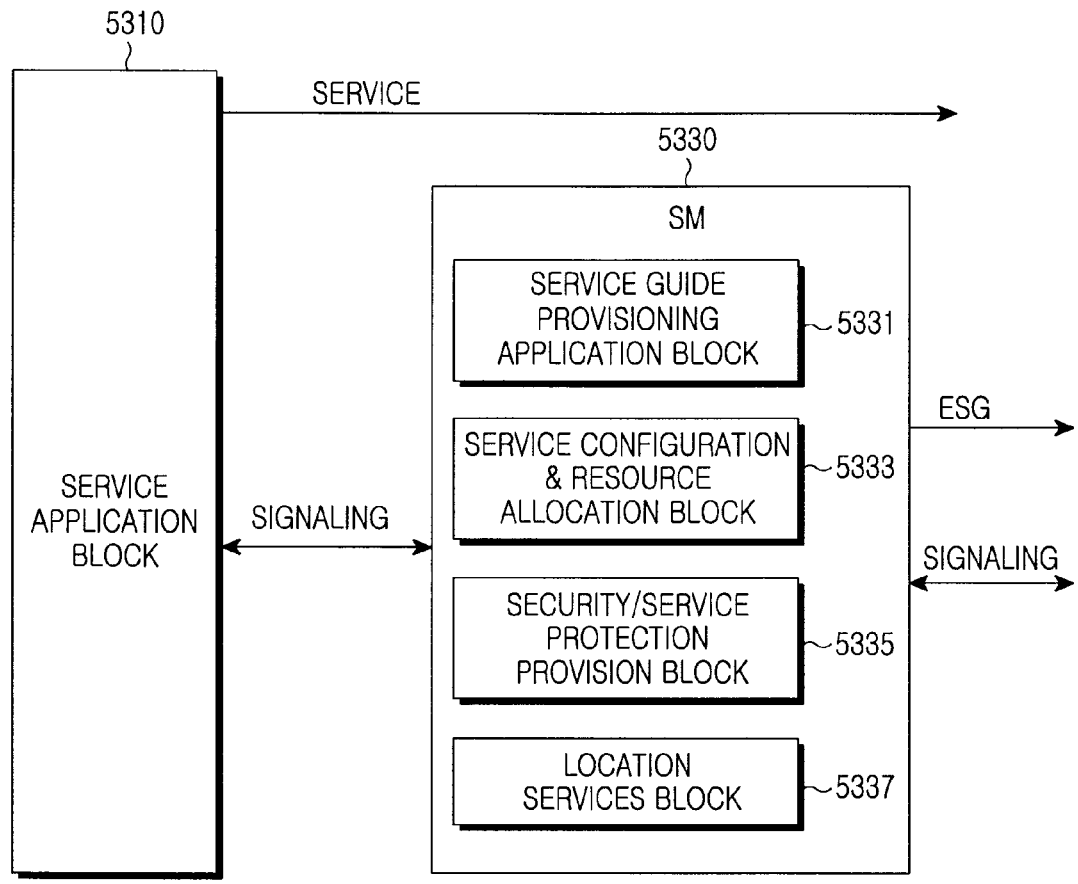
FIG. 53 illustrates a DM server according to an exemplary embodiment of the present invention.

FIG. 53 illustrates a DM server according to an exemplary embodiment of the present invention.

Referring to FIG. 53, the DM server (transmitter) includes a service application block 5310 and service management block 5330, in order to establish a communication with the terminal (receiver) and transmit ESG bootstrap entry point information to the terminal in response to a request from the terminal.

The service application block 5310 is an interacting endpoint for a terminal, which aggregates content from multiple sources and metadata necessary for service configuration in order to provide a particular service application, generates service description metadata to be used in the electronic service guide, and interacts with the service application. Further, the service application block 5310 can provide a head end application logic and service protection and include the applications provided to the IP datacast, and has a responsibility to provide content encoded in a format which the terminal understands through streaming or file carousel transfer. Further, the service application block 5310 provides service protection and may include a service application entity for each application provided in the IP datacast.

The service management block 5330 includes sub-entities of a service guide provisioning application block 5331, a service configuration & resource allocation block 5333, a security/service protection provision block 5335, and a location services block 5337.

The service configuration & resource allocation block 5333 allocates competing service applications for a bandwidth of a broadcast bearer. That is, one DVB-H IP platform is allocated to one DVB transport stream. Further, the service configuration & resource allocation block 5333 allocates resources to the service location (e.g. broadcast network topology) and a schedule service over bandwidth and time. The service provisioning application block 5331 collects parameters of roaming ESG information from the service application block 5310. The security/service protection provision block 5335 manages user access to the service application block 5310. Further, the location services block 5337 provides a location service to a service application by, for example, an interactive bearer network function or a GPS function.

Figure 54:
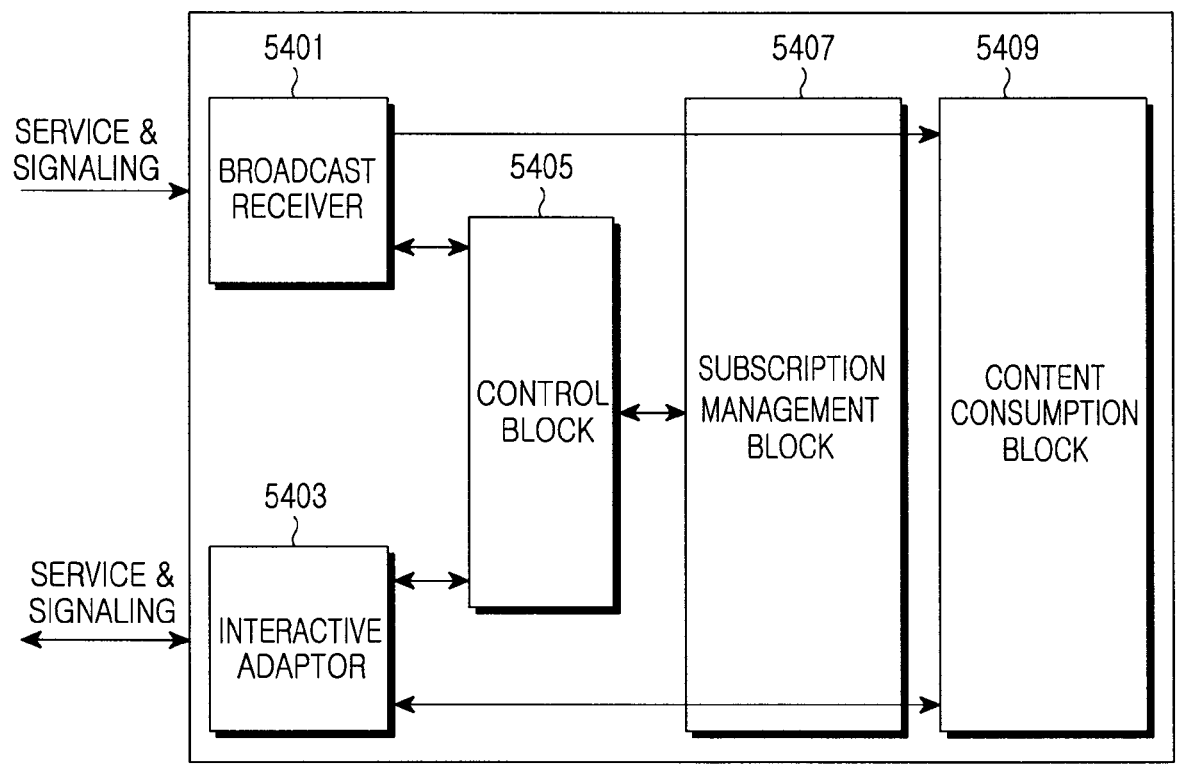
FIG. 54 illustrates a terminal according to an exemplary embodiment of the present invention.

FIG. 54 illustrates a terminal according to an exemplary embodiment of the present invention.

Referring to FIG. 54, the terminal first receives ESG bootstrap entry point information from the DM server. Then, the terminal can select an ESG bootstrap entry point according to requirements of a desired bootstrap as described below. The ESG bootstrap entry point according to requirements of a desired bootstrap may include an ESG bootstrap entry point relating to the home IPDCKMSID and IPDCOperatorID of the described terminal (itself), an ESG bootstrap entry point relating to a particular area, an ESG bootstrap entry point relating to a particular network, an ESG bootstrap entry point relating to a particular ESG, and an ESG bootstrap entry point relating to a roaming user. Thereafter, the terminal requests ESG bootstrap information from the selected ESG bootstrap entry point, receives the requested ESG bootstrap information, and selects an ESG. Further, the terminal selects a service to access through the selected ESG and then accesses the service. The terminal as described above includes a broadcast receiver 5401, an interactive adaptor 5403, a control block 5405, a subscription management block 5407, and a content consumption block 5409.

The broadcast receiver 5401 receives service data or signaling (including roaming ESG information) from the broadcast network. The interactive adaptor 5403 transmits and receives the service data or signaling (including roaming ESG information) through an interactive network. The control block 5405 performs the mobility process and performs a control for selection of the ESG bootstrap entry point according to the requirements of the desired bootstrap as described above. The subscription management block 5407 controls rights acquisition, traces the acquired rights and controls the parsing process of the service content. The content consumption block 5409 consumes content and provides the roaming ESG information to the user.

Figure 55:
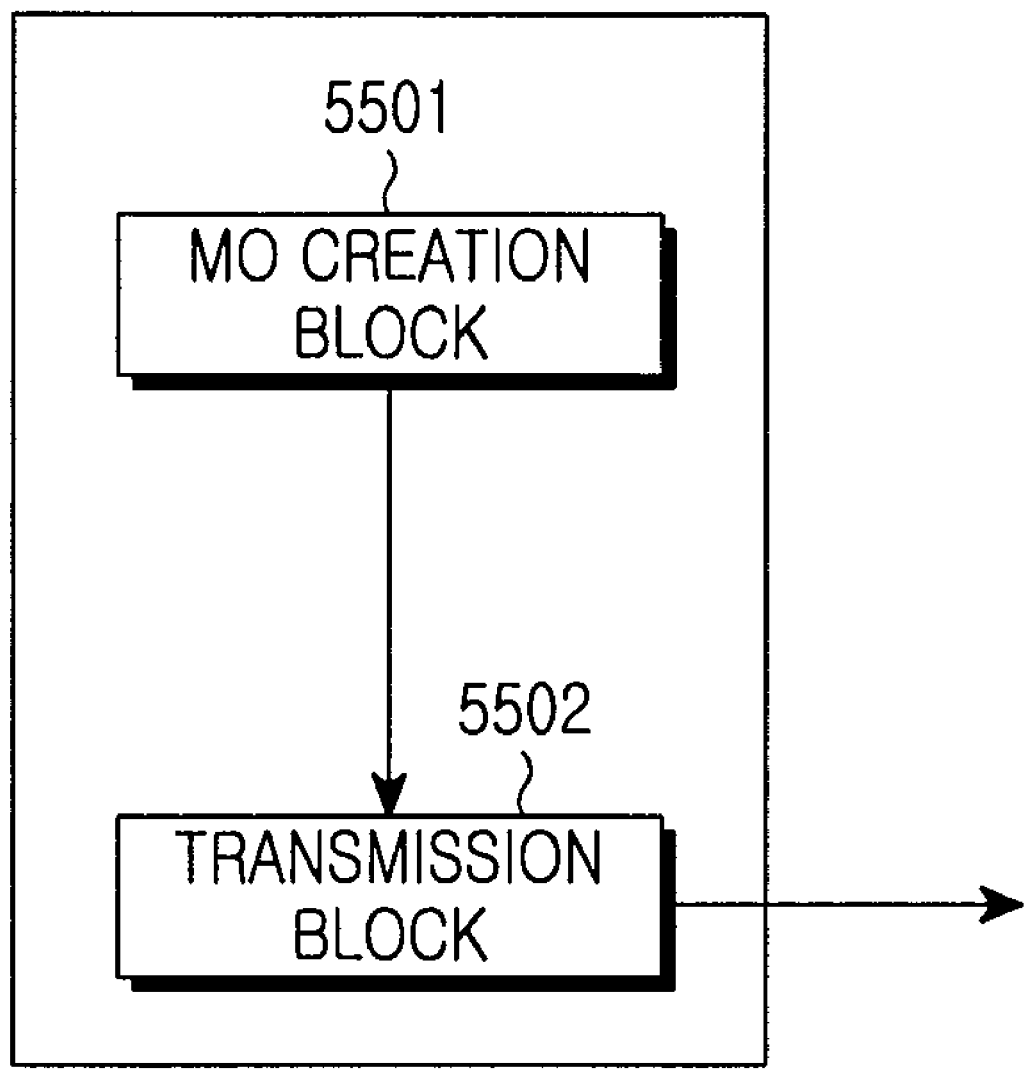
FIG. 55 illustrates an apparatus for providing ESG bootstrap entry point discovery information according to an exemplary embodiment of the present invention.

FIG. 55 illustrates an apparatus for providing ESG bootstrap entry point discovery information according to an exemplary embodiment of the present invention.

Figure 1:
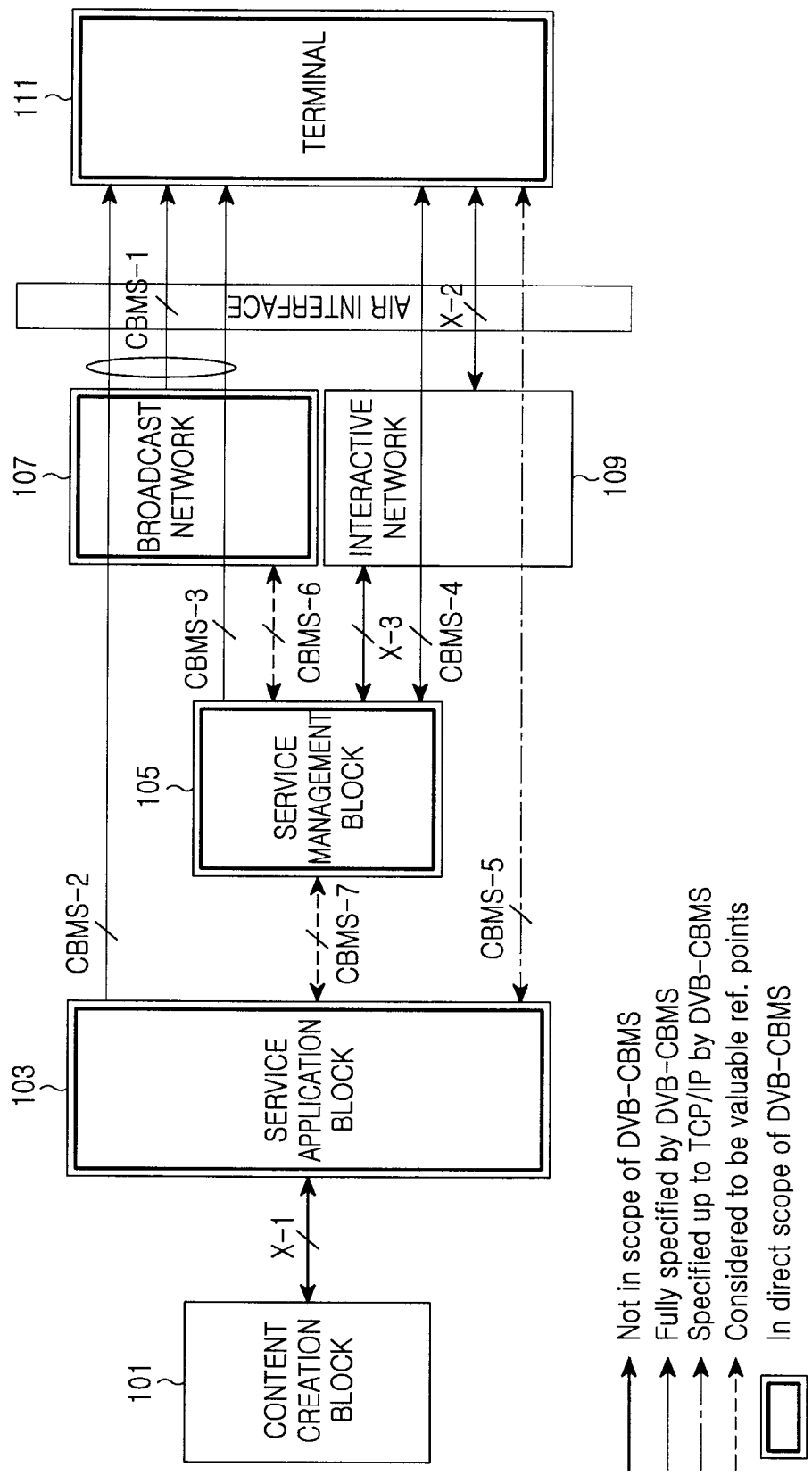
FIG. 1 is a block diagram illustrating a structure of a Convergence of Broadcasting and Mobile Service (CBMS) system.

This apparatus may be separately configured between the service application block 103 and the interactive network 109 of FIG. 1, may be embedded in the service management block 105, or may be configured as a part of the service management block 105.

The ESG bootstrap entry point discovery information providing apparatus as described above includes an MO creation block 5501 and a transmission block 5502. The MO creation block 5501 lists at least one piece of ESG bootstrap characteristic information for an ESG bootstrap proper for the status of the terminal, and creates a Management Object (MO) connecting the ESG bootstrap entry point with said at least one piece of ESG bootstrap characteristic information. The transmission block 5502 transmits the generated MO to the terminal through an interactive channel.

According to exemplary embodiments of the present invention, it is possible to select an ESG bootstrap entry point according to requirements of a desired bootstrap, request ESG bootstrap information from the selected ESG bootstrap entry point, receive the requested ESG bootstrap information, select an ESG, and access a service through the selected ESG.

Further, according to exemplary embodiments of the present invention, it is possible to select an ESG by selecting an ESG bootstrap entry point according to requirements of a desired bootstrap by using an OMA DM in a digital broadcast system.

Further, according to exemplary embodiments of the present invention, it is possible to select an ESG based on provisioning information by using an OMA DM in a digital broadcast system. Moreover, according to exemplary embodiments of the present invention, it is possible to discover roaming partner information within a roaming coverage area of a terminal and an ESG bootstrap entry point corresponding to the roaming partner information.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method of providing discovery information of an Electronic Service Guide (ESG) bootstrap entry point, the method comprising:
creating a Management Object (MO) comprising information of a terminal and ESG bootstrap entry points corresponding to roaming partners within a roaming coverage area of the terminal; and
transmitting the created MO to the terminal through an interactive channel,
wherein the information of the terminal comprises Internet Protocol Data Cast Operator Identification (IPDCOperatorID) and location information of the terminal.

2. A method of discovering an Electronic Service Guide (ESG) bootstrap entry point, the method comprising:
receiving a Management Object (MO) comprising information of a terminal and ESG bootstrap entry points corresponding to roaming partners within a roaming coverage area of the terminal through an interactive channel; and
selecting an ESG bootstrap entry point for a bootstrap corresponding to movement of an operator to another coverage area
wherein the information of the terminal comprises Internet Protocol Data Cast Operator ID (IPDCOperatorID) and location information of the terminal.

3. A terminal apparatus for discovering an Electronic Service Guide (ESG) bootstrap entry point, the terminal apparatus comprising:
an interactive adaptor for receiving a Management Object (MO) comprising information of a terminal and ESG bootstrap entry points corresponding to roaming partners within a roaming coverage area of the terminal through an interactive channel; and
a control block for selecting an ESG bootstrap entry point for a bootstrap corresponding to movement of an operator to another coverage area
wherein the information of the terminal comprises Internet Protocol Data Cast Operator Identification (IPDCOperatorID) and location information of the terminal.

4. An apparatus for providing discovery information of an Electronic Service Guide (ESG) bootstrap entry point, the apparatus comprising:
a Management Object (MO) creation block for creating an MO comprising information of a terminal and ESG bootstrap entry points corresponding to roaming partners within a roaming coverage area of the terminal; and
a transmission block for transmitting the created MO to the terminal through an interactive channel,
wherein the information of the terminal comprises Internet Protocol Data Cast Operator Identification (IPDCOperatorID) and location information of the terminal.

5. The method of claim 1, wherein the information of the terminal further comprises IPDC Key Management System ID (IPDCKMSID).

6. The method of claim 1, wherein the ESG bootstrap entry points comprise ESG bootstrap entry point Uniform Resource Locator (URL) for requiring ESG bootstrap information, network information and ESG information.

7. The method of claim 1, wherein the ESG bootstrap entry points further comprises:
an EntryPointAttri being a node carrying characteristic information of an entry point,
an IPPlatform being a node carrying IP platform-related information,
an IPPlatformID being a node carrying an IP platform identifier (ID),
an ESGProvider being a node carrying ESG provider-related information,
an ESG Provider Uniform Resource Identifier (ESGProviderURI) being a node carrying a URI identifying an ESG provider,
an ESGURI being a node indicating an ESGURI that can be found within the ESG bootstrap,
an AreaParameters being a node carrying area-related parameters,
an AreaParameter being a node carrying area-related parameters
a NetworkInfo being a node carrying network-related parameters and network ID,
a Tuning parameters being a node carrying related tuning-related information, and
a Tuning parameter being a node carrying related tuning parameters.

8. The method of claim 7, wherein the ESG bootstrap entry points further comprises:
a RoamingPartnerOutside being a node carrying roaming partner-related information for the local IPDC KMS system and IPDC operator in an area out of the home coverage,
an Operator being a node carrying operator information,
an OutsideRoamingIPDCKMSID being a node carrying a roaming IPDC KMS system having an IPDCKMSID for a local terminal and indicates the IPDC KMS system having made a roaming agreement with the home (local) IPDC KMS system and operator, and
an OutsideRoamingIPDCOperatorID being a node carrying a roaming IPDC operator having an IPDCOperatorID for a local terminal and indicates the IPDC operator having made a roaming agreement with the home (local) IPDC operator.

9. The method of claim 2, wherein the information of the terminal further comprises IPDC Key Management System ID (IPDCKMSID).

10. The method of claim 2, wherein the ESG bootstrap entry points comprise ESG bootstrap entry point Uniform Resource Locator (URL) for requiring ESG bootstrap information, network information and ESG information.

11. The method of claim 2, wherein the ESG bootstrap entry points further comprises:
an EntryPointAttri being a node carrying characteristic information of an entry point,
an IPPlatform being a node carrying IP platform-related information,
an IPPlatformID being a node carrying an IP platform identifier (ID),
an ESGProvider being a node carrying ESG provider-related information,
an ESG Provider Uniform Resource Identifier (ESGProviderURI) being a node carrying a URI identifying an ESG provider,
an ESGURI being a node indicating an ESGURI that can be found within the ESG bootstrap,
an AreaParameters being a node carrying area-related parameters,
an AreaParameter being a node carrying area-related parameters
a NetworkInfo being a node carrying network-related parameters, and network ID,
a Tuning parameters being a node carrying related tuning-related information, and
a Tuning parameter being a node carrying related tuning parameters.

12. The method of claim 11, wherein the ESG bootstrap entry points further comprises:
a RoamingPartnerOutside being a node carrying roaming partner-related information for the local IPDC KMS system and IPDC operator in an area out of the home coverage,
an Operator being a node carrying operator information,
an OutsideRoamingIPDCKMSID being a node carrying a roaming IPDC KMS system having an IPDCKMSID for a local terminal and indicates the IPDC KMS system having made a roaming agreement with the home (local) IPDC KMS system and operator, and
an OutsideRoamingIPDCOperatorID being a node carrying a roaming IPDC operator having an IPDCOperatorID for a local terminal and indicates the IPDC operator having made a roaming agreement with the home (local) IPDC operator.

13. The apparatus of claim 3, wherein the information of the terminal further comprises IPDC Key Management System ID (IPDCKMSID).

14. The apparatus of claim 3, wherein the ESG bootstrap entry points comprise ESG bootstrap entry point Uniform Resource Locator (URL) for requiring ESG bootstrap information, network information and ESG information.

15. The apparatus of claim 3, wherein the ESG bootstrap entry points further comprises:
- an EntryPointAttri being a node carrying characteristic information of an entry point,
- an IPPlatform being a node carrying IP platform-related information,
- an IPPlatformID being a node carrying an IP platform identifier (ID),
- an ESGProvider being a node carrying ESG provider-related information,
- an ESG Provider Uniform Resource Identifier (ESGProviderURI) being a node carrying a URI identifying an ESG provider,
- an ESGURI being a node indicating an ESGURI that can be found within the ESG bootstrap,
- an AreaParameters being a node carrying area-related parameters,
- an AreaParameter being a node carrying area-related parameters,
- a NetworkInfo being a node carrying network-related parameters and network ID,
- a Tuning parameters being a node carrying related tuning-related information, and
- a Tuning parameter being a node carrying related tuning parameters.

16. The apparatus of claim 15, wherein the ESG bootstrap entry points further comprises:
- a RoamingPartnerOutside being a node carrying roaming partner-related information for the local IPDC KMS system and IPDC operator in an area out of the home coverage,
- an Operator being a node carrying operator information,
- an OutsideRoamingIPDCKMSID being a node carrying a roaming IPDC KMS system having an IPDCKMSID for a local terminal and indicates the IPDC KMS system having made a roaming agreement with the home (local) IPDC KMS system and operator, and
- an OutsideRoamingIPDCOperatorID being a node carrying a roaming IPDC operator having an IPDCOperatorID for a local terminal and indicates the IPDC operator having made a roaming agreement with the home (local) IPDC operator.

17. The apparatus of claim 4, wherein the information of the terminal comprises IPDC Key Management System ID (IPDCKMSID).

18. The apparatus of claim 4, wherein the ESG bootstrap entry points comprise ESG bootstrap entry point Uniform Resource Locator (URL) for requiring ESG bootstrap information, network information and ESG information.

19. The apparatus of claim 18, wherein the ESG bootstrap entry points further comprises:
- an EntryPointAttri being a node carrying characteristic information of an entry point,
- an IPPlatform being a node carrying IP platform-related information,
- an IPPlatformID being a node carrying an IP platform identifier (ID),
- an ESGProvider being a node carrying ESG provider-related information,
- an ESG Provider Uniform Resource Identifier (ESGProviderURI) being a node carrying a URI identifying an ESG provider,
- an ESGURI being a node indicating an ESGURI that can be found within the ESG bootstrap,
- an AreaParameters being a node carrying area-related parameters,
- an AreaParameter being a node carrying area-related parameters,
- a NetworkInfo being a node carrying network-related parameters and network ID,
- a Tuning parameters being a node carrying related tuning-related information, and
- a Tuning parameter being a node carrying related tuning parameters.

20. The apparatus of claim 19, wherein the ESG bootstrap entry points further comprises:
- a RoamingPartnerOutside being a node carrying roaming partner-related information for the local IPDC KMS system and IPDC operator in an area out of the home coverage,
- an Operator being a node carrying operator information,
- an OutsideRoamingIPDCKMSID being a node carrying a roaming IPDC KMS system having an IPDCKMSID for a local terminal and indicates the IPDC KMS system having made a roaming agreement with the home (local) IPDC KMS system and operator, and
- an OutsideRoamingIPDCOperatorID being a node carrying a roaming IPDC operator having an IPDCOperatorID for a local terminal and indicates the IPDC operator having made a roaming agreement with the home (local) IPDC operator.

* * * * *